US012602142B2

(12) United States Patent
Devine et al.

(10) Patent No.: US 12,602,142 B2
(45) Date of Patent: Apr. 14, 2026

(54) USER INTERFACES FOR SHARING CONTEXTUALLY RELEVANT MEDIA CONTENT

(71) Applicant: Apple Inc., Cupertino, CA (US)

(72) Inventors: Lynne Devine, San Francisco, CA (US); Michael Brandt, San Jose, CA (US); Eric M.G. Circlaeys, Los Gatos, CA (US); Chelsea Leblanc, Mountain View, CA (US); William A. Sorrentino, III, Mill Valley, CA (US); Gregg Suzuki, Daly City, CA (US); Joar Wingfors, Umea (SE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/367,934

(22) Filed: Sep. 13, 2023

(65) Prior Publication Data

US 2024/0004521 A1     Jan. 4, 2024

Related U.S. Application Data

(63) Continuation of application No. 16/145,033, filed on Sep. 27, 2018, now Pat. No. 11,782,575.

(Continued)

(51) Int. Cl.
*G06F 3/0482* (2013.01)
*G06F 3/0485* (2022.01)
(Continued)

(52) U.S. Cl.
CPC .......... *G06F 3/0482* (2013.01); *G06F 3/0485* (2013.01); *G06F 3/04883* (2013.01);
(Continued)

(58) Field of Classification Search
CPC ... G06F 3/0482; G06F 3/04886; G06V 40/16; G06V 40/168; H04L 51/216; G06T 2207/30201
See application file for complete search history.

(56) References Cited

U.S. PATENT DOCUMENTS 5,416,895 A     5/1995   Anderson et al.
5,463,725 A    10/1995   Henckel et al.
(Continued)

FOREIGN PATENT DOCUMENTS

AU     2015100705 A4     6/2015
AU     2016100796 A4     6/2016
(Continued)

OTHER PUBLICATIONS

US 2002/0018582 A1, 02/2002, Hagiwara et al. (withdrawn)
(Continued)

*Primary Examiner* — Anil K Bhargava
(74) *Attorney, Agent, or Firm* — YHE Law LLP

(57) ABSTRACT

The present disclosure generally relates to managing and sharing contextually-relevant media content. In some embodiments, a device receives an input, and in response, displays a suggested collection of media items for sharing with a recipient, wherein the collection is relevant to a message conversation with the recipient. Subsequent to displaying the suggested collection, the device transmits a message to the recipient as part of the message conversation that provides access to the at least a portion of the suggested collection of media items. In some embodiments, a device receives an indication, from an external device, that a first user has shared a first collection of media items with a second user. Subsequent to receiving the indication that the first user has shared the first collection of media items with (Continued)

the second user, the device outputs a prompt to share, with the first user, one or more suggested media items.

48 Claims, 129 Drawing Sheets

Related U.S. Application Data

(60) Provisional application No. 62/668,018, filed on May 7, 2018.

(51) Int. Cl.
| | |
|---|---|
| *G06F 3/04883* | (2022.01) |
| *G06F 3/04886* | (2022.01) |
| *G06V 40/16* | (2022.01) |
| *H04L 51/10* | (2022.01) |
| *H04L 51/216* | (2022.01) |

(52) U.S. Cl.
CPC .......... *G06F 3/04886* (2013.01); *G06V 40/16* (2022.01); *G06V 40/168* (2022.01); *G06V 40/172* (2022.01); *H04L 51/10* (2013.01); *H04L 51/216* (2022.05); *G06T 2207/30201* (2013.01)

(56) References Cited

U.S. PATENT DOCUMENTS

| | | | |
|---|---|---|---|
| 5,565,888 | A | 10/1996 | Selker |
| 5,583,542 | A | 12/1996 | Capps |
| 5,604,861 | A | 2/1997 | Douglas et al. |
| 5,677,708 | A | 10/1997 | Matthews et al. |
| 5,724,985 | A | 3/1998 | Snell et al. |
| 5,757,368 | A | 5/1998 | Gerpheide et al. |
| 5,784,061 | A | 7/1998 | Moran et al. |
| 5,815,657 | A | 9/1998 | Williams et al. |
| 5,825,349 | A | 10/1998 | Meier et al. |
| 5,886,697 | A | 3/1999 | Naughton et al. |
| 5,956,035 | A | 9/1999 | Sciammarella et al. |
| 5,973,694 | A | 10/1999 | Steele et al. |
| 6,073,036 | A | 6/2000 | Heikkinen et al. |
| 6,097,371 | A | 8/2000 | Siddiqui et al. |
| 6,154,210 | A | 11/2000 | Anderson |
| 6,167,469 | A | 12/2000 | Safai et al. |
| 6,199,012 | B1 | 3/2001 | Hasegawa |
| 6,237,010 | B1 | 5/2001 | Hui et al. |
| 6,252,596 | B1 | 6/2001 | Garland et al. |
| 6,272,246 | B1 | 8/2001 | Takai |
| 6,292,273 | B1 | 9/2001 | Dow et al. |
| 6,301,586 | B1 | 10/2001 | Yang et al. |
| 6,323,846 | B1 | 11/2001 | Westerman et al. |
| 6,334,025 | B1 | 12/2001 | Yamagami et al. |
| 6,351,556 | B1 | 2/2002 | Loui et al. |
| 6,416,471 | B1 | 7/2002 | Kumar et al. |
| 6,570,557 | B1 | 5/2003 | Westerman et al. |
| 6,594,654 | B1 | 7/2003 | Salam et al. |
| 6,606,411 | B1 | 8/2003 | Loui et al. |
| 6,629,793 | B1 | 10/2003 | Miller |
| 6,662,023 | B1 | 12/2003 | Helle |
| 6,677,932 | B1 | 1/2004 | Westerman |
| 6,686,938 | B1 | 2/2004 | Jobs et al. |
| 6,741,268 | B1 | 5/2004 | Hayakawa et al. |
| 6,784,925 | B1 | 8/2004 | Tomat et al. |
| 6,912,694 | B1 | 6/2005 | Harrison et al. |
| 6,915,011 | B2 | 7/2005 | Loui et al. |
| 6,920,619 | B1 | 7/2005 | Milekic |
| 6,950,989 | B2 | 9/2005 | Rosenzweig et al. |
| 6,985,854 | B1 | 1/2006 | Mitsui |
| 6,987,991 | B2 | 1/2006 | Nelson |
| 6,990,452 | B1 | 1/2006 | Ostermann et al. |
| 7,015,910 | B2 | 3/2006 | Card et al. |
| 7,139,982 | B2 | 11/2006 | Card et al. |
| 7,164,410 | B2 | 1/2007 | Kupka |
| 7,167,731 | B2 | 1/2007 | Nelson |
| 7,178,111 | B2 | 2/2007 | Glein et al. |
| 7,286,256 | B2 | 10/2007 | Herbert |
| 7,302,650 | B1 | 11/2007 | Allyn et al. |
| 7,305,350 | B1 | 12/2007 | Bruecken |
| 7,325,198 | B2 | 1/2008 | Adcock et al. |
| 7,380,212 | B2 | 5/2008 | Cody et al. |
| 7,419,469 | B2 | 9/2008 | Vacca et al. |
| 7,421,449 | B2 | 9/2008 | Williams et al. |
| 7,434,177 | B1 | 10/2008 | Ording et al. |
| 7,437,005 | B2 | 10/2008 | Drucker et al. |
| 7,587,671 | B2 | 9/2009 | Saft et al. |
| 7,614,008 | B2 | 11/2009 | Ording |
| 7,627,828 | B1 | 12/2009 | Collison et al. |
| 7,633,076 | B2 | 12/2009 | Huppi et al. |
| 7,636,733 | B1 | 12/2009 | Rothmuller et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,669,135 | B2 | 2/2010 | Cunningham et al. |
| 7,680,340 | B2 | 3/2010 | Luo et al. |
| 7,716,194 | B2 | 5/2010 | Williams et al. |
| 7,724,242 | B2 | 5/2010 | Hillis et al. |
| 7,747,625 | B2 | 6/2010 | Gargi et al. |
| 7,771,320 | B2 | 8/2010 | Riley et al. |
| 7,773,460 | B2 | 8/2010 | Holt |
| 7,779,358 | B1 | 8/2010 | Gupta et al. |
| 7,788,592 | B2 | 8/2010 | Williams et al. |
| 7,823,080 | B2 | 10/2010 | Miyajima et al. |
| 7,831,100 | B2 | 11/2010 | Gallagher et al. |
| 7,843,454 | B1 | 11/2010 | Biswas |
| 7,844,914 | B2 | 11/2010 | Andre et al. |
| 7,865,215 | B2 | 1/2011 | Bells et al. |
| 7,957,762 | B2 | 6/2011 | Herz et al. |
| 7,970,240 | B1 | 6/2011 | Chao et al. |
| 7,970,827 | B1 | 6/2011 | Cumberbatch et al. |
| 7,991,234 | B2 | 8/2011 | Fujioka et al. |
| 8,006,002 | B2 | 8/2011 | Kalayjian et al. |
| 8,024,658 | B1 | 9/2011 | Fagans et al. |
| 8,028,249 | B2 | 9/2011 | Loui et al. |
| 8,074,172 | B2 | 12/2011 | Kocienda et al. |
| 8,105,208 | B2 | 1/2012 | Oleson et al. |
| 8,106,856 | B2 | 1/2012 | Matas et al. |
| 8,121,945 | B2 | 2/2012 | Rackley et al. |
| RE43,260 | E | 3/2012 | Paalasmaa et al. |
| 8,128,503 | B1 | 3/2012 | Haot et al. |
| 8,132,116 | B1 | 3/2012 | Schendel |
| 8,152,694 | B2 | 4/2012 | Srinivasan et al. |
| 8,200,323 | B2 | 6/2012 | Dibenedetto et al. |
| 8,200,669 | B1 | 6/2012 | Iampietro et al. |
| 8,232,973 | B2 | 7/2012 | Kocienda et al. |
| 8,239,784 | B2 | 8/2012 | Hotelling et al. |
| 8,255,810 | B2 | 8/2012 | Moore et al. |
| 8,279,180 | B2 | 10/2012 | Hotelling et al. |
| 8,290,478 | B2 | 10/2012 | Shim et al. |
| 8,305,355 | B2 | 11/2012 | Forstall et al. |
| 8,339,420 | B2 | 12/2012 | Hiraoka et al. |
| 8,352,471 | B2 | 1/2013 | Oami |
| 8,379,939 | B1 * | 2/2013 | Bourdev ............... G06V 20/30 |
| | | | 382/118 |
| 8,381,135 | B2 | 2/2013 | Hotelling et al. |
| 8,386,934 | B2 | 2/2013 | Takakura et al. |
| 8,406,473 | B2 | 3/2013 | Tanaka et al. |
| 8,418,075 | B2 | 4/2013 | Gallo et al. |
| 8,453,940 | B2 | 6/2013 | Diamond |
| 8,462,997 | B2 | 6/2013 | Soldan et al. |
| 8,467,770 | B1 | 6/2013 | Ben |
| 8,479,122 | B2 | 7/2013 | Hotelling et al. |
| 8,504,008 | B1 | 8/2013 | Gossweiler et al. |
| 8,543,081 | B2 | 9/2013 | Scott et al. |
| 8,543,927 | B1 | 9/2013 | Mckinley et al. |
| 8,554,694 | B1 | 10/2013 | Ward et al. |
| 8,566,403 | B2 | 10/2013 | Pascal et al. |
| 8,571,331 | B2 | 10/2013 | Cifarelli et al. |
| 8,572,513 | B2 | 10/2013 | Chaudhri et al. |
| 8,583,637 | B2 | 11/2013 | Berkner et al. |
| 8,595,798 | B2 | 11/2013 | Anand et al. |
| 8,624,836 | B1 | 1/2014 | Miller et al. |
| 8,666,361 | B2 | 3/2014 | Chu et al. |

(56)                References Cited

U.S. PATENT DOCUMENTS

| | | | |
|---|---|---|---|
| 8,698,762 | B2 | 4/2014 | Wagner et al. |
| 8,700,158 | B2 | 4/2014 | Mass et al. |
| 8,706,628 | B2 | 4/2014 | Phillips |
| 8,825,445 | B2 | 9/2014 | Hoffman et al. |
| 8,849,610 | B2 | 9/2014 | Molettiere et al. |
| 8,893,023 | B2 | 11/2014 | Perry et al. |
| 8,931,703 | B1 | 1/2015 | Mullen et al. |
| 8,934,717 | B2 | 1/2015 | Newell et al. |
| 8,948,819 | B2 | 2/2015 | Yun et al. |
| 8,996,639 | B1 | 3/2015 | Faaborg et al. |
| 9,021,034 | B2 | 4/2015 | Narayanan et al. |
| 9,042,646 | B2 | 5/2015 | Das et al. |
| 9,071,945 | B1 | 6/2015 | Rubin et al. |
| 9,123,086 | B1 | 9/2015 | Freeland et al. |
| 9,125,566 | B2 | 9/2015 | Libbus et al. |
| 9,143,601 | B2 | 9/2015 | Padmanabhan et al. |
| 9,143,907 | B1 | 9/2015 | Caldwell et al. |
| 9,164,663 | B1 | 10/2015 | Berard |
| 9,173,576 | B2 | 11/2015 | Yuen et al. |
| 9,183,560 | B2 | 11/2015 | Abelow |
| 9,213,754 | B1 | 12/2015 | Zhang et al. |
| 9,286,546 | B2 | 3/2016 | O'malley et al. |
| 9,317,870 | B2 | 4/2016 | Tew et al. |
| 9,338,242 | B1 | 5/2016 | Suchland et al. |
| 9,348,458 | B2 | 5/2016 | Huppi et al. |
| 9,405,964 | B1 | 8/2016 | Suchland et al. |
| 9,459,792 | B2 | 10/2016 | Matas et al. |
| 9,600,178 | B2 | 3/2017 | Yun et al. |
| 9,600,630 | B2 | 3/2017 | Keegan et al. |
| 9,730,621 | B2 | 8/2017 | Cohen et al. |
| 9,740,399 | B2 | 8/2017 | Paek et al. |
| 9,800,525 | B1 | 10/2017 | Lerner et al. |
| 9,857,894 | B2 | 1/2018 | Park |
| 9,857,941 | B2 | 1/2018 | Wagner et al. |
| 9,870,554 | B1 | 1/2018 | Leung et al. |
| 9,904,906 | B2 | 2/2018 | Kim et al. |
| 9,906,928 | B2 | 2/2018 | Kim et al. |
| 9,916,538 | B2 | 3/2018 | Zadeh et al. |
| 9,933,937 | B2 | 4/2018 | Lemay et al. |
| 9,998,888 | B1 | 6/2018 | Chang et al. |
| 10,003,938 | B2 | 6/2018 | Chang et al. |
| 10,013,601 | B2 | 7/2018 | Ebersman et al. |
| 10,019,136 | B1 * | 7/2018 | Ozog .................... H04L 51/48 |
| 10,051,103 | B1 | 8/2018 | Gordon et al. |
| 10,076,257 | B2 | 9/2018 | Lin et al. |
| 10,083,213 | B1 | 9/2018 | Podgorny et al. |
| 10,204,338 | B2 | 2/2019 | Lee |
| 10,269,164 | B1 | 4/2019 | Song et al. |
| 10,270,898 | B2 | 4/2019 | Soli et al. |
| 10,270,983 | B1 | 4/2019 | Van Os et al. |
| 10,275,116 | B2 | 4/2019 | Decker et al. |
| 10,303,448 | B2 | 5/2019 | Steven et al. |
| 10,341,826 | B2 | 7/2019 | Chang et al. |
| 10,362,219 | B2 | 7/2019 | Wilson et al. |
| 10,375,313 | B1 | 8/2019 | Van Os et al. |
| 10,417,588 | B1 | 9/2019 | Kreisel et al. |
| 10,425,284 | B2 | 9/2019 | Dellinger et al. |
| 10,445,425 | B2 | 10/2019 | Jon et al. |
| 10,489,982 | B2 | 11/2019 | Johnson et al. |
| 10,509,907 | B2 | 12/2019 | Shear et al. |
| 10,521,948 | B2 | 12/2019 | Rickwald et al. |
| 10,540,400 | B2 | 1/2020 | Dumant et al. |
| 10,595,169 | B2 | 3/2020 | Peterson et al. |
| 10,639,521 | B2 | 5/2020 | Foley et al. |
| 10,659,405 | B1 | 5/2020 | Chang et al. |
| 10,776,965 | B2 | 9/2020 | Stetson et al. |
| 10,796,480 | B2 | 10/2020 | Chen et al. |
| 10,866,619 | B1 | 12/2020 | Bushnell et al. |
| 10,873,786 | B2 | 12/2020 | Folse et al. |
| 11,194,467 | B2 | 12/2021 | Zhu et al. |
| 11,327,649 | B1 | 5/2022 | Spivak et al. |
| 11,360,634 | B1 | 6/2022 | Chang et al. |
| 11,592,959 | B2 | 2/2023 | Wagner et al. |
| 12,260,059 | B2 | 3/2025 | Chang et al. |
| 2001/0014184 | A1 | 8/2001 | Bubie et al. |
| 2001/0030715 | A1 | 10/2001 | Tabata |
| 2001/0031622 | A1 | 10/2001 | Kivela et al. |
| 2002/0000998 | A1 | 1/2002 | Scott et al. |
| 2002/0008763 | A1 | 1/2002 | Kawamura et al. |
| 2002/0015024 | A1 | 2/2002 | Westerman et al. |
| 2002/0015064 | A1 | 2/2002 | Robotham et al. |
| 2002/0021758 | A1 | 2/2002 | Chui et al. |
| 2002/0029169 | A1 | 3/2002 | Oki et al. |
| 2002/0054233 | A1 | 5/2002 | Juen |
| 2002/0057461 | A1 | 5/2002 | Dow et al. |
| 2002/0068600 | A1 | 6/2002 | Chihara et al. |
| 2002/0070982 | A1 | 6/2002 | Hill et al. |
| 2002/0093531 | A1 | 7/2002 | Barile |
| 2002/0106199 | A1 | 8/2002 | Ikeda |
| 2002/0135621 | A1 | 9/2002 | Angiulo et al. |
| 2002/0142734 | A1 | 10/2002 | Wickstead |
| 2002/0168108 | A1 | 11/2002 | Loui et al. |
| 2002/0196357 | A1 | 12/2002 | Battles et al. |
| 2003/0002391 | A1 | 1/2003 | Biggs et al. |
| 2003/0033296 | A1 | 2/2003 | Rothmuller et al. |
| 2003/0048291 | A1 | 3/2003 | Dieberger |
| 2003/0081011 | A1 | 5/2003 | Sheldon et al. |
| 2003/0081135 | A1 | 5/2003 | Boll |
| 2003/0090504 | A1 | 5/2003 | Brook et al. |
| 2003/0108241 | A1 | 6/2003 | Colmenarez et al. |
| 2003/0122787 | A1 | 7/2003 | Zimmerman et al. |
| 2003/0149990 | A1 | 8/2003 | Anttila et al. |
| 2003/0160824 | A1 | 8/2003 | Szumla |
| 2003/0161003 | A1 | 8/2003 | Herbert |
| 2003/0177067 | A1 | 9/2003 | Cowell et al. |
| 2003/0182628 | A1 | 9/2003 | Lira |
| 2003/0197687 | A1 | 10/2003 | Shetter |
| 2004/0019640 | A1 | 1/2004 | Bartram et al. |
| 2004/0046886 | A1 | 3/2004 | Ambiru et al. |
| 2004/0077462 | A1 | 4/2004 | Brown et al. |
| 2004/0078752 | A1 | 4/2004 | Johnson |
| 2004/0083474 | A1 | 4/2004 | Mckinlay et al. |
| 2004/0119758 | A1 | 6/2004 | Grossman et al. |
| 2004/0125150 | A1 | 7/2004 | Adcock et al. |
| 2004/0135904 | A1 | 7/2004 | Shiota et al. |
| 2004/0143590 | A1 | 7/2004 | Wong et al. |
| 2004/0158555 | A1 | 8/2004 | Seedman et al. |
| 2004/0167898 | A1 | 8/2004 | Margolus et al. |
| 2004/0168107 | A1 | 8/2004 | Sharp et al. |
| 2004/0181771 | A1 | 9/2004 | Anonsen et al. |
| 2004/0183830 | A1 | 9/2004 | Cody et al. |
| 2004/0205504 | A1 | 10/2004 | Phillips |
| 2004/0207722 | A1 | 10/2004 | Koyama et al. |
| 2004/0212617 | A1 | 10/2004 | Fitzmaurice et al. |
| 2004/0218472 | A1 | 11/2004 | Narayanaswami et al. |
| 2004/0225966 | A1 | 11/2004 | Besharat et al. |
| 2004/0246607 | A1 | 12/2004 | Watson et al. |
| 2005/0015803 | A1 | 1/2005 | Macrae et al. |
| 2005/0018082 | A1 | 1/2005 | Larsen et al. |
| 2005/0020317 | A1 | 1/2005 | Koyama |
| 2005/0041035 | A1 | 2/2005 | Nagatomo et al. |
| 2005/0044066 | A1 | 2/2005 | Hooper et al. |
| 2005/0052427 | A1 | 3/2005 | Wu et al. |
| 2005/0062130 | A1 | 3/2005 | Ciancio et al. |
| 2005/0066325 | A1 | 3/2005 | Mori et al. |
| 2005/0071736 | A1 | 3/2005 | Schneider et al. |
| 2005/0071767 | A1 | 3/2005 | Kirkland et al. |
| 2005/0073601 | A1 | 4/2005 | Battles et al. |
| 2005/0076056 | A1 | 4/2005 | Paalasmaa et al. |
| 2005/0081150 | A1 | 4/2005 | Beardow et al. |
| 2005/0083406 | A1 | 4/2005 | Cozier |
| 2005/0102635 | A1 | 5/2005 | Jiang et al. |
| 2005/0104848 | A1 | 5/2005 | Yamaguchi et al. |
| 2005/0108253 | A1 | 5/2005 | Metsatahti et al. |
| 2005/0128305 | A1 | 6/2005 | Hamasaki et al. |
| 2005/0134719 | A1 | 6/2005 | Beck |
| 2005/0134945 | A1 | 6/2005 | Gallagher |
| 2005/0149872 | A1 | 7/2005 | Fong et al. |
| 2005/0156873 | A1 | 7/2005 | Walter et al. |
| 2005/0160377 | A1 | 7/2005 | Sciammarella et al. |
| 2005/0183026 | A1 | 8/2005 | Amano et al. |
| 2005/0188326 | A1 | 8/2005 | Ikeda |
| 2005/0190059 | A1 | 9/2005 | Wehrenberg |
| 2005/0192924 | A1 | 9/2005 | Drucker et al. |

(56)        References Cited

U.S. PATENT DOCUMENTS

| | | |
|---|---|---|
| 2005/0195221 A1 | 9/2005 | Berger et al. |
| 2005/0197063 A1 | 9/2005 | White et al. |
| 2005/0198024 A1 | 9/2005 | Sakata et al. |
| 2005/0202846 A1 | 9/2005 | Glass et al. |
| 2005/0210399 A1 | 9/2005 | Filner et al. |
| 2005/0256712 A1 | 11/2005 | Yamada et al. |
| 2005/0275636 A1 | 12/2005 | Dehlin et al. |
| 2005/0278757 A1 | 12/2005 | Grossman et al. |
| 2005/0289173 A1 | 12/2005 | Vacca et al. |
| 2006/0000900 A1 | 1/2006 | Fernandes et al. |
| 2006/0001652 A1 | 1/2006 | Chiu et al. |
| 2006/0004685 A1 | 1/2006 | Pyhalammi et al. |
| 2006/0010098 A1 | 1/2006 | Goodnow et al. |
| 2006/0010435 A1 | 1/2006 | Jhanwar et al. |
| 2006/0017692 A1 | 1/2006 | Wehrenberg et al. |
| 2006/0022961 A1 | 2/2006 | Kaminaga |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0036960 A1 | 2/2006 | Loui et al. |
| 2006/0053386 A1 | 3/2006 | Kuhl et al. |
| 2006/0061663 A1 | 3/2006 | Park |
| 2006/0072028 A1 | 4/2006 | Hong |
| 2006/0077266 A1 | 4/2006 | Nurmi et al. |
| 2006/0080386 A1 | 4/2006 | Roykkee et al. |
| 2006/0088228 A1 | 4/2006 | Marriott et al. |
| 2006/0090141 A1 | 4/2006 | Loui et al. |
| 2006/0122748 A1 | 6/2006 | Nou |
| 2006/0125799 A1 | 6/2006 | Hillis et al. |
| 2006/0136839 A1 | 6/2006 | Makela et al. |
| 2006/0155578 A1 | 7/2006 | Eisenberger et al. |
| 2006/0155757 A1 | 7/2006 | Williams et al. |
| 2006/0156228 A1 | 7/2006 | Gallo et al. |
| 2006/0156237 A1 | 7/2006 | Williams et al. |
| 2006/0156245 A1 | 7/2006 | Williams et al. |
| 2006/0156246 A1 | 7/2006 | Williams et al. |
| 2006/0164535 A1 | 7/2006 | Oyama |
| 2006/0173749 A1 | 8/2006 | Ward et al. |
| 2006/0179114 A1 | 8/2006 | Deeds |
| 2006/0184540 A1 | 8/2006 | Kung et al. |
| 2006/0197753 A1 | 9/2006 | Hotelling |
| 2006/0217104 A1 | 9/2006 | Cho |
| 2006/0218500 A1 | 9/2006 | Sauve et al. |
| 2006/0233536 A1 | 10/2006 | Shuhami |
| 2006/0242259 A1 | 10/2006 | Vallabh et al. |
| 2006/0265643 A1 | 11/2006 | Saft et al. |
| 2006/0271605 A1 | 11/2006 | Petruzzo |
| 2006/0277118 A1 | 12/2006 | Keohane et al. |
| 2006/0277469 A1 | 12/2006 | Chaudhri et al. |
| 2007/0002077 A1 | 1/2007 | Gopalakrishnan et al. |
| 2007/0008321 A1 | 1/2007 | Gallagher et al. |
| 2007/0016868 A1 | 1/2007 | Nurmi |
| 2007/0031115 A1 | 2/2007 | Oshikiri et al. |
| 2007/0040810 A1 | 2/2007 | Dowe et al. |
| 2007/0067733 A1 | 3/2007 | Moore et al. |
| 2007/0081740 A1 | 4/2007 | Ciudad et al. |
| 2007/0096765 A1 | 5/2007 | Kagan |
| 2007/0097151 A1 | 5/2007 | Rosenberg |
| 2007/0097421 A1 | 5/2007 | Sorensen et al. |
| 2007/0101279 A1 | 5/2007 | Chaudhri et al. |
| 2007/0101355 A1 | 5/2007 | Chung et al. |
| 2007/0112754 A1 | 5/2007 | Haigh et al. |
| 2007/0115373 A1 | 5/2007 | Gallagher et al. |
| 2007/0135043 A1 | 6/2007 | Hayes et al. |
| 2007/0136778 A1 | 6/2007 | Birger et al. |
| 2007/0143495 A1 | 6/2007 | Porat |
| 2007/0152984 A1 | 7/2007 | Ording et al. |
| 2007/0156689 A1 | 7/2007 | Meek et al. |
| 2007/0186154 A1 | 8/2007 | Anthony et al. |
| 2007/0192741 A1 | 8/2007 | Yoritate et al. |
| 2007/0194110 A1 | 8/2007 | Esplin et al. |
| 2007/0194113 A1 | 8/2007 | Esplin et al. |
| 2007/0204225 A1 | 8/2007 | Berkowitz et al. |
| 2007/0229678 A1 | 10/2007 | Barrus et al. |
| 2007/0239801 A1 | 10/2007 | Lee et al. |
| 2007/0245236 A1 | 10/2007 | Lee et al. |
| 2007/0254712 A1 | 11/2007 | Chitti |
| 2007/0261537 A1 | 11/2007 | Eronen et al. |
| 2007/0262964 A1 | 11/2007 | Zotov et al. |
| 2007/0271340 A1 | 11/2007 | Goodman et al. |
| 2008/0005734 A1 | 1/2008 | Kendra et al. |
| 2008/0022343 A1 | 1/2008 | Hodzic et al. |
| 2008/0027586 A1 | 1/2008 | Hern et al. |
| 2008/0030456 A1 | 2/2008 | Asadi et al. |
| 2008/0036743 A1 | 2/2008 | Westerman et al. |
| 2008/0040265 A1 | 2/2008 | Rackley, III et al. |
| 2008/0057926 A1 | 3/2008 | Forstall et al. |
| 2008/0057941 A1 | 3/2008 | Scott et al. |
| 2008/0059888 A1 | 3/2008 | Dunko |
| 2008/0062141 A1 | 3/2008 | Chaudhri |
| 2008/0076637 A1 | 3/2008 | Gilley et al. |
| 2008/0077936 A1 | 3/2008 | Goel et al. |
| 2008/0091637 A1 | 4/2008 | Escamilla et al. |
| 2008/0122796 A1 | 5/2008 | Jobs et al. |
| 2008/0133479 A1 | 6/2008 | Zelevinsky et al. |
| 2008/0133697 A1 | 6/2008 | Stewart et al. |
| 2008/0152201 A1 | 6/2008 | Zhang et al. |
| 2008/0152297 A1 | 6/2008 | Ubillos |
| 2008/0155474 A1 | 6/2008 | Duhig et al. |
| 2008/0165141 A1 | 7/2008 | Christie |
| 2008/0168144 A1 | 7/2008 | Lee |
| 2008/0168349 A1 | 7/2008 | Lamiraux et al. |
| 2008/0168366 A1 | 7/2008 | Kocienda et al. |
| 2008/0168402 A1 | 7/2008 | Blumenberg |
| 2008/0183909 A1 | 7/2008 | Lim et al. |
| 2008/0247519 A1 | 10/2008 | Abella et al. |
| 2008/0256577 A1 | 10/2008 | Funaki et al. |
| 2008/0259829 A1 | 10/2008 | Rosenblatt |
| 2008/0282202 A1 | 11/2008 | Sunday |
| 2008/0309632 A1 | 12/2008 | Westerman et al. |
| 2008/0320391 A1 | 12/2008 | Lemay et al. |
| 2009/0005011 A1 | 1/2009 | Christie et al. |
| 2009/0006965 A1 | 1/2009 | Bodin et al. |
| 2009/0021576 A1 | 1/2009 | Linder et al. |
| 2009/0037326 A1 | 2/2009 | Chitti et al. |
| 2009/0054743 A1 | 2/2009 | Stewart |
| 2009/0057396 A1 | 3/2009 | Barbour et al. |
| 2009/0060170 A1 | 3/2009 | Coughlan et al. |
| 2009/0063414 A1 | 3/2009 | White et al. |
| 2009/0063542 A1 | 3/2009 | Bull et al. |
| 2009/0070675 A1 | 3/2009 | Li |
| 2009/0077460 A1 | 3/2009 | Li et al. |
| 2009/0085881 A1 | 4/2009 | Keam |
| 2009/0106695 A1 | 4/2009 | Perry et al. |
| 2009/0113315 A1 | 4/2009 | Fisher et al. |
| 2009/0113350 A1 | 4/2009 | Hibino et al. |
| 2009/0132921 A1 | 5/2009 | Hwangbo et al. |
| 2009/0144639 A1 | 6/2009 | Nims et al. |
| 2009/0158214 A1 | 6/2009 | Arnold et al. |
| 2009/0161962 A1 | 6/2009 | Gallagher et al. |
| 2009/0177981 A1 | 7/2009 | Christie et al. |
| 2009/0195497 A1 | 8/2009 | Fitzgerald et al. |
| 2009/0198359 A1 | 8/2009 | Chaudhri |
| 2009/0198581 A1 | 8/2009 | Lidestri |
| 2009/0205041 A1 | 8/2009 | Michalske |
| 2009/0210793 A1 | 8/2009 | Yee et al. |
| 2009/0216556 A1 | 8/2009 | Martin et al. |
| 2009/0216806 A1 | 8/2009 | Feuerstein et al. |
| 2009/0222757 A1 | 9/2009 | Gupta et al. |
| 2009/0231960 A1 | 9/2009 | Hutcheson |
| 2009/0237367 A1 | 9/2009 | Ryu et al. |
| 2009/0253516 A1 | 10/2009 | Hartmann et al. |
| 2009/0254840 A1 | 10/2009 | Churchill et al. |
| 2009/0259967 A1 | 10/2009 | Davidson et al. |
| 2009/0262088 A1 | 10/2009 | Moll-carrillo et al. |
| 2009/0276463 A1 | 11/2009 | Miller et al. |
| 2009/0278806 A1 | 11/2009 | Duarte et al. |
| 2009/0282371 A1 | 11/2009 | Curl et al. |
| 2009/0284471 A1 | 11/2009 | Longe et al. |
| 2009/0284551 A1 | 11/2009 | Stanton |
| 2009/0300598 A1 | 12/2009 | Choi |
| 2009/0306969 A1 | 12/2009 | Goud et al. |

(56) References Cited

U.S. PATENT DOCUMENTS

| | | |
|---|---|---|
| 2009/0307623 A1 | 12/2009 | Agarawala et al. |
| 2009/0311993 A1 | 12/2009 | Horodezky |
| 2009/0313579 A1 | 12/2009 | Poulson et al. |
| 2009/0313580 A1 | 12/2009 | Nakata et al. |
| 2009/0319467 A1 | 12/2009 | Berg et al. |
| 2009/0319472 A1 | 12/2009 | Jain et al. |
| 2010/0005008 A1 | 1/2010 | Duncker et al. |
| 2010/0011309 A1 | 1/2010 | Mitra et al. |
| 2010/0042926 A1 | 2/2010 | Bull et al. |
| 2010/0045828 A1 | 2/2010 | Gallagher et al. |
| 2010/0046842 A1 | 2/2010 | Conwell |
| 2010/0048358 A1 | 2/2010 | Tchao et al. |
| 2010/0054519 A1 | 3/2010 | Mulvey et al. |
| 2010/0063840 A1 | 3/2010 | Hoyme et al. |
| 2010/0064255 A1 | 3/2010 | Rottler et al. |
| 2010/0076976 A1 | 3/2010 | Sotirov et al. |
| 2010/0082481 A1 | 4/2010 | Lin et al. |
| 2010/0082784 A1 | 4/2010 | Rosenblatt et al. |
| 2010/0083173 A1 | 4/2010 | Germann et al. |
| 2010/0088616 A1 | 4/2010 | Park et al. |
| 2010/0103321 A1 | 4/2010 | Ishikawa et al. |
| 2010/0110228 A1 | 5/2010 | Ozawa et al. |
| 2010/0114891 A1 | 5/2010 | Oami |
| 2010/0123724 A1 | 5/2010 | Moore et al. |
| 2010/0124967 A1 | 5/2010 | Lutnick et al. |
| 2010/0125785 A1 | 5/2010 | Moore et al. |
| 2010/0125786 A1 | 5/2010 | Ozawa et al. |
| 2010/0125811 A1 | 5/2010 | Moore et al. |
| 2010/0150456 A1 | 6/2010 | Tanaka et al. |
| 2010/0151908 A1 | 6/2010 | Skarby et al. |
| 2010/0151918 A1 | 6/2010 | Annambhotla et al. |
| 2010/0153386 A1 | 6/2010 | Tysowski |
| 2010/0157742 A1 | 6/2010 | Relyea et al. |
| 2010/0169784 A1 | 7/2010 | Weber et al. |
| 2010/0177048 A1 | 7/2010 | Semenets et al. |
| 2010/0179874 A1 | 7/2010 | Higgins et al. |
| 2010/0179991 A1 | 7/2010 | Lorch et al. |
| 2010/0190468 A1 | 7/2010 | Scott et al. |
| 2010/0194692 A1 | 8/2010 | Orr et al. |
| 2010/0198453 A1 | 8/2010 | Dorogusker et al. |
| 2010/0199228 A1 | 8/2010 | Latta et al. |
| 2010/0202368 A1 | 8/2010 | Hans |
| 2010/0207892 A1 | 8/2010 | Lin et al. |
| 2010/0211575 A1 | 8/2010 | Collins et al. |
| 2010/0211685 A1 | 8/2010 | Mcdowall et al. |
| 2010/0214442 A1 | 8/2010 | Uemura et al. |
| 2010/0222645 A1 | 9/2010 | Nadler et al. |
| 2010/0223145 A1 | 9/2010 | Dragt |
| 2010/0223563 A1 | 9/2010 | Green |
| 2010/0225962 A1 | 9/2010 | Okigami et al. |
| 2010/0226213 A1 | 9/2010 | Drugge |
| 2010/0251167 A1 | 9/2010 | Deluca et al. |
| 2010/0253807 A1 | 10/2010 | Matsumoto et al. |
| 2010/0269055 A1 | 10/2010 | Daikeler et al. |
| 2010/0281374 A1 | 11/2010 | Schulz et al. |
| 2010/0287053 A1 | 11/2010 | Ganong et al. |
| 2010/0292600 A1 | 11/2010 | Dibenedetto et al. |
| 2010/0295795 A1 | 11/2010 | Wilairat |
| 2010/0299601 A1 | 11/2010 | Kaplan et al. |
| 2010/0302179 A1 | 12/2010 | Ahn et al. |
| 2010/0306185 A1 | 12/2010 | Smith et al. |
| 2010/0325194 A1 | 12/2010 | Williamson et al. |
| 2011/0003665 A1 | 1/2011 | Burton et al. |
| 2011/0004835 A1 | 1/2011 | Yanchar et al. |
| 2011/0009109 A1 | 1/2011 | Hyon |
| 2011/0010195 A1 | 1/2011 | Cohn et al. |
| 2011/0012919 A1 | 1/2011 | Tai et al. |
| 2011/0029750 A1 | 2/2011 | Jang et al. |
| 2011/0035700 A1 | 2/2011 | Meaney et al. |
| 2011/0050564 A1 | 3/2011 | Alberth et al. |
| 2011/0050640 A1 | 3/2011 | Lundback et al. |
| 2011/0059769 A1 | 3/2011 | Brunolli |
| 2011/0061010 A1 | 3/2011 | Wasko et al. |
| 2011/0072394 A1 | 3/2011 | Victor et al. |
| 2011/0074699 A1 | 3/2011 | Marr et al. |
| 2011/0078025 A1 | 3/2011 | Shrivastav et al. |
| 2011/0078717 A1 | 3/2011 | Drummond et al. |
| 2011/0083111 A1 | 4/2011 | Forutanpour et al. |
| 2011/0087747 A1 | 4/2011 | Hirst et al. |
| 2011/0088086 A1 | 4/2011 | Swink et al. |
| 2011/0093728 A1 | 4/2011 | Das |
| 2011/0098928 A1 | 4/2011 | Hoffman et al. |
| 2011/0099199 A1 | 4/2011 | Stalenhoef et al. |
| 2011/0099478 A1 | 4/2011 | Gallagher et al. |
| 2011/0106954 A1 | 5/2011 | Chatterjee et al. |
| 2011/0111735 A1 | 5/2011 | Pietrow |
| 2011/0113337 A1 | 5/2011 | Liu et al. |
| 2011/0126148 A1 | 5/2011 | Krishnaraj et al. |
| 2011/0130168 A1 | 6/2011 | Vendrow et al. |
| 2011/0137678 A1 | 6/2011 | Williams |
| 2011/0142299 A1 | 6/2011 | Akbarzadeh et al. |
| 2011/0145275 A1 | 6/2011 | Stewart |
| 2011/0145327 A1 | 6/2011 | Stewart |
| 2011/0159959 A1 | 6/2011 | Mallinson et al. |
| 2011/0163969 A1 | 7/2011 | Freddy et al. |
| 2011/0163971 A1 | 7/2011 | Wagner et al. |
| 2011/0167369 A1 | 7/2011 | Van Os |
| 2011/0193878 A1 | 8/2011 | Seo et al. |
| 2011/0197165 A1 | 8/2011 | Filippov et al. |
| 2011/0201387 A1 | 8/2011 | Paek et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0221685 A1 | 9/2011 | Lee et al. |
| 2011/0227872 A1 | 9/2011 | Huska et al. |
| 2011/0227946 A1 | 9/2011 | Yoshizawa et al. |
| 2011/0234152 A1 | 9/2011 | Frossen et al. |
| 2011/0246241 A1 | 10/2011 | Hasan et al. |
| 2011/0246463 A1 | 10/2011 | Carson et al. |
| 2011/0248992 A1 | 10/2011 | Van et al. |
| 2011/0251892 A1 | 10/2011 | Laracey |
| 2011/0267368 A1 | 11/2011 | Casillas et al. |
| 2011/0271223 A1 | 11/2011 | Cruz Moreno et al. |
| 2011/0276683 A1 | 11/2011 | Goldschlag et al. |
| 2011/0279323 A1 | 11/2011 | Hung et al. |
| 2011/0282867 A1 | 11/2011 | Palermiti et al. |
| 2011/0294525 A1 | 12/2011 | Jonsson |
| 2011/0296324 A1 | 12/2011 | Goossens et al. |
| 2011/0304685 A1 | 12/2011 | Khedouri et al. |
| 2011/0307880 A1 | 12/2011 | Hilerio et al. |
| 2012/0001922 A1 | 1/2012 | Escher et al. |
| 2012/0008526 A1 | 1/2012 | Borghei et al. |
| 2012/0015779 A1 | 1/2012 | Powch et al. |
| 2012/0023131 A1 | 1/2012 | Downey et al. |
| 2012/0030568 A1 | 2/2012 | Migos et al. |
| 2012/0036029 A1 | 2/2012 | Esplin et al. |
| 2012/0036220 A1 | 2/2012 | Dare et al. |
| 2012/0036433 A1 | 2/2012 | Zimmer et al. |
| 2012/0036460 A1 | 2/2012 | Cieplinski et al. |
| 2012/0044062 A1 | 2/2012 | Jersa et al. |
| 2012/0047447 A1 | 2/2012 | Haq |
| 2012/0056830 A1 | 3/2012 | Suzuki et al. |
| 2012/0057081 A1 | 3/2012 | Petersson et al. |
| 2012/0058801 A1 | 3/2012 | Nurmi |
| 2012/0059664 A1 | 3/2012 | Georgiev et al. |
| 2012/0059787 A1 | 3/2012 | Brown et al. |
| 2012/0060089 A1 | 3/2012 | Heo et al. |
| 2012/0060092 A1 | 3/2012 | Hill et al. |
| 2012/0066628 A1 | 3/2012 | Ens et al. |
| 2012/0071770 A1 | 3/2012 | Grey et al. |
| 2012/0079122 A1 | 3/2012 | Brown et al. |
| 2012/0083258 A1 | 4/2012 | Rabii et al. |
| 2012/0083294 A1* | 4/2012 | Bray .................. G06V 30/1444 455/466 |
| 2012/0084210 A1 | 4/2012 | Farahmand |
| 2012/0092383 A1 | 4/2012 | Hysek et al. |
| 2012/0101887 A1 | 4/2012 | Harvey et al. |
| 2012/0105444 A1 | 5/2012 | Tokuda |
| 2012/0109836 A1 | 5/2012 | Chen et al. |
| 2012/0116550 A1 | 5/2012 | Hoffman et al. |
| 2012/0117507 A1 | 5/2012 | Tseng et al. |
| 2012/0131441 A1 | 5/2012 | Jitkoff et al. |
| 2012/0136780 A1 | 5/2012 | El-awady et al. |
| 2012/0136855 A1 | 5/2012 | Ni et al. |

(56) References Cited

U.S. PATENT DOCUMENTS

| | | |
|---|---|---|
| 2012/0143013 A1 | 6/2012 | Davis et al. |
| 2012/0150446 A1 | 6/2012 | Chang et al. |
| 2012/0169608 A1 | 7/2012 | Forutanpour et al. |
| 2012/0190386 A1 | 7/2012 | Anderson |
| 2012/0191603 A1 | 7/2012 | Nuzzi |
| 2012/0197523 A1 | 8/2012 | Kirsch |
| 2012/0206495 A1 | 8/2012 | Endo et al. |
| 2012/0209829 A1 | 8/2012 | Thomas et al. |
| 2012/0226117 A1 | 9/2012 | Lamego et al. |
| 2012/0254263 A1 | 10/2012 | Hiestermann et al. |
| 2012/0258684 A1 | 10/2012 | Franz et al. |
| 2012/0290109 A1 | 11/2012 | Engelberg et al. |
| 2012/0302256 A1 | 11/2012 | Pai et al. |
| 2012/0308209 A1 | 12/2012 | Zaletel |
| 2012/0310674 A1 | 12/2012 | Faulkner et al. |
| 2012/0310760 A1 | 12/2012 | Phillips et al. |
| 2012/0311032 A1 | 12/2012 | Murphy et al. |
| 2012/0311444 A1 | 12/2012 | Chaudhri |
| 2012/0324357 A1 | 12/2012 | Viegers et al. |
| 2012/0324390 A1 | 12/2012 | Tao et al. |
| 2013/0010093 A1 | 1/2013 | Redmann et al. |
| 2013/0013327 A1 | 1/2013 | Horseman |
| 2013/0013650 A1 | 1/2013 | Shum |
| 2013/0014052 A1 | 1/2013 | Frey et al. |
| 2013/0016818 A1 | 1/2013 | Cohn |
| 2013/0017846 A1 | 1/2013 | Schoppe |
| 2013/0021368 A1 | 1/2013 | Lee et al. |
| 2013/0022282 A1 | 1/2013 | Cooper |
| 2013/0027341 A1 | 1/2013 | Mastandrea |
| 2013/0031490 A1 | 1/2013 | Joo et al. |
| 2013/0036380 A1 | 2/2013 | Symons |
| 2013/0040660 A1 | 2/2013 | Fisher et al. |
| 2013/0044072 A1 | 2/2013 | Kobayashi et al. |
| 2013/0047034 A1 | 2/2013 | Salomon et al. |
| 2013/0050263 A1 | 2/2013 | Khoe et al. |
| 2013/0054634 A1 | 2/2013 | Chakraborty et al. |
| 2013/0055147 A1 | 2/2013 | Vasudev et al. |
| 2013/0061175 A1 | 3/2013 | Matas et al. |
| 2013/0063383 A1 | 3/2013 | Anderssonreimer et al. |
| 2013/0069893 A1 | 3/2013 | Brinda et al. |
| 2013/0093715 A1 | 4/2013 | Marsden et al. |
| 2013/0103814 A1 | 4/2013 | Carrasco et al. |
| 2013/0111579 A1 | 5/2013 | Newman et al. |
| 2013/0117365 A1 | 5/2013 | Padmanabhan et al. |
| 2013/0117696 A1 | 5/2013 | Robertson et al. |
| 2013/0137073 A1 | 5/2013 | Nacey et al. |
| 2013/0142495 A1 | 6/2013 | Terai |
| 2013/0143512 A1 | 6/2013 | Hernandez et al. |
| 2013/0145292 A1 | 6/2013 | Cohen et al. |
| 2013/0151523 A1* | 6/2013 | Hsi ............... G06F 16/5866 |
| | | 707/E17.026 |
| 2013/0156275 A1 | 6/2013 | Amacker et al. |
| 2013/0159919 A1 | 6/2013 | Leydon |
| 2013/0190083 A1 | 7/2013 | Toy et al. |
| 2013/0197679 A1 | 8/2013 | Balakrishnan et al. |
| 2013/0198176 A1 | 8/2013 | Kim |
| 2013/0201185 A1 | 8/2013 | Kochi |
| 2013/0204897 A1 | 8/2013 | Mcdougall |
| 2013/0205210 A1 | 8/2013 | Jeon et al. |
| 2013/0209972 A1 | 8/2013 | Carter et al. |
| 2013/0222270 A1 | 8/2013 | Winkler et al. |
| 2013/0225118 A1 | 8/2013 | Jang et al. |
| 2013/0230251 A1 | 9/2013 | Kondo et al. |
| 2013/0238360 A1 | 9/2013 | Bhathal |
| 2013/0239049 A1 | 9/2013 | Perrodin et al. |
| 2013/0239063 A1 | 9/2013 | Ubillos et al. |
| 2013/0244633 A1 | 9/2013 | Jacobs et al. |
| 2013/0246202 A1 | 9/2013 | Tobin et al. |
| 2013/0246329 A1 | 9/2013 | Pasquero et al. |
| 2013/0254685 A1 | 9/2013 | Batraski et al. |
| 2013/0254705 A1 | 9/2013 | Mooring et al. |
| 2013/0260896 A1 | 10/2013 | Miura et al. |
| 2013/0262155 A1 | 10/2013 | Hinkamp |
| 2013/0275923 A1 | 10/2013 | Griffin et al. |
| 2013/0275924 A1 | 10/2013 | Weinberg et al. |
| 2013/0285948 A1 | 10/2013 | Zhang |
| 2013/0290013 A1 | 10/2013 | Forrester et al. |
| 2013/0295872 A1 | 11/2013 | Guday et al. |
| 2013/0300645 A1 | 11/2013 | Fedorov |
| 2013/0304276 A1 | 11/2013 | Flies |
| 2013/0310726 A1 | 11/2013 | Miller et al. |
| 2013/0320080 A1 | 12/2013 | Olson et al. |
| 2013/0325970 A1 | 12/2013 | Roberts et al. |
| 2013/0332856 A1 | 12/2013 | Sanders et al. |
| 2013/0332871 A1 | 12/2013 | Bucur et al. |
| 2013/0345978 A1 | 12/2013 | Lush et al. |
| 2014/0006769 A1 | 1/2014 | Chory et al. |
| 2014/0022183 A1 | 1/2014 | Ayoub et al. |
| 2014/0025737 A1 | 1/2014 | Kruglick |
| 2014/0046914 A1 | 2/2014 | Das et al. |
| 2014/0058812 A1 | 2/2014 | Bender et al. |
| 2014/0058860 A1 | 2/2014 | Roh et al. |
| 2014/0058935 A1 | 2/2014 | Mijares |
| 2014/0059125 A1 | 2/2014 | Hillier |
| 2014/0059493 A1 | 2/2014 | Kim |
| 2014/0064572 A1 | 3/2014 | Panzer et al. |
| 2014/0066105 A1 | 3/2014 | Bridge et al. |
| 2014/0068520 A1 | 3/2014 | Missig et al. |
| 2014/0073298 A1 | 3/2014 | Rossmann |
| 2014/0074407 A1 | 3/2014 | Hernandez-silveira et al. |
| 2014/0074570 A1 | 3/2014 | Hope et al. |
| 2014/0074717 A1 | 3/2014 | Evans et al. |
| 2014/0074825 A1 | 3/2014 | Wood et al. |
| 2014/0074893 A1 | 3/2014 | Griffin |
| 2014/0075234 A1 | 3/2014 | Stekkelpak et al. |
| 2014/0081854 A1 | 3/2014 | Sanchez et al. |
| 2014/0082383 A1 | 3/2014 | De Cesare et al. |
| 2014/0082384 A1 | 3/2014 | De Cesare et al. |
| 2014/0082533 A1 | 3/2014 | Kelley et al. |
| 2014/0089330 A1 | 3/2014 | Cui et al. |
| 2014/0092101 A1 | 4/2014 | Lee et al. |
| 2014/0092291 A1 | 4/2014 | Aoshima et al. |
| 2014/0094124 A1 | 4/2014 | Dave et al. |
| 2014/0101565 A1 | 4/2014 | Mahieu et al. |
| 2014/0115465 A1 | 4/2014 | Lee et al. |
| 2014/0123005 A1 | 5/2014 | Forstall et al. |
| 2014/0128021 A1 | 5/2014 | Walker et al. |
| 2014/0129255 A1 | 5/2014 | Woodson et al. |
| 2014/0134947 A1 | 5/2014 | Stouder-studenmund |
| 2014/0139637 A1 | 5/2014 | Mistry et al. |
| 2014/0143145 A1 | 5/2014 | Kortina et al. |
| 2014/0143678 A1 | 5/2014 | Mistry et al. |
| 2014/0143737 A1 | 5/2014 | Mistry et al. |
| 2014/0149198 A1 | 5/2014 | Kim et al. |
| 2014/0155154 A1 | 6/2014 | Laakkonen et al. |
| 2014/0156262 A1 | 6/2014 | Yuen et al. |
| 2014/0163954 A1 | 6/2014 | Joshi et al. |
| 2014/0164241 A1 | 6/2014 | Neuwirth et al. |
| 2014/0164938 A1 | 6/2014 | Petterson et al. |
| 2014/0165000 A1 | 6/2014 | Fleizach et al. |
| 2014/0172622 A1 | 6/2014 | Baronshin |
| 2014/0172864 A1 | 6/2014 | Shum |
| 2014/0176475 A1 | 6/2014 | Myers et al. |
| 2014/0179272 A1 | 6/2014 | Zhang et al. |
| 2014/0181089 A1 | 6/2014 | Desmond et al. |
| 2014/0181205 A1 | 6/2014 | Sherrets et al. |
| 2014/0181558 A1 | 6/2014 | Taha et al. |
| 2014/0187314 A1 | 7/2014 | Perry et al. |
| 2014/0187323 A1 | 7/2014 | Perry |
| 2014/0189584 A1 | 7/2014 | Weng et al. |
| 2014/0195826 A1 | 7/2014 | Wojcik et al. |
| 2014/0195918 A1 | 7/2014 | Friedlander |
| 2014/0198234 A1 | 7/2014 | Kobayashi et al. |
| 2014/0208250 A1 | 7/2014 | Ording et al. |
| 2014/0215365 A1 | 7/2014 | Hiraga et al. |
| 2014/0218394 A1 | 8/2014 | Hochmuth et al. |
| 2014/0222809 A1 | 8/2014 | Hochmuth et al. |
| 2014/0225925 A1 | 8/2014 | Hayashi et al. |
| 2014/0229831 A1 | 8/2014 | Chordia et al. |
| 2014/0236459 A1 | 8/2014 | Boesch et al. |
| 2014/0236882 A1 | 8/2014 | Rishe et al. |
| 2014/0240122 A1 | 8/2014 | Roberts et al. |
| 2014/0244495 A1 | 8/2014 | Davis et al. |
| 2014/0245177 A1 | 8/2014 | Maklouf et al. |

(56) References Cited

U.S. PATENT DOCUMENTS

| | | |
|---|---|---|
| 2014/0250126 A1 | 9/2014 | Baldwin et al. |
| 2014/0250391 A1 | 9/2014 | Jong et al. |
| 2014/0280498 A1 | 9/2014 | Frankel et al. |
| 2014/0282011 A1 | 9/2014 | Dellinger et al. |
| 2014/0282103 A1 | 9/2014 | Jerry |
| 2014/0282207 A1 | 9/2014 | Wouhaybi et al. |
| 2014/0282211 A1 | 9/2014 | Ady et al. |
| 2014/0282262 A1 | 9/2014 | Gregotski et al. |
| 2014/0287821 A1 | 9/2014 | Barclay et al. |
| 2014/0289222 A1 | 9/2014 | Sharpe et al. |
| 2014/0289660 A1 | 9/2014 | Min |
| 2014/0293755 A1 | 10/2014 | Geiser et al. |
| 2014/0294167 A1 | 10/2014 | Kim et al. |
| 2014/0304738 A1 | 10/2014 | Nakaoka et al. |
| 2014/0310618 A1 | 10/2014 | Venkatesh |
| 2014/0317543 A1 | 10/2014 | Kim |
| 2014/0317555 A1 | 10/2014 | Choi et al. |
| 2014/0325384 A1 | 10/2014 | Kobayashi |
| 2014/0325408 A1 | 10/2014 | Leppanen et al. |
| 2014/0330824 A1 | 11/2014 | Johnson et al. |
| 2014/0337207 A1 | 11/2014 | Ye et al. |
| 2014/0337324 A1 | 11/2014 | Chao et al. |
| 2014/0337438 A1 | 11/2014 | Govande et al. |
| 2014/0337450 A1 | 11/2014 | Choudhary et al. |
| 2014/0341476 A1 | 11/2014 | Kulick et al. |
| 2014/0344862 A1 | 11/2014 | Cho et al. |
| 2014/0358012 A1 | 12/2014 | Richards et al. |
| 2014/0359441 A1 | 12/2014 | Lehtiniemi et al. |
| 2014/0362056 A1 | 12/2014 | Zambetti et al. |
| 2014/0362274 A1 | 12/2014 | Christie et al. |
| 2014/0365944 A1 | 12/2014 | Moore et al. |
| 2014/0372436 A1 | 12/2014 | Makki et al. |
| 2014/0372889 A1 | 12/2014 | Lemay et al. |
| 2014/0372898 A1 | 12/2014 | Ayres et al. |
| 2015/0005013 A1 | 1/2015 | Cao et al. |
| 2015/0006376 A1 | 1/2015 | Paulson et al. |
| 2015/0012425 A1 | 1/2015 | Mathew |
| 2015/0026615 A1 | 1/2015 | Choi et al. |
| 2015/0033149 A1 | 1/2015 | Kuchoor |
| 2015/0039494 A1 | 2/2015 | Sinton et al. |
| 2015/0039616 A1 | 2/2015 | Rolston et al. |
| 2015/0046828 A1 | 2/2015 | Desai et al. |
| 2015/0052212 A1 | 2/2015 | Flam |
| 2015/0057945 A1 | 2/2015 | White et al. |
| 2015/0058720 A1 | 2/2015 | Smadja et al. |
| 2015/0066758 A1 | 3/2015 | Denardis et al. |
| 2015/0067513 A1 | 3/2015 | Zambetti et al. |
| 2015/0078680 A1 | 3/2015 | Shakib et al. |
| 2015/0082250 A1 | 3/2015 | Wagner et al. |
| 2015/0089660 A1 | 3/2015 | Song et al. |
| 2015/0098309 A1 | 4/2015 | Adams et al. |
| 2015/0100537 A1 | 4/2015 | Grieves et al. |
| 2015/0100982 A1 | 4/2015 | Sirpal et al. |
| 2015/0112990 A1 | 4/2015 | Van Os et al. |
| 2015/0113435 A1 | 4/2015 | Phillips |
| 2015/0121405 A1 | 4/2015 | Ates et al. |
| 2015/0124105 A1 | 5/2015 | Imahira et al. |
| 2015/0130719 A1 | 5/2015 | Wehrenberg et al. |
| 2015/0130740 A1 | 5/2015 | Cederlund et al. |
| 2015/0130830 A1 | 5/2015 | Nagasaki et al. |
| 2015/0147048 A1 | 5/2015 | Kim et al. |
| 2015/0160856 A1 | 6/2015 | Jang et al. |
| 2015/0169503 A1 | 6/2015 | Maharaj |
| 2015/0172393 A1 | 6/2015 | Oplinger et al. |
| 2015/0177937 A1 | 6/2015 | Poletto et al. |
| 2015/0177979 A1 | 6/2015 | Johansson et al. |
| 2015/0180980 A1* | 6/2015 | Welinder ............... H04L 67/06 715/758 |
| 2015/0185995 A1 | 7/2015 | Shoemaker et al. |
| 2015/0188861 A1 | 7/2015 | Esplin et al. |
| 2015/0201062 A1 | 7/2015 | Shih et al. |
| 2015/0205509 A1 | 7/2015 | Scriven et al. |
| 2015/0208115 A1 | 7/2015 | Kutsumi et al. |
| 2015/0213001 A1 | 7/2015 | Levy et al. |
| 2015/0217163 A1 | 8/2015 | Amis et al. |
| 2015/0220774 A1 | 8/2015 | Ebersman et al. |
| 2015/0222586 A1 | 8/2015 | Ebersman et al. |
| 2015/0227166 A1 | 8/2015 | Lee et al. |
| 2015/0227609 A1* | 8/2015 | Shoemaker ......... G06V 40/173 707/737 |
| 2015/0227611 A1 | 8/2015 | Xuan et al. |
| 2015/0227782 A1 | 8/2015 | Salvador et al. |
| 2015/0228121 A1 | 8/2015 | Tsukahara et al. |
| 2015/0242114 A1 | 8/2015 | Hirabayashi et al. |
| 2015/0242404 A1 | 8/2015 | Underwood et al. |
| 2015/0242689 A1 | 8/2015 | Mau |
| 2015/0244794 A1 | 8/2015 | Poletto et al. |
| 2015/0253740 A1 | 9/2015 | Nishijima et al. |
| 2015/0256491 A1 | 9/2015 | Eatough et al. |
| 2015/0262062 A1 | 9/2015 | Burger et al. |
| 2015/0264305 A1 | 9/2015 | Chastney et al. |
| 2015/0269432 A1 | 9/2015 | Motoi |
| 2015/0269848 A1 | 9/2015 | Yuen et al. |
| 2015/0286391 A1 | 10/2015 | Jacobs et al. |
| 2015/0287162 A1 | 10/2015 | Canan et al. |
| 2015/0295901 A1 | 10/2015 | Woodward et al. |
| 2015/0301506 A1 | 10/2015 | Koumaiha |
| 2015/0309672 A1 | 10/2015 | Miwa et al. |
| 2015/0309698 A1 | 10/2015 | Senderek et al. |
| 2015/0317147 A1 | 11/2015 | Nachimuthu et al. |
| 2015/0324751 A1 | 11/2015 | Orenstein et al. |
| 2015/0334546 A1 | 11/2015 | Diamond |
| 2015/0341695 A1 | 11/2015 | Pattan |
| 2015/0347007 A1 | 12/2015 | Jong et al. |
| 2015/0347711 A1 | 12/2015 | Soli et al. |
| 2015/0347824 A1 | 12/2015 | Saari et al. |
| 2015/0347985 A1 | 12/2015 | Gross et al. |
| 2015/0348009 A1 | 12/2015 | Rosen et al. |
| 2015/0350141 A1 | 12/2015 | Yang et al. |
| 2015/0350861 A1 | 12/2015 | Soli et al. |
| 2015/0355804 A1 | 12/2015 | Nguyen et al. |
| 2015/0356615 A1 | 12/2015 | Hagen et al. |
| 2015/0363409 A1 | 12/2015 | Wood et al. |
| 2015/0370323 A1 | 12/2015 | Cieplinski et al. |
| 2015/0370455 A1 | 12/2015 | Van Os et al. |
| 2016/0004393 A1 | 1/2016 | Faaborg et al. |
| 2016/0004820 A1 | 1/2016 | Moore |
| 2016/0012294 A1 | 1/2016 | Bouck |
| 2016/0014266 A1 | 1/2016 | Bhatt |
| 2016/0019388 A1 | 1/2016 | Singla et al. |
| 2016/0022202 A1 | 1/2016 | Peterson et al. |
| 2016/0026730 A1 | 1/2016 | Hasan |
| 2016/0027420 A1 | 1/2016 | Eronen |
| 2016/0028869 A1 | 1/2016 | Bhatt |
| 2016/0041966 A1 | 2/2016 | Pasquero et al. |
| 2016/0044269 A1 | 2/2016 | Kang |
| 2016/0048263 A1 | 2/2016 | Hiraga et al. |
| 2016/0054841 A1 | 2/2016 | Yang et al. |
| 2016/0054845 A1 | 2/2016 | Takahashi et al. |
| 2016/0058336 A1 | 3/2016 | Blahnik et al. |
| 2016/0062589 A1 | 3/2016 | Wan et al. |
| 2016/0063748 A1 | 3/2016 | Kim et al. |
| 2016/0065505 A1 | 3/2016 | Iskander |
| 2016/0066005 A1 | 3/2016 | Davis et al. |
| 2016/0073034 A1 | 3/2016 | Mukherjee et al. |
| 2016/0073223 A1 | 3/2016 | Woolsey et al. |
| 2016/0088335 A1 | 3/2016 | Zucchetta |
| 2016/0092431 A1 | 3/2016 | Motoi |
| 2016/0098137 A1 | 4/2016 | Kim et al. |
| 2016/0098186 A1 | 4/2016 | Sugiura |
| 2016/0103970 A1 | 4/2016 | Liu et al. |
| 2016/0110355 A1 | 4/2016 | Charania et al. |
| 2016/0132232 A1 | 5/2016 | Baba et al. |
| 2016/0140146 A1 | 5/2016 | Wexler et al. |
| 2016/0150063 A1 | 5/2016 | Choi et al. |
| 2016/0165032 A1 | 6/2016 | Chang |
| 2016/0180568 A1 | 6/2016 | Bullivant et al. |
| 2016/0182410 A1 | 6/2016 | Janakiraman et al. |
| 2016/0187995 A1 | 6/2016 | Rosewall |
| 2016/0188181 A1 | 6/2016 | Smith |
| 2016/0196760 A1 | 7/2016 | Koo et al. |
| 2016/0197773 A1 | 7/2016 | Pandrangi et al. |
| 2016/0202889 A1 | 7/2016 | Shin et al. |
| 2016/0210568 A1 | 7/2016 | Krupa et al. |

(56) References Cited

U.S. PATENT DOCUMENTS

| | | |
|---|---|---|
| 2016/0217601 A1 | 7/2016 | Tsuda et al. |
| 2016/0219262 A1 | 7/2016 | Cole et al. |
| 2016/0224213 A1 | 8/2016 | Chen et al. |
| 2016/0224540 A1 | 8/2016 | Stewart et al. |
| 2016/0226713 A1 | 8/2016 | Pitschel et al. |
| 2016/0226804 A1 | 8/2016 | Hampson et al. |
| 2016/0234184 A1 | 8/2016 | Liu et al. |
| 2016/0239724 A1 | 8/2016 | Arfvidsson et al. |
| 2016/0253864 A1 | 9/2016 | Weber et al. |
| 2016/0255162 A1 | 9/2016 | Frieder et al. |
| 2016/0256741 A1 | 9/2016 | Holma et al. |
| 2016/0261675 A1 | 9/2016 | Block et al. |
| 2016/0270717 A1 | 9/2016 | Luna et al. |
| 2016/0274756 A1 | 9/2016 | Sakaguchi |
| 2016/0274769 A1 | 9/2016 | Sakahara et al. |
| 2016/0283483 A1 | 9/2016 | Jiang et al. |
| 2016/0294958 A1 | 10/2016 | Zhang et al. |
| 2016/0295384 A1 | 10/2016 | Shan et al. |
| 2016/0320931 A1 | 11/2016 | Kovacs et al. |
| 2016/0321831 A1 | 11/2016 | Nakamura et al. |
| 2016/0321932 A1 | 11/2016 | Mitchell et al. |
| 2016/0327911 A1 | 11/2016 | Eim et al. |
| 2016/0337301 A1 | 11/2016 | Rollins et al. |
| 2016/0357363 A1 | 12/2016 | Decker et al. |
| 2016/0358133 A1 | 12/2016 | Van Os et al. |
| 2016/0358134 A1 | 12/2016 | Van Os et al. |
| 2016/0358180 A1 | 12/2016 | Van Os et al. |
| 2016/0359771 A1 | 12/2016 | Sridhar |
| 2017/0004507 A1 | 1/2017 | Henderson et al. |
| 2017/0019587 A1 | 1/2017 | Matas et al. |
| 2017/0026430 A1 | 1/2017 | Beckhardt et al. |
| 2017/0039535 A1 | 2/2017 | Park et al. |
| 2017/0041549 A1 | 2/2017 | Kim et al. |
| 2017/0048686 A1 | 2/2017 | Chang et al. |
| 2017/0063753 A1 | 3/2017 | Probasco et al. |
| 2017/0068439 A1 | 3/2017 | Mohseni |
| 2017/0075878 A1 | 3/2017 | Jon et al. |
| 2017/0078621 A1 | 3/2017 | Sahay et al. |
| 2017/0083189 A1 | 3/2017 | Yang et al. |
| 2017/0087469 A1 | 3/2017 | Hardee et al. |
| 2017/0093769 A1 | 3/2017 | Lind et al. |
| 2017/0093780 A1* | 3/2017 | Lieb .................. G06F 16/587 |
| 2017/0108924 A1 | 4/2017 | Hurter |
| 2017/0123571 A1 | 5/2017 | Huang et al. |
| 2017/0134321 A1 | 5/2017 | Ushio et al. |
| 2017/0139554 A1 | 5/2017 | Nakabayashi et al. |
| 2017/0169295 A1 | 6/2017 | Park et al. |
| 2017/0180811 A1 | 6/2017 | Quirino et al. |
| 2017/0192625 A1 | 7/2017 | Kim et al. |
| 2017/0220852 A1 | 8/2017 | Salvador et al. |
| 2017/0239524 A1 | 8/2017 | Lee et al. |
| 2017/0243508 A1 | 8/2017 | Cheng et al. |
| 2017/0244959 A1 | 8/2017 | Angela et al. |
| 2017/0255169 A1 | 9/2017 | Lee et al. |
| 2017/0269792 A1 | 9/2017 | Xu et al. |
| 2017/0339264 A1 | 11/2017 | Steel et al. |
| 2017/0344257 A1 | 11/2017 | Gnedin et al. |
| 2017/0353423 A1 | 12/2017 | Morrison et al. |
| 2017/0354845 A1 | 12/2017 | Williams et al. |
| 2017/0357382 A1 | 12/2017 | Miura et al. |
| 2017/0357409 A1 | 12/2017 | Wagner et al. |
| 2017/0357415 A1 | 12/2017 | Peterson et al. |
| 2017/0357442 A1 | 12/2017 | Peterson et al. |
| 2017/0357520 A1 | 12/2017 | De Vries et al. |
| 2017/0359302 A1 | 12/2017 | Van Os et al. |
| 2017/0359623 A1 | 12/2017 | Folse et al. |
| 2018/0005420 A1 | 1/2018 | Bondich et al. |
| 2018/0034765 A1 | 2/2018 | Keszler et al. |
| 2018/0039406 A1 | 2/2018 | Kong et al. |
| 2018/0047189 A1 | 2/2018 | Diverdi et al. |
| 2018/0063324 A1 | 3/2018 | Van Meter, II |
| 2018/0068019 A1 | 3/2018 | Novikoff et al. |
| 2018/0068475 A1 | 3/2018 | Blue et al. |
| 2018/0077344 A1* | 3/2018 | Bostick ................ H04N 23/611 |
| 2018/0081515 A1 | 3/2018 | Block et al. |
| 2018/0083898 A1 | 3/2018 | Pham |
| 2018/0083901 A1 | 3/2018 | Mcgregor et al. |
| 2018/0121060 A1 | 5/2018 | Jeong et al. |
| 2018/0121063 A1 | 5/2018 | Lieb et al. |
| 2018/0121074 A1 | 5/2018 | Peron et al. |
| 2018/0143761 A1 | 5/2018 | Choi et al. |
| 2018/0146349 A1 | 5/2018 | Chang et al. |
| 2018/0157381 A1 | 6/2018 | Jung et al. |
| 2018/0157452 A1 | 6/2018 | Nelson et al. |
| 2018/0165858 A1 | 6/2018 | Ahuja et al. |
| 2018/0181668 A1 | 6/2018 | Zhang et al. |
| 2018/0182149 A1 | 6/2018 | Chong et al. |
| 2018/0204111 A1 | 7/2018 | Zadeh et al. |
| 2018/0239520 A1 | 8/2018 | Hinckley et al. |
| 2018/0253194 A1 | 9/2018 | Javadi |
| 2018/0270627 A1 | 9/2018 | Chang et al. |
| 2018/0286126 A1 | 10/2018 | Schwarz et al. |
| 2018/0300037 A1 | 10/2018 | Takeda et al. |
| 2018/0309801 A1 | 10/2018 | Rathod |
| 2018/0314409 A1 | 11/2018 | Adilipour et al. |
| 2018/0316783 A1 | 11/2018 | Ye et al. |
| 2018/0316964 A1 | 11/2018 | Dillon et al. |
| 2018/0321048 A1 | 11/2018 | Li et al. |
| 2018/0329586 A1 | 11/2018 | Sundstrom et al. |
| 2018/0329622 A1 | 11/2018 | Missig et al. |
| 2018/0335927 A1 | 11/2018 | Anzures et al. |
| 2018/0336715 A1 | 11/2018 | Rickwald et al. |
| 2018/0337994 A1 | 11/2018 | Dachille et al. |
| 2018/0349020 A1 | 12/2018 | Jon et al. |
| 2018/0364648 A1 | 12/2018 | Chi et al. |
| 2018/0364872 A1 | 12/2018 | Miura et al. |
| 2018/0367484 A1 | 12/2018 | Rodriguez et al. |
| 2018/0367862 A1 | 12/2018 | Horii et al. |
| 2019/0026011 A1 | 1/2019 | Wang et al. |
| 2019/0072909 A1 | 3/2019 | Misaki et al. |
| 2019/0073081 A1 | 3/2019 | Takahashi et al. |
| 2019/0102049 A1 | 4/2019 | Anzures et al. |
| 2019/0126099 A1 | 5/2019 | Hoang |
| 2019/0155382 A1 | 5/2019 | Ikuta et al. |
| 2019/0184234 A1 | 6/2019 | Packles et al. |
| 2019/0187889 A1 | 6/2019 | Moon et al. |
| 2019/0220243 A1 | 7/2019 | Decker et al. |
| 2019/0232110 A1 | 8/2019 | Williams et al. |
| 2019/0232111 A1 | 8/2019 | Williams et al. |
| 2019/0250813 A1 | 8/2019 | Block et al. |
| 2019/0258383 A1 | 8/2019 | Wagner et al. |
| 2019/0265844 A1 | 8/2019 | Burkert et al. |
| 2019/0268771 A1 | 8/2019 | Seo et al. |
| 2019/0303423 A1 | 10/2019 | Thimbleby |
| 2019/0313012 A1 | 10/2019 | Matas |
| 2019/0320301 A1 | 10/2019 | Chang et al. |
| 2019/0334782 A1 | 10/2019 | Dellinger et al. |
| 2019/0339822 A1 | 11/2019 | Devine et al. |
| 2019/0342507 A1 | 11/2019 | Dye et al. |
| 2019/0342616 A1 | 11/2019 | Domm et al. |
| 2019/0349463 A1 | 11/2019 | Soli et al. |
| 2020/0042550 A1 | 2/2020 | Chang et al. |
| 2020/0089374 A1 | 3/2020 | Hill et al. |
| 2020/0089402 A1 | 3/2020 | Kakani et al. |
| 2020/0104038 A1 | 4/2020 | Kamath et al. |
| 2020/0110798 A1 | 4/2020 | Jon et al. |
| 2020/0118325 A1 | 4/2020 | Sasikumar et al. |
| 2020/0149921 A1 | 5/2020 | Hoffman et al. |
| 2020/0211250 A1 | 7/2020 | Sasikumar et al. |
| 2020/0213437 A1 | 7/2020 | Bhatt |
| 2020/0225746 A1 | 7/2020 | Bar-zeev et al. |
| 2020/0302669 A1 | 9/2020 | Barlier et al. |
| 2020/0304863 A1 | 9/2020 | Domm et al. |
| 2020/0335133 A1 | 10/2020 | Vaucher |
| 2020/0344411 A1 | 10/2020 | Cragg et al. |
| 2020/0356222 A1 | 11/2020 | Clarke et al. |
| 2020/0356590 A1 | 11/2020 | Clarke et al. |
| 2020/0358726 A1 | 11/2020 | Dryer et al. |
| 2020/0363932 A1 | 11/2020 | Wagner et al. |
| 2020/0379560 A1 | 12/2020 | Krasadakis |
| 2020/0379638 A1 | 12/2020 | Zhu et al. |
| 2020/0380208 A1 | 12/2020 | Garcia, III et al. |
| 2021/0034860 A1 | 2/2021 | Bednarowicz et al. |
| 2021/0042028 A1 | 2/2021 | Block et al. |

(56)　　　　References Cited

U.S. PATENT DOCUMENTS

| | | |
|---|---|---|
| 2021/0042132 A1 | 2/2021 | Park et al. |
| 2021/0092488 A1 | 3/2021 | Folse et al. |
| 2021/0149549 A1 | 5/2021 | Ubillos et al. |
| 2021/0150121 A1 | 5/2021 | Thimbleby |
| 2021/0191578 A1 | 6/2021 | Miura et al. |
| 2021/0191600 A1 | 6/2021 | Lemay et al. |
| 2021/0243356 A1 | 8/2021 | Matas et al. |
| 2021/0255758 A1 | 8/2021 | Devine et al. |
| 2021/0263700 A1 | 8/2021 | Decker et al. |
| 2021/0286502 A1 | 9/2021 | Lemay et al. |
| 2021/0287416 A1 | 9/2021 | O'Hagan et al. |
| 2021/0289067 A1 | 9/2021 | Dellinger et al. |
| 2021/0342535 A1 | 11/2021 | Garcia et al. |
| 2021/0352118 A1 | 11/2021 | Ahn et al. |
| 2022/0027039 A1 | 1/2022 | Wagner et al. |
| 2022/0047918 A1 | 2/2022 | Williams et al. |
| 2022/0057931 A1 | 2/2022 | Zhu et al. |
| 2022/0057984 A1 | 2/2022 | Yang et al. |
| 2022/0074754 A1 | 3/2022 | Elder et al. |
| 2022/0121277 A1 | 4/2022 | Azam et al. |
| 2022/0206647 A1 | 6/2022 | Clarke et al. |
| 2022/0264184 A1 | 8/2022 | Folse et al. |
| 2022/0276750 A1 | 9/2022 | Miura et al. |
| 2022/0291793 A1 | 9/2022 | Zambetti et al. |
| 2022/0326846 A1 | 10/2022 | Park et al. |
| 2022/0345785 A1 | 10/2022 | Yang et al. |
| 2022/0365740 A1 | 11/2022 | Chang et al. |
| 2022/0374137 A1 | 11/2022 | Triverio et al. |
| 2022/0382443 A1 | 12/2022 | Clarke et al. |
| 2022/0386085 A1 | 12/2022 | Chang et al. |
| 2023/0012755 A1 | 1/2023 | D'auria et al. |
| 2023/0013809 A1 | 1/2023 | D'auria et al. |
| 2023/0019337 A1 | 1/2023 | D'auria et al. |
| 2023/0024084 A1 | 1/2023 | D'auria et al. |
| 2023/0031103 A1 | 2/2023 | Decker et al. |
| 2023/0066552 A1 | 3/2023 | Van Os et al. |
| 2023/0087879 A1 | 3/2023 | An et al. |
| 2023/0100610 A1 | 3/2023 | Pastrana Vicente et al. |
| 2023/0107803 A1 | 4/2023 | Dugan |
| 2023/0136013 A1 | 5/2023 | Goodrich et al. |
| 2023/0152964 A1 | 5/2023 | Zhu et al. |
| 2023/0179700 A1 | 6/2023 | Bhatt |
| 2023/0221836 A1 | 7/2023 | Clarke et al. |
| 2023/0260127 A1 | 8/2023 | Ben Baruch et al. |
| 2023/0297206 A1 | 9/2023 | Miura et al. |
| 2023/0315253 A1 | 10/2023 | Wagner et al. |
| 2023/0328400 A1 | 10/2023 | Li et al. |
| 2023/0376168 A1 | 11/2023 | Ryan et al. |
| 2023/0412908 A1 | 12/2023 | Matas et al. |
| 2024/0028177 A1 | 1/2024 | Pastrana Vicente et al. |
| 2024/0104808 A1 | 3/2024 | Oefverstroem et al. |
| 2024/0192845 A1 | 6/2024 | Block et al. |
| 2024/0201829 A1 | 6/2024 | Clarke et al. |
| 2024/0256101 A1 | 8/2024 | Miura et al. |
| 2024/0316404 A1 | 9/2024 | Williams et al. |
| 2024/0319860 A1 | 9/2024 | Chaudhri et al. |
| 2024/0346554 A1 | 10/2024 | Green et al. |
| 2024/0364645 A1 | 10/2024 | Zumbrunnen et al. |
| 2024/0402869 A1 | 12/2024 | Boesel et al. |
| 2024/0402870 A1 | 12/2024 | Lin et al. |
| 2024/0402881 A1 | 12/2024 | Bignell et al. |
| 2024/0406686 A1 | 12/2024 | Chang et al. |
| 2025/0047777 A1 | 2/2025 | Bhatt |
| 2025/0153004 A1 | 5/2025 | Williams et al. |
| 2025/0195954 A1 | 6/2025 | D'Auria et al. |
| 2025/0258581 A1 | 8/2025 | Circlaeys et al. |
| 2025/0258591 A1 | 8/2025 | Lin et al. |
| 2025/0258686 A1 | 8/2025 | Federighi et al. |

FOREIGN PATENT DOCUMENTS

| | | | |
|---|---|---|---|
| CA | 2897539 A1 | 10/2014 |
| CN | 1404233 A | 3/2003 |
| CN | 1443427 A | 9/2003 |
| CN | 1536511 A | 10/2004 |
| CN | 1619541 A | 5/2005 |
| CN | 1648856 A | 8/2005 |
| CN | 1717918 A | 1/2006 |
| CN | 1756273 A | 4/2006 |
| CN | 1782685 A | 6/2006 |
| CN | 1997050 A | 7/2007 |
| CN | 101061484 A | 10/2007 |
| CN | 101128794 A | 2/2008 |
| CN | 101129059 A | 2/2008 |
| CN | 101196786 A | 6/2008 |
| CN | 101291409 A | 10/2008 |
| CN | 101365127 A | 2/2009 |
| CN | 101505320 A | 8/2009 |
| CN | 101566919 A | 10/2009 |
| CN | 101796476 A | 8/2010 |
| CN | 101822020 A | 9/2010 |
| CN | 101827363 A | 9/2010 |
| CN | 101828411 A | 9/2010 |
| CN | 101854278 A | 10/2010 |
| CN | 101910992 A | 12/2010 |
| CN | 101939740 A | 1/2011 |
| CN | 101978374 A | 2/2011 |
| CN | 102193895 A | 9/2011 |
| CN | 102265586 A | 11/2011 |
| CN | 102449560 A | 5/2012 |
| CN | 102449561 A | 5/2012 |
| CN | 102483758 A | 5/2012 |
| CN | 102646081 A | 8/2012 |
| CN | 102681847 A | 9/2012 |
| CN | 102693311 A | 9/2012 |
| CN | 102937970 A | 2/2013 |
| CN | 102989159 A | 3/2013 |
| CN | 103003668 A | 3/2013 |
| CN | 103081496 A | 5/2013 |
| CN | 103154954 A | 6/2013 |
| CN | 103282937 A | 9/2013 |
| CN | 103297610 A | 9/2013 |
| CN | 103460651 A | 12/2013 |
| CN | 103577108 A | 2/2014 |
| CN | 103581456 A | 2/2014 |
| CN | 103876721 A | 6/2014 |
| CN | 103902808 A | 7/2014 |
| CN | 103914238 A | 7/2014 |
| CN | 103973899 A | 8/2014 |
| CN | 104035666 A | 9/2014 |
| CN | 104288983 A | 1/2015 |
| CN | 104464010 A | 3/2015 |
| CN | 104471521 A | 3/2015 |
| CN | 104487927 A | 4/2015 |
| CN | 104487928 A | 4/2015 |
| CN | 104508426 A | 4/2015 |
| CN | 104685470 A | 6/2015 |
| CN | 104885107 A | 9/2015 |
| CN | 104917794 A | 9/2015 |
| CN | 104981762 A | 10/2015 |
| CN | 105103154 A | 11/2015 |
| CN | 105260078 A | 1/2016 |
| CN | 105264480 A | 1/2016 |
| CN | 105308634 A | 2/2016 |
| CN | 105378728 A | 3/2016 |
| CN | 105874447 A | 8/2016 |
| CN | 106415476 A | 2/2017 |
| CN | 106575149 A | 4/2017 |
| CN | 106843711 A | 6/2017 |
| CN | 107122049 A | 9/2017 |
| CN | 107430483 A | 12/2017 |
| CN | 107491259 A | 12/2017 |
| CN | 107710197 A | 2/2018 |
| CN | 109600456 A | 4/2019 |
| CN | 110456899 A | 11/2019 |
| CN | 110456971 A | 11/2019 |
| CN | 111314770 A | 6/2020 |
| CN | 111787984 A | 10/2020 |
| CN | 111796657 A | 10/2020 |
| EP | 1124175 A2 | 8/2001 |
| EP | 1148412 A2 | 10/2001 |
| EP | 1289210 A2 | 3/2003 |
| EP | 1550943 A2 | 7/2005 |
| EP | 1705883 A1 | 9/2006 |

(56) References Cited

FOREIGN PATENT DOCUMENTS

| | | | |
|----|--------------|------|----------|
| EP | 2172833 | A1 | 4/2010 |
| EP | 2407219 | A2 | 1/2012 |
| EP | 2426902 | A1 | 3/2012 |
| EP | 2455858 | A1 | 5/2012 |
| EP | 2509074 | A2 | 10/2012 |
| EP | 2632139 | A2 | 8/2013 |
| EP | 2698695 | A2 | 2/2014 |
| EP | 2562633 | B1 | 3/2016 |
| EP | 2993602 | A1 | 3/2016 |
| EP | 3739439 | B1 | 4/2023 |
| FR | 2830093 | A3 | 3/2003 |
| GB | 2420260 | A | 5/2006 |
| GB | 2470585 | A | 12/2010 |
| GB | 2550639 | A | 11/2017 |
| JP | 3-217976 | A | 9/1991 |
| JP | 6-309138 | A | 11/1994 |
| JP | 7-334463 | A | 12/1995 |
| JP | 8-106469 | A | 4/1996 |
| JP | 9-322199 | A | 12/1997 |
| JP | 10-90333 | A | 4/1998 |
| JP | 10-93848 | A | 4/1998 |
| JP | 10-198337 | A | 7/1998 |
| JP | 10-202715 | A | 8/1998 |
| JP | 11-164175 | A | 6/1999 |
| JP | 11-168694 | A | 6/1999 |
| JP | 11-341425 | A | 12/1999 |
| JP | 2000-112997 | A | 4/2000 |
| JP | 2000-138883 | A | 5/2000 |
| JP | 2000-138888 | A | 5/2000 |
| JP | 2000-148591 | A | 5/2000 |
| JP | 2000-163031 | A | 6/2000 |
| JP | 2000-221879 | A | 8/2000 |
| JP | 2000-244637 | A | 9/2000 |
| JP | 2000-244673 | A | 9/2000 |
| JP | 2000-350134 | A | 12/2000 |
| JP | 2001-133293 | A | 5/2001 |
| JP | 2001-136303 | A | 5/2001 |
| JP | 2001-265481 | A | 9/2001 |
| JP | 2001-309019 | A | 11/2001 |
| JP | 2002-73486 | A | 3/2002 |
| JP | 2002-73679 | A | 3/2002 |
| JP | 2002-152559 | A | 5/2002 |
| JP | 2003-163820 | A | 6/2003 |
| JP | 2003-296246 | A | 10/2003 |
| JP | 2003-338975 | A | 11/2003 |
| JP | 2003-345491 | A | 12/2003 |
| JP | 2003-348432 | A | 12/2003 |
| JP | 2004-15586 | A | 1/2004 |
| JP | 2004-32346 | A | 1/2004 |
| JP | 2004-145291 | A | 5/2004 |
| JP | 2004-153832 | A | 5/2004 |
| JP | 2004-258738 | A | 9/2004 |
| JP | 2004-288208 | A | 10/2004 |
| JP | 2004-336536 | A | 11/2004 |
| JP | 2004-336711 | A | 11/2004 |
| JP | 2005-38101 | A | 2/2005 |
| JP | 2005-92386 | A | 4/2005 |
| JP | 2005-100084 | A | 4/2005 |
| JP | 2005-515530 | A | 5/2005 |
| JP | 2005-150836 | A | 6/2005 |
| JP | 2005-175991 | A | 6/2005 |
| JP | 2005-182320 | A | 7/2005 |
| JP | 2005-202483 | A | 7/2005 |
| JP | 2005-202651 | A | 7/2005 |
| JP | 2005-303728 | A | 10/2005 |
| JP | 2005-321516 | A | 11/2005 |
| JP | 2005-339017 | A | 12/2005 |
| JP | 2005-339420 | A | 12/2005 |
| JP | 2006-67344 | A | 3/2006 |
| JP | 2006-139340 | A | 6/2006 |
| JP | 2006-140865 | A | 6/2006 |
| JP | 2006-195592 | A | 7/2006 |
| JP | 2006-203809 | A | 8/2006 |
| JP | 2006-236249 | A | 9/2006 |
| JP | 2006-293939 | A | 10/2006 |
| JP | 3830956 | B1 | 10/2006 |
| JP | 2007-515775 | A | 6/2007 |
| JP | 2007-525775 | A | 9/2007 |
| JP | 2007-287014 | A | 11/2007 |
| JP | 2007-292971 | A | 11/2007 |
| JP | 2008-59614 | A | 3/2008 |
| JP | 2008-106469 | A | 5/2008 |
| JP | 2008-518330 | A | 5/2008 |
| JP | 2008-236794 | A | 10/2008 |
| JP | 2008-272301 | A | 11/2008 |
| JP | 2009-50471 | A | 3/2009 |
| JP | 2009-59042 | A | 3/2009 |
| JP | 2009-147889 | A | 7/2009 |
| JP | 2010-12335 | A | 1/2010 |
| JP | 2010-503130 | A | 1/2010 |
| JP | 2010-118056 | A | 5/2010 |
| JP | 2010-539619 | A | 12/2010 |
| JP | 2011-65500 | A | 3/2011 |
| JP | 2011-159006 | A | 8/2011 |
| JP | 2012-53642 | A | 3/2012 |
| JP | 2012-203537 | A | 10/2012 |
| JP | 2012-533117 | A | 12/2012 |
| JP | 5162082 | B2 | 12/2012 |
| JP | 2013-29925 | A | 2/2013 |
| JP | 2013-54468 | A | 3/2013 |
| JP | 2013-83689 | A | 5/2013 |
| JP | 2013-84282 | A | 5/2013 |
| JP | 2013-140171 | A | 7/2013 |
| JP | 2013-537870 | A | 10/2013 |
| JP | 2014-44724 | A | 3/2014 |
| JP | 2014-93003 | A | 5/2014 |
| JP | 2014-95979 | A | 5/2014 |
| JP | 2014-112404 | A | 6/2014 |
| JP | 5530320 | B2 | 6/2014 |
| JP | 2014-160481 | A | 9/2014 |
| JP | 2014-216868 | A | 11/2014 |
| JP | 2015-149634 | A | 8/2015 |
| JP | 5771242 | B2 | 8/2015 |
| JP | 2015-531916 | A | 11/2015 |
| JP | 2016-35776 | A | 3/2016 |
| JP | 2016-508631 | A | 3/2016 |
| JP | 2016-62590 | A | 4/2016 |
| JP | 2016-158115 | A | 9/2016 |
| JP | 2016-167299 | A | 9/2016 |
| JP | 2016-527581 | A | 9/2016 |
| JP | 2016-201135 | A | 12/2016 |
| JP | 2017-4326 | A | 1/2017 |
| JP | 6112878 | B2 | 4/2017 |
| JP | 2017-529577 | A | 10/2017 |
| JP | 6208151 | B2 | 10/2017 |
| JP | 2017-538975 | A | 12/2017 |
| JP | 2018-22995 | A | 2/2018 |
| JP | 6345911 | B2 | 6/2018 |
| JP | 2018-197828 | A | 12/2018 |
| JP | 2020-30853 | A | 2/2020 |
| JP | 2024-537657 | A | 10/2024 |
| KR | 10-2004-0067514 | A | 7/2004 |
| KR | 10-2005-0072072 | A | 7/2005 |
| KR | 10-2005-0101162 | A | 10/2005 |
| KR | 10-2006-0032793 | A | 4/2006 |
| KR | 10-2009-0112132 | A | 10/2009 |
| KR | 10-2012-0058539 | A | 6/2012 |
| KR | 10-2012-0092644 | A | 8/2012 |
| KR | 10-2013-0026541 | A | 3/2013 |
| KR | 10-2013-0109466 | A | 10/2013 |
| KR | 10-2014-0067965 | A | 6/2014 |
| KR | 10-2014-0105309 | A | 9/2014 |
| KR | 10-2015-0131257 | A | 11/2015 |
| KR | 10-2015-0131262 | A | 11/2015 |
| KR | 10-1611895 | B1 | 4/2016 |
| KR | 10-2018-0114963 | A | 10/2018 |
| KR | 10-2019-0028574 | A | 3/2019 |
| TW | 498240 | B | 8/2002 |
| TW | 200512616 | A | 4/2005 |
| TW | 201210368 | A | 3/2012 |
| TW | 201240499 | A | 10/2012 |
| WO | 1999/54807 | A1 | 10/1999 |
| WO | 2001/29702 | A2 | 4/2001 |
| WO | 2003/023593 | A1 | 3/2003 |

(56)                References Cited

FOREIGN PATENT DOCUMENTS

| WO | 2003/081458 A1 | 10/2003 |
| WO | 2004/047440 A2 | 6/2004 |
| WO | 2005/093550 A2 | 10/2005 |
| WO | 2005/103863 A2 | 11/2005 |
| WO | 2006/020305 A2 | 2/2006 |
| WO | 2006/047697 A2 | 5/2006 |
| WO | 2006/076557 A2 | 7/2006 |
| WO | 2007/000012 A1 | 1/2007 |
| WO | 2007/142703 A1 | 12/2007 |
| WO | 2007/149731 A1 | 12/2007 |
| WO | 2008/030779 A2 | 3/2008 |
| WO | 2008/030976 A2 | 3/2008 |
| WO | 2008/114491 A1 | 9/2008 |
| WO | 2009/032998 A1 | 3/2009 |
| WO | 2009/082814 A1 | 7/2009 |
| WO | 2009/150425 A2 | 12/2009 |
| WO | 2009/155991 A1 | 12/2009 |
| WO | 2010/059188 A2 | 5/2010 |
| WO | 2010/059306 A2 | 5/2010 |
| WO | 2010/129221 A1 | 11/2010 |
| WO | 2011/017653 A1 | 2/2011 |
| WO | 2011/028424 A1 | 3/2011 |
| WO | 2011/051091 A1 | 5/2011 |
| WO | 2011/084856 A1 | 7/2011 |
| WO | 2012/018513 A1 | 2/2012 |
| WO | 2012/075322 A2 | 6/2012 |
| WO | 2012/097385 A2 | 7/2012 |
| WO | 2012/127484 A1 | 9/2012 |
| WO | 2013/169849 A2 | 11/2013 |
| WO | 2013/169854 A2 | 11/2013 |
| WO | 2013/169870 A1 | 11/2013 |
| WO | 2013/169877 A2 | 11/2013 |
| WO | 2014/002711 A1 | 1/2014 |
| WO | 2014/022711 A1 | 2/2014 |
| WO | 2014/074407 A1 | 5/2014 |
| WO | 2014/094199 A1 | 6/2014 |
| WO | 2014/105278 A1 | 7/2014 |
| WO | 2014/149473 A1 | 9/2014 |
| WO | 2014/149488 A1 | 9/2014 |
| WO | 2014/162659 A1 | 10/2014 |
| WO | 2014/195851 A1 | 12/2014 |
| WO | 2014/197340 A1 | 12/2014 |
| WO | 2014/200730 A1 | 12/2014 |
| WO | 2014/200734 A1 | 12/2014 |
| WO | 2015/029313 A1 | 3/2015 |
| WO | 2015/087084 A1 | 6/2015 |
| WO | 2015/183828 A1 | 12/2015 |
| WO | 2015/200227 A1 | 12/2015 |
| WO | 2016/077834 A1 | 5/2016 |
| WO | 2016/126733 A1 | 8/2016 |
| WO | 2016/160632 A1 | 10/2016 |
| WO | 2017/027632 A1 | 2/2017 |
| WO | 2017/218194 A1 | 12/2017 |
| WO | 2019/118853 A1 | 6/2019 |
| WO | 2019/217005 A1 | 11/2019 |
| WO | 2019/217009 A1 | 11/2019 |
| WO | 2021/096507 A1 | 5/2021 |
| WO | 2021/188439 A1 | 9/2021 |
| WO | 2022/066438 A1 | 3/2022 |
| WO | 2022/086580 A1 | 4/2022 |
| WO | 2022/147146 A1 | 7/2022 |
| WO | 2022/256195 A1 | 12/2022 |
| WO | 2023/049418 A2 | 3/2023 |

OTHER PUBLICATIONS

Corrected Notice of Allowance received for U.S. Appl. No. 17/744,500, mailed on Jan. 12, 2024, 3 pages.
Corrected Notice of Allowance received for U.S. Appl. No. 17/951,613, mailed on Jan. 2, 2024, 2 pages.
Decision to Refuse received for European Patent Application No. 20723742.1, mailed on Jan. 5, 2024, 21 pages.
Final Office Action received for U.S. Appl. No. 18/088,309, mailed on Jan. 9, 2024, 13 pages.

Minutes of the Oral Proceedings received for European Patent Application No. 20723742.1, mailed on Jan. 4, 2024, 8 pages.
Notice of Acceptance received for Australian Patent Application No. 2023237163, mailed on Dec. 21, 2023, 3 pages.
Notice of Allowance received for U.S. Appl. No. 17/952,027, mailed on Dec. 29, 2023, 6 pages.
Notice of Allowance received for U.S. Appl. No. 18/137,353, mailed on Jan. 9, 2024, 9 pages.
Office Action received for Japanese Patent Application No. 2022-151671, mailed on Jan. 5, 2024, 6 pages (3 pages of English Translation and 3 pages of Official Copy).
Supplemental Notice of Allowance received for U.S. Appl. No. 18/114,794, mailed on Jan. 8, 2024, 2 pages.
Applicant-Initiated Interview Summary received for U.S. Appl. No. 17/951,624, mailed on Nov. 16, 2023. 3 pages.
Brief Communication Regarding Oral Proceedings received for European Patent Application No. 20723742.1, mailed on Nov. 15, 2023, 10 pages.
International Search Report and Written Opinion received for PCT Patent Application No. PCT/US2023/021734, mailed on Sep. 7, 2023, 17 pages.
Office Action received for Australian Patent Application No. 2022263576, mailed on Nov. 13, 2023, 3 pages.
Office Action received for Chinese Patent Application No. 201780033901.2, mailed on Oct. 31, 2023, 17 pages (10 pages of English Translation and 7 pages of Official Copy).
Supplemental Notice of Allowance received for U.S. Appl. No. 18/114,794, mailed on Nov. 17, 2023, 2 pages.
Applicant-Initiated Interview Summary received for U.S. Appl. No. 17/542,947, mailed on Feb. 9, 2024, 4 pages.
Applicant-Initiated Interview Summary received for U.S. Appl. No. 18/088,309, mailed on Feb. 28, 2024, 2 pages.
Corrected Notice of Allowance received for U.S. Appl. No. 18/114,794, mailed on Feb. 23, 2024, 4 pages.
Office Action received for Chinese Patent Application No. 201780033901.2, mailed on Jan. 26, 2024, 14 pages (7 pages of English Translation and 7 pages of Official Copy).
Notice of Allowance received for Japanese Patent Application No. 2023-560216, mailed on Jan. 27, 2025, 4 pages (1 page of English Translation and 3 pages of Official Copy).
Final Office Action received for U.S. Appl. No. 18/112,421, mailed on Dec. 12, 2023, 22 pages.
International Preliminary Report on Patentability received for PCT Patent Application No. PCT/US2022/029297, mailed on Nov. 30, 2023, 10 pages.
Notice of Acceptance received for Australian Patent Application No. 2022203278, mailed on Dec. 4, 2023, 3 pages.
Notice of Allowance received for U.S. Appl. No. 17/068,386, mailed on Dec. 13, 2023, 12 pages.
Notice of Allowance received for U.S. Appl. No. 17/951,613, mailed on Dec. 8, 2023, 13 pages.
Notice of Allowance received for U.S. Appl. No. 18/114,794, mailed on Dec. 5, 2023, 8 pages.
Office Action received for Australian Patent Application No. 2023237163, mailed on Nov. 24, 2023, 3 pages.
Office Action received for European Patent Application No. 22152524.9, mailed on Dec. 5, 2023, 8 pages.
Decision to Grant received for European Patent Application No. 22150207.3, mailed on Jul. 11, 2024, 2 pages.
Notice of Allowance received for Chinese Patent Application No. 202210326960.1, mailed on Jun. 21, 2024, 5 pages (1 page of English Translation and 4 pages of Official Copy).
Office Action received for Japanese Patent Application No. 2024-077470, mailed on Jun. 24, 2024, 5 pages (2 pages of English Translation and 3 pages of Official Copy).
Applicant-Initiated Interview Summary received for U.S. Appl. No. 18/195,350, mailed on Sep. 13, 2024, 3 pages.
Decision on Appeal received for U.S. Appl. No. 14/599,424, mailed on Apr. 3, 2024, 34 pages.
Immersed, "Immersed on the Quest Pro in AR & VR", XP093203344, Available online at: https://www.youtube.com/watch?v= iWSDNiDtsHE, Oct. 25, 2022, 4 pages.

(56)　　　　　References Cited

OTHER PUBLICATIONS

Notice of Allowance received for Chinese Patent Application No. 202111244490.6, mailed on Sep. 23, 2024, 2 pages (1 page of English Translation and 1 page of Official Copy).
Notice of Allowance received for U.S. Appl. No. 17/951,624, mailed on Sep. 20, 2024, 9 pages.
Office Action received for Chinese Patent Application No. 202110831819.2, mailed on Aug. 17, 2024, 11 pages (5 pages of English Translation and 6 pages of Official Copy).
Office Action received for Japanese Patent Application No. 2023-560216, mailed on Sep. 20, 2024, 14 pages (7 pages of English Translation and 7 pages of Official Copy).
Intention to Grant received for European Patent Application No. 22150207.3, mailed on Mar. 21, 2024, 9 pages.
Lin et al., "Cooperation Stimulation Strategies for Peer-To-Peer Wireless Video Streaming Social Networks", In IEEE Transactions on Image Processing, vol. 19, Issue 17. Available Online at: https://dl.acm.org/doi/abs/10.1109/TIP.2010.2045035, 2010, 30 pages.
Non-Final Office Action received for U.S. Appl. No. 18/117,998, mailed on Mar. 15, 2024, 11 pages.
Notice of Allowance received for U.S. Appl. No. 17/885,807, mailed on Mar. 27, 2024, 16 pages.
Office Action received for Chinese Patent Application No. 202111576661.5, mailed on Dec. 1, 2023, 13 pages (6 pages of English Translation and 7 pages of Official Copy).
Office Action received for Indian Patent Application No. 202118050660, mailed on Mar. 18, 2024, 7 pages.
Xiaoli, Wan, "Research on sharing and collaboration technology for P2P instant messaging", Wan Fang's dissertation, Aug. 11, 2008, 64 pages (Official Copy Only) {See Communication Under Rule 37 CFR § 1.98(a) (3)}.
Yang, Yang, "Design and implementation of P2P-based video live broadcast function on iOS system", CNKI Excellent Master's Thesis Full Text Database, Apr. 15, 2015, 64 pages (Official Copy Only) {See Communication Under Rule 37 CFR § 1.98(a) (3)}.
Decision to Grant received for European Patent Application No. 22173249.8, mailed on Dec. 14, 2023, 2 pages.
Final Office Action received for U.S. Appl. No. 18/117,998, mailed on Dec. 28, 2023, 12 pages.
International Preliminary Report on Patentability received for PCT Patent Application No. PCT/US2022/030589, mailed on Dec. 14, 2023, 22 pages.
Leonie, "Can I interrupt slideshow music in Mac Photos?", Online available at: https://discussions.apple.com/thread/8027658?sortBy=best. Jul. 31, 2017, 1 page.
Non-Final Office Action received for U.S. Appl. No. 17/542,947, mailed on Dec. 15, 2023, 68 pages.
Non-Final Office Action received for U.S. Appl. No. 17/885,807, mailed on Dec. 20, 2023, 39 pages.
Notice of Acceptance received for Australian Patent Application No. 2022263576, mailed on Dec. 12, 2023, 3 pages.
Notice of Allowance received for Chinese Patent Application No. 202080040442.2, mailed on Dec. 9, 2023, 4 pages (1 page of English Translation and 3 pages of Official Copy).
Notice of Allowance received for U.S. Appl. No. 17/744,500, mailed on Dec. 22. 2023, 38 pages.
Notice of Allowance received for U.S. Appl. No. 17/951,875, mailed on Dec. 26, 2023, 7 pages.
Office Action received for Chinese Patent Application No. 202210618961.3, mailed on Jun. 21, 2024, 20 pages (7 pages of English Translation and 13 pages of Official Copy).
Applicant-Initiated Interview Summary received for U.S. Appl. No. 18/088,309, mailed on Aug. 27, 2024, 2 pages.
Extended European Search Report received for European Patent Application No. 24179066.6, mailed on Aug. 8, 2024, 10 pages.
Kaceli Techtraining, "PowerPoint 2016: How to Insert and Embed a YouTube Video in PowerPoint (10/30)", Available online at: https://www.youtube.com/watch?v=OEpbmaX2zJQ, May 19, 2017, 3 pages.

Non-Final Office Action received for U.S. Appl. No. 17/542,947, mailed on Aug. 13, 2024, 58 pages.
Notice of Allowance received for Chinese Patent Application No. 202110366820.2, mailed on Aug. 6, 2024, 4 pages (1 page of English Translation and 3 pages of Official Copy).
Final Office Action received for U.S. Appl. No. 17/542,947, mailed on Apr. 18, 2024, 55 pages.
Minutes of Oral Proceedings received for European Patent Application No. 21165295.3, mailed on Apr. 26, 2024, 6 pages.
Notice of Allowance received for Chinese Patent Application No. 201780033901.2, mailed on Apr. 16, 2024, 4 pages (1 page of English Translation and 3 pages of Official Copy).
Notice of Allowance received for Chinese Patent Application No. 202111576661.5, mailed on Mar. 28, 2024, 4 pages (1 page of English Translation and 3 pages of Official Copy).
Notice of Allowance received for Japanese Patent Application No. 2022-151671, mailed on Apr. 22, 2024, 4 pages (1 page of English Translation and 3 pages of Official Copy).
Notice of Allowance received for U.S. Appl. No. 17/068,386, mailed on Apr. 29, 2024, 13 pages.
Office Action received for Chinese Patent Application No. 202111244490.6, mailed on Apr. 3, 2024, 20 pages (11 pages of English Translation and 9 pages of Official Copy).
Result of Consultation received for European Patent Application No. 21165295.3, mailed on Apr. 18, 2024, 3 pages.
Technology for Teachers and Students, "Adding Music to PowerPoint Presentations—PowerPoint Tutorial", Online available at: https://www.youtube.com/watch?v=tBiwTRLVOd0, Aug. 6, 2018, 6 pages.
Travelvids—Video O, "How to quickly make a Slideshow video on iPhone (No 3rd party Apps required)", Online available at: https://www.youtube.com/watch?v=KpAzFvBQLf0, May 8, 2020, 4 pages.
Blackburn, Ian, "How Using Custom Workouts on Apple Watch will make you a better Athlete (and everything you need to know about creating them)—The Apple Watch Triathlete", Available online at: https://theapplewatchtriathlete.com/blog-1/2022/8/23/how-using-custom-workouts-on-apple-watch-will-make-you-a-better-athlete-and-everything-you-need-to-know-about-creating-them, August 23, 2022, pp. 1-51.
Corrected Notice of Allowance received for U.S. Appl. No. 17/951,624, mailed on Oct. 3, 2024, 2 pages.
Notice of Allowance received for Chinese Patent Application No. 202210312775.7, mailed on Sep. 23, 2024, 5 pages (1 page of English Translation and 4 pages of Official Copy).
Notice of Allowance received for U.S. Appl. No. 18/112,421, mailed on Oct. 11, 2024, 16 pages.
Office Action received for Australian Patent Application No. 2023208169, mailed on Oct. 2, 2024, 3 pages.
Office Action received for Australian Patent Application No. 2023214377, mailed on Sep. 25, 2024, 4 pages.
Lafayette, Pierre-Antoine, "The 'icon' URI scheme", draft-lafayette-icon-uri-scheme-01, Online available at: https://www.ietf.org/archive/id/draft-lafayette-icon-uri-scheme-01.html, 2010, 7 pages.
Nikoletseas et al., "Decentralizing and Adding Portability to an IoT Test-bed through Smartphones", IEEE International Conference on Distributed Computing in Sensor Systems, 2014, pp. 281-286.
Office Action received for Australian Patent Application No. 2023214377, mailed on Jan. 17, 2025, 3 pages.
Office Action received for Australian Patent Application No. 2024200956, mailed on Jan. 10, 2025, 6 pages.
Advisory Action received for U.S. Appl. No. 17/744,500, mailed on Nov. 14, 2023, 5 pages.
Corrected Notice of Allowance received for U.S. Appl. No. 18/153,922, mailed on Nov. 3, 2023, 3 pages.
Non-Final Office Action received for U.S. Appl. No. 18/137,353, mailed on Nov. 9, 2023, 10 pages.
Notice of Acceptance received for Australian Patent Application No. 2022235634, mailed on Nov. 2, 2023, 3 pages.
Office Action received for Indian Patent Application No. 202117050360, mailed on Oct. 30, 2023, 10 pages.
Applicant-Initiated Interview Summary received for U.S. Appl. No. 18/117,998, mailed on Jan. 31, 2024, 4 pages.
Corrected Notice of Allowance received for U.S. Appl. No. 17/952,027, mailed on Jan. 22, 2024, 3 pages.

(56)  References Cited

OTHER PUBLICATIONS

Corrected Notice of Allowance received for U.S. Appl. No. 18/137,353, mailed on Jan. 31, 2024, 2 pages.
Examiner's Answer to Appeal Brief received for U.S. Appl. No. 16/389,722, mailed on Feb. 2, 2024, 8 pages.
Final Office Action received for U.S. Appl. No. 17/951,624, mailed on Jan. 25, 2024, 48 pages.
Intention to Grant received for European Patent Application No. 16807953.1, mailed on Jan. 24, 2024, 9 pages,.
Intention to Grant received for European Patent Application No. 17813824.4, mailed on Feb. 1, 2024, 9 pages.
Notice of Allowance received for U.S. Appl. No. 17/951,613, mailed on Feb. 2, 2024, 5 pages.
Corrected Notice of Allowance received for U.S. Appl. No. 17/068,386, mailed on May 20, 2024, 2 pages.
Office Action received for Australian Patent Application No. 2024202344, mailed on May 16, 2024, 3 pages.
Office Action received for Chinese Patent Application No. 202110366820.2. mailed on Apr. 12. 2024, 11 pages (5 pages of English Translation and 6 pages of Official Copy).
Office Action received for Chinese Patent Application No. 202110831819.2, mailed on Apr. 16, 2024, 6 pages (3 pages of English Translation and 3 pages of Official Copy).
Office Action received for European Patent Application No. 22170561. 9, mailed on May 23, 2024, 8 pages.
Intention to Grant received for European Patent Application No. 22731852.4, mailed on Dec. 17, 2024, 9 pages.
International Search Report and Written Opinion received for PCT Patent Application No. PCT/US2024/031346, mailed on Dec. 6, 2024, 17 pages.
Non-Final Office Action received for U.S. Appl. No. 18/520,372, mailed on Dec. 20, 2024, 32 pages.
Office Action received for Australian Patent Application No. 2023208169, mailed on Dec. 5, 2024, 3 pages.
Supplemental Notice of Allowance received for U.S. Appl. No. 18/589,265, mailed on Dec. 18, 2024, 2 pages,.
Anonymous,"Application Development Discussions", Available online at: https://community.sap.com/t5/application-development-discussions/skip-selection-screen/m-p/2769825, Sep. 10, 2007, 10 pages.
Applicant-Initiated Interview Summary received for U.S. Appl. No. 17/542,947, mailed on Nov. 1, 2024, 4 pages.
Extended European Search Report received for European Patent Application No. 24186217.6, mailed on Oct. 31, 2024, 11 pages.
Limegamingtv, "How To Upload Ps4 Share Clips To Youtube!", Available online at: https://www.youtube.com/watch?v=ZAYFajRWIMA, Oct. 30, 2014, 3 pages.
Malatesta, Francesco, "How to Implement User Log-in with PayPal", Available online at: https://www.sitepoint.com/implement-user-log-paypal/, Dec. 23, 2014, 16 pages.
Non-Final Office Action received for U.S. Appl. No. 18/117,998, mailed on Nov. 6, 2024, 12 pages.
Office Action received for Indian Patent Application No. 202248063719, mailed on Oct. 24, 2024, 5 pages.
Playstation Europe, "How to stream your gameplay | Inside PS4 | #4 ThePlayers", Available online at: https://www.youtube.com/watch?v=eaQzxZa_BVE, Sep. 10, 2014, 3 pages.
Brief Communication Regarding Oral Proceedings received for European Patent Application No. 21165295.3, mailed on Feb. 27, 2024, 1 page.
Extended European Search Report received for European Patent Application No. 23216484.8, mailed on Feb. 28, 2024, 9 pages.
International Search Report received for PCT Patent Application No. PCT/US2023/024370, mailed on Sep. 7, 2023, 5 pages.
Notice of Allowance received for Korean Patent Application No. 10-2022-7044515, mailed on Feb. 19, 2024, 7 pages (2 pages of English Translation and 5 pages of Official Copy).
Applicant-Initiated Interview Summary received for U.S. Appl. No. 18/117,998, mailed on Jul. 24, 2024, 4 pages.
Notice of Allowance received for U.S. Appl. No. 17/885,807, mailed on Jul. 29, 2024, 16 pages.

Applicant-Initiated Interview Summary received for U.S. Appl. No. 17/951,613, mailed on Sep. 8, 2023, 5 pages.
Applicant-Initiated Interview Summary received for U.S. Appl. No. 17/952,027, mailed on Sep. 11, 2023, 3 pages.
Final Office Action received for U.S. Appl. No. 17/744,500, mailed on Sep. 19, 2023, 35 pages.
Final Office Action received for U.S. Appl. No. 17/885,807, mailed on Aug. 25, 2023, 36 pages.
Final Office Action received for U.S. Appl. No. 17/952,027, mailed on Aug. 21, 2023, 47 pages.
Non-Final Office Action received for U.S. Appl. No. 17/951,613, mailed on Aug. 2, 2023, 42 pages.
Non-Final Office Action received for U.S. Appl. No. 17/951,624, mailed on Sep. 19, 2023, 41 pages.
Non-Final Office Action received for U.S. Appl. No. 18/088,309, mailed on Sep. 21, 2023, 11 pages.
Non-Final Office Action received for U.S. Appl. No. 18/112,421, mailed on Aug. 17, 2023, 15 pages.
Notice of Acceptance received for Australian Patent Application No. 2022235618, mailed on Aug. 25, 2023, 3 pages.
Notice of Allowance received for U.S. Appl. No. 18/114,794, mailed on Aug. 16, 2023, 11 pages.
Office Action received for Australian Patent Application No. 2022203278, mailed on Aug. 12, 2023, 5 pages.
Office Action received for Korean Patent Application No. 10-2022-7044515, mailed on Aug. 21, 2023, 11 pages (5 pages of English Translation and 6 pages of Official Copy).
Supplemental Notice of Allowance received for U.S. Appl. No. 17/951,875, mailed on Aug. 25, 2023, 2 pages.
Supplemental Notice of Allowance received for U.S. Appl. No. 18/114,794, mailed on Aug. 31, 2023, 2 pages.
Applicant-Initiated Interview Summary received for U.S. Appl. No. 17/885,807, mailed on Oct. 10, 2023, 2 pages.
Intention to Grant received for European Patent Application No. 22173249.8, mailed on Oct. 2, 2023, 9 pages.
Non-Final Office Action received for U.S. Appl. No. 18/117,998, mailed on Oct. 10, 2023, 21 pages.
Notice of Allowance received for U.S. Appl. No. 17/952,027, mailed on Oct. 4, 2023, 13 pages.
Result of Consultation received for European Patent Application No. 20729331.7, mailed on Sep. 27, 2023, 27 pages.
Extended European Search Report received for European Patent Application No. 23218010.9, mailed on Apr. 10, 2024, 13 pages.
International Preliminary Report on Patentability received for PCT Patent Application No. PCT/US2022/044637, mailed on Apr. 4, 2024, 12 pages.
Non-Final Office Action received for U.S. Appl. No. 18/088,309, mailed on Apr. 9, 2024, 14 pages.
Office Action received for Australian Patent Application No. 2023214377, mailed on Mar. 27, 2024, 3 pages.
Final Office Action received for U.S. Appl. No. 17/542,947, mailed on Dec. 2, 2024, 58 pages.
Impossible Technical, "How to change Audio Language of movie I Audio Track I VLC Media Player I In Laptop/ Desktop", Online available at: https://www.youtube.com/watch?v=5PDwwqYStuk, Apr. 23, 2020, 10 pages.
International Preliminary Report on Patentability received for PCT Patent Application No. PCT/US2023/021734, mailed on Nov. 21, 2024, 12 pages.
International Search Report and Written Opinion received for PCT Patent Application No. PCT/US2024/028414, mailed on Nov. 11, 2024, 20 pages.
International Search Report and Written Opinion received for PCT Patent Application No. PCT/US2024/030858, mailed on Oct. 31, 2024, 21 pages.
Invitation to Pay Additional Fees and Partial International Search Report received for PCT Patent Application No. PCT/US2024/028414, mailed on Sep. 20, 2024, 12 pages.
Invitation to Pay Additional Fees and Partial International Search Report received for PCT Patent Application No. PCT/US2024/030858, mailed on Sep. 10, 2024, 15 pages.

(56) References Cited

OTHER PUBLICATIONS

Invitation to Pay Additional Fees and Partial International Search Report received for PCT Patent Application No. PCT/US2024/031346, mailed on Oct. 14, 2024, 9 pages.

Notice of Allowance received for Chinese Patent Application No. 202311811912.2, mailed on Dec. 1, 2024, 5 pages (1 page of English Translation and 4 pages of Official Copy).

Notice of Allowance received for Japanese Patent Application No. 2023-077331, mailed on Nov. 29, 2024, 4 pages (1 page of English Translation and 3 pages of Official Copy).

Notice of Allowance received for U.S. Appl. No. 18/589,265, mailed on Dec. 6, 2024, 9 pages.

Office Action received for Australian Patent Application No. 2023210654, mailed on Nov. 26, 2024, 4 pages.

Office Action received for Australian Patent Application No. 2024202344, mailed on Nov. 25, 2024, 4 pages.

Office Action received for Chinese Patent Application No. 202210312598.2, mailed on Jun. 27, 2024, 22 pages (7 pages of English Translation and 15 pages of Official Copy).

Applicant-Initiated Interview Summary received for U.S. Appl. No. 18/112,421, mailed on Sep. 3, 2024, 5 pages.

Notice of Allowance received for Japanese Patent Application No. 2024-077470, mailed on Aug. 23, 2024, 4 pages (1 page of English Translation and 3 pages of Official Copy).

Office Action received for Australian Patent Application No. 2023210654, mailed on Sep. 4, 2024, 3 Pages.

Non-Final Office Action received for U.S. Appl. No. 18/195,350, mailed on Jun. 20, 2024, 38 pages.

Lu et al., "E-health Web Application Framework and Platform Based On The Cloud Technology", Available online at: https://www.divaportal.org/smash/get/diva2:647835/FULLTEXT01.pdf, 2013, 64 pages.

Office Action received for Australian Patent Application No. 2023210654, mailed on Jun. 13, 2024, 6 pages.

Office Action received for European Patent Application No. 22152524.9, mailed on Jun. 25, 2024, 7 pages.

Office Action received for European Patent Application No. 22731852.4, mailed on Jun. 26, 2024, 7 pages.

Park et al., "The UCONABC Usage Control Model", ACM Transactions on Information and System Security (TISSEC, vol. 7, No. 1), Available online at: https://citeseerx.ist.psu.edu/document?repid=rep1&type=pdf&doi=15a34e494fcfb656c2bcb3897b65b30f00f9fcd1, Feb. 2004, pp. 128-174.

Applicant-Initiated Interview Summary received for U.S. Appl. No. 18/117,998, mailed on May 3, 2024, 4 pages.

Decision to Refuse received for European Patent Application No. 21165295.3, mailed on Apr. 29, 2024, 14 pages.

Non-Final Office Action received for U.S. Appl. No. 18/112,421, mailed on May 14, 2024, 28 pages.

Applicant-Initiated Interview Summary received for U.S. Appl. No. 17/542,947, mailed on Jun. 6, 2024, 4 pages.

Applicant-Initiated Interview Summary received for U.S. Appl. No. 18/088,309, mailed on Jun. 7, 2024, 2 pages.

Caitlin Mcgarry, "Mail in iOS 9: Three huge changes that make email less awful", Online Available at: https://www.macworld.com/article/225975/mail-in-iOS-9-three-huge-changes-that-will-make-email-less-awful.html, Sep. 16, 2015, 6 pages.

Decision to Grant received for European Patent Application No. 16807953.1, mailed on May 31, 2024, 2 pages.

Decision to Grant received for European Patent Application No. 17813824.4, mailed on Jun. 13, 2024, 2 pages.

Extended European Search Report received for European Patent Application No. 24161066.6, mailed on Jun. 14, 2024, 10 pages.

Final Office Action received for U.S. Appl. No. 18/117,998, mailed on May 31, 2024, 12 pages.

Office Action received for Australian Patent Application No. 2023214377, mailed on Jun. 5, 2024, 4 pages.

Office Action received for Japanese Patent Application No. 2023-077331, mailed on May 31, 2024, 4 pages (2 pages of English Translation and 2 pages of Official Copy).

International Search Report and Written Opinion received for PCT Patent Application No. PCT/US2024/022386, mailed on Sep. 23, 2024, 16 pages.

Invitation to Pay Additional Fees and Partial International Search Report received for PCT Patent Application No. PCT/US2024/022386, mailed on Aug. 2, 2024, 9 pages.

Notice of Allowance received for Chinese Patent Application No. 202110831819.2, mailed on Oct. 28, 2024, 4 pages (1 page of English Translation and 3 pages of Official Copy).

Notice of Allowance received for Chinese Patent Application No. 202210312598.2, mailed on Nov. 6, 2024, 4 pages (1 page of English Translation and 3 pages of Official Copy).

Notice of Allowance received for Chinese Patent Application No. 202210618961.3, mailed on Oct. 30, 2024, 5 pages (1 page of English Translation and 4 pages of Official Copy).

Office Action received for Korean Patent Application No. 10-2022-7026174, mailed on Oct. 31, 2024, 14 pages (6 pages of English Translation and 8 pages of Official Copy).

Applicant-Initiated Interview Summary received for U.S. Appl. No. 17/744,500, mailed on Oct. 17, 2023, 4 pages.

Applicant-Initiated Interview Summary received for U.S. Appl. No. 18/088,309, mailed on Oct. 27, 2023, 2 pages.

Applicant-Initiated Interview Summary received for U.S. Appl. No. 18/112,421, mailed on Oct. 27, 2023, 4 pages.

Applicant-Initiated Interview Summary received for U.S. Appl. No. 18/117,998, mailed on Nov. 1, 2023, 2 pages.

Decision to Refuse received for European Patent Application No. 20729331.7, mailed on Oct. 19, 2023, 2 pages.

Notice of Allowance received for U.S. Appl. No. 17/951,875, mailed on Oct. 20, 2023, 8 pages.

Prasad et al., "Understanding Sharing Preferences and Behavior for Mhealth Devices", Proceedings of the 2012 ACM workshop on Privacy in the electronic society, Available online at: https://dl.acm.org/doi/10.1145/2381966.2381983, Oct. 15, 2012, pp. 117-128.

Corrected Notice of Allowance received for U.S. Appl. No. 17/885,807, mailed on Aug. 9, 2024, 2 pages.

Final Office Action received for U.S. Appl. No. 18/088,309, mailed on Aug. 1, 2024, 16 pages.

Office Action received for Chinese Patent Application No. 202210312775.7, mailed on Jun. 19, 2024, 13 pages (6 pages of English Translation and 7 pages of Official Copy).

Office Action received for European Patent Application No. 22164099.8, mailed on Jul. 29, 2024, 10 pages.

Applicant-Initiated Interview Summary received for U.S. Appl. No. 18/374,562, mailed on Jul. 22, 2025, 2 pages.

Applicant-Initiated Interview Summary received for U.S. Appl. No. 18/583,787, mailed on Jul. 18, 2025, 2 pages.

Notice of Allowance received for Korean Patent Application No. 10-2022-7026174, mailed on Jul. 11, 2025, 8 pages (2 pages of English Translation and 6 pages of Official Copy).

Advisory Action received for U.S. Appl. No. 14/841,606, mailed on Feb. 28, 2019, 3 pages.

Advisory Action received for U.S. Appl. No. 14/253,783, mailed on Feb. 15, 2017, 6 pages.

Advisory Action received for U.S. Appl. No. 14/846,574, mailed on Jul. 31, 2020, 8 pages.

Advisory Action received for U.S. Appl. No. 14/863,099, mailed on Sep. 8, 2016, 3 pages.

Advisory Action received for U.S. Appl. No. 14/869,877, mailed on Jan. 5, 2017, 3 pages.

Advisory Action received for U.S. Appl. No. 14/870,793, mailed on Apr. 13, 2017, 3 pages.

Advisory Action received for U.S. Appl. No. 15/554,204, mailed on Mar. 12, 2020, 3 pages.

Advisory Action received for U.S. Appl. No. 16/145,033, mailed on Nov. 2, 2021, 5 pages.

Advisory Action received for U.S. Appl. No. 16/377,892, mailed on Apr. 9, 2021, 4 pages.

Advisory Action received for U.S. Appl. No. 16/378,136, mailed on Apr. 12, 2021, 4 pages.

(56) References Cited

OTHER PUBLICATIONS

Advisory Action received for U.S. Appl. No. 16/389,722, mailed on Jun. 9, 2023, 4 pages.
Advisory Action received for U.S. Appl. No. 16/389,722, mailed on Mar. 9, 2021, 5 pages.
Advisory Action received for U.S. Appl. No. 16/454,884, mailed on Jan. 1, 2021, 6 pages.
Apple Inc., "iPhone User Guide For iOS 7.1 Software", available online at <https://manuals.info.apple.com/MANUALS/1000/MA1681/en_US/iphone_ios7_user_guide.pdf>, Mar. 10, 2014, pp. 1-162.
Applicant Initiated Interview Summary received for U.S. Appl. No. 16/109,487, mailed on Apr. 21, 2020, 5 pages.
Applicant Initiated Interview Summary received for U.S. Appl. No. 16/363,945, mailed on Aug. 13, 2020, 5 pages.
Applicant Initiated Interview Summary received for U.S. Appl. No. 16/389,722, mailed on Jul. 7, 2020, 5 pages.
Applicant Initiated Interview Summary received for U.S. Appl. No. 16/584,783, mailed on May 4, 2020, 3 pages.
Applicant Initiated Interview Summary received for U.S. Appl. No. 17/327,204, mailed on Jan. 25, 2022, 5 pages.
Applicant-Initiated Interview Summary for U.S. Appl. No. 16/402,057, mailed on Mar. 16, 2020, 3 pages.
Applicant-Initiated Interview Summary received for U.S. Appl. No. 14/846,574, mailed on Feb. 3, 2020, 6 pages.
Applicant-Initiated Interview Summary received for U.S. Appl. No. 14/846,574, mailed on Jan. 14, 2021, 5 pages.
Applicant-Initiated Interview Summary received for U.S. Appl. No. 14/846,574, mailed on Jul. 21, 2020, 7 pages.
Applicant-Initiated Interview Summary received for U.S. Appl. No. 15/554,204, mailed on Jan. 31, 2020, 3 pages.
Applicant-Initiated Interview Summary received for U.S. Appl. No. 15/554,204, mailed on Oct. 11, 2019, 5 pages.
Applicant-Initiated Interview Summary received for U.S. Appl. No. 15/614,121, mailed on Feb. 13, 2020, 4 pages.
Applicant-Initiated Interview Summary received for U.S. Appl. No. 16/145,033, mailed on Apr. 30, 2021, 4 pages.
Applicant-Initiated Interview Summary received for U.S. Appl. No. 16/145,033, mailed on Jun. 29, 2020, 5 pages.
Applicant-Initiated Interview Summary received for U.S. Appl. No. 16/145,033, mailed on Nov. 24, 2020, 4 pages.
Applicant-Initiated Interview Summary received for U.S. Appl. No. 16/145,033, mailed on Oct. 7, 2021, 4 pages.
Applicant-Initiated Interview Summary received for U.S. Appl. No. 16/377,892, mailed on Mar. 26, 2021, 2 pages.
Applicant-Initiated Interview Summary received for U.S. Appl. No. 16/377,892, mailed on Oct. 13, 2020, 5 pages.
Applicant-Initiated Interview Summary received for U.S. Appl. No. 16/378,136, mailed on Mar. 26, 2021, 2 pages.
Applicant-Initiated Interview Summary received for U.S. Appl. No. 16/378,136, mailed on Oct. 13, 2020, 4 pages.
Applicant-Initiated Interview Summary received for U.S. Appl. No. 16/388,493, mailed on Feb. 17, 2022, 2 pages.
Applicant-Initiated Interview Summary received for U.S. Appl. No. 16/389,722, mailed on Feb. 11, 2021, 4 pages.
Applicant-Initiated Interview Summary received for U.S. Appl. No. 16/389,722, mailed on Feb. 18, 2022, 5 pages.
Applicant-Initiated Interview Summary received for U.S. Appl. No. 16/389,722, mailed on May 31, 2023, 4 pages.
Applicant-Initiated Interview Summary received for U.S. Appl. No. 16/389,722, mailed on Nov. 4, 2022, 4 pages.
Applicant-Initiated Interview Summary received for U.S. Appl. No. 16/389,722, mailed on Sep. 7, 2021, 4 pages.
Applicant-Initiated Interview Summary received for U.S. Appl. No. 16/407,590, mailed on Jun. 5, 2020, 3 pages.
Applicant-Initiated Interview Summary received for U.S. Appl. No. 16/407,590, mailed on Nov. 17, 2020, 6 pages.
Applicant-Initiated Interview Summary received for U.S. Appl. No. 16/450,531, mailed on Aug. 11, 2020, 5 pages.
Applicant-Initiated Interview Summary received for U.S. Appl. No. 16/454,884, mailed on Dec. 4, 2020, 4 pages.

Applicant-Initiated Interview Summary received for U.S. Appl. No. 16/454,884, mailed on Jun. 2, 2020, 3 pages.
Applicant-Initiated Interview Summary received for U.S. Appl. No. 16/584,776, mailed on May 13, 2020, 9 pages.
Applicant-Initiated Interview Summary received for U.S. Appl. No. 16/584,776, mailed on Nov. 25, 2020, 5 pages.
Applicant-Initiated Interview Summary received for U.S. Appl. No. 16/601,064, mailed on Dec. 14, 2020, 5 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/736,711, mailed on Oct. 16, 2020, 3 pages.
Applicant-Initiated Interview Summary received for U.S. Appl. No. 17/068,386, mailed on Apr. 24, 2023, 2 pages.
Applicant-Initiated Interview Summary received for U.S. Appl. No. 17/068,386, mailed on Jan. 13, 2022, 2 pages.
Applicant-Initiated Interview Summary received for U.S. Appl. No. 17/068,386, mailed on Sep. 21, 2021, 2 pages.
Applicant-Initiated Interview Summary received for U.S. Appl. No. 17/116,775, mailed on Nov. 3, 2021, 4 pages.
Applicant-Initiated Interview Summary received for U.S. Appl. No. 17/126,571, mailed on Jan. 27, 2022, 4 pages.
Applicant-Initiated Interview Summary received for U.S. Appl. No. 17/153,703, mailed on May 11, 2022, 4 pages.
Applicant-Initiated Interview Summary received for U.S. Appl. No. 17/408,220, mailed on Oct. 18, 2022, 4 pages.
Applicant-Initiated Interview Summary received for U.S. Appl. No. 17/516,537, mailed on Jul. 5, 2022, 4 pages.
Applicant-Initiated Interview Summary received for U.S. Appl. No. 17/516,537, mailed on Nov. 22, 2022, 2 pages.
Applicant-Initiated Interview Summary received for U.S. Appl. No. 17/542,947, mailed on Apr. 28, 2023, 4 pages.
Applicant-Initiated Interview Summary received for U.S. Appl. No. 17/542,947, mailed on Jul. 10, 2023, 4 pages.
Applicant-Initiated Interview Summary received for U.S. Appl. No. 17/744,499, mailed on Jan. 27, 2023, 3 pages.
Applicant-Initiated Interview Summary received for U.S. Appl. No. 17/744,500, mailed on May 30, 2023, 4 pages.
Applicant-Initiated Interview Summary received for U.S. Appl. No. 17/862,097, mailed on Mar. 1, 2023, 4 pages.
Applicant-Initiated Interview Summary received for U.S. Appl. No. 17/862,097, mailed May 18, 2023, 3 pages.
Applicant-Initiated Interview Summary received for U.S. Appl. No. 17/885,807, mailed on May 26, 2023, pages.
Applicant-Initiated Interview Summary received for U.S. Appl. No. 17/951,875, mailed on Feb. 28, 2023, 2 pages.
Applicant-Initiated Interview Summary received for U.S. Appl. No. 17/951,875, mailed on Jun. 27, 2023, 2 pages.
Applicant-Initiated Interview Summary received for U.S. Appl. No. 17/952,027, mailed on May 30, 2023, 4 pages.
Applicant-Initiated Interview Summary received for U.S. Appl. No. 18/153,922, mailed on May 12, 2023, 2 pages.
Board Decision received for Chinese Patent Application No. 201510284850.3, mailed on Mar. 3, 2022, 27 pages.
Board Opinion received for Chinese Patent Application No. 201510284850.3, mailed on Jul. 2, 2021, 13 pages.
Board Opinion received for Chinese Reexamination Patent Application No. 200780001142.8, mailed on Oct. 21, 2014, 13 pages.
Brief Communication Regarding Oral Proceedings received for European Patent Application No. 16804040.0, mailed on May 28, 2020, 15 pages.
Brief Communication Regarding Oral Proceedings received for European Patent Application No. 18197554.1, mailed on Feb. 6, 2023, 8 pages.
Brief Communication Regarding Oral Proceedings received for European Patent Application No. 19724963.4, mailed on Jun. 22, 2021, 2 pages.
Canon IXUS 700—Additional Evidence and Information, 2023, 3 pages.

(56) References Cited

OTHER PUBLICATIONS

Canon,"Camera User Guide Canon (UK) LTD", Online available at: https://bedienungsanleitung-deutsch.de/bedienungsanleitung-handbuch/Canon_Digital_Ixus_700_EN.pdf, 2005, 196 pages.

Certificate of Examination received for Australian Patent Application No. 2018101855, mailed on Aug. 6, 2019, 2 pages.

Certificate of Examination received for Australian Patent Application No. 2019100490, mailed on Oct. 16, 2019, 2 pages.

Certification of Examination received for Australian Patent Application No. 2018100158, mailed on Oct. 23, 2018, 2 pages.

Chen et al., "Event Detection from Flickr Data through Wavelet-based Spatial Analysis", Proceeding of the 18th ACM Conference on Information and Knowledge Management, CIKM, Jan. 1, 2009, pp. 523-532.

Codrington Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.

Corrected Notice of Allowance received for U.S. Appl. No. 13/666,943, mailed on Aug. 11, 2016, 2 pages.

Corrected Notice of Allowance received for U.S. Appl. No. 15/281,524, mailed on Jun. 3, 2019, 2 pages.

Corrected Notice of Allowance received for U.S. Appl. No. 15/554,204, mailed on Aug. 19, 2020, 3 pages.

Corrected Notice of Allowance received for U.S. Appl. No. 16/145,033, mailed on Jun. 23, 2023, 3 pages.

Corrected Notice of Allowance received for U.S. Appl. No. 16/377,892, mailed on Aug. 11, 2021, 3 pages.

Corrected Notice of Allowance received for U.S. Appl. No. 16/378,136, mailed on Aug. 11, 2021, 2 pages.

Corrected Notice of Allowance received for U.S. Appl. No. 16/378,136, mailed on Jun. 11, 2021, 2 pages.

Corrected Notice of Allowance received for U.S. Appl. No. 16/402,057, mailed on Jul. 6, 2020, 2 pages.

Corrected Notice of Allowance received for U.S. Appl. No. 16/450,531, mailed on Nov. 12, 2020, 2 pages.

Corrected Notice of Allowance received for U.S. Appl. No. 16/450,531, mailed on Oct. 30, 2020, 2 pages.

Corrected Notice of Allowance received for U.S. Appl. No. 16/736,711, mailed on Jun. 17, 2021, 6 pages.

Corrected Notice of Allowance received for U.S. Appl. No. 16/736,711, mailed on May 17, 2021, 6 pages.

Corrected Notice of Allowance received for U.S. Appl. No. 16/983,815, mailed on Mar. 31, 2021, 6 pages.

Corrected Notice of Allowance received for U.S. Appl. No. 17/116,775, mailed on Jan. 28, 2022, 2 pages.

Corrected Notice of Allowance received for U.S. Appl. No. 17/125,744, mailed on Dec. 8, 2021, 2 pages.

Corrected Notice of Allowance received for U.S. Appl. No. 17/125,744, mailed on Dec. 24, 2021, 2 pages.

Corrected Notice of Allowance received for U.S. Appl. No. 17/125,744, mailed on Mar. 10, 2022, 2 pages.

Corrected Notice of Allowance received for U.S. Appl. No. 17/125,744, mailed on Mar. 30, 2022, 2 pages.

Corrected Notice of Allowance received for U.S. Appl. No. 17/153,703, mailed on Jan. 19, 2023, 2 pages.

Corrected Notice of Allowance received for U.S. Appl. No. 17/153,703, mailed on Nov. 10, 2022, 2 pages.

Corrected Notice of Allowance received for U.S. Appl. No. 17/153,703, mailed on Sep. 14, 2022, 2 pages.

Corrected Notice of Allowance received for U.S. Appl. No. 17/373,272, mailed on Apr. 26, 2022, 5 pages.

Corrected Notice of Allowance received for U.S. Appl. No. 17/697,539, mailed on Feb. 1, 2023, 2 pages.

Corrected Notice of Allowance received for U.S. Appl. No. 17/744,499, mailed on Mar. 21, 2023, 4 pages.

Das et al., "Event Classification in Personal Image Collections", IEEE Intl. Workshop on Media Information Analysis for Personal and Social Applications at ICME, 2009, 2009, pp. 1660-1663.

Das et al., "Event-based Location Matching for Consumer Image Collections", CIVR, 2008, Proc. of the ACM Int. Conf. on Image and Video Retrieval, 2008, 5 pages.

Decision on Appeal received for U.S. Appl. No. 14/774,664, mailed on Sep. 12, 2019, 8 pages.

Decision on Appeal received for U.S. Appl. No. 14/863,099, mailed on Aug. 22, 2019, 9 pages.

Decision on Appeal received for U.S. Appl. No. 16/145,033, mailed on Apr. 4, 2023, 9 pages.

Decision on Appeal received for U.S. Appl. No. 16/454,884, mailed on Feb. 16, 2022, 12 pages.

Decision on Appeal received for U.S. Appl. No. 16/584,783, mailed on Oct. 14, 2021, 12 pages.

Decision to Grant received for Danish Patent Application No. PA201870385, mailed on Mar. 26, 2020, 2 pages.

Decision to Grant received for European Patent Application No. 11178259.5, mailed on Apr. 4, 2019, 3 pages.

Decision to Grant received for European Patent Application No. 16706081.3, mailed on Nov. 29, 2018, 2 pages.

Decision to Grant received for European Patent Application No. 16762356.0, mailed on Apr. 26, 2022, 2 pages.

Decision to Grant received for European Patent Application No. 16844879.3, mailed on Sep. 24, 2020, 2 pages.

Decision to Grant received for European Patent Application No. 18213157.3, mailed on Feb. 24, 2022, 2 pages.

Decision to Grant received for European Patent Application No. 19724963.4, mailed on Feb. 3, 2022, 2 pages.

Decision to Grant received for European Patent Application No. 20197945.7, mailed on Jul. 20, 2023, 2 pages.

Decision to Grant received for Japanese Patent Application No. 2009-526943, mailed on Dec. 2, 2011, 3 pages.

Decision to Grant received for the European Patent Application No. 07814633.9, mailed on Sep. 2, 2010, 3 pages.

Decision to Grant received for the European Patent Application No. 10172417.7, mailed on Nov. 14, 2013, 3 pages.

Decision to Grant received for the European Patent Application No. 11178257.9, mailed on Jun. 20, 2013, 3 pages.

Decision to Refuse received for European Patent Application No. 16804040.0, mailed on Nov. 4, 2020, 18 pages.

Decision to Refuse received for European Patent Application No. 17810749.6, mailed on Jan. 29, 2021, 24 pages.

Decision to Refuse received for European Patent Application No. 17813778.2, mailed on Jan. 24, 2022, 17 pages.

Decision to Refuse received for European Patent Application No. 18197554.1, mailed on Mar. 21, 2023, 17 pages.

Dharmasena Anusha, "iMessage—send as text message Option", YouTube, Available online at: <https://www.youtube.com/watch?v=hXG-MdIW6FA>, Feb. 18, 2013, 1 page.

European Search Report received for European Patent Application No. 21165295.3, mailed on Jun. 18, 2021, 4 pages.

European Search Report received for the European Application No. 11178259.5, mailed on Oct. 31, 2011, 8 pages.

European Search Report received for the European Patent Application No. 10172417.7, mailed on Jan. 7, 2011, 4 pages.

Examiner's Answer to Appeal Brief received for U.S. Appl. No. 14/870,793, mailed on Apr. 16, 2018, 15 pages.

Examiner's Answer to Appeal Brief received for U.S. Appl. No. 14/774,664, mailed on May 31, 2018, 28 pages.

Examiner's Answer to Appeal Brief received for U.S. Appl. No. 14/863,099, mailed on Jul. 28, 2017, 31 pages.

Examiner's Answer to Appeal Brief received for U.S. Appl. No. 14/869,877, mailed on Jun. 26, 2020, 14 pages.

Examiner's Answer to Appeal Brief received for U.S. Appl. No. 16/145,033, mailed on Aug. 4, 2022, 10 pages.

Examiner's Answer to Appeal Brief received for U.S. Appl. No. 16/454,884, mailed on Sep. 17, 2021, 33 pages.

Examiner's Answer to Appeal Brief received for U.S. Appl. No. 16/584,783, mailed on Feb. 17, 2021, 9 pages.

Examiner's Pre-Review Report received for Japanese Patent Application No. 2018-138559, mailed on Jul. 29, 2020, 6 pages.

Extended European Search Report received for European Patent Application No. 11178257.9, mailed on Oct. 31, 2011, 5 pages.

(56) References Cited

OTHER PUBLICATIONS

Extended European Search Report received for European Patent Application No. 16762356.0, mailed on Nov. 9, 2018, 10 pages.
Extended European Search Report received for European Patent Application No. 16804040.0, mailed on Feb. 26, 2018, 9 pages.
Extended European Search Report received for European Patent Application No. 16844879.3, mailed on Mar. 1, 2019, 6 pages.
Extended European Search Report received for European Patent Application No. 17813778.2, mailed on Jan. 10, 2020, 12 pages.
Extended European Search Report received for European Patent Application No. 18197554.1, mailed on Jun. 3, 2019, 11 pages.
Extended European Search Report received for European Patent Application No. 18213157.3, mailed on Apr. 12, 2019, 8 pages.
Extended European Search Report received for European Patent Application No. 19163212.4, mailed on Jun. 25, 2019, 11 pages.
Extended European Search Report received for European Patent Application No. 20197945.7, mailed on Feb. 9, 2021, 8 pages.
Extended European Search Report received for European Patent Application No. 22150207.3, mailed on Apr. 11, 2022, 11 pages.
Extended European Search Report received for European Patent Application No. 22152524.9, mailed on May 2, 2022, 10 pages.
Extended European Search Report received for European Patent Application No. 22164099.8, mailed on Aug. 25, 2022, 9 pages.
Extended European Search Report received for European Patent Application No. 22170561.9, mailed on Aug. 10, 2022, 11 pages.
Extended European Search Report received for European Patent Application No. 22173249.8, mailed on Aug. 19, 2022, 15 pages.
Extended European Search Report received for European Patent Application No. 16807953.1, mailed on Dec. 4, 2018, 7 pages.
Extended European Search Report received for European Patent Application No. 17813824.4, mailed on Dec. 5, 2019, 7 pages.
Filipowicz Luke, "How to use the QuickType keyboard in iOS 8", available online at <https://www.imore.com/comment/568232>, Oct. 11, 2014, pp. 1-17.
Final Office Action received for U.S. Appl. No. 14/599,424, mailed on Jun. 28, 2018, 12 pages.
Final Office Action received for U.S. Appl. No. 14/599,425, mailed on Jun. 12, 2018, 45 pages.
Final Office Action received for U.S. Appl. No. 14/599,425, mailed on May 19, 2017, 24 pages.
Final Office Action received for U.S. Appl. No. 14/599,425, mailed on Oct. 8, 2015, 20 pages.
Final Office Action received for U.S. Appl. No. 14/774,664, mailed on Aug. 25, 2017, 23 pages.
Final Office Action received for U.S. Appl. No. 14/841,606, mailed on Sep. 7, 2018, 34 pages.
Final Office Action received for U.S. Appl. No. 14/846,574, mailed on Jun. 4. 2020, 25 pages.
Final Office Action received for U.S. Appl. No. 14/846,574, mailed on May 10, 2019, 36 pages.
Final Office Action received for U.S. Appl. No. 14/863,069, mailed on Jul. 5, 2018, 19 pages.
Final Office Action received for U.S. Appl. No. 14/863,099, mailed on Apr. 21, 2016, 20 pages.
Final Office Action received for U.S. Appl. No. 14/864,759, mailed on Sep. 4, 2018, 24 pages.
Final Office Action received for U.S. Appl. No. 14/869,877, mailed on Apr. 26, 2018, 18 pages.
Final Office Action received for U.S. Appl. No. 14/869,877, mailed on Aug. 3, 2016, 13 pages.
Final Office Action received for U.S. Appl. No. 14/869,877, mailed on Jun. 11, 2019, 35 pages.
Final Office Action received for U.S. Appl. No. 14/870,726, mailed on Apr. 19, 2017, 17 pages.
Final Office Action received for U.S. Appl. No. 14/870,793, mailed on Jan. 19, 2017, 16 pages.
Final Office Action received for U.S. Appl. No. 15/188,081, mailed on Dec. 13, 2018, 10 pages.
Final Office Action received for U.S. Appl. No. 15/281,524, mailed on Dec. 27, 2018, 6 pages.

Final Office Action received for U.S. Appl. No. 15/554,204, mailed on Oct. 31, 2019, 22 pages.
Final Office Action received for U.S. Appl. No. 15/614,121, mailed on Apr. 8, 2019, 32 pages.
Final Office Action received for U.S. Appl. No. 16/145,033, mailed on Jul. 6, 2021, 113 pages.
Final Office Action received for U.S. Appl. No. 16/145,033, mailed on Sep. 22, 2020, 49 pages.
Final Office Action received for U.S. Appl. No. 16/377,892, mailed on Jan. 28, 2021, 11 pages.
Final Office Action received for U.S. Appl. No. 16/378,136, mailed on Jan. 28, 2021, 9 pages.
Final Office Action received for U.S. Appl. No. 16/389,722, mailed on Dec. 6, 2021, 19 pages.
Final Office Action received for U.S. Appl. No. 16/389,722, mailed on Dec. 8, 2020, 18 pages.
Final Office Action received for U.S. Appl. No. 16/389,722, mailed on Mar. 17, 2023, 14 pages.
Final Office Action received for U.S. Appl. No. 16/402,057, mailed on Oct. 17, 2019, 23 pages.
Final Office Action received for U.S. Appl. No. 16/407,590, mailed on Aug. 25, 2020, 14 pages.
Final Office Action received for U.S. Appl. No. 16/454,884, mailed on Sep. 11, 2020, 28 pages.
Final Office Action received for U.S. Appl. No. 16/584,783, mailed on May 19, 2020, 19 pages.
Final Office Action received for U.S. Appl. No. 16/601,064, mailed on Mar. 8, 2021, 8 pages.
Final Office Action received for U.S. Appl. No. 16/679,967, mailed on Nov. 10, 2021, 14 pages.
Final Office Action received for U.S. Appl. No. 16/736,711, mailed on Dec. 10, 2020, 11 pages.
Final Office Action received for U.S. Appl. No. 17/068,386, mailed on Mar. 3, 2022, 29 pages.
Final Office Action received for U.S. Appl. No. 17/068,386, mailed on May 8, 2023, 23 pages.
Final Office Action received for U.S. Appl. No. 17/516,537, mailed on Oct. 11, 2022, 9 pages.
Final Office Action received for U.S. Appl. No. 17/542,947, mailed on May 25, 2023, 55 pages.
Final Office Action received for U.S. Appl. No. 17/862,097, mailed on Apr. 24, 2023, 17 pages.
Final Office Action received for U.S. Appl. No. 17/951,875, mailed on May 30, 2023, 12 pages.
Final Office Action received for U.S. Appl. No. 14/253,783, mailed on Sep. 30, 2016, 18 pages.
Fono et al., "EyeWindows: Evaluation of Eye-Controlled Zooming Windows for Focus Selection", CHI 2005, Conference Proceedings, Conference on Human Factors In Computing Systems, Apr. 2-7, 2005, pp. 151-160.
Gallagher et al., "Image Annotation Using Personal Calendars as Context", ACM Intl. Conf. on Multimedia, 2008, 4 pages.
Google, "Android User's Guide", Retrieved from the Internet: https://static.googleusercontent.com/media/www.google.com/en// help/hc/pdfs/mobile/AndroidUsersGuide-30-100.pdf, Feb. 23, 2011, 140 pages.
Han et al., "Density-Based Methods", Data Mining Concepts and Techniques, Elsevier, 2006, pp. 418-420.
Hazra et al., "Sentiment Learning Using Twitter Ideograms", 8th Annual Industrial Automation and Electromechanical Engineering Conference, 2017, pp. 115-120.
Hinckley et al., "Sensing Techniques for Mobile Interaction", Symposium on User Interface Software and Technology, CHI Letters, vol. 2, No. 2, Nov. 2000, pp. 91-100.
Hourunranta et al., "Video and Audio Editing for Mobile Applications", Proceedings/2006 IEEE international Conference on multimedia and expo, ICME 2006, Jul. 9, 2006, pp. 1305-1308.
How to Send and Receive files over Bluetooth on an Android Phone, Online Available at: <https://web. archive.org/web/20160529062240/ http://www.androidtipsandhacks.com/android/send-receive-files-bluetooth-android-phone/, May 29, 2016, 7 pages.
Hughes Neil, "Apple Explores Merging Cloud Content with Locally Stored Media Library", Available at <http://appleinsider.com/articles/

(56) References Cited

OTHER PUBLICATIONS

11/02/10/apple_explores_merging_cloud_content_with_locally_stored_media_library.html>, XP55040717, Feb. 10, 2011, 2 pages.
Hurwitz Jon, "Interface for Small-Screen Media Playback Control", Technical Disclosure Commons, Online available at: https://www.tdcommons.org/cgi/viewcontent.cgi?article=4231&context=dpubs_series, Apr. 17, 2020, pp. 1-9.
Ikeda Masaru, "beGlobal Seoul 2015 Startup Battle: Talkey", YouTube Publisher, Online Available at: https://www.youtube.com/watch?v=4Wkp7sAAldg, May 14, 2015, 1 page.
Inews and Tech, "How To Use The QuickType Keyboard In IOS 8", Available online at:—http://www.inewsandtech.com/how-to-use-the-quicktype-keyboard-in-ios-8/, Sep. 17, 2014, 6 pages.
Intention to Grant received for Danish Patent Application No. PA201870385, mailed on Jan. 24, 2020, 2 pages.
Intention to Grant received for European Patent Application No. 10172417.7, mailed on Jul. 9, 2013, 10 pages.
Intention to Grant received for European Patent Application No. 11178257.9, mailed on Jan. 30, 2013, 9 pages.
Intention to Grant received for European Patent Application No. 11178259.5, mailed on Nov. 8, 2018, 16 pages.
Intention to Grant received for European Patent Application No. 16706081.3, mailed on Jul. 18, 2018, 8 pages.
Intention to Grant received for European Patent Application No. 16706081.3, mailed on Jun. 11, 2018, 7 pages.
Intention to Grant received for European Patent Application No. 16762356.0, mailed on Dec. 23, 2021, 8 pages.
Intention to Grant received for European Patent Application No. 16844879.3, mailed on May 11, 2020, 8 pages.
Intention to Grant received for European Patent Application No. 18213157.3, mailed on May 19, 2021, 8 pages.
Intention to Grant received for European Patent Application No. 18213157.3, mailed on Oct. 27, 2021, 8 pages.
Intention to Grant received for European Patent Application No. 19724963.4, mailed on Sep. 20, 2021, 7 pages.
Intention to Grant received for European Patent Application No. 20197945.7, mailed on Mar. 28, 2023, 9 pages.
Intention to Grant received for the European Patent Application No. 07814633.9, mailed on Mar. 19, 2010, 4 pages.
International Preliminary Report on Patentability received for PCT Patent Application No. PCT/US2007/077441, issued on Mar. 10, 2009, 9 pages.
International Preliminary Report on Patentability received for PCT Patent Application No. PCT/US2011/020403, mailed on Jul. 19, 2012, 10 pages.
International Preliminary Report on Patentability received for PCT Patent Application No. PCT/US2014/027882, mailed on Sep. 24, 2015, 8 pages.
International Preliminary Report on Patentability received for PCT Patent Application No. PCT/US2015/032474, mailed on Dec. 15, 2016, 7 pages.
International Preliminary Report on Patentability received for PCT Patent Application No. PCT/US2015/053353, mailed on Sep. 21, 2017, 15 pages.
International Preliminary Report on Patentability received for PCT Patent Application No. PCT/US2016/014997, mailed on Dec. 21, 2017, 16 pages.
International Preliminary Report on Patentability received for PCT Patent Application No. PCT/US2016/016216, mailed on May 4, 2017, 14 pages.
International Preliminary Report on Patentability received for PCT Patent Application No. PCT/US2016/021403, mailed on Sep. 21, 2017, 21 pages.
International Preliminary Report on Patentability received for PCT Patent Application No. PCT/US2016/025418, mailed on Dec. 21, 2017, 16 pages.
International Preliminary Report on Patentability received for PCT Patent Application No. PCT/US2016/034175, mailed on Dec. 14, 2017, 14 pages.

International Preliminary Report on Patentability received for PCT Patent Application No. PCT/US2016/046828, mailed on Mar. 1, 2018, 19 pages.
International Preliminary Report on Patentability received for PCT Patent Application No. PCT/US2016/048044, mailed on Mar. 22, 2018, 8 pages.
International Preliminary Report on Patentability received for PCT Patent Application No. PCT/US2017/035322, mailed on Dec. 27, 2018, 13 pages.
International Preliminary Report on Patentability received for PCT Patent Application No. PCT/US2017/035554, mailed on Dec. 20, 2018, 39 pages.
International Preliminary Report on Patentability received for PCT Patent Application No. PCT/US2017/036608, mailed on Dec. 27, 2018, 12 pages.
International Preliminary Report on Patentability received for PCT Patent Application No. PCT/US2019/024790, mailed on Nov. 19, 2020, 11 pages.
International Preliminary Report on Patentability received for PCT Patent Application No. PCT/US2020/028215, mailed on Dec. 16, 2021, 13 pages.
International Preliminary Report on Patentability received for PCT Patent Application No. PCT/US2020/031442, mailed on Nov. 18, 2021, 21 pages.
International Search Report & Written Opinion received for PCT Patent Application No. PCT/US2016/014997, mailed on Aug. 31, 2016, 21 pages.
International Search Report and Written Opinion received for PCT Patent Application No. PCT/US2011/020403, mailed on May 26, 2011, 14 pages.
International Search Report and Written Opinion received for PCT Patent Application No. PCT/US2011/048169, mailed on Oct. 21, 2011, 9 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/032474, mailed on Aug. 19, 2015, 8 pages.
International Search Report and Written Opinion received for PCT Patent Application No. PCT/US2015/053353, mailed on May 9, 2016, 21 pages.
International Search Report and Written Opinion received for PCT Patent Application No. PCT/US2016/016216, mailed on Jun. 27, 2016, 18 pages.
International Search Report and Written Opinion received for PCT Patent Application No. PCT/US2016/021403, mailed on May 12, 2016, 23 pages.
International Search Report and Written Opinion received for PCT Patent Application No. PCT/US2016/025418, mailed on Jul. 1, 2016, 20 pages.
International Search Report and Written Opinion received for PCT Patent Application No. PCT/US2016/034175, mailed on Oct. 7, 2016, 17 pages.
International Search Report and Written Opinion received for PCT Patent Application No. PCT/US2016/046828, mailed on Dec. 15, 2016, 22 pages.
International Search Report and Written Opinion received for PCT Patent Application No. PCT/US2016/048044, mailed on Oct. 31, 2016, 9 pages.
International Search Report and Written Opinion Received for PCT Patent Application No. PCT/US2017/035322, mailed on Oct. 5, 2017, 18 pages.
International Search Report and Written Opinion received for PCT Patent Application No. PCT/US2017/035554, mailed on Sep. 22, 2017, 42 pages.
International Search Report and Written Opinion received for PCT Patent Application No. PCT/US2017/036608, mailed on Oct. 20, 2017, 15 pages.

(56) References Cited

OTHER PUBLICATIONS

International Search Report and Written Opinion received for PCT Patent Application No. PCT/US2019/024790, mailed on Sep. 11, 2019, 18 pages.
International Search Report and written Opinion received for PCT Patent Application No. PCT/US2020/028215, mailed on Aug. 10, 2020, 18 pages.
International Search Report and Written Opinion received for PCT Patent Application No. PCT/US2020/031442, mailed on Oct. 30, 2020, 28 pages.
International Search Report and Written Opinion received for PCT Patent Application No. PCT/US2022/029297, mailed on Aug. 11, 2022, 13 pages.
International Search Report and Written Opinion received for PCT Patent Application No. PCT/US2022/030589, mailed on Sep. 5, 2022, 26 pages.
International Search Report and Written Opinion received for PCT Patent Application No. PCT/US2022/044637, mailed on Mar. 15, 2023, 19 pages.
International Search Report and Written Opinion, received for PCT Patent Application No. PCT/US2007/077441, mailed on May 8, 2008, 13 pages.
Internet Blog Post,"[PC] Pre-Customization of Black Desert's Characters", Online Available at:—<https://blog.naver.com/hsh6051/220209813968>, Dec. 14, 2014, 41 pages.
Invitation to Pay Additional Fee received for PCT Patent Application No. PCT/US2019/024790, mailed on Jul. 18, 2019, 10 pages.
Invitation to Pay Additional Fees and Partial International Search Report received for PCT Patent Application No. PCT/US2022/044637, mailed on Jan. 20, 2023, 12 pages.
Invitation to Pay Additional Fees and Partial International Search Report received for PCT Patent Application No. PCT/US2023/021734, mailed on Jul. 12, 2023, 12 pages.
Invitation to Pay Additional Fees received for PCT Patent Application No. PCT/US2007/077441, mailed on Jan. 28, 2008, 5 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2015/053353, mailed on Jan. 21, 2016, 7 pages.
Invitation to Pay Additional Fees received for PCT Patent Application No. PCT/US2016/014997, mailed on May 2, 2016, 5 pages.
Invitation to Pay Additional Fees received for PCT Patent Application No. PCT/US2016/016216, mailed on Apr. 20, 2016, 6 pages.
Invitation to Pay Additional Fees received for PCT Patent Application No. PCT/US2016/034175, mailed on Aug. 11, 2016, 3 pages.
Invitation to Pay Additional Fees received for PCT Patent Application No. PCT/US2016/046828, mailed on Sep. 23, 2016, 2 pages.
Invitation to Pay Additional Fees received for PCT Patent Application No. PCT/US2017/035322, mailed on Aug. 7, 2017, 4 pages.
Invitation to Pay Additional Fees received for PCT Patent Application No. PCT/US2017/035554, mailed on Jul. 20, 2017, 2 pages.
Invitation to Pay Additional Fees received for PCT Patent Application No. PCT/US2017/036608, mailed on Aug. 14, 2017, 2 pages.
Invitation to Pay Additional Fees received for PCT Patent Application No. PCT/US2020/028215, mailed on Jun. 19, 2020, 11 pages.
Invitation to Pay Additional Fees received for PCT Patent Application No. PCT/US2020/031442, mailed on Aug. 25, 2020, 22 pages.
Invitation to Pay Additional Fees received for PCT Patent Application No. PCT/US2016/016216, mailed on Dec. 19, 2016, 9 pages.
IOS Security, White Paper, Available online at <https://web.archive.org/web/20150526223200/http://www.apple.com/business/docs/iOS_Security_Guide.pdf>, Apr. 2015, 55 pages.
Jin-Chang et al., "Multi-modal Interface Techniques and Its Application for Multimedia Retrieval", China Academic Journal Electronic Publishing House, 2002, pp. 115-117.
Jobs Steve, "iPhone Introduction in 2007 (Complete)", available at <https://www.youtube.com/watch?v=9hUIxyE2Ns8>,, Jan. 10, 2013, 3 pages.

Jurick et al., "iPhone Hacks", Tips & Tools for Unlocking the Power of Your iPhone & iPod touch, Online: URL: https://api.pageplace.de/preview/DT0400.9780596550974_A23629666/preview-9780596550974_A23629666.pdf >, Apr. 2009, 49 pages.
Kamcord—Wikipedia, Online Available at: <https://en.wikipedia.org/w/index.php?title=Kamcord&oldid=712263010>, Mar. 28, 2016, 2 pages.
Kamcord Developers—Quick Start Guide, Online Available at: <https://web.archive.org/web/20140801055705/https://www.kamcord.com/developers/docs/ios/features-and-settings/, Aug. 1, 2014, 10 pages.
Kamcord Developers, Online Available at: <https://web.archive.org/web/20140827043641/http://www.kamcord.com/developers/>, Aug. 27, 2014, 7 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Komninos et al., "Text Input on a Smart Watch", IEEE, 2014, pp. 50-58.
Liao, T.W., "Clustering of Time Series Data—a Survey", Pattern Recognition, vol. 38, 2005, pp. 1857-1874.
Marwan et al., "Generalized Recurrence Plot Analysis for Spatial Data", Physics Letters A, vol. 360, 2007, pp. 545-551.
Minutes of Oral Proceedings received for European Patent Application No. 11178259.5, mailed on Nov. 2, 2018, 9 pages.
Minutes of Oral Proceedings received for European Patent Application No. 16762356.0, mailed on Dec. 17, 2021, 5 pages.
Minutes of the Oral Proceedings received for European Patent Application No. 16804040.0, mailed on Nov. 2, 2020, 6 pages.
Minutes of the Oral Proceedings received for European Patent Application No. 17810749.6, mailed on Jan. 26, 2021, 8 pages.
Minutes of the Oral Proceedings received for European Patent Application No. 17813778.2, mailed on Jan. 21, 2022, 7 pages.
Minutes of the Oral Proceedings received for European Patent Application No. 18197554.1, mailed on Feb. 22, 2023, 9 pages.
Minutes of the Oral Proceedings received for European Patent Application No. 19724963.4, mailed on Sep. 3, 2021, 6 pages.
Mozilla Developer Network, "Mouse Gesture Events", Available online at <https://developer.mozilla.org/en-US/docs/Web/Guide/Events/Mouse_gesture_events>, May 14, 2009, 3 pages.
Mugs, Online Available at: https://web.archive.org/web/20151029034349/http://le-mugs.com/, Oct. 29, 2015, 14 pages.
Non-Final Office Action received for U.S. Appl. No. 14/869,877, mailed on Jan. 29, 2016, 18 pages.
Non-Final Office Action received for U.S. Appl. No. 14/869,877, mailed on Jun. 16, 2017, 17 pages.
Non-Final Office Action received for U.S. Appl. No. 14/869,877, mailed on Oct. 5, 2018, 19 pages.
Non-Final Office Action received for U.S. Appl. No. 14/870,793, mailed on Apr. 19, 2016, 17 pages.
Non-Final Office Action received for U.S. Appl. No. 12/789,441, mailed on Jan. 17, 2013, 24 pages.
Non-Final Office Action received for U.S. Appl. No. 14/253,783, mailed on Feb. 23, 2016, 18 pages.
Non-Final Office Action received for U.S. Appl. No. 15/554,204, mailed on Apr. 17, 2019, 19 pages.
Non-Final Office Action received for U.S. Appl. No. 16/679,967, mailed on Sep. 2, 2021, 12 pages.
Non-Final Office Action received for U.S. Appl. No. 11/848,210, mailed on Jun. 30, 2011, 8 pages.
Non-Final Office Action received for U.S. Appl. No. 13/361,912, mailed on Mar. 22, 2012, 8 pages.
Non-Final Office Action received for U.S. Appl. No. 14/503,372, mailed on Dec. 5, 2014, 11 pages.
Non-Final Office Action received for U.S. Appl. No. 14/599,424, mailed on Jan. 17, 2018, 13 pages.
Non-Final Office Action received for U.S. Appl. No. 14/599,425, mailed on Jan. 11, 2018, 42 pages.
Non-Final Office Action received for U.S. Appl. No. 14/599,425, mailed on Mar. 17, 2015, 16 pages.
Non-Final Office Action received for U.S. Appl. No. 14/599,425, mailed on Oct. 26, 2016, 22 pages.

(56) References Cited

OTHER PUBLICATIONS

Non-Final Office Action received for U.S. Appl. No. 14/774,664, mailed on Mar. 7, 2017, 23 pages.
Non-Final Office Action received for U.S. Appl. No. 14/841,606, mailed on Dec. 7, 2017, 30 pages.
Non-Final Office Action received for U.S. Appl. No. 14/841,606, mailed on May 8, 2019, 28 pages.
Non-Final Office Action received for U.S. Appl. No. 14/846,574, mailed on Nov. 29, 2017, 27 pages.
Non-Final Office Action received for U.S. Appl. No. 14/846,574, mailed on Sep. 24, 2020, 29 pages.
Non-Final Office Action received for U.S. Appl. No. 14/846,574, mailed on Sep. 30, 2019, 29 pages.
Non-Final Office Action received for U.S. Appl. No. 14/863,069, mailed on Oct. 5, 2017, 19 pages.
Non-Final Office Action received for U.S. Appl. No. 14/863,099, mailed on Dec. 2, 2015, 12 pages.
Non-Final Office Action received for U.S. Appl. No. 14/864,759, mailed on Mar. 20, 2018, 20 pages.
Non-Final Office Action received for U.S. Appl. No. 14/870,726, mailed on Sep. 16, 2016, 12 pages.
Non-Final Office Action received for U.S. Appl. No. 15/142,661, mailed on Jan. 25, 2017, 29 pages.
Non-Final Office Action received for U.S. Appl. No. 15/188,081, mailed on Jun. 8, 2017, 17 pages.
Non-Final Office Action received for U.S. Appl. No. 15/188,081, mailed on Mar. 30, 2018, 21 pages.
Non-Final Office Action received for U.S. Appl. No. 15/275,294, mailed on Dec. 23, 2016, 18 pages.
Non-Final Office Action received for U.S. Appl. No. 15/275,294, mailed on Nov. 3, 2017, 29 pages.
Non-Final Office Action received for U.S. Appl. No. 15/281,524, mailed on Jun. 19, 2018, 23 pages.
Non-Final Office Action received for U.S. Appl. No. 15/391,269, mailed on Aug. 22, 2019, 44 pages.
Non-Final Office Action received for U.S. Appl. No. 15/614,121, mailed on Nov. 4, 2019, 44 pages.
Non-Final Office Action received for U.S. Appl. No. 15/614,121, mailed on Nov. 30, 2018, 28 pages.
Non-Final Office Action received for U.S. Appl. No. 15/687,384, mailed on Jul. 6, 2018, 19 pages.
Non-Final Office Action received for U.S. Appl. No. 15/985,570, mailed on Aug. 16, 2018, 23 pages.
Non-Final Office Action received for U.S. Appl. No. 16/109,487, mailed on Feb. 5, 2020, 19 pages.
Non-Final Office Action received for U.S. Appl. No. 16/145,033, mailed on Feb. 9, 2021, 55 pages.
Non-Final Office Action received for U.S. Appl. No. 16/145,033, mailed on Mar. 4, 2020, 50 pages.
Non-Final Office Action received for U.S. Appl. No. 16/363,945, mailed on Apr. 24, 2020, 13 pages.
Non-Final Office Action received for U.S. Appl. No. 16/377,892, mailed on May 21, 2020, 9 pages.
Non-Final Office Action received for U.S. Appl. No. 16/378,136, mailed on Jun. 2, 2020, 8 pages.
Non-Final Office Action received for U.S. Appl. No. 16/388,493, mailed on Dec. 9, 2021, 7 pages.
Non-Final Office Action received for U.S. Appl. No. 16/389,722, mailed on Apr. 3, 2020, 15 pages.
Non-Final Office Action received for U.S. Appl. No. 16/389,722, mailed on Jul. 7, 2022, 16 pages.
Non-Final Office Action received for U.S. Appl. No. 16/389,722, mailed on Jun. 3, 2021, 17 pages.
Non-Final Office Action received for U.S. Appl. No. 16/402,057, mailed on May 23, 2019, 16 pages.
Non-Final Office Action received for U.S. Appl. No. 16/407,590, mailed on Apr. 10, 2020, 12 pages.
Non-Final Office Action received for U.S. Appl. No. 16/450,531, mailed on Jun. 10, 2020, 10 pages.

Non-Final Office Action received for U.S. Appl. No. 16/454,884, mailed on Jan. 14, 2020, 41 pages.
Non-Final Office Action received for U.S. Appl. No. 16/584,776, mailed on Aug. 18, 2020, 36 pages.
Non-Final Office Action for U.S. Appl. No. 16/584,776, mailed on Feb. 13, 2020, 31 pages.
Non-Final Office Action received for U.S. Appl. No. 16/584,783, mailed on Jan. 30, 2020, 18 pages.
Non-Final Office Action received for U.S. Appl. No. 16/601,064, mailed on Oct. 7, 2020, 13 pages.
Non-Final Office Action received for U.S. Appl. No. 16/679,967, mailed on Apr. 19, 2022, 13 pages.
Non-Final Office Action received for U.S. Appl. No. 16/736,711, mailed on Jun. 11, 2020, 10 pages.
Non-Final Office Action received for U.S. Appl. No. 17/068,386, mailed on Jan. 30, 2023, 20 pages.
Non-Final Office Action received for U.S. Appl. No. 17/068,386, mailed on Jul. 15, 2021, 16 pages.
Non-Final Office Action received for U.S. Appl. No. 17/068,386, mailed on Oct. 28, 2021, 20 pages.
Non-Final Office Action received for U.S. Appl. No. 17/116,775, mailed on Aug. 24, 2021, 20 pages.
Non-Final Office Action received for U.S. Appl. No. 17/126,571, mailed on Dec. 21, 2021, 19 pages.
Non-Final Office Action received for U.S. Appl. No. 17/153,703, mailed on Mar. 30, 2022, 10 pages.
Non-Final Office Action received for U.S. Appl. No. 17/327,204, mailed on Nov. 26, 2021, 13 pages.
Non-Final Office Action received for U.S. Appl. No. 17/408,220, mailed on Aug. 3, 2022, 15 pages.
Non-Final Office Action received for U.S. Appl. No. 17/516,537, mailed on May 5, 2022, 8 pages.
Non-Final Office Action received for U.S. Appl. No. 17/519,229, mailed on Oct. 4, 2022, 7 pages.
Non-Final Office Action received for U.S. Appl. No. 17/542,947, mailed on Mar. 2, 2023, 59 pages.
Non-Final Office Action received for U.S. Appl. No. 17/744,499, mailed on Dec. 7, 2022, 14 pages.
Non-Final Office Action received for U.S. Appl. No. 17/744,500, mailed on Apr. 19, 2023, 30 pages.
Non-Final Office Action received for U.S. Appl. No. 17/862,097, mailed on Feb. 1, 2023, 16 pages.
Non-Final Office Action received for U.S. Appl. No. 17/885,807, mailed on May 12, 2023, 50 pages.
Non-Final Office Action received for U.S. Appl. No. 17/951,875, mailed on Jan. 23, 2023, 12 pages.
Non-Final Office Action received for U.S. Appl. No. 17/952,027, mailed on Apr. 28, 2023, 46 pages.
Non-Final Office Action received for U.S. Appl. No. 18/153,922, mailed on May 10, 2023, 7 pages.
Non-Final Office Action received for U.S. Appl. No. 13/666,943, mailed on Oct. 26, 2015, 12 pages.
Non-Final Office Action received for U.S. Appl. No. 14/846,574, mailed on Jun. 22, 2017, 21 pages.
Non-Final Office Action received for U.S. Appl. No. 14/846,574, mailed on Sep. 20, 2018, 61 pages.
Notice of Acceptance received for Australian Patent Application No. 2011265412, mailed on Nov. 12, 2014, 2 pages.
Notice of Acceptance received for Australian Patent Application No. 2015201028, mailed on Mar. 21, 2017, 3 pages.
Notice of Acceptance received for Australian Patent Application No. 2015267240, mailed on Apr. 10, 2018, 3 pages.
Notice of Acceptance received for Australian Patent Application No. 2016215440, mailed on Feb. 28, 2019, 3 pages.
Notice of Acceptance received for Australian Patent Application No. 2016229847, mailed on Sep. 12, 2018, 3 pages.
Notice of Acceptance received for Australian Patent Application No. 2017201548, mailed on Sep. 3, 2018, 3 pages.
Notice of Acceptance received for Australian Patent Application No. 2017277971, mailed on Feb. 17, 2021, 3 pages.
Notice of Acceptance received for Australian Patent Application No. 2017286296, mailed on May 1, 2020, 3 pages.

(56) References Cited

OTHER PUBLICATIONS

Notice of Acceptance received for Australian Patent Application No. 2018206772, mailed on Mar. 17, 2020, 3 pages.

Notice of Acceptance received for Australian Patent Application No. 2018214074, mailed on Aug. 6, 2019, 3 pages.

Notice of Acceptance received for Australian Patent Application No. 2018279037, mailed on May 13, 2020, 3 pages.

Notice of Acceptance received for Australian Patent Application No. 2019264623, mailed on Jan. 4, 2021, 3 pages.

Notice of Acceptance received for Australian Patent Application No. 2019266054, mailed on Nov. 25, 2021, 3 pages.

Notice of Acceptance received for Australian Patent Application No. 2019271873, mailed on Nov. 30, 2020, 3 pages.

Notice of Acceptance received for Australian Patent Application No. 2020204259, mailed on Jun. 11, 2021, 3 pages.

Notice of Acceptance received for Australian Patent Application No. 2020204506, mailed on Apr. 8, 2021, 3 pages.

Notice of Acceptance received for Australian Patent Application No. 2020210234, mailed on Feb. 3, 2022, 3 pages.

Notice of Acceptance received for Australian Patent Application No. 2020267310, mailed on Feb. 23, 2022, 3 pages.

Notice of Acceptance received for Australian Patent Application No. 2020267396, mailed on Dec. 7, 2021, 3 pages.

Notice of acceptance received for Australian Patent Application No. 2021202225, mailed on Jun. 20, 2022, 3 pages.

Notice of Acceptance received for Australian Patent Application No. 2021203216, mailed on Jul. 26, 2022, 3 pages.

Notice of Acceptance received for Australian Patent Application No. 2021203636, mailed on Apr. 14, 2022, 3 pages.

Notice of Acceptance received for Australian Patent Application No. 2021218036, mailed on May 9, 2023, 3 pages.

Notice of Acceptance received for Australian Patent Application No. 2022200514, mailed on Apr. 17, 2023, 3 pages.

Notice of Acceptance received for Australian Patent Application No. 2022201561, mailed on Jul. 22, 2022, 3 pages.

Notice of Acceptance received for Australian Patent Application No. 2022201810, mailed on Jun. 14, 2023, 3 pages.

Notice of Acceptance received for Australian Patent Application No. 2022209277, mailed on Apr. 28, 2023, 3 pages.

Notice of Acceptance received for Australian Patent Application No. 2017284958, mailed on Sep. 3, 2019, 3 pages.

Notice of Allowance received for Canadian Patent Application No. 2,935,875, mailed on May 3, 2017, 1 page.

Notice of Allowance received for Canadian Patent Application No. 2,984,527, mailed on Apr. 30, 2020, 1 page.

Notice of Allowance received for Chinese Patent Application No. 201520358505.5, issued on Jan. 13, 2016, 3 pages.

Notice of Allowance received for Chinese Patent Application No. 201580028677.9, mailed on Apr. 2, 2019, 2 pages.

Notice of Allowance received for Chinese Patent Application No. 201610371774.4, mailed on Jun. 4, 2020, 2 pages.

Notice of Allowance received for Chinese Patent Application No. 201680008151.9, mailed on Jun. 16, 2020, 2 pages.

Notice of Allowance received for Chinese Patent Application No. 201680013193.1, mailed on May 7, 2021, 5 pages.

Notice of Allowance received for Chinese Patent Application No. 201680031609.2, mailed on Mar. 18, 2021, 2 pages.

Notice of Allowance received for Chinese Patent Application No. 201680049868.8, mailed on Feb. 9, 2021, 4 pages.

Notice of Allowance received for Chinese Patent Application No. 201710439448.7, mailed on Jan. 26, 2021, 2 pages.

Notice of Allowance received for Chinese Patent Application No. 201780034193.4, mailed on Oct. 20, 2021, 4 pages.

Notice of Allowance received for Chinese Patent Application No. 201780034203.4, mailed on Jan. 17, 2022, 2 pages.

Notice of Allowance received for Chinese Patent Application No. 201811136445.7, mailed on Aug. 11, 2021, 2 pages.

Notice of Allowance received for Chinese Patent Application No. 201811616429.8, mailed on Aug. 5, 2020, 3 pages.

Notice of Allowance received for Chinese Patent Application No. 202111644466.1, mailed on Mar. 30, 2023, 2 pages.

Notice of Allowance received for Japanese Patent Application No. 2013-140171, mailed on May 29, 2015, 4 pages.

Notice of Allowance received for Japanese Patent Application No. 2014-259225, mailed on Feb. 27, 2017, 3 pages.

Notice of Allowance received for Japanese Patent Application No. 2015-129152, mailed on May 8, 2017, 3 pages.

Notice of Allowance received for Japanese Patent Application No. 2016-569945, mailed on Jan. 7, 2020, 4 pages.

Notice of Allowance received for Japanese Patent Application No. 2017-057997, mailed on Apr. 23, 2018, 4 pages.

Notice of Allowance received for Japanese Patent Application No. 2017-132229, mailed on Jun. 25, 2018, 4 pages.

Notice of Allowance received for Japanese Patent Application No. 2017-545918, mailed on Jul. 22, 2019, 4 pages.

Notice of Allowance received for Japanese Patent Application No. 2017-562330, mailed on Sep. 20, 2019, 4 pages.

Notice of Allowance received for Japanese Patent Application No. 2018-138559, mailed on Dec. 3, 2021, 3 pages.

Notice of Allowance received for Japanese Patent Application No. 2019-123115, mailed on Nov. 30, 2020, 4 pages.

Notice of Allowance received for Japanese Patent Application No. 2019-151358, mailed on Jan. 22, 2021, 4 pages.

Notice of Allowance received for Japanese Patent Application No. 2020-010239, mailed on Sep. 3, 2021, 4 pages.

Notice of Allowance received for Japanese Patent Application No. 2020-079486, mailed on Oct. 21, 2022, 4 pages.

Notice of Allowance received for Japanese Patent Application No. 2021-000224, mailed on May 7, 2021, 4 pages.

Notice of Allowance received for Japanese Patent Application No. 2021-023661, mailed on Apr. 10, 2023, 4 pages.

Notice of Allowance received for Japanese Patent Application No. 2021-094529, mailed on Sep. 6, 2021, 4 pages.

Notice of Allowance received for Japanese Patent Application No. 2021-566100, mailed on Jan. 27, 2023, 4 pages.

Notice of Allowance received for Japanese Patent Application No. 2021-163700, mailed on Mar. 3, 2023, 4 pages.

Notice of Allowance received for Korean Patent Application No. 10-2018-7034875, mailed on Dec. 12, 2018, 4 pages.

Notice of Allowance received for Korean Patent Application No. 10-2019-7007053, mailed on Dec. 19, 2019, 6 pages.

Notice of Allowance received for Korean Patent Application No. 10-2019-7007053, mailed on Mar. 12, 2020, 6 pages.

Notice of Allowance received for Korean Patent Application No. 10-2019-7029673, mailed on Aug. 3, 2021, 3 pages.

Notice of Allowance received for Korean Patent Application No. 10-2020-7005314, mailed on Mar. 23, 2020, 6 pages.

Notice of Allowance received for Korean Patent Application No. 10-2020-7018255, mailed on Feb. 24, 2021, 5 pages.

Notice of Allowance received for Korean Patent Application No. 10-2021-7036016, mailed on Sep. 28, 2022, 7 pages.

Notice of Allowance received for Korean Patent Application No. 10-2021-7036310, mailed on Apr. 26, 2022, 5 pages.

Notice of Allowance received for Taiwanese Patent Application No. 104117509, mailed on Mar. 31, 2017, 3 pages.

Notice of Allowance received for the Canadian Patent Application No. 2,853,273, mailed on Jan. 12, 2016, 1 page.

Notice of Allowance received for U.S. Appl. No. 11/848,210, mailed on Dec. 20, 2011, 5 pages.

Notice of Allowance received for U.S. Appl. No. 12/789,441, mailed on Dec. 6, 2013, 11 pages.

Notice of Allowance received for U.S. Appl. No. 13/361,912, mailed on Jul. 2, 2012, 7 pages.

Notice of Allowance received for U.S. Appl. No. 13/666,943, mailed on Jun. 2, 2016, 9 pages.

Notice of Allowance received for U.S. Appl. No. 13/666,943, mailed on Jun. 17, 2015, 7 pages.

Notice of Allowance received for U.S. Appl. No. 14/253,783, mailed on Apr. 14, 2017., 12 Pages.

Notice of Allowance received for U.S. Appl. No. 14/253,783, mailed on Jul. 12, 2017, 5 pages.

(56) References Cited

OTHER PUBLICATIONS

Notice of Allowance received for U.S. Appl. No. 14/253,783, mailed on Sep. 5, 2017, 8 pages.
Notice of Allowance received for U.S. Appl. No. 14/599,424, mailed on Dec. 13, 2018, 6 pages.
Notice of Allowance received for U.S. Appl. No. 14/599,425, mailed on Dec. 19, 2018, 9 pages.
Notice of Allowance received for U.S. Appl. No. 14/846,574, mailed on Feb. 9, 2021, 12 pages.
Notice of Allowance received for U.S. Appl. No. 14/863,069, mailed on Feb. 6, 2019, 6 pages.
Notice of Allowance received for U.S. Appl. No. 14/863,069, mailed on Jun. 18, 2019, 6 pages.
Notice of Allowance received for U.S. Appl. No. 14/864,759, mailed on Dec. 14, 2018, 10 pages.
Notice of Allowance received for U.S. Appl. No. 14/870,726, mailed on Sep. 11, 2018, 9 pages.
Notice of Allowance received for U.S. Appl. No. 15/142,661, mailed on Feb. 15, 2018., 9 pages.
Notice of Allowance received for U.S. Appl. No. 15/142,661, mailed on Oct. 4, 2017, 22 pages.
Notice of Allowance received for U.S. Appl. No. 15/188,081, mailed on Jun. 26, 2019, 8 pages.
Notice of Allowance received for U.S. Appl. No. 15/188,081, mailed on Mar. 20, 2019, 6 pages.
Notice of Allowance received for U.S. Appl. No. 15/275,294, mailed on Jun. 6, 2018, 8 pages.
Notice of Allowance received for U.S. Appl. No. 15/275,294, mailed on Jun. 30, 2018., 8 Pages.
Notice of Allowance received for U.S. Appl. No. 15/281,524, mailed on Apr. 11, 2019, 7 pages.
Notice of Allowance received for U.S. Appl. No. 15/554,204, mailed on Jul. 13, 2020, 10 pages.
Notice of Allowance received for U.S. Appl. No. 15/614,121, mailed on Aug. 27, 2020, 8 pages.
Notice of Allowance received for U.S. Appl. No. 15/614,121, mailed on Mar. 6, 2020, 8 pages.
Notice of Allowance received for U.S. Appl. No. 15/616,480, mailed on Jan. 3, 2019, 8 pages.
Notice of Allowance received for U.S. Appl. No. 15/687,384, mailed on Jan. 8, 2019, 8 pages.
Notice of Allowance received for U.S. Appl. No. 15/876,673, mailed on May 4, 2018, 27 pages.
Notice of Allowance received for U.S. Appl. No. 15/985,570, mailed on Mar. 13, 2019, 22 pages.
Notice of Allowance received for U.S. Appl. No. 16/109,487, mailed on Aug. 18, 2020, 8 pages.
Notice of Allowance received for U.S. Appl. No. 16/109,487, mailed on May 12, 2020, 8 pages.
Notice of Allowance received for U.S. Appl. No. 16/109,487, mailed on Nov. 23, 2020, 3 pages.
Notice of Allowance received for U.S. Appl. No. 16/145,033, mailed on Aug. 17, 2023, 8 pages.
Notice of Allowance received for U.S. Appl. No. 16/145,033, mailed on May 3, 2023, 5 pages.
Notice of Allowance received for U.S. Appl. No. 16/363,945, mailed on Sep. 23, 2020, 10 pages.
Notice of Allowance received for U.S. Appl. No. 16/377,892, mailed on May 24, 2021, 9 pages.
Notice of Allowance received for U.S. Appl. No. 16/377,892, mailed on Sep. 9, 2021, 9 pages.
Notice of Allowance received for U.S. Appl. No. 16/378,136, mailed on Jun. 3, 2021, 7 pages.
Notice of Allowance received for U.S. Appl. No. 16/378,136, mailed on Sep. 22, 2021, 7 pages.
Notice of Allowance received for U.S. Appl. No. 16/388,493, mailed on Jun. 20, 2022, 5 pages.
Notice of Allowance received for U.S. Appl. No. 16/402,057, mailed on Mar. 25, 2020, 8 pages.

Notice of Allowance received for U.S. Appl. No. 16/407,590, mailed on Apr. 9, 2021, 3 pages.
Notice of Allowance received for U.S. Appl. No. 16/407,590, mailed on Dec. 16, 2020, 6 pages.
Notice of Allowance received for U.S. Appl. No. 16/407,590, mailed on Mar. 22, 2021, 6 pages.
Notice of Allowance received for U.S. Appl. No. 16/450,531, mailed on Sep. 25, 2020, 7 pages.
Notice of Allowance received for U.S. Appl. No. 16/454,884, mailed on May 18, 2022, 9 pages.
Notice of Allowance received for U.S. Appl. No. 16/584,776, mailed on Feb. 1, 2021, 9 pages.
Notice of Allowance received for U.S. Appl. No. 16/584,783, mailed on Dec. 20, 2021, 7 pages.
Notice of Allowance received for U.S. Appl. No. 16/601,064, mailed on May 17, 2021, 9 pages.
Notice of Allowance received for U.S. Appl. No. 16/679,967, mailed on Jun. 15, 2022, 7 pages.
Notice of Allowance received for U.S. Appl. No. 16/679,967, mailed on Nov. 2, 2022, 7 pages.
Notice of Allowance received for U.S. Appl. No. 16/736,711, mailed on Apr. 21, 2021, 8 pages.
Notice of Allowance received for U.S. Appl. No. 16/736,711, mailed on Jun. 8, 2021, 8 pages.
Notice of Allowance received for U.S. Appl. No. 16/814,770, mailed on Jun. 1, 2021, 9 pages.
Notice of Allowance received for U.S. Appl. No. 16/814,770, mailed on Sep. 17, 2021, 9 pages.
Notice of Allowance received for U.S. Appl. No. 16/983,815, mailed on Jul. 26, 2021, 3 pages.
Notice of Allowance received for U.S. Appl. No. 16/983,815, mailed on Mar. 18, 2021, 11 pages.
Notice of Allowance received for U.S. Appl. No. 17/116,775, mailed on Jan. 18, 2022, 10 pages.
Notice of Allowance received for U.S. Appl. No. 17/125,744, mailed on Feb. 7, 2022, 10 pages.
Notice of Allowance received for U.S. Appl. No. 17/125,744, mailed on Oct. 21, 2021, 11 pages.
Notice of Allowance received for U.S. Appl. No. 17/126,571, mailed on Mar. 11, 2022, 9 pages.
Notice of Allowance received for U.S. Appl. No. 17/153,703, mailed on Aug. 30, 2022, 8 pages.
Notice of Allowance received for U.S. Appl. No. 17/153,703, mailed on Dec. 22, 2022, 7 pages.
Notice of Allowance received for U.S. Appl. No. 17/327,204, mailed on May 18, 2022, 18 pages.
Notice of Allowance received for U.S. Appl. No. 17/373,272, mailed on Feb. 9, 2022, 10 pages.
Notice of Allowance received for U.S. Appl. No. 17/408,220, mailed on Nov. 15, 2022, 11 pages.
Notice of Allowance received for U.S. Appl. No. 17/516,537, mailed on Apr. 17, 2023, 8 pages.
Notice of Allowance received for U.S. Appl. No. 17/516,537, mailed on Dec. 27, 2022, 7 pages.
Notice of Allowance received for U.S. Appl. No. 17/519,229, mailed on Nov. 10, 2022, 9 pages.
Notice of Allowance received for U.S. Appl. No. 17/697,539, mailed on Nov. 29, 2022, 10 pages.
Notice of Allowance received for U.S. Appl. No. 17/739,664, mailed on Dec. 7, 2022, 8 pages.
Notice of Allowance received for U.S. Appl. No. 17/744,499, mailed on Mar. 15, 2023, 7 pages.
Notice of Allowance received for U.S. Appl. No. 17/951,875, mailed on Jul. 26, 2023, 7 pages.
Notice of Allowance received for U.S. Appl. No. 18/153,922, mailed on Jul. 26, 2023, 9 pages.
Notice of Allowance received for U.S. Appl. No. 12/789,441, mailed on Aug. 20, 2013, 9 pages.
Office Action received for Japanese Patent Application No. 2016-569945, mailed on Nov. 10, 2017, 8 pages.
Office Action received for Australian Patent Application No. 2015100734, issued on Jul. 29, 2015, 5 pages.

(56) References Cited

OTHER PUBLICATIONS

Office Action received for Australian Patent Application No. 2015201028, issued on Mar. 15, 2016, 2 pages.
Office Action received for Australian Patent Application No. 2015267240, mailed on Apr. 10, 2017, 5 pages.
Office Action received for Australian Patent Application No. 2015267240, mailed on Mar. 21, 2018, 5 pages.
Office Action received for Australian Patent Application No. 2016100796, issued on Aug. 26, 2016, 6 pages.
Office Action received for Australian Patent Application No. 2016100796, issued on Feb. 13, 2017, 4 pages.
Office Action received for Australian Patent Application No. 2016215440, mailed on Jan. 22, 2019, 2 pages.
Office Action received for Australian Patent Application No. 2016215440, mailed on Mar. 13, 2018, 3 pages.
Office Action received for Australian Patent Application No. 2016229847, mailed on Jul. 3, 2018, 4 pages.
Office Action received for Australian Patent Application No. 2016270323, mailed on May 29, 2019, 4 pages.
Office Action received for Australian Patent Application No. 2016270323, mailed on Nov. 26, 2018, 4 pages.
Office Action received for Australian Patent Application No. 2017100231, mailed on Apr. 13, 2017, 3 pages.
Office Action received for Australian Patent Application No. 2017100667, mailed on Aug. 3, 2017, 9 pages.
Office Action received for Australian Patent Application No. 2017101375, mailed on Dec. 1, 2017, 3 pages.
Office Action received for Australian Patent Application No. 2017101375, mailed on Feb. 19, 2018, 4 pages.
Office Action received for Australian Patent Application No. 2017201548, mailed on Feb. 26, 2018, 2 pages.
Office Action received for Australian Patent Application No. 2017277971, mailed on Aug. 12, 2020, 3 pages.
Office Action received for Australian Patent Application No. 2017277971, mailed on Jun. 3, 2020, 3 pages.
Office Action received for Australian Patent Application No. 2017286296, mailed on May 8, 2019, 4 pages.
Office Action received for Australian Patent Application No. 2018100158, mailed on Apr. 23, 2018, 5 pages.
Office Action received for Australian Patent Application No. 2018101855, mailed on Feb. 22, 2019, 4 pages.
Office Action received for Australian Patent Application No. 2018206772, mailed on Apr. 1, 2019, 4 pages.
Office Action received for Australian Patent Application No. 2018206772, mailed on Feb. 6, 2020, 4 pages.
Office Action received for Australian Patent Application No. 2018206772, mailed on Nov. 6, 2019, 4 pages.
Office Action received for Australian Patent Application No. 2018214074, mailed on May 9, 2019, 2 pages.
Office Action received for Australian Patent Application No. 2018279037, mailed on Jan. 17, 2020, 4 pages.
Office Action received for Australian Patent Application No. 2018279037, mailed on Jun. 18, 2019, 5 pages.
Office Action received for Australian Patent Application No. 2019100490, mailed on Jul. 26, 2019, 4 pages.
Office Action received for Australian Patent Application No. 2019264623, mailed on Sep. 14, 2020, 3 pages.
Office Action received for Australian Patent Application No. 2019266054, mailed on Aug. 23, 2021, 4 pages.
Office Action received for Australian Patent Application No. 2019266054, mailed on Jun. 29, 2021, 3 pages.
Office Action received for Australian Patent Application No. 2019271873, mailed on Oct. 5, 2020, 3 pages.
Office Action received for Australian Patent Application No. 2020204259, mailed on Nov. 30, 2020, 8 pages.
Office Action received for Australian Patent Application No. 2020204506, mailed on Dec. 7, 2020, 6 pages.
Office Action received for Australian Patent Application No. 2020210234, mailed on Jul. 30, 2021, 7 pages.

Office Action received for Australian Patent Application No. 2020267310, mailed on Nov. 4, 2021, 2 pages.
Office Action received for Australian Patent Application No. 2021202225, mailed on Apr. 7, 2022, 3 pages.
Office Action received for Australian Patent Application No. 2021203216, mailed on Mar. 7, 2022, 8 pages.
Office Action received for Australian Patent Application No. 2021203636, mailed on Mar. 23, 2022, 3 pages.
Office Action received for Australian Patent Application No. 2021218036, mailed on Apr. 13, 2023, 3 pages.
Office Action received for Australian Patent Application No. 2021218036, mailed on Jun. 21, 2022, 5 pages.
Office Action received for Australian Patent Application No. 2021218036, mailed on Nov. 16, 2022, 4 pages.
Office Action received for Australian Patent Application No. 2022200514, mailed on Feb. 15, 2023, 2 pages.
Office Action received for Australian Patent Application No. 2022200514, mailed on Jan. 17, 2023, 3 pages.
Office Action received for Australian Patent Application No. 2022201561, mailed on May 2, 2022, 3 pages.
Office Action received for Australian Patent Application No. 2022201810, mailed on Mar. 15, 2023, 2 pages.
Office Action received for Australian Patent Application No. 2022203278, mailed on May 10, 2023, 4 pages.
Office Action received for Australian Patent Application No. 2022209277, mailed on Mar. 10, 2023, 6 pages.
Office Action received for Australian Patent Application No. 2022235618, mailed on Jul. 4, 2023, 2 pages.
Office Action received for Australian Patent Application No. 2022235618, mailed on May 19, 2023, 2 pages.
Office Action received for Australian Patent Application No. 2022235634, mailed on May 25, 2023, 4 pages.
Office Action received for Australian Patent Application No. 2017284958, mailed on Dec. 13, 2018, 3 pages.
Office Action received for Canadian Patent Application No. 2,853,273, mailed on Feb. 23, 2015, 5 pages.
Office Action received for Canadian Patent Application No. 2,984,527 mailed on Sep. 11, 2018, 5 pages.
Office Action received for Canadian Patent Application No. 2,984,527, mailed on Jul. 25, 2019, 4 pages.
Office Action received for Chinese Patent Application No. 201510284850.3, mailed on Jul. 9, 2018, 11 pages.
Office Action received for Chinese Patent Application No. 201510284850.3, mailed on Jun. 21, 2019, 10 pages.
Office Action received for Chinese Patent Application No. 201510284850.3, mailed on Nov. 28, 2017, 15 pages.
Office Action received for Chinese Patent Application No. 201580028677.9, mailed on May 25, 2018, 14 pages.
Office Action received for Chinese Patent Application No. 201610371774.4, mailed on Dec. 2, 2019, 6 pages.
Office Action received for Chinese Patent Application No. 201610371774.4, mailed on Dec. 19, 2018, 13 pages.
Office Action received for Chinese Patent Application No. 201610371774.4, mailed on Jul. 8, 2019, 6 pages.
Office Action received for Chinese Patent Application No. 201620509515.9, mailed on Nov. 9, 2016, 2 pages.
Office Action received for Chinese Patent Application No. 201680008151.9, mailed on Apr. 20, 2020, 6 pages.
Office Action received for Chinese Patent Application No. 201680008151.9, mailed on Aug. 27, 2019, 24 pages.
Office Action received for Chinese Patent Application No. 201680013193.1, mailed on Feb. 1, 2021, 8 pages.
Office Action received for Chinese Patent Application No. 201680013193.1, mailed on Mar. 25, 2020, 21 pages.
Office Action received for Chinese Patent Application No. 201680013193.1, mailed on Sep. 7, 2020, 6 pages.
Office Action received for Chinese Patent Application No. 201680031609.2, mailed on Aug. 20, 2020, 6 pages.
Office Action received for Chinese Patent Application No. 201680031609.2, mailed on Jan. 15, 2020, 20 pages.
Office Action received for Chinese Patent Application No. 201680049868.8, mailed on May 25, 2020, 30 pages.

(56)        References Cited

OTHER PUBLICATIONS

Office Action received for Chinese Patent Application No. 201680049868.8, mailed on Oct. 20, 2020, 8 pages.

Office Action received for Chinese Patent Application No. 201710439448.7, mailed on Mar. 27, 2020, 13 pages.

Office Action received for Chinese Patent Application No. 201710439448.7, mailed on Oct. 10, 2020, 19 pages.

Office Action received for Chinese Patent Application No. 201780033901.2, mailed on Jun. 28, 2023, 28 pages.

Office Action received for Chinese Patent Application No. 201780033901.2, mailed on Nov. 23, 2022, 44 pages.

Office Action received for Chinese Patent Application No. 201780034193.4, mailed on Jun. 8, 2021, 16 pages.

Office Action received for Chinese Patent Application No. 201780034203.4, mailed on Jul. 14, 2021, 12 pages.

Office Action received for Chinese Patent Application No. 201780034203.4, mailed on Sep. 24, 2021, 7 pages.

Office Action received for Chinese Patent Application No. 201811136445.7, mailed on Apr. 14, 2021, 7 pages.

Office Action received for Chinese Patent Application No. 201811136445.7, mailed on Oct. 28, 2020, 17 pages.

Office Action received for Chinese Patent Application No. 201811330077.X, mailed on May 18, 2020, 9 pages.

Office Action received for Chinese Patent Application No. 201811330077.X, mailed on Nov. 13, 2019, 14 pages.

Office Action received for Chinese Patent Application No. 201811616429.8, mailed on May 7, 2020, 8 pages.

Office Action received for Chinese Patent Application No. 201811616429.8, mailed on Sep. 4, 2019, 26 pages.

Office Action received for Chinese Patent Application No. 202011127969.7, mailed on Jul. 28, 2022, 25 pages.

Office Action received for Chinese Patent Application No. 202011127969.7, mailed on Mar. 17, 2023, 14 pages.

Office Action received for Chinese Patent Application No. 202011127969.7, mailed on Nov. 24, 2022, 26 pages.

Office Action received for Chinese Patent Application No. 202080040442.2, mailed on Apr. 29, 2023, 12 pages.

Office Action received for Chinese Patent Application No. 202111487316.4, mailed on Aug. 8, 2022, 25 pages.

Office Action received for Chinese Patent Application No. 202111487316.4, mailed on Dec. 28, 2022, 13 pages.

Office Action received for Chinese Patent Application No. 202111487316.4, mailed on Jun. 7, 2023, 20 pages.

Office Action received for Chinese Patent Application No. 202111644466.1, mailed on Nov. 2, 2022, 10 pages.

Office Action received for Danish Patent Application No. PA201670362, mailed on Jan. 29, 2018, 3 pages.

Office Action received for Danish Patent Application No. PA201670362, mailed on Jun. 1, 2017, 6 pages.

Office Action received for Danish Patent Application No. PA201670362, mailed on Nov. 21, 2016, 11 pages.

Office Action received for Danish Patent Application No. PA201670608, mailed on Jan. 14, 2019, 7 pages.

Office Action received for Danish Patent Application No. PA201670608, mailed on Jan. 23, 2018, 10 pages.

Office Action received for Danish Patent Application No. PA201670609, mailed on Jan. 26, 2018, 8 pages.

Office Action received for Danish Patent Application No. PA201670609, mailed on Mar. 1, 2019, 9 pages.

Office Action received for Danish Patent Application No. PA201670609, mailed on May 4, 2020, 7 pages.

Office Action received for Danish Patent Application No. PA201670609, mailed on May 7, 2018, 4 pages.

Office Action received for Danish Patent Application No. PA201670749, mailed on Jan. 30, 2017, 11 pages.

Office Action received for Danish Patent Application No. PA201670749, mailed on Oct. 3, 2017, 3 pages.

Office Action received for Danish Patent Application No. PA201670751, mailed on Jan. 13, 2017, 9 pages.

Office Action received for Danish Patent Application No. PA201670751, mailed on Nov. 13, 2017, 2 pages.

Office Action received for Danish Patent Application No. PA201770423, mailed on Jun. 12, 2018, 7 pages.

Office Action received for Danish Patent Application No. PA201770423, mailed on Mar. 29, 2019, 6 pages.

Office Action received for Danish Patent Application No. PA201870385, mailed on Aug. 23, 2019, 3 pages.

Office Action received for Danish Patent Application No. PA201970535, mailed on May 20, 2020, 3 pages.

Office Action received for Danish Patent Application No. PA201970535, mailed on Oct. 27, 2020, 6 pages.

Office Action received for European Patent Application No. 07814633.9, mailed on Aug. 10, 2009, 3 pages.

Office Action received for European Patent Application No. 10172417.7, mailed on Oct. 31, 2011, 6 pages.

Office Action received for European Patent Application No. 11178259.5, mailed on Jan. 4, 2013, 8 pages.

Office Action received for European Patent Application No. 11178259.5, mailed on Nov. 10, 2015, 4 pages.

Office Action received for European Patent Application No. 15730890.9, mailed on Aug. 3, 2017, 4 pages.

Office Action received for European Patent Application No. 16762356.0, mailed on Dec. 11, 2020, 7 pages.

Office Action received for European Patent Application No. 16804040.0, mailed on May 13, 2019, 12 pages.

Office Action received for European Patent Application No. 16807953.1, mailed on Apr. 7, 2021, 4 pages.

Office Action received for European Patent Application No. 16807953.1, mailed on Oct. 7, 2022, 6 pages.

Office Action received for European Patent Application No. 16807953.1, mailed on Sep. 10, 2020, 4 pages.

Office Action received for European Patent Application No. 17810749.6, mailed on Aug. 20, 2019, 9 pages.

Office Action received for European Patent Application No. 17813778.2, mailed on Nov. 26, 2020, 10 pages.

Office Action received for European Patent Application No. 17813824.4, mailed on Nov. 30, 2021, 8 pages.

Office Action received for European Patent Application No. 18197554.1, mailed on Jun. 15, 2020, 4 pages.

Office Action received for European Patent Application No. 18213157.3, mailed on May 15, 2020, 7 pages.

Office Action received for European Patent Application No. 19163212.4, mailed on Oct. 12, 2020, 4 pages.

Office Action received for European Patent Application No. 19724963.4, mailed on Jul. 28, 2020, 6 pages.

Office Action received for European Patent Application No. 20197945.7, mailed on Nov. 18, 2022, 5 pages.

Office Action received for European Patent Application No. 20723742.1, mailed on Jan. 2, 2023, 10 pages.

Office Action received for European Patent Application No. 20729331.7, mailed on Jan. 4, 2023, 12 pages.

Office Action received for European Patent Application No. 21165295.3, mailed on Jul. 1, 2021, 10 pages.

Office Action received for German Patent Application No. 112007000067.8, mailed on Apr. 23, 2009, 15 pages.

Office Action received for German Patent Application No. 112007000067.8, mailed on Sep. 14, 2010, 4 pages.

Office Action received for Indian Patent Application No. 202048019639, mailed on Sep. 27, 2022, 5 pages.

Office Action received for Indian Patent Application No. 9044/CHENP/2014, mailed on Jan. 24, 2020, 6 pages.

Office action received for Indian Patent Application No. 2797CHENP2008 , mailed on Jan. 29, 2014, 3 pages.

Office Action received for Japanese Patent Application No. 2013-140171, mailed on Jul. 22, 2014, 4 pages.

Office Action received for Japanese Patent Application No. 2014-259225, mailed on May 27, 2016, 4 pages.

Office Action Received for Japanese Patent Application No. 2014-259225, mailed on Nov. 20, 2015, 2 pages.

Office Action received for Japanese Patent Application No. 2015-129152, mailed on Sep. 23, 2016, 3 pages.

(56) References Cited

OTHER PUBLICATIONS

Office Action received for Japanese Patent Application No. 2016-569945, mailed on Jul. 29, 2019, 6 pages.
Office Action received for Japanese Patent Application No. 2016-569945, mailed on Sep. 10, 2018, 11 pages.
Office Action received for Japanese Patent Application No. 2017-057997, mailed on Jan. 9, 2018, 6 pages.
Office Action received for Japanese Patent Application No. 2017-132229, mailed on Mar. 16, 2018, 7 pages.
Office Action received for Japanese Patent Application No. 2017-545918, mailed on Sep. 14, 2018, 12 pages.
Office Action received for Japanese Patent Application No. 2017-562330, mailed on Jan. 18, 2019, 11 pages.
Office Action received for Japanese Patent Application No. 2018-138559, mailed on Apr. 9, 2021, 30 pages.
Office Action received for Japanese Patent Application No. 2018-138559, mailed on Jan. 27, 2020, 7 pages.
Office Action received for Japanese Patent Application No. 2018-138559, mailed on Jul. 26, 2021, 37 pages.
Office Action received for Japanese Patent Application No. 2018-138559, mailed on May 13, 2019, 10 pages.
Office Action received for Japanese Patent Application No. 2019-123115, mailed on Aug. 31, 2020, 9 pages.
Office Action received for Japanese Patent Application No. 2019-151358, mailed on Oct. 2, 2020, 5 pages.
Office Action received for Japanese Patent Application No. 2020-010239, mailed on Jan. 4, 2021, 6 pages.
Office Action received for Japanese Patent Application No. 2020-079486, mailed on Jul. 16, 2021, 10 pages.
Office Action received for Japanese Patent Application No. 2020-079486, mailed on Mar. 11, 2022, 8 pages.
Office Action received for Japanese Patent Application No. 2021-023661, mailed on Feb. 25, 2022, 6 pages.
Office Action received for Japanese Patent Application No. 2021-023661, mailed on Oct. 3, 2022, 8 pages.
Office Action received for Japanese Patent Application No. 2021-163700, mailed on Oct. 7, 2022, 4 pages.
Office Action received for Japanese Patent Application No. 2021-566100, mailed on May 27, 2022, 7 pages.
Office Action received for Korean Patent Application No. 10-2017-7024570, mailed on Jul. 10, 2019, 6 pages.
Office Action received for Korean Patent Application No. 10-2017-7024570, mailed on Sep. 28, 2018, 14 pages.
Office Action received for Korean Patent Application No. 10-2017-7034558, mailed on Dec. 15, 2018, 15 pages.
Office Action received for Korean Patent Application No. 10-2017-7034558, mailed on Jun. 4, 2019, 7 pages.
Office Action received for Korean Patent Application No. 10-2017-7034558, mailed on Sep. 25, 2019, 9 pages.
Office Action received for Korean Patent Application No. 10-2019-7007053, mailed on Mar. 18, 2019, 12 pages.
Office Action received for Korean Patent Application No. 10-2019-7007053, mailed on Sep. 26, 2019, 9 pages.
Office Action received for Korean Patent Application No. 10-2019-7029673, mailed on Apr. 8, 2021, 7 pages.
Office Action received for Korean Patent Application No. 10-2019-7029673, mailed on Nov. 5, 2019, 10 pages.
Office Action received for Korean Patent Application No. 10-2019-7029673, mailed on Sep. 3, 2020, 9 pages.
Office Action received for Korean Patent Application No. 10-2019-7038235, mailed on Mar. 9, 2020, 15 pages.
Office Action received for Korean Patent Application No. 10-2020-7018255, mailed on Sep. 10, 2020, 12 pages.
Office Action received for Korean Patent Application No. 10-2021-7036016, mailed on Nov. 10, 2021, 13 pages.
Office Action received for Korean Patent Application No. 10-2021-7036310, mailed on Feb. 23, 2022, 6 pages.
Office Action received for Taiwanese Patent Application No. 104117509, issued on Aug. 22, 2016, 6 pages.

Office Action received for Taiwanese Patent Application No. 104132636, issued on Dec. 13, 2018, 26 pages.
Office Action received for Taiwanese Patent Application No. 104132636, issued on Mar. 23, 2017, 25 pages.
Office Action received for Taiwanese Patent Application No. 104132636, issued on Oct. 31, 2017, 10 pages.
Partial European Search Report received for European Patent Application No. 18197554.1, mailed on Jan. 22, 2019, 8 pages.
Partial Supplementary European Search Report received for European Patent Application No. 17810749.6, mailed on Apr. 25, 2019, 8 pages.
Phandroid, "How to record & stream using YouTube Gaming", Available online at: https://www.youtube.com/watch?v=8H5Q1L9M_ql, Jun. 1, 2016, 3 pages.
Preliminary Opinion received for European Patent Application No. 15730890.9, mailed on Mar. 7, 2019, 4 pages.
Programmatically download APK from google play store, retrieved from the Internet: https://stackoverflow.com/questions/13703982/prog ram maticallydownload-apk-from-google-play-store/13704021#13704021, Dec. 10, 2012, 2 pages.
Puryear Blake, "A modular framework for home healthcare monitoring", Online available at: https://scholarworks.uark.edu/cgi/viewcontent.cgi?article=1009&context=csceuht, May 2012, 92 pages.
Quick Type Keyboard on iOS 8 Makes Typing Easier, Online available at: < https://www.youtube.com/watch?v=0CldLR4fhVU >, Jun. 3, 2014, 3 pages.
Razykdreviews, "In Depth Review of Apple Watch Activity and Workout App", available at <URL: https://www.youtube.com/watch?v=GkKI3qIK0ow>, Category: X Claims: 1-5 Category: L Reason: Internet citation/video, May 11, 2015, 1 page.
Record of Oral Hearing received for U.S. Appl. No. 16/145,033, mailed on Apr. 19, 2023, 16 pages.
Record of Oral Hearing received for U.S. Appl. No. 16/454,884, mailed on Feb. 14, 2022, 13 pages.
Result of Consultation received for European Patent Application No. 16762356.0, mailed on Nov. 29, 2021, 3 pages.
Result of Consultation received for European Patent Application No. 16807953.1, mailed on Sep. 24, 2020, 3 pages.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.
Result of Consultation received for European Patent Application No. 17813778.2, mailed on Dec. 6, 2021, 17 pages.
Result of Consultation received for European Patent Application No. 18197554.1, mailed on Feb. 3, 2023, 3 pages.
Result of Consultation received for European Patent Application No. 19724963.4, mailed on Jul. 8, 2021, 3 pages.
Result of Consultation received for European Patent Application No. 19724963.4, mailed on May 31, 2021, 3 pages.
Ritchie Rene, "Quick Type keyboard in iOS 8: Explained", Retrieved via URL: https://www.imore.com/quicktype-keyboards-ios-8-explained, Jun. 21, 2014, pp. 1-19.
Rizknows, "Garmin Connect Mobile App—Review #2", https://www.youtube.com/watch?v=7my3wMpeRbE, Category: X Claims: 1-5 Category: L Reason: Internet citation/video, Oct. 22, 2015, 1 page.
Sansford Steve, "Streaming Android Games with OBS On Linux", Available online at: https://www.youtube.com/watch?v=twyh32Ud8vQ, May 20, 2016, 3 pages.
Search Report and opinion received for Danish Patent Application No. PA201670608, mailed on Jan. 3, 2017, 15 pages.
Search Report and Opinion received for Danish Patent Application No. PA201670609, mailed on Feb. 1, 2017, 11 pages.
Search Report and Opinion received for Danish Patent Application No. PA201770423, mailed on Oct. 4, 2017, 10 pages.
Search Report and Opinion received for Danish Patent Application No. PA201870385, mailed on Nov. 16, 2018, 10 pages.
Search Report and Opinion received for Danish Patent Application No. PA201970535, mailed on Nov. 5, 2019, 10 pages.

(56) References Cited

OTHER PUBLICATIONS

Summons to Attend Oral Proceeding received for European Patent Application No. 10172417.7, Jan. 28, 2013, 6 pages, 6 pages.
Summons to Attend Oral Proceedings received for European Patent Application No. 11178259.5, mailed on Feb. 11, 2015, 9 pages.
Summons to Attend Oral Proceedings received for European Patent Application No. 11178259.5, mailed on Feb. 19, 2018, 12 pages.
Summons to Attend Oral Proceedings received for European Patent Application No. 15730890.9, mailed on Sep. 10, 2018, 11 pages.
Summons to Attend Oral Proceedings received for European Patent Application No. 16762356.0, mailed on May 10, 2021, 10 pages.
Summons to Attend Oral Proceedings received for European Patent Application No. 16804040.0, mailed on Jan. 24, 2020, 11 pages.
Summons to Attend Oral Proceedings received for European Patent Application No. 17810749.6, mailed on Aug. 12, 2020, 11 pages.
Summons to Attend Oral Proceedings received for European Patent Application No. 17813778.2, mailed on Aug. 13, 2021, 13 pages.
Summons to Attend Oral Proceedings received for European Patent Application No. 18197554.1, mailed on Mar. 23, 2022, 7 pages.
Summons to Attend Oral Proceedings received for European Patent Application No. 19163212.4, mailed on Dec. 15, 2021, 9 pages.
Summons to Attend Oral Proceedings received for European Patent Application No. 19724963.4, mailed on Dec. 23, 2020, 8 pages.
Summons to Attend Oral Proceedings received for European Patent Application No. 20723742.1, mailed on Jul. 21, 2023, 12 pages.
Summons to Attend Oral Proceedings received for European Patent Application No. 20729331.7, mailed on May 22, 2023, 15 pages.
Summons to Attend Oral Proceedings received for European Patent Application No. 21165295.3, mailed on Jul. 25, 2023, 14 pages.
Summons to Oral Proceedings received for German Patent Application No. 112007000067.8, mailed on Dec. 8, 2021, 11 pages.
Supplemental Notice of Allowance received for U.S. Appl. No. 14/846,574, mailed on Apr. 15, 2021, 3 pages.
Supplemental Notice of Allowance received for U.S. Appl. No. 14/846,574, mailed on Apr. 30, 2021, 3 pages.
Supplemental Notice of Allowance received for U.S. Appl. No. 14/863,069, mailed on Aug. 15, 2019, 3 pages.
Supplemental Notice of Allowance received for U.S. Appl. No. 14/863,069, mailed on Mar. 29, 2019, 3 pages.
Supplemental Notice of Allowance received for U.S. Appl. No. 14/863,069, mailed on Mar. 1, 2019, 3 pages.
Supplemental Notice of Allowance received for U.S. Appl. No. 14/870,726, mailed on Mar. 6, 2019, 6 pages.
Supplemental Notice of Allowance received for U.S. Appl. No. 15/616,480, mailed on Mar. 28, 2019, 2 pages.
Supplemental Notice of Allowance received for U.S. Appl. No. 16/584,776, mailed on Feb. 18, 2021, 3 pages.
Supplemental Notice of Allowance received for U.S. Appl. No. 16/584,776, mailed on May 13, 2021, 4 pages.
Supplemental Notice of Allowance received for U.S. Appl. No. 17/697,539, mailed on Feb. 21, 2023, 2 pages.
Supplementary European Search Report received for European Patent Application No. 17810749.6, mailed on Aug. 6, 2019, 6 pages.
T&GG Channel, "Canon IXUS 700 / Screenshots of deleting an image", Online available at: https://www.youtube.com/watch?v=8BL_L5hKZUM, May 2015, 2 pages.
Tomic et al., "Emoticons", FIP—Journal of Finance and Law, vol. 1, No. 1, 2013, pp. 35-42.
Tweedie Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
Van Wijk et al., "Cluster and Calendar based Visualization of Time Series Data", IEEE Comput. Soc., 1999, 7 pages.
Way to Use a Camera, JP, Nov. 18, 2005, pp. 206-212.
Whitwam Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Wikipedia, "Enhanced Multi-Level Precedence and Pre-emption Service", Available online at: https://de.wikipedia.org/w/index.php?%20title=Enhanced%20Multi%E3%83%BCLevel_Precedence_And_Pre-emption_Service&oldid=123047429, Oct. 2013, 2 pages.
Willcom, "Operation Manual for WS003SH", JP, Dec. 2005, pp. 4-1 to 4-7.
Willem Jonker, "Secure Data Management", Online available at: http://ndl.ethernet.edu.et/bitstream/123456789/21649/1/291.pdf, Sep. 17, 2010, 177 pages.
Written Opinion Issued from International Preliminary Examining Authority for PCT Application No. PCT/US2016/016216, mailed on Feb. 20, 2017, 12 pages.
XZULAS,"PS4 to Twitch—How to Broadcast Gameplay—Camera and Audio Settings", Available online at: https://www.youtube.com/watch?v=TyTR64RF0wl, Nov. 3, 2014, 4 pages.
Office Action received for Australian Patent Application No. 2024201844, mailed on Jul. 2, 2025, 3 pages.
Extended European Search Report received for European Patent Application No. 25164739.2, mailed on Jun. 2, 2025, 8 pages.
Final Office Action received for U.S. Appl. No. 17/542,947, mailed on Jun. 26, 2025, 59 pages.
Final Office Action received for U.S. Appl. No. 18/583,787, mailed on Jun. 18, 2025, 16 pages.
Non-Final Office Action received for U.S. Appl. No. 18/520,372, mailed on Jun. 18, 2025, 36 pages.
Notice of Hearing received for Indian Patent Application No. 202117050360, mailed on Jun. 26, 2025, 7 pages.
Office Action received for European Patent Application No. 22741402.6, mailed on Jun. 24, 2025, 14 pages.
Applicant-Initiated Interview Summary received for U.S. Appl. No. 17/542,947, mailed on May 1, 2025, 3 pages.
Applicant-Initiated Interview Summary received for U.S. Appl. No. 18/195,350. mailed on May 23, 2025, 4 pages.
Applicant-Initiated Interview Summary received for U.S. Appl. No. 18/520,372, mailed on Mar. 3, 2025, 4 pages.
Applicant-Initiated Interview Summary received for U.S. Appl. No. 18/520,372, mailed on May 27, 2025, 4 pages.
Applicant-Initiated Interview Summary received for U.S. Appl. No. 18/583,787, mailed on May 28, 2025, 2 pages.
Applicant-Initiated Interview Summary received for U.S. Appl. No. 18/592,219, mailed on Apr. 4, 2025, 2 pages.
Corrected Notice of Allowance received for U.S. Appl. No. 18/589,265, mailed on Feb. 26, 2025, 2 pages.
Decision on Appeal received for U.S. Appl. No. 16/389,722, mailed on Mar. 4, 2025, 18 pages.
Decision to Grant received for European Patent Application No. 22731852.4, mailed on Apr. 17, 2025, 3 pages.
Examiner's Answer to Appeal Brief received for U.S. Appl. No. 18/117,998, mailed on May 5, 2025, 15 pages.
Final Office Action received for U.S. Appl. No. 18/195,350, mailed on Apr. 11, 2025, 39 pages.
Final Office Action received for U.S. Appl. No. 18/520,372, mailed on Mar. 25, 2025, 37 pages.
Final Office Action received for U.S. Appl. No. 18/592,219, mailed on Apr. 28, 2025, 22 pages.
GREGGLESTV, "Google Photos How To Share Albums With Android and iOS Users", Online Available at: https://www.youtube.com/watch?v=vty3c3DgDnl, Dec. 18, 2015, 3 pages.
Non-Final Office Action received for U.S. Appl. No. 17/542,947, mailed on Feb. 18, 2025, 57 pages.
Non-Final Office Action received for U.S. Appl. No. 18/374,562, mailed on May 19, 2025, 29 pages.
Non-Final Office Action received for U.S. Appl. No. 18/583,787, mailed on Mar. 5, 2025, 16 pages.

(56)  References Cited

OTHER PUBLICATIONS

Notice of Acceptance received for Australian Patent Application No. 2023208169, mailed on May 22, 2025, 3 pages.
Notice of Acceptance received for Australian Patent Application No. 2024202344, mailed on Apr. 1, 2025, 3 pages.
Notice of Allowance received for U.S. Appl. No. 18/589,265, mailed on Feb. 18, 2025, 10 pages.
Office Action received for Australian Patent Application No. 2022352756, mailed on May 14, 2025, 4 pages.
Office Action received for Australian Patent Application No. 2024201844, mailed on Mar. 21, 2025, 5 pages.
Office Action received for European Patent Application No. 23216484.8, mailed on Mar. 13, 2025, 7 pages.
Office Action received for Japanese Patent Application No. 2024-515963, mailed on Mar. 7, 2025, 15 pages (7 pages of English Translation and 8 pages of Official Copy).
Record of Oral Hearing received for U.S. Appl. No. 16/389,722, mailed on Feb. 26, 2025, 15 pages.
Applicant-Initiated Interview Summary received for U.S. Appl. No. 17/542,947, mailed on Dec. 30, 2024, 3 pages.
Non-Final Office Action received for U.S. Appl. No. 18/592,219, mailed on Jan. 3, 2025, 20 pages.
Notice of Allowance received for U.S. Appl. No. 17/951,624, mailed on Jan. 15, 2025, 5 pages.
International Search Report and Written Opinion received for PCT Patent Application No. PCT/US2025/015130, mailed on Jul. 14, 2025, 23 pages.
Invitation to Pay Additional Fees and Partial International Search Report received for PCT Patent Application No. PCT/US2025/015130, mailed on May 22, 2025, 17 pages.
Office Action received for Australian Patent Application No. 2022352756, mailed on Aug. 8, 2025, 4 pages.
Summons to Oral Proceedings received for European Patent Application No. 21165295.3, mailed on Jul. 21, 2025, 11 pages.
Applicant-Initiated Interview Summary received for U.S. Appl. No. 18/195,350, mailed on Nov. 6, 2025, 6 pages.
Applicant-Initiated Interview Summary received for U.S. Appl. No. 18/520,372, mailed on Oct. 15, 2025, 7 pages.

Final Office Action received for U.S. Appl. No. 18/374,562, mailed on Sep. 11, 2025, 45 pages.
International Preliminary Report on Patentability received for PCT Patent Application No. PCT/US2024/022386, mailed on Nov. 6, 2025, 11 pages.
Non-Final Office Action received for U.S. Appl. No. 18/195,350, mailed on Sep. 3, 2025, 39 pages.
Non-Final Office Action received for U.S. Appl. No. 18/583,787, mailed on Nov. 5, 2025, 17 pages.
Non-Final Office Action received for U.S. Appl. No. 18/614,032, mailed on Sep. 18, 2025, 17 pages.
Notice of Acceptance received for Australian Patent Application No. 2024201844, mailed on Sep. 12, 2025, 3 pages.
Office Action received for Australian Patent Application No. 2024200956, mailed on Aug. 20, 2025, 7 pages.
Office Action received for Chinese Patent Application No. 202510130289.7, mailed on Sep. 19, 2025, 18 pages (9 pages of English Translation and 9 pages of Official Copy).
Office Action received for Japanese Patent Application No. 2024-515963, mailed on Sep. 1, 2025, 17 pages (8 pages of English Translation and 9 pages of Official Copy).
Applicant-Initiated Interview Summary received for U.S. Appl. No. 18/614,032, mailed on Dec. 4, 2025, 3 pages.
Final Office Action received for U.S. Appl. No. 18/520,372, mailed on Dec. 9, 2025, 42 pages.
International Preliminary Report on Patentability received for PCT Patent Application No. PCT/US2024/028414, mailed on Dec. 11, 2025, 14 pages.
Ifun, "Apple Photo Stream: Setting up an iCloud photo share from your iPhone—ifun.de", Retrieved from the Internet: URL: https://www.youtube.com/watch?v=gBqenU5BsG0, Nov. 26, 2013, 2 pages (1 page of English Translation and 1 page of Official Copy).
Non-Final Office Action received for U.S. Appl. No. 18/611,377, mailed on Dec. 10, 2025, 19 pages.
Office Action received for European Patent Application No. 23216484.8, mailed on Dec. 8, 2025, 7 pages.
Office Action received for European Patent Application No. 24161066.6, mailed on Nov. 27, 2025, 11 pages.

* cited by examiner

Portable Multifunction Device 100

210

212

208

206

Speaker 111

Optical Sensor 164

Proximity Sensor 166

200

208

210 is SIM card slot
212 is headphone jack

202

Touch Screen 112

Contact Intensity Sensor(s) 165

Tactile Output Generator(s) 167

203

Microphone 113

Home 204

Accelerometer(s) 168

External Port 124

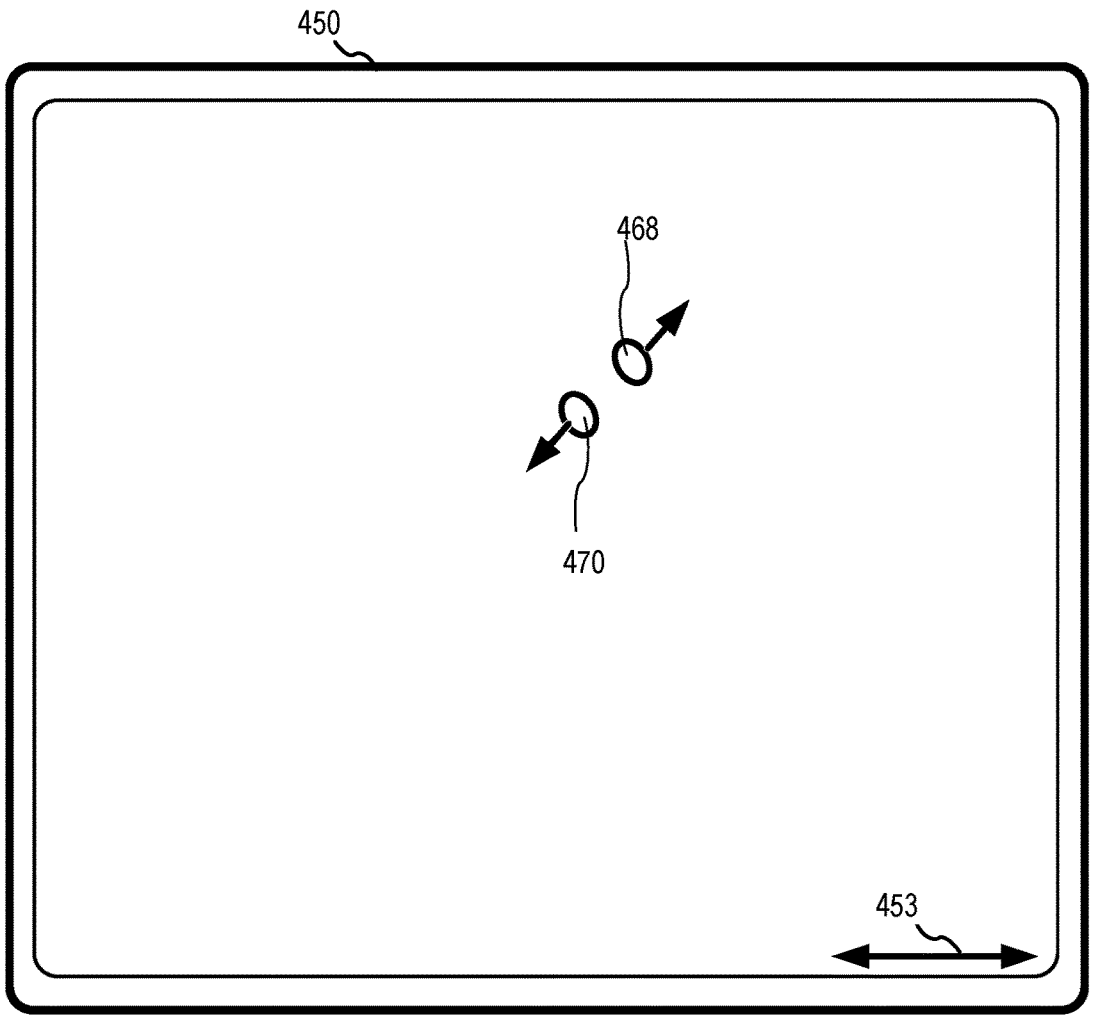
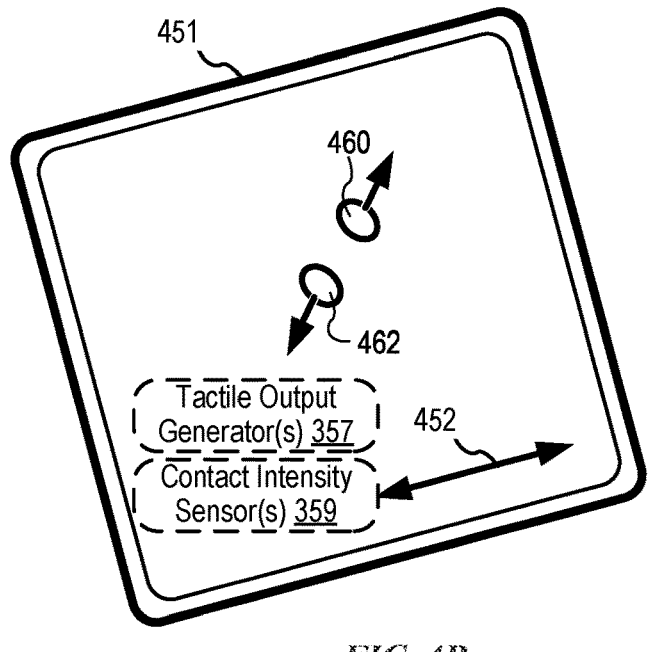
*FIG. 4B*

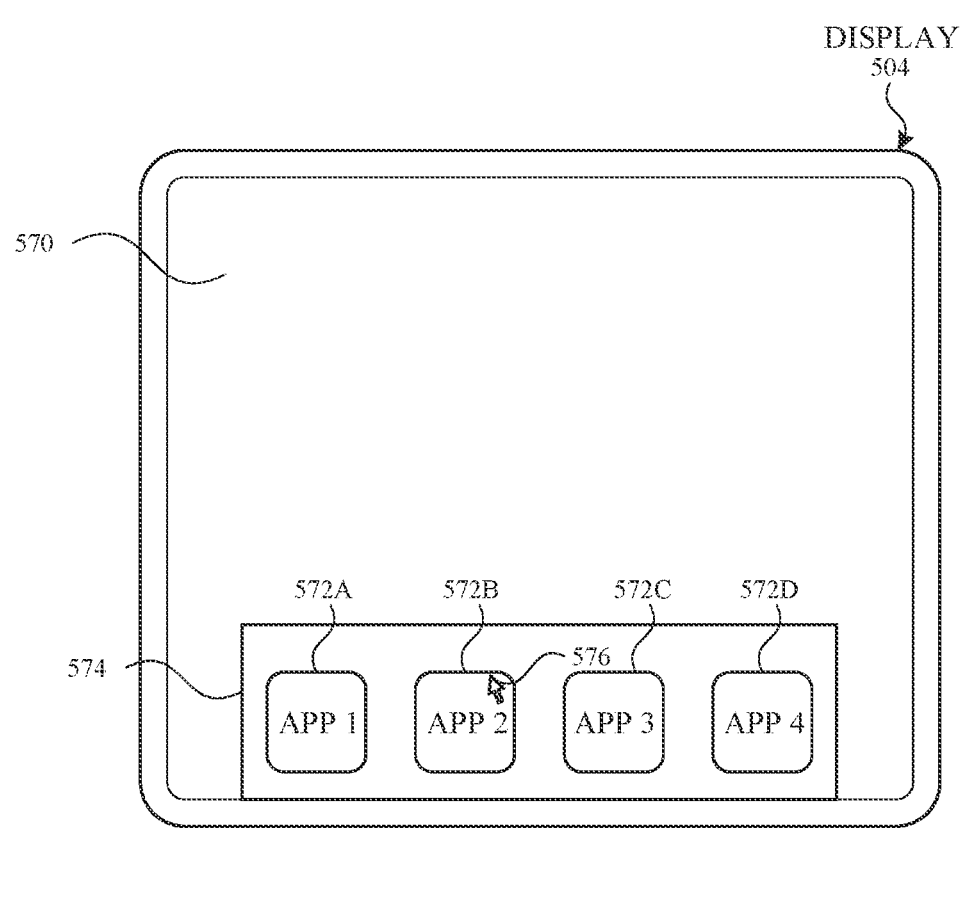
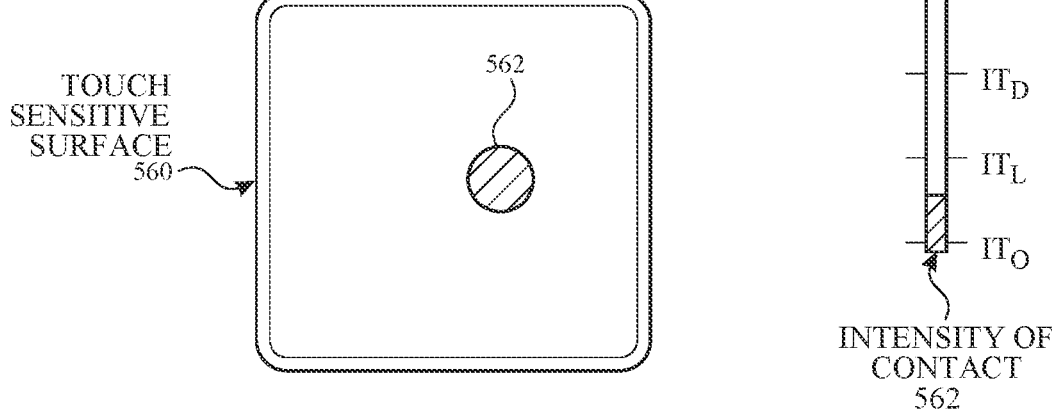
*FIG. 5E*

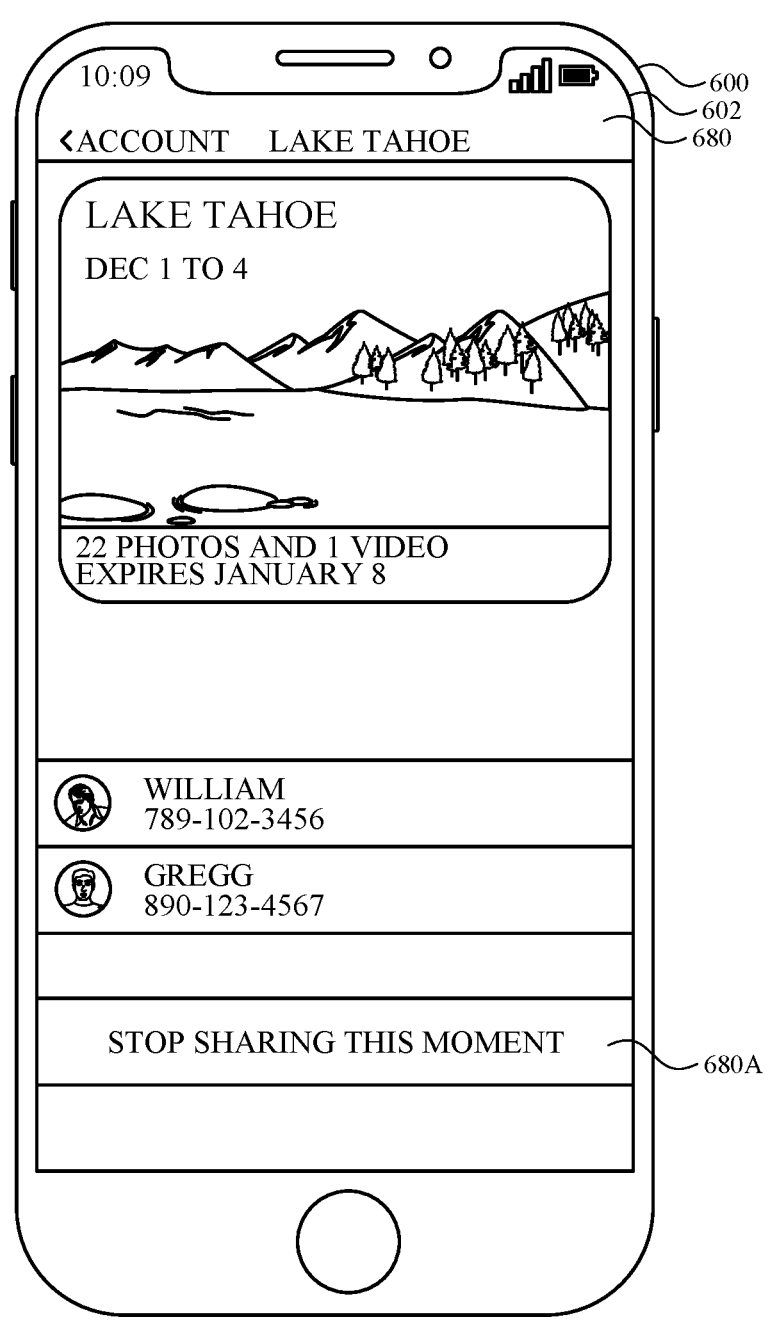
*FIG.6AAA*

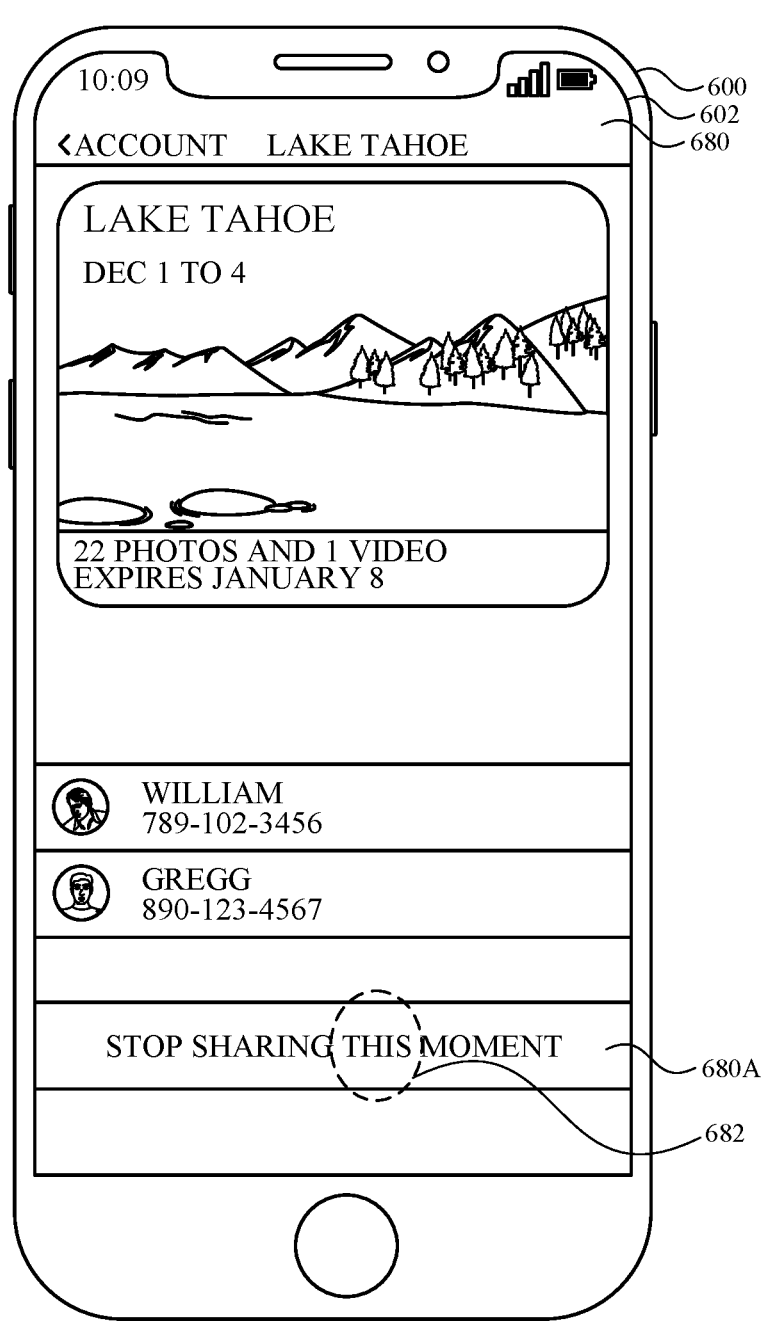
*FIG. 6AAB*

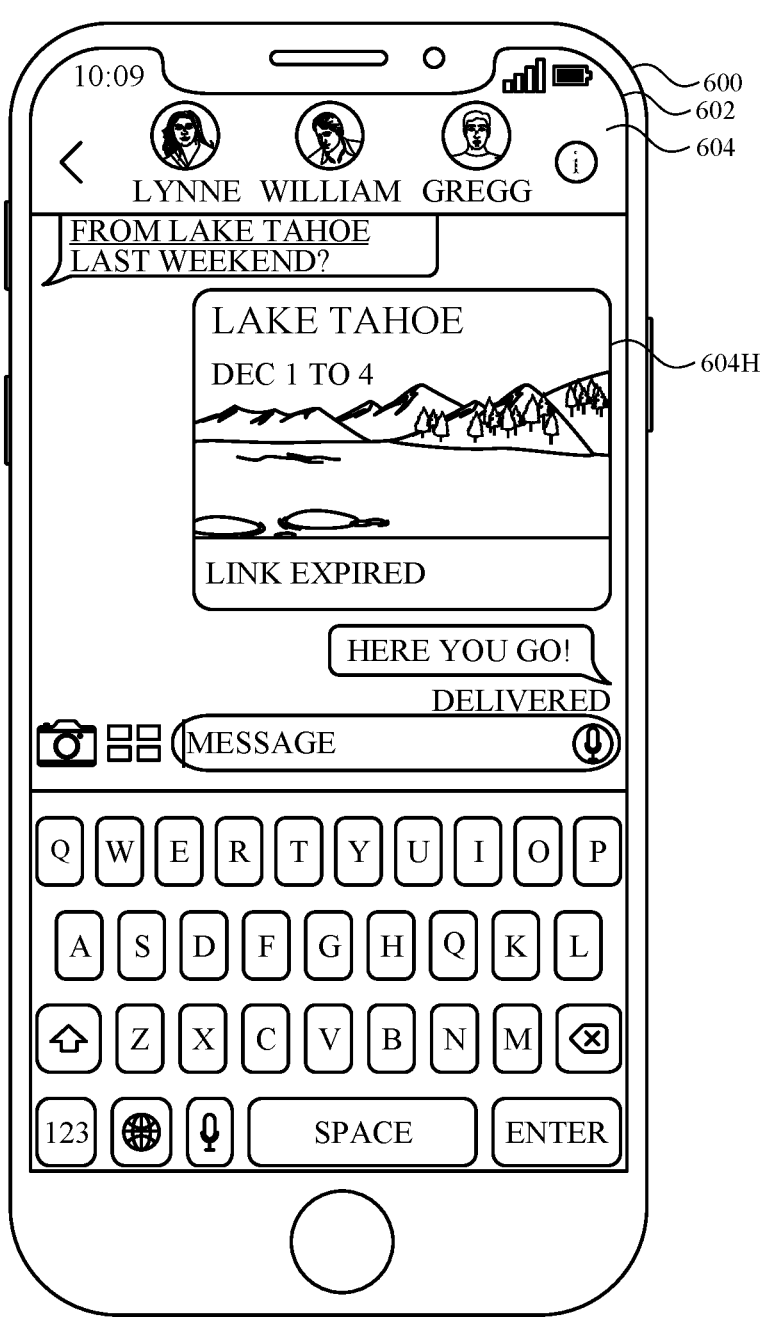
*FIG. 6AAC*

700

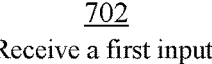

```
┌─────────────────────────────────────────────────────────────────────┐
│                               702                                     │
│                       Receive a first input.                          │
└─────────────────────────────────────────────────────────────────────┘
                                  │
                                  ▼
┌─────────────────────────────────────────────────────────────────────┐
│                               704                                     │
│  In response to receiving the first input, display a suggested        │
│  collection of media items for sharing with a recipient, wherein      │
│  the suggested collection is relevant to a message conversation       │
│  with the recipient.                                                  │
└─────────────────────────────────────────────────────────────────────┘
                                  │
                                  ▼
┌─────────────────────────────────────────────────────────────────────┐
│                               706                                     │
│  Subsequent to displaying the suggested collection of media items,    │
│  receive a second input representing a request to transmit at least   │
│  a portion of the suggested collection of media items to the          │
│  recipient.                                                           │
└─────────────────────────────────────────────────────────────────────┘
                                  │
                                  ▼
┌─────────────────────────────────────────────────────────────────────┐
│                               708                                     │
│  In response to receiving the second input, transmitting a message    │
│  to the recipient as part of the message conversation that provides   │
│  access to the at least a portion of the suggested collection of      │
│  media items.                                                         │
└─────────────────────────────────────────────────────────────────────┘
```

(A)

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│                               710                                     │
│  Further in response to receiving the first input, and while          │
│  displaying at least a portion of the suggested collection of media   │
│  items, display an indication of selected media that identifies an    │
│  initial set of selected media items from the suggested collection    │
│  that were automatically selected for sharing.                        │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                  │
                                  ▼

(B)

*FIG. 7A*

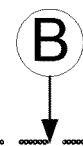

712
While displaying the indication of selected media that identifies the initial set of selected media items, receive the second input representing the request to transmit at least a portion of the suggested collection of media items to the recipient.

714
In response to receiving the second input, transmit a message to the recipient as part of the message conversation and providing access to the initial set of selected media items.

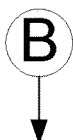

716
The indication of selected media is a first affordance and the second input corresponds to selection of the first affordance, and the first affordance includes an indication of an amount of media items included in the initial set of selected media items.

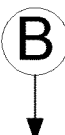

718
The initial set of selected media items includes fewer than all media items in the suggested collection of media items.

720
The suggested collection of media items is determined to be relevant to the message conversation with the recipient based on an identified face associated with the recipient, and one or more media items in the suggested collection of media items for sharing with the recipient are selected based on the identified face associated with the recipient being identified in at least a portion of the one or more media items in the suggested collection of media items.

FIG. 7B

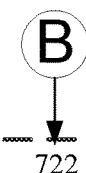

722
Receive input representing a change to the initial set of selected media items from the suggested collection to form a user-selected set of selected media items from the suggested collection, wherein the initial set of selected media items differs from the user-selected set of selected media items with respect to the selection of at least one media item of the first collection.

724
Update the indication of selected media based on the user-selected set of selected media items.

726
While displaying the indication of selected media that is updated based on the user-selected set of selected media items, receive the second input representing the request to transmit at least a portion of the suggested collection of media items to the recipient.

728
In response to receiving the second input, transmit a message to the recipient as part of the message conversation that provides access to the user-selected set of selected media items.

730
The indication of selected media comprises an indication of an amount of media items from the suggested collection that are currently selected, wherein updating the indication of selected media comprises updating the indication to include display of the amount of media items in the user-selected set of selected media items, and wherein the indication of selected media is a second affordance and the second input corresponds to selection of the second affordance.

732
The suggested collection of media items is determined to be relevant to the message conversation with the recipient based on an event known to have been attended by the recipient, and one or more media items in the suggested collection of media items for sharing with the recipient are selected based on an indication that the one more media items in the suggested collection are associated with the event known to have been attended by the recipient.

*FIG. 7C*

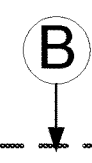

734
While displaying the suggested collection of media items, and while in a media item selection mode, receive a third input associated with a first media item of the suggested collection of media items.

736
In accordance with a determination that the third input associated with the first media item is a first gesture:

738
Toggle whether the first media item is selected without displaying the first media item in a one-up view.

740
In accordance with the toggling causing the first media item to be selected, display a selection indicator associated with the first media item.

742
In accordance with the toggling causing the first media item to be unselected, cease to display the selection indicator associated with the first media item.

744
In accordance with a determination that the third input associated with the first media item is a second gesture, different than the first gesture: display the first media item in the one-up view without toggling whether the first media item is selected.

746
While displaying the first media item in the one-up view, and while in the media item selection mode:

748
Receive a fourth input associated with the first media item displayed in the one-up view.

750
In response to receiving the fourth input: toggling whether the first media item is selected. In accordance with the toggling causing the first media item to be selected, display a selection indicator associated with the first media item. In accordance with the toggling causing the first media item to be unselected, cease to display the selection indicator associated with the first media item.

*FIG. 7D*

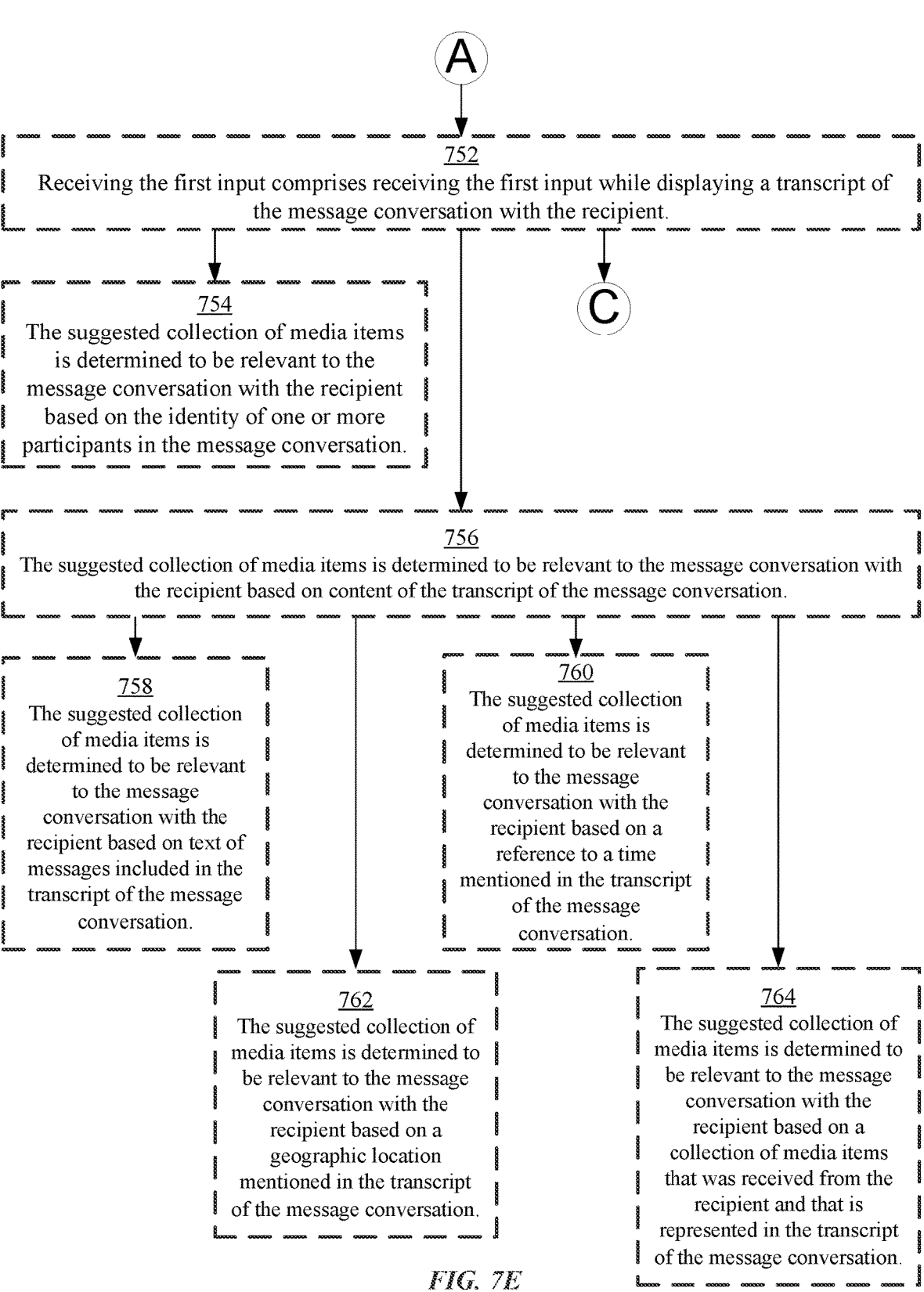

(A)

752
Receiving the first input comprises receiving the first input while displaying a transcript of the message conversation with the recipient.

(C)

754
The suggested collection of media items is determined to be relevant to the message conversation with the recipient based on the identity of one or more participants in the message conversation.

756
The suggested collection of media items is determined to be relevant to the message conversation with the recipient based on content of the transcript of the message conversation.

758
The suggested collection of media items is determined to be relevant to the message conversation with the recipient based on text of messages included in the transcript of the message conversation.

760
The suggested collection of media items is determined to be relevant to the message conversation with the recipient based on a reference to a time mentioned in the transcript of the message conversation.

762
The suggested collection of media items is determined to be relevant to the message conversation with the recipient based on a geographic location mentioned in the transcript of the message conversation.

764
The suggested collection of media items is determined to be relevant to the message conversation with the recipient based on a collection of media items that was received from the recipient and that is represented in the transcript of the message conversation.

*FIG. 7E*

766

Prior to displaying a sharing affordance that corresponds to the suggested collection of media items, display the transcript of the message conversation concurrently with a keyboard region that includes a suggestion region that is populated with input suggestions.

768

While displaying the transcript of the message conversation concurrently with the keyboard region, replace display of an input suggestion in the keyboard region with the sharing affordance, wherein the sharing affordance is displayed concurrently with the transcript of the message conversation, and wherein receiving the first input comprises receiving input corresponding to selection of the sharing affordance.

770

Prior to displaying the sharing affordance that corresponds to the suggested collection of media items, and while displaying the transcript of the message conversation with the recipient:

772

Receive input associated with a text entry field displayed concurrently with the transcript of the message conversation.

774

In response to receiving the input associated with the text entry field, display the sharing affordance concurrently with the transcript of the message conversation.

776

Receiving the first input comprises receiving input corresponding to selection of a portion of a message in the transcript of the message conversation.

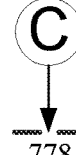

778

The transcript of the message conversation with the recipient is displayed concurrently with the suggested collection of media items for sharing with the recipient.

*FIG. 7F*

780
Prior to receiving the first input, and while displaying the transcript of the message conversation with the recipient, display a plurality of affordances including an affordance associated with a first application and an affordance associated with a second application, different than the first application.

782
Receive input corresponding to selection of the affordance associated with the first application.

784
In response to receiving the input corresponding to selection of the affordance associated with the first application, and while continuing to display the transcript of the message conversation with the recipient, display an interface associated with the first application.

786
While displaying the interface associated with the first application, display the suggested collection of media items for sharing with the recipient.

788
Subsequent to transmitting the message to the recipient as part of the message conversation that provides access to the at least a portion of the suggested collection of media items:

790
Receive input representing revocation of the recipient's access to the at least a portion of the suggested collection of media items.

792
In response to receiving the input representing revocation of the recipient's access, transmit data that causes termination of the access to the at least a portion of the suggested collection of media items that was provided in the message to the recipient.

*FIG. 7G*

794
Transmitting the message to the recipient as part of the message conversation that provides access to the at least a portion of the suggested collection of media items comprises:

> 796
> In accordance with a determination that the recipient is eligible to receive messages through a predetermined cloud-based service, providing access to the at least a portion of the suggested collection of media items through the predetermined cloud-based service, wherein the access provided through the predetermined cloud service restricts access by users other than the recipient.

> 798
> In accordance with a determination that the recipient is not eligible to receive messages through the predetermined cloud-based service, providing access to the at least a portion of the suggested collection of media items by sending a link to the recipient, wherein the access provided by sending a link does not restrict access by users other than the recipient.

7100
Transmitting the message to the recipient as part of the message conversation that provides access to the at least a portion of the suggested collection of media items comprises transmitting, to the recipient, the media items in the at least a portion of the suggested collection of media items.

7102
Transmitting the message to the recipient as part of the message conversation that provides access to the at least a portion of the suggested collection of media items comprises inserting a representation of the suggested collection of media items into the transcript.

*FIG. 7H*

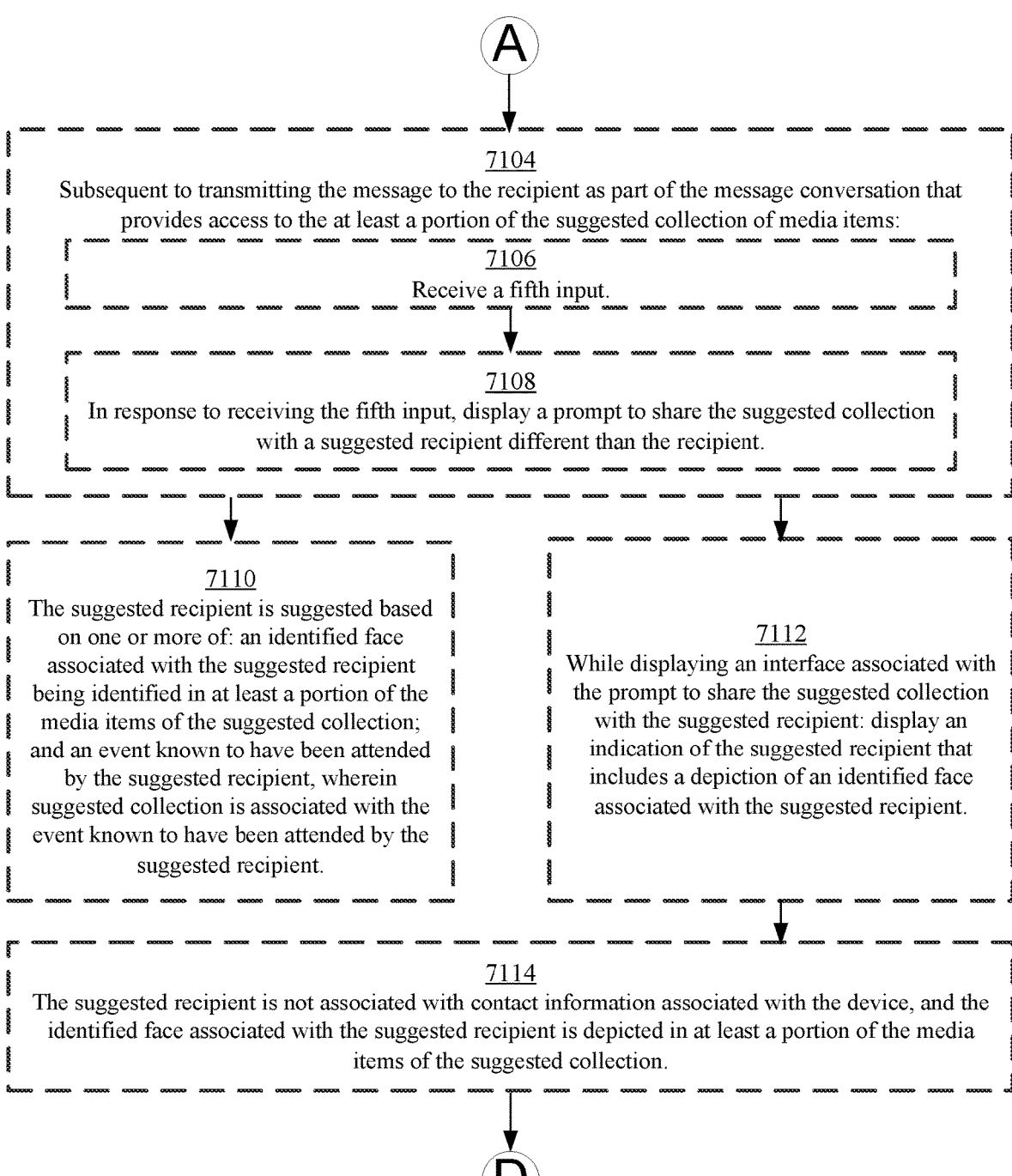

Ⓐ

7104
Subsequent to transmitting the message to the recipient as part of the message conversation that provides access to the at least a portion of the suggested collection of media items:

7106
Receive a fifth input.

7108
In response to receiving the fifth input, display a prompt to share the suggested collection with a suggested recipient different than the recipient.

7110
The suggested recipient is suggested based on one or more of: an identified face associated with the suggested recipient being identified in at least a portion of the media items of the suggested collection; and an event known to have been attended by the suggested recipient, wherein suggested collection is associated with the event known to have been attended by the suggested recipient.

7112
While displaying an interface associated with the prompt to share the suggested collection with the suggested recipient: display an indication of the suggested recipient that includes a depiction of an identified face associated with the suggested recipient.

7114
The suggested recipient is not associated with contact information associated with the device, and the identified face associated with the suggested recipient is depicted in at least a portion of the media items of the suggested collection.

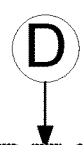

7116
While displaying the indication of the suggested recipient that includes the depiction of the identified face associated with the suggested recipient, receive a sixth input representing selection of the suggested recipient.

7118
In response to receiving the sixth input, display a prompt to match the suggested recipient with contact information associated with the device.

7120
Receive a seventh input representing selection of an item of contact information from the contact information associated with the device.

7122
In response to receiving the seventh input, associate the suggested recipient with the item of contact information.

7124
Subsequent to associating the suggested recipient with the item of contact information, transmit, using the item of contact information, a message to the suggested and providing access to at least a portion of the suggested collection of media items in response to selection of an affordance included in an interface associated with the prompt.

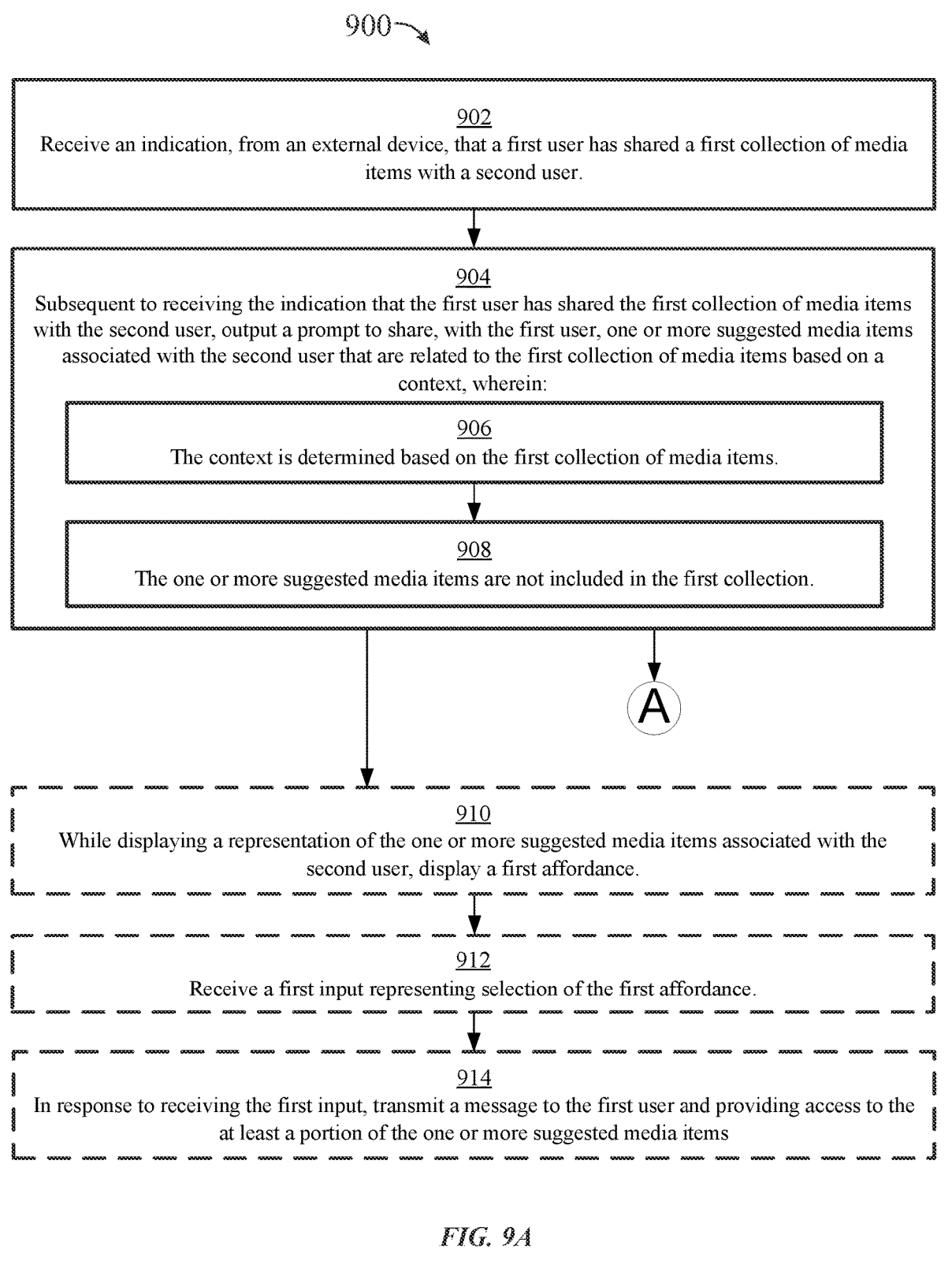

902
Receive an indication, from an external device, that a first user has shared a first collection of media items with a second user.

904
Subsequent to receiving the indication that the first user has shared the first collection of media items with the second user, output a prompt to share, with the first user, one or more suggested media items associated with the second user that are related to the first collection of media items based on a context, wherein:

906
The context is determined based on the first collection of media items.

908
The one or more suggested media items are not included in the first collection.

A

910
While displaying a representation of the one or more suggested media items associated with the second user, display a first affordance.

912
Receive a first input representing selection of the first affordance.

914
In response to receiving the first input, transmit a message to the first user and providing access to the at least a portion of the one or more suggested media items

*FIG. 9A*

916
Subsequent to receiving the indication that the first user has shared the first collection of media items with the second user, and prior to outputting the prompt to share, receive a second input representing a request to add one or more media items in the first collection of media items to a media library associated with the second user.

918
In response to receiving the second input, cause the one or more media items in the first collection of media items to be added to the media library associated with the second user.

920
Subsequent to causing the one or more media items in the first collection to be added to the media library associated with the second user, display the prompt to share the one or more suggested media items associated with the second user, wherein:

922
The one or more suggested media items associated with the second user are selected from the media library associated with the second user.

924
The one or more suggested media items associated with the second user exclude the one or more media items from the first collection that have been added to the media library associated with the second user.

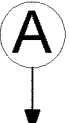

926
The context is determined based on an identified face being identified in: one or more media items in the first collection of media items, and one or more media items in the one or more suggested media items.

*FIG. 9B*

928
The context is determined based on an event associated with the first collection of media items and the one or more suggested media items.

930
The event corresponds to a range of time, and the first collection and the one or more suggested media items respectively include one or more media items captured during the range of time.

932
The event corresponds to a geographic location, and the first collection and the one or more suggested media items respectively include one or more media items captured at the geographic location.

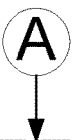

934
Subsequent to receiving the indication that the first user has shared the first collection of media items with the second user, display a second affordance associated with the first collection of media items.

936
Receive a third input representing selection of the second affordance associated with the first collection of media items.

938
In response to receiving the third input representing selection of the second affordance, display an interface for viewing the first collection that includes a depiction of at least a portion of the first collection of media items.

*FIG. 9C*

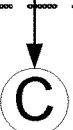

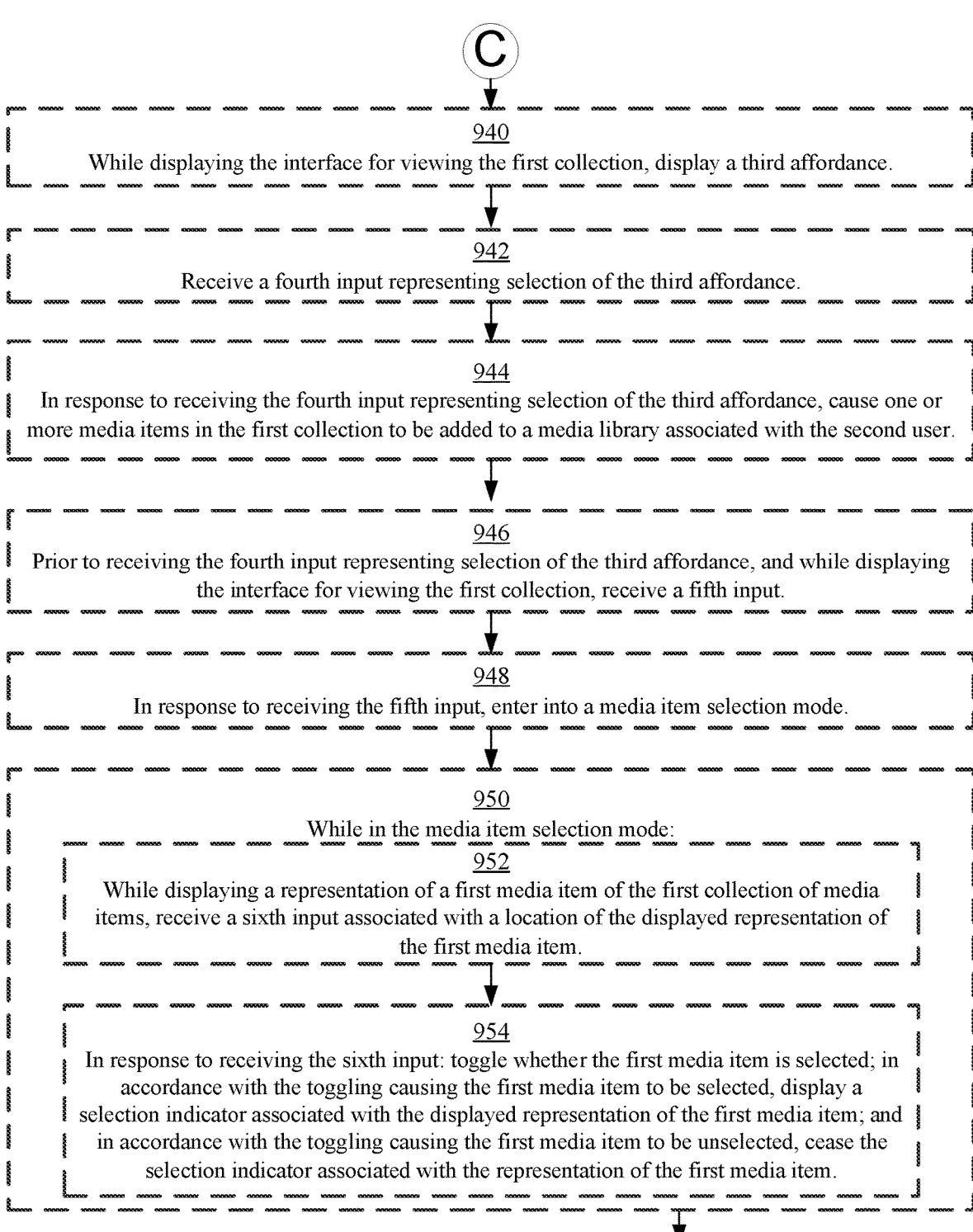

C

940
While displaying the interface for viewing the first collection, display a third affordance.

942
Receive a fourth input representing selection of the third affordance.

944
In response to receiving the fourth input representing selection of the third affordance, cause one or more media items in the first collection to be added to a media library associated with the second user.

946
Prior to receiving the fourth input representing selection of the third affordance, and while displaying the interface for viewing the first collection, receive a fifth input.

948
In response to receiving the fifth input, enter into a media item selection mode.

950
While in the media item selection mode:

952
While displaying a representation of a first media item of the first collection of media items, receive a sixth input associated with a location of the displayed representation of the first media item.

954
In response to receiving the sixth input: toggle whether the first media item is selected; in accordance with the toggling causing the first media item to be selected, display a selection indicator associated with the displayed representation of the first media item; and in accordance with the toggling causing the first media item to be unselected, cease the selection indicator associated with the representation of the first media item.

956

In accordance with a determination that the sixth input is a first gesture: toggle whether the first media item is selected; in accordance with the toggling causing the first media item to be selected, display the selection indicator associated with the displayed representation of the first media item; and in accordance with the toggling causing the first media item to be unselected, cease to display the selection indicator associated with the representation of the first media item.

958

In accordance with a determination that the sixth input is a second gesture, different than the first gesture: display a one-up view of the first media item without toggling whether the first media item is selected.

960

Displaying the representation of the first media item of the first collection of media items comprises displaying a one-up view of the first media item, wherein the sixth input is received while displaying the one-up view of the first media item.

962

While in the media item selection mode, receive input that defines a user-selected set of media items in the first collection of media items, wherein the user-selected set of media items in the first collection includes fewer than all media items in the first collection.

964

Subsequent to receiving the input that defines the user-selected set of media items in the first collection, receive the fourth input representing selection of the third affordance.

966

In response to receiving the fourth input representing selection of the third affordance, cause the user-selected set of media items in the first collection to be added to a media library associated with the second user without causing media items in the first collection that are not included in the user-selected set of media items to be added to the media library associated with the second user.

*FIG. 9E*

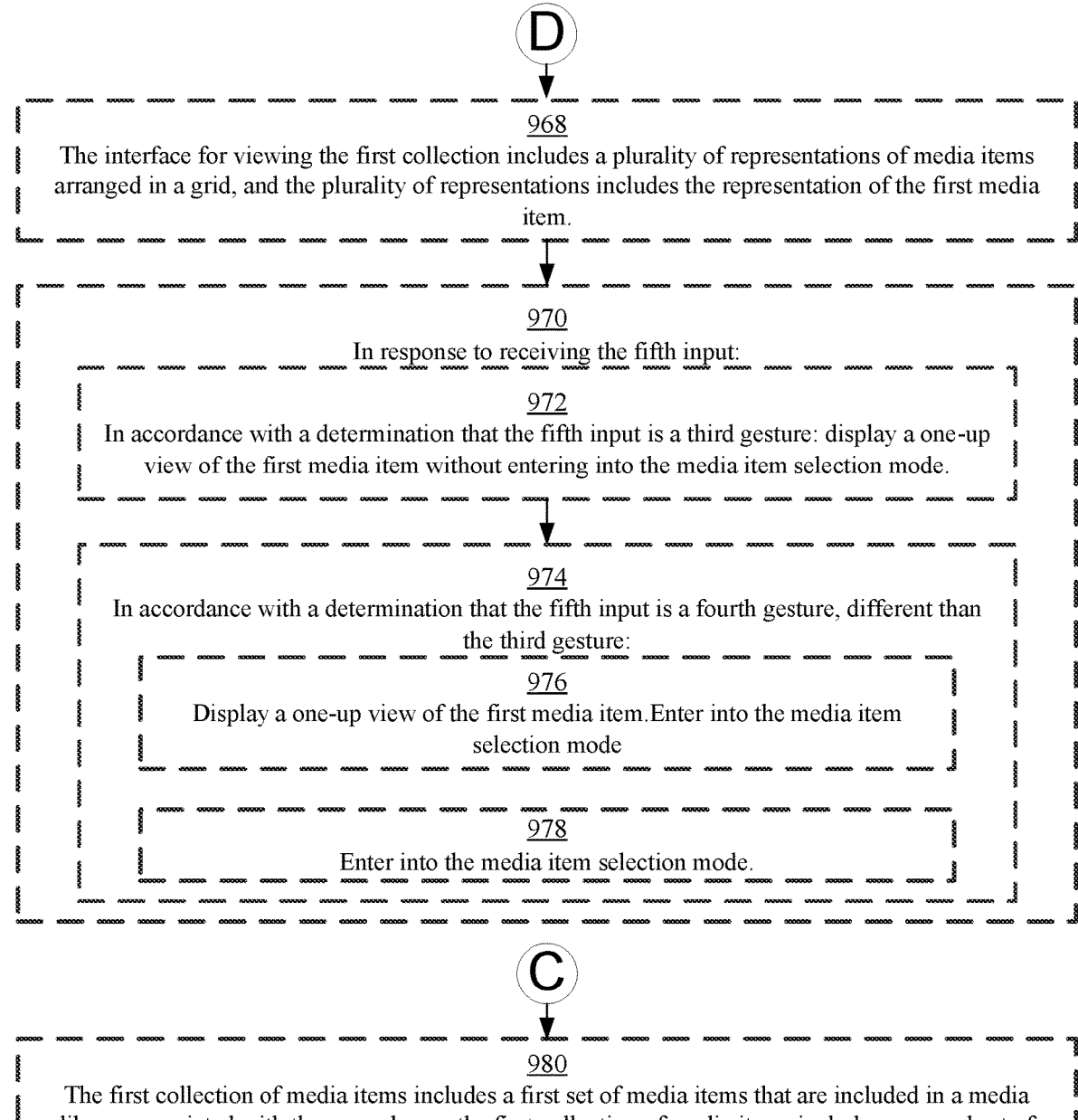

968

The interface for viewing the first collection includes a plurality of representations of media items arranged in a grid, and the plurality of representations includes the representation of the first media item.

970

In response to receiving the fifth input:

972

In accordance with a determination that the fifth input is a third gesture: display a one-up view of the first media item without entering into the media item selection mode.

974

In accordance with a determination that the fifth input is a fourth gesture, different than the third gesture:

976

Display a one-up view of the first media item. Enter into the media item selection mode

978

Enter into the media item selection mode.

980

The first collection of media items includes a first set of media items that are included in a media library associated with the second user, the first collection of media items includes a second set of media items that are not included in the media library associated with the second user, and displaying the interface for viewing the first collection that includes a depiction of at least a portion of the first collection of media items comprises: displaying representations of the first set of media items that are not included in the media library associated with the second user without displaying representations of the second set of media items that are included in the media library associated with the second user.

*FIG. 9F*

USER INTERFACES FOR SHARING CONTEXTUALLY RELEVANT MEDIA CONTENT

CROSS-REFERENCE TO RELATED APPLICATIONS

This application is a continuation of U.S. Nonprovisional application Ser. No. 16/145,033, entitled "USER INTER-FACES FOR SHARING CONTEXTUALLY RELEVANT MEDIA CONTENT", filed Sep. 27, 2018, which claims priority to U.S. Provisional Application No. 62/668,018, entitled "USER INTERFACES FOR SHARING CONTEX-TUALLY RELEVANT MEDIA CONTENT", filed May 7, 2018, the entire contents of which are hereby incorporated by reference.

FIELD

The present disclosure relates generally to computer user interfaces, and more specifically to techniques for viewing and sharing relevant media items.

BACKGROUND

The size of user media libraries continues to grow, along with the amount of media sharing between device users. As such, devices are increasingly expected to have thought-fully-designed user interfaces for handling such activity.

BRIEF SUMMARY

Some techniques for viewing and sharing relevant media items using electronic devices, however, are generally cum-bersome and inefficient. For example, some existing tech-niques use a complex and time-consuming user interface, which may include multiple key presses or keystrokes. Existing techniques require more time than necessary, wast-ing user time and device energy. This latter consideration is particularly important in battery-operated devices.

Accordingly, the present technique provides electronic devices with faster, more efficient methods and interfaces for viewing and sharing relevant media items. Such methods and interfaces optionally complement or replace other meth-ods for viewing and sharing relevant media items. Such methods and interfaces reduce the cognitive burden on a user and produce a more efficient human-machine interface. For battery-operated computing devices, such methods and interfaces conserve power and increase the time between battery charges. Further, such methods and interfaces reduce the number of unnecessary, extraneous, or repetitive inputs by a user.

In accordance with some embodiments, a method is performed at a device with a display and one or more input devices. The method comprises: receiving, via the one or more input devices, a first input; in response to receiving the first input, displaying, on the display, a suggested collection of media items for sharing with a recipient, wherein the suggested collection is relevant to a message conversation with the recipient; subsequent to displaying the suggested collection of media items, receiving, via the one or more input devices, a second input representing a request to transmit at least a portion of the suggested collection of media items to the recipient; and in response to receiving the second input, transmitting a message to the recipient as part of the message conversation that provides access to the at least a portion of the suggested collection of media items.

In accordance with some embodiments, a non-transitory computer-readable storage medium is described. The non-transitory computer-readable storage medium stores one or more programs configured to be executed by one or more processors of an electronic device with a display and one or more input devices, the one or more programs including instructions for: receiving, via the one or more input devices, a first input; in response to receiving the first input, display-ing, on the display, a suggested collection of media items for sharing with a recipient, wherein the suggested collection is relevant to a message conversation with the recipient; sub-sequent to displaying the suggested collection of media items, receiving, via the one or more input devices, a second input representing a request to transmit at least a portion of the suggested collection of media items to the recipient; and in response to receiving the second input, transmitting a message to the recipient as part of the message conversation that provides access to the at least a portion of the suggested collection of media items.

In accordance with some embodiments, an electronic device is described. The electronic device comprises: a display; one or more input devices; one or more processors; and memory storing one or more programs configured to be executed by the one or more processors, the one or more programs including instructions for: receiving, via the one or more input devices, a first input; in response to receiving the first input, displaying, on the display, a suggested collection of media items for sharing with a recipient, wherein the suggested collection is relevant to a message conversation with the recipient; subsequent to displaying the suggested collection of media items, receiving, via the one or more input devices, a second input representing a request to transmit at least a portion of the suggested collection of media items to the recipient; and in response to receiving the second input, transmitting a message to the recipient as part of the message conversation that provides access to the at least a portion of the suggested collection of media items.

In accordance with some embodiments, an electronic device is described. The electronic device comprises: a display; one or more input devices; means for receiving, via the one or more input devices, a first input; means for, responsive to receiving the first input, displaying, on the display, a suggested collection of media items for sharing with a recipient, wherein the suggested collection is relevant to a message conversation with the recipient; means for, subsequent to displaying the suggested collection of media items, receiving, via the one or more input devices, a second input representing a request to transmit at least a portion of the suggested collection of media items to the recipient; and means for, responsive to receiving the second input, trans-mitting a message to the recipient as part of the message conversation that provides access to the at least a portion of the suggested collection of media items.

In accordance with some embodiments, a transitory com-puter-readable storage medium is described. The transitory computer-readable storage medium stores one or more pro-grams configured to be executed by one or more processors of an electronic device with a display and one or more input devices, the one or more programs including instructions for: receiving, via the one or more input devices, a first input; in response to receiving the first input, displaying, on the display, a suggested collection of media items for sharing with a recipient, wherein the suggested collection is relevant to a message conversation with the recipient; subsequent to displaying the suggested collection of media items, receiv-ing, via the one or more input devices, a second input representing a request to transmit at least a portion of the suggested collection of media items to the recipient; and in response to receiving the second input, transmitting a message to the recipient as part of the message conversation that provides access to the at least a portion of the suggested collection of media items.

In accordance with some embodiments, a method is performed at a device with a display and one or more input devices. The method comprises: receiving an indication, from an external device, that a first user has shared a first collection of media items with a second user; subsequent to receiving the indication that the first user has shared the first collection of media items with the second user, outputting a prompt to share, with the first user, one or more suggested media items associated with the second user that are related to the first collection of media items based on a context, wherein: the context is determined based on the first collection of media items, and the one or more suggested media items are not included in the first collection.

In accordance with some embodiments, a non-transitory computer-readable storage medium is described. The non-transitory computer-readable storage medium stores one or more programs configured to be executed by one or more processors of an electronic device with a display and one or more input devices, the one or more programs including instructions for: receiving an indication, from an external device, that a first user has shared a first collection of media items with a second user; subsequent to receiving the indication that the first user has shared the first collection of media items with the second user, outputting a prompt to share, with the first user, one or more suggested media items associated with the second user that are related to the first collection of media items based on a context, wherein: the context is determined based on the first collection of media items, and the one or more suggested media items are not included in the first collection.

In accordance with some embodiments, an electronic device is described. The electronic device comprises: a display; one or more input devices; one or more processors; and memory storing one or more programs configured to be executed by the one or more processors, the one or more programs including instructions for: receiving an indication, from an external device, that a first user has shared a first collection of media items with a second user; subsequent to receiving the indication that the first user has shared the first collection of media items with the second user, outputting a prompt to share, with the first user, one or more suggested media items associated with the second user that are related to the first collection of media items based on a context, wherein: the context is determined based on the first collection of media items, and the one or more suggested media items are not included in the first collection.

In accordance with some embodiments, an electronic device is described. The electronic device comprises: a display; one or more input devices; means for receiving an indication, from an external device, that a first user has shared a first collection of media items with a second user; means for subsequent to receiving the indication that the first user has shared the first collection of media items with the second user, outputting a prompt to share, with the first user, one or more suggested media items associated with the second user that are related to the first collection of media items based on a context, wherein: the context is determined based on the first collection of media items, and the one or more suggested media items are not included in the first collection.

In accordance with some embodiments, a transitory computer-readable storage medium is described. The transitory computer-readable storage medium stores one or more programs configured to be executed by one or more processors of an electronic device with a display and one or more input devices, the one or more programs including instructions for: receiving an indication, from an external device, that a first user has shared a first collection of media items with a second user; subsequent to receiving the indication that the first user has shared the first collection of media items with the second user, outputting a prompt to share, with the first user, one or more suggested media items associated with the second user that are related to the first collection of media items based on a context, wherein: the context is determined based on the first collection of media items, and the one or more suggested media items are not included in the first collection.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for viewing and sharing relevant media items, thereby increasing the effectiveness, efficiency, and user satisfaction with such devices. Such methods and interfaces may complement or replace other methods for viewing and sharing relevant media items.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIGS. 7A-7J is a flow diagram illustrating a process for viewing and sharing relevant media items in accordance with some embodiments.

FIGS. 9A-9G is a flow diagram illustrating a process for viewing and sharing relevant media items in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for viewing and sharing relevant media items. For example, there is a need for electronic devices that provide quick and easy access to relevant sharing suggestions, and improved interfaces for interacting with the media of the sharing suggestion. Further, there is a need for devices that provide improved interfaces for managing and saving received shared media. Such techniques can reduce the cognitive burden on a user who accesses media items for sharing, thereby enhancing productivity. Further, such techniques can reduce processor and battery power otherwise wasted on redundant user inputs.

Figure 8A:
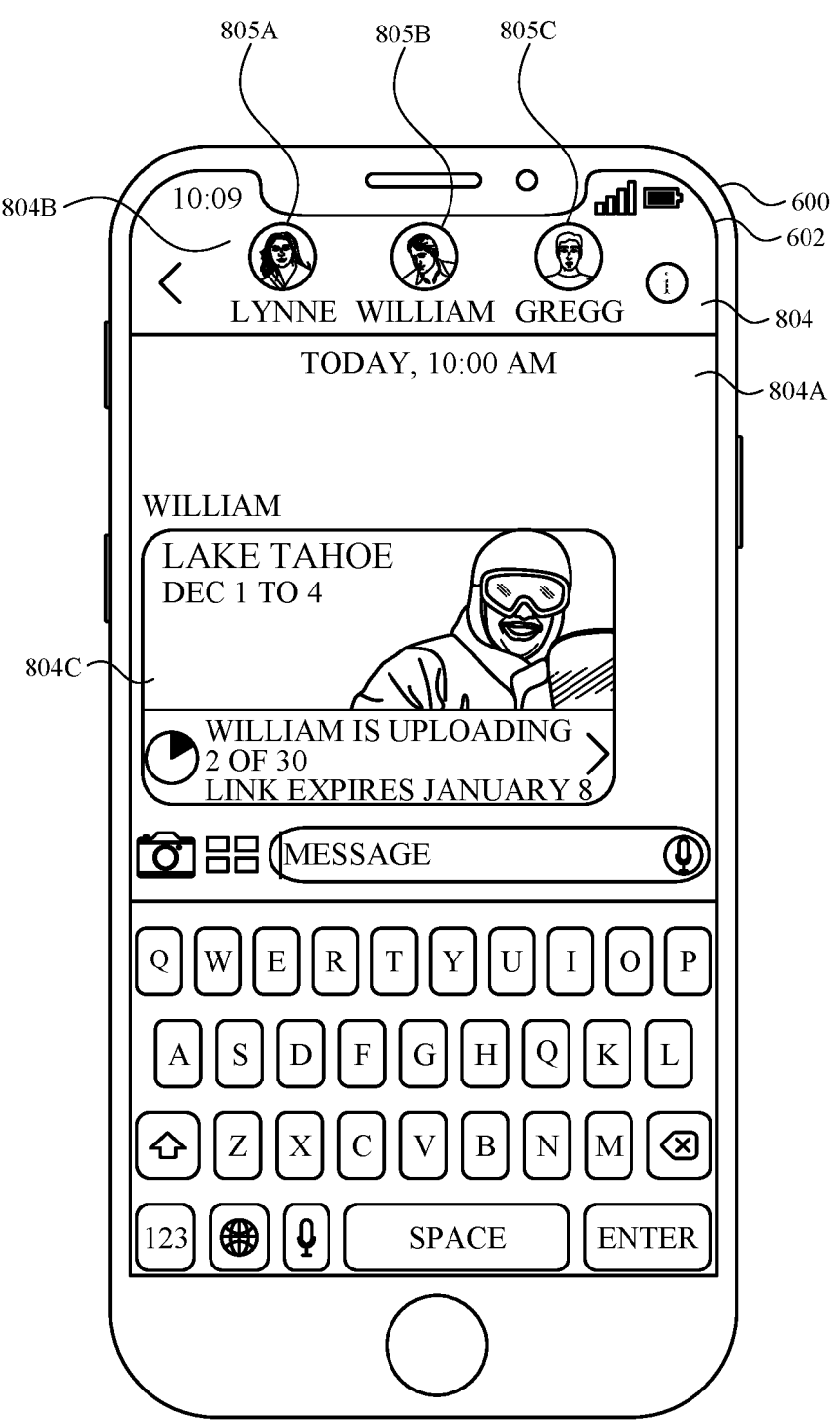
FIGS. 8A-8AQ illustrate exemplary techniques and interfaces for viewing and sharing relevant media items in accordance with some embodiments.

Below, FIGS. 1A-1B, 2, 3, 4A-4B, and 5A-5H provide a description of exemplary devices for performing the techniques for viewing and sharing relevant media items. FIGS. 6A-6AAC illustrate exemplary user interfaces for viewing and sharing relevant media items. FIGS. 7A-7J is a flow diagram illustrating methods of viewing and sharing relevant media items in accordance with some embodiments. The user interfaces in FIGS. 6A-6AAC are used to illustrate the processes described below, including the processes in FIGS. 7A-7J. FIGS. 8A-8AQ illustrate exemplary user interfaces for viewing and sharing relevant media items. FIGS. 9A-9G is a flow diagram illustrating methods of viewing and sharing relevant media items in accordance with some embodiments. The user interfaces in FIGS. 8A-8AQ are used to illustrate the processes described below, including the processes in FIGS. 9A-9G.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
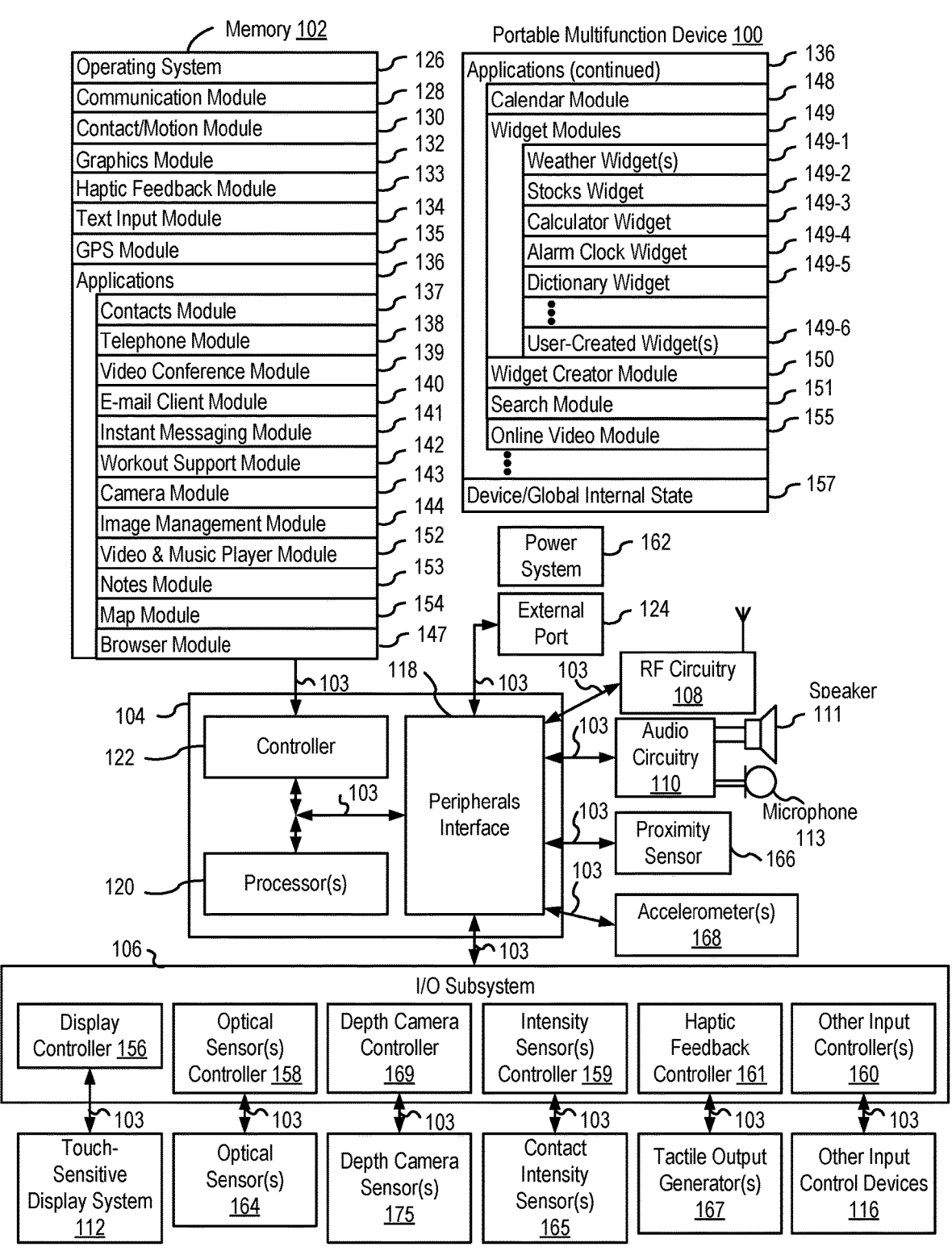
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser.

No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
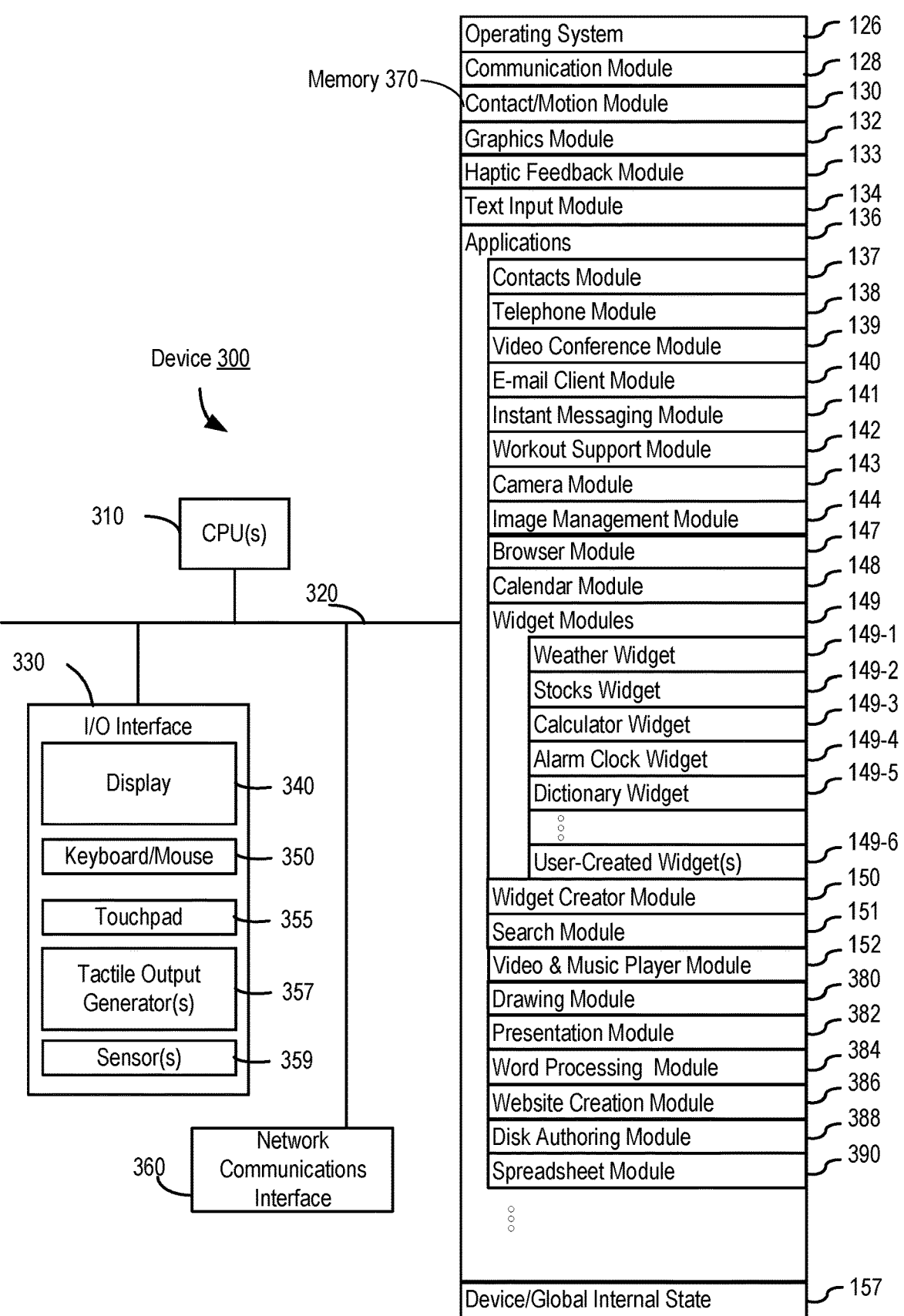
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
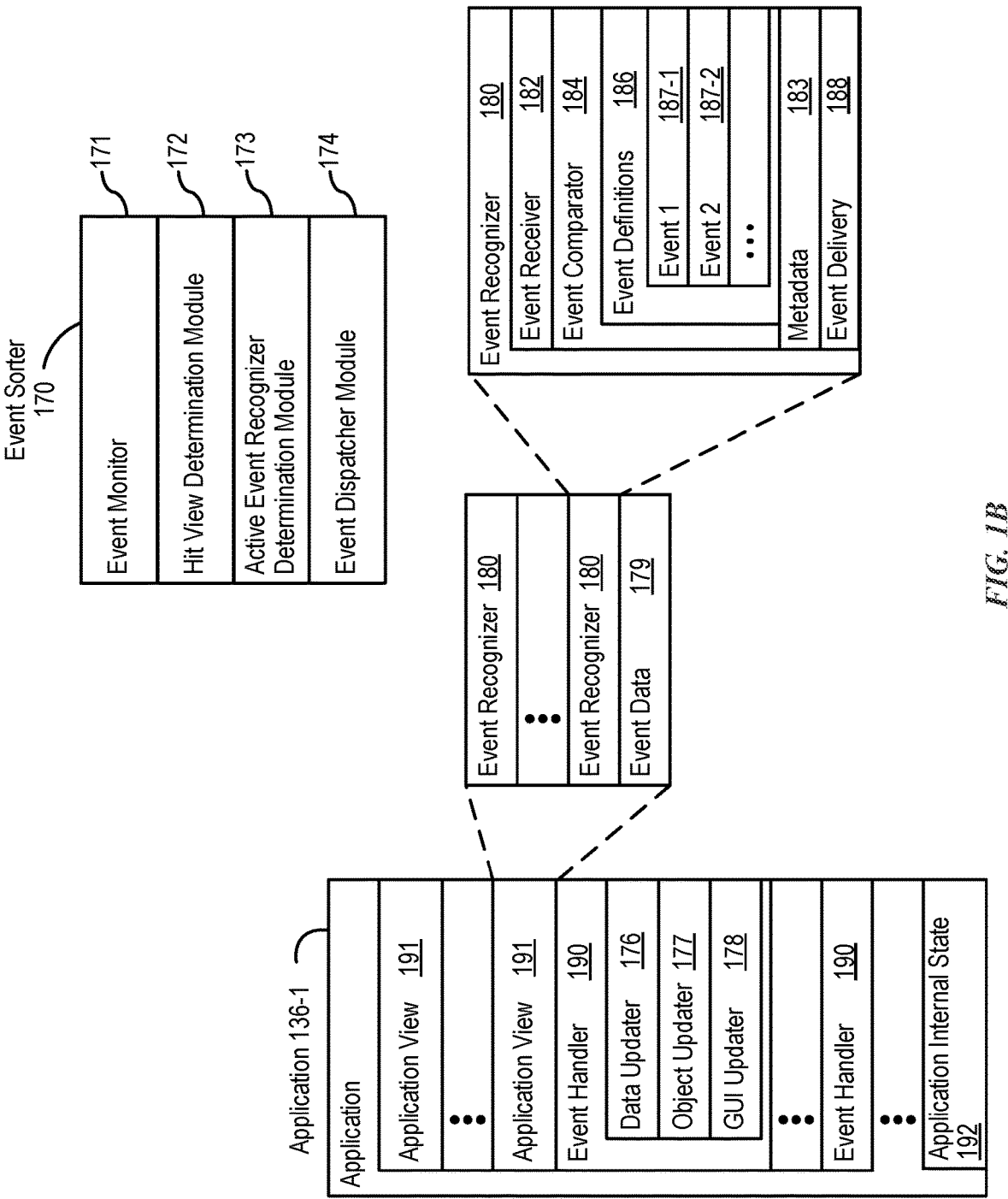
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions;

detected eye movements; biometric inputs; and/or any combination thereof are optionally utilized as inputs corresponding to sub-events which define an event to be recognized.

Figure 2:
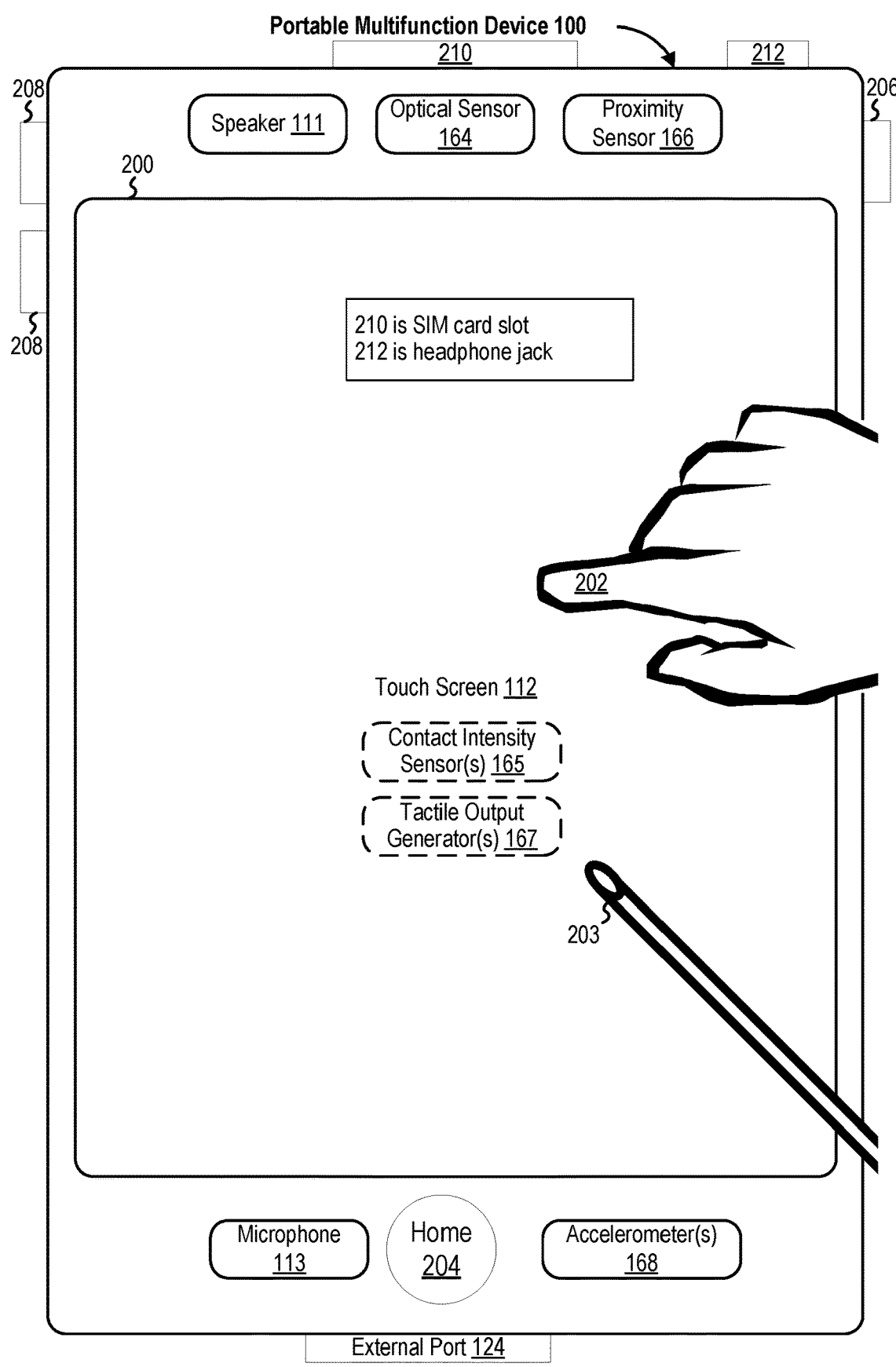
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
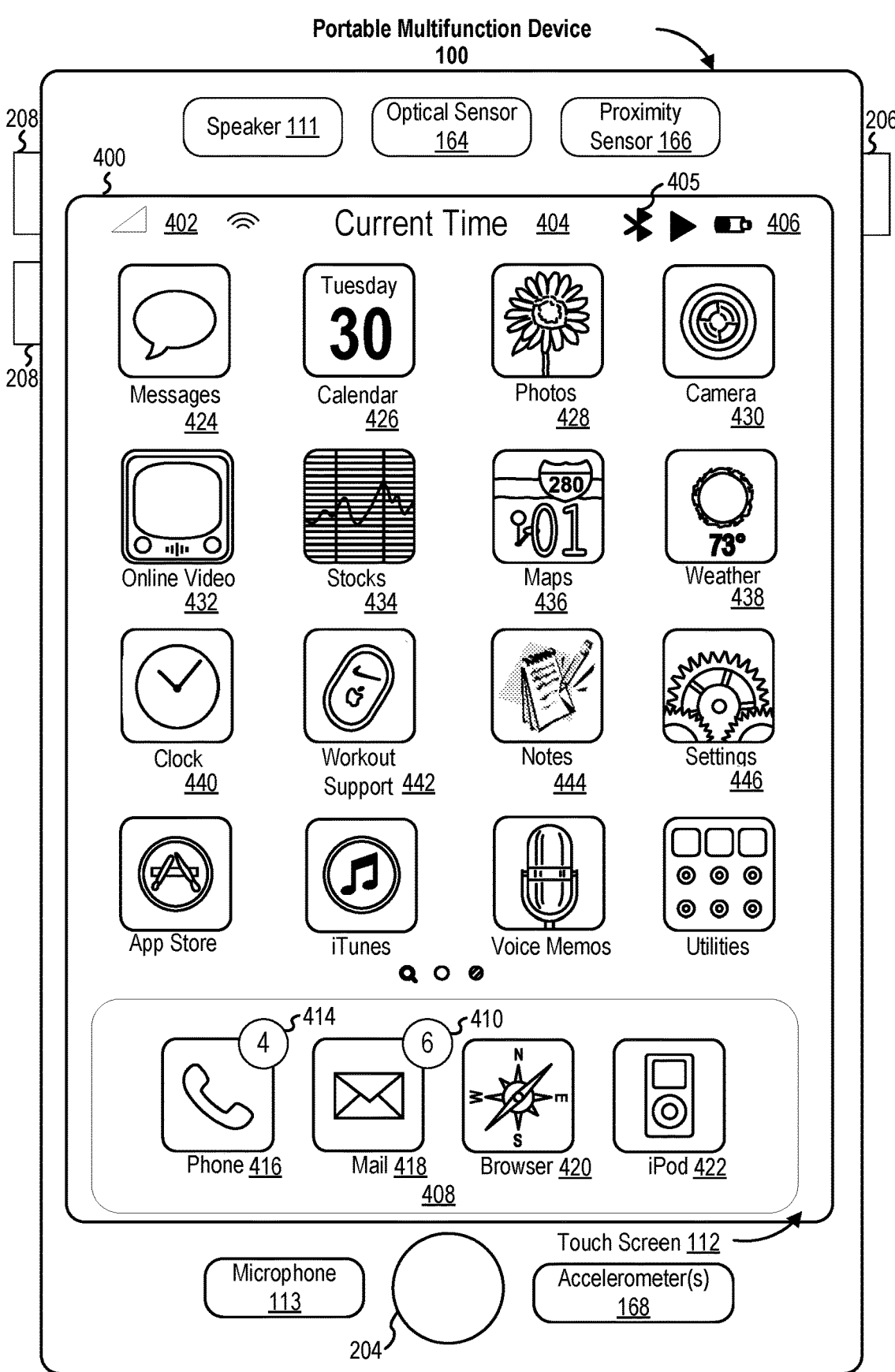
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
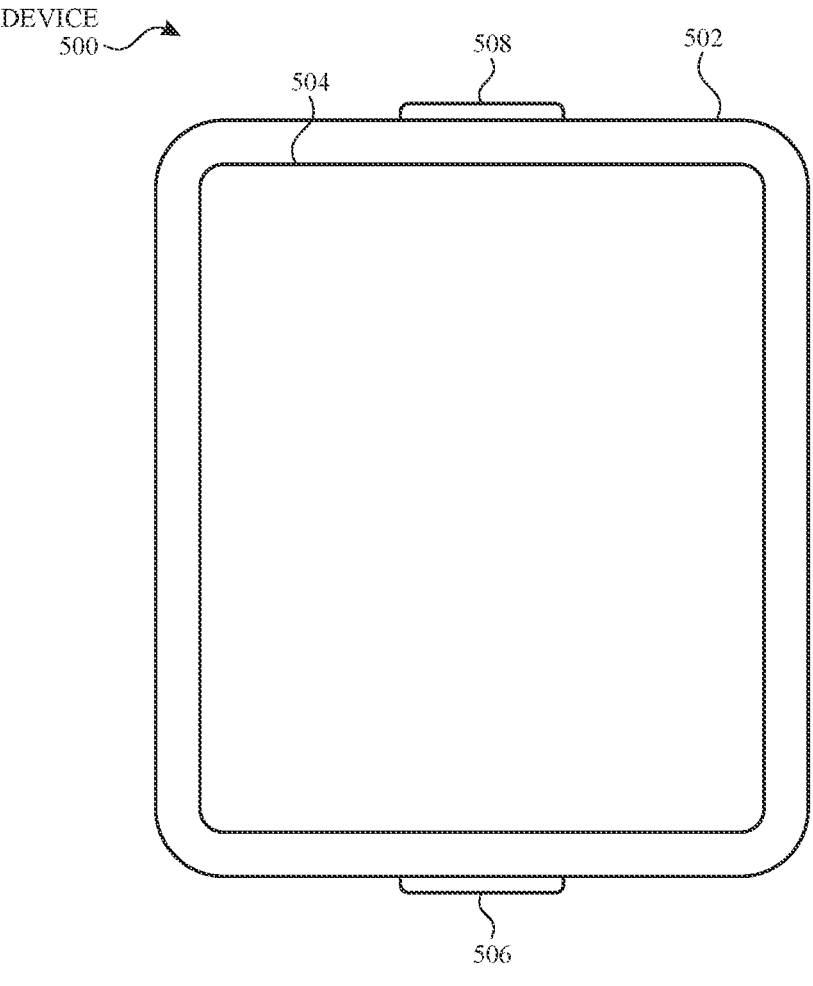
FIG. 5A illustrates a personal electronic device in accordance with some embodiments.
Figure 6A:
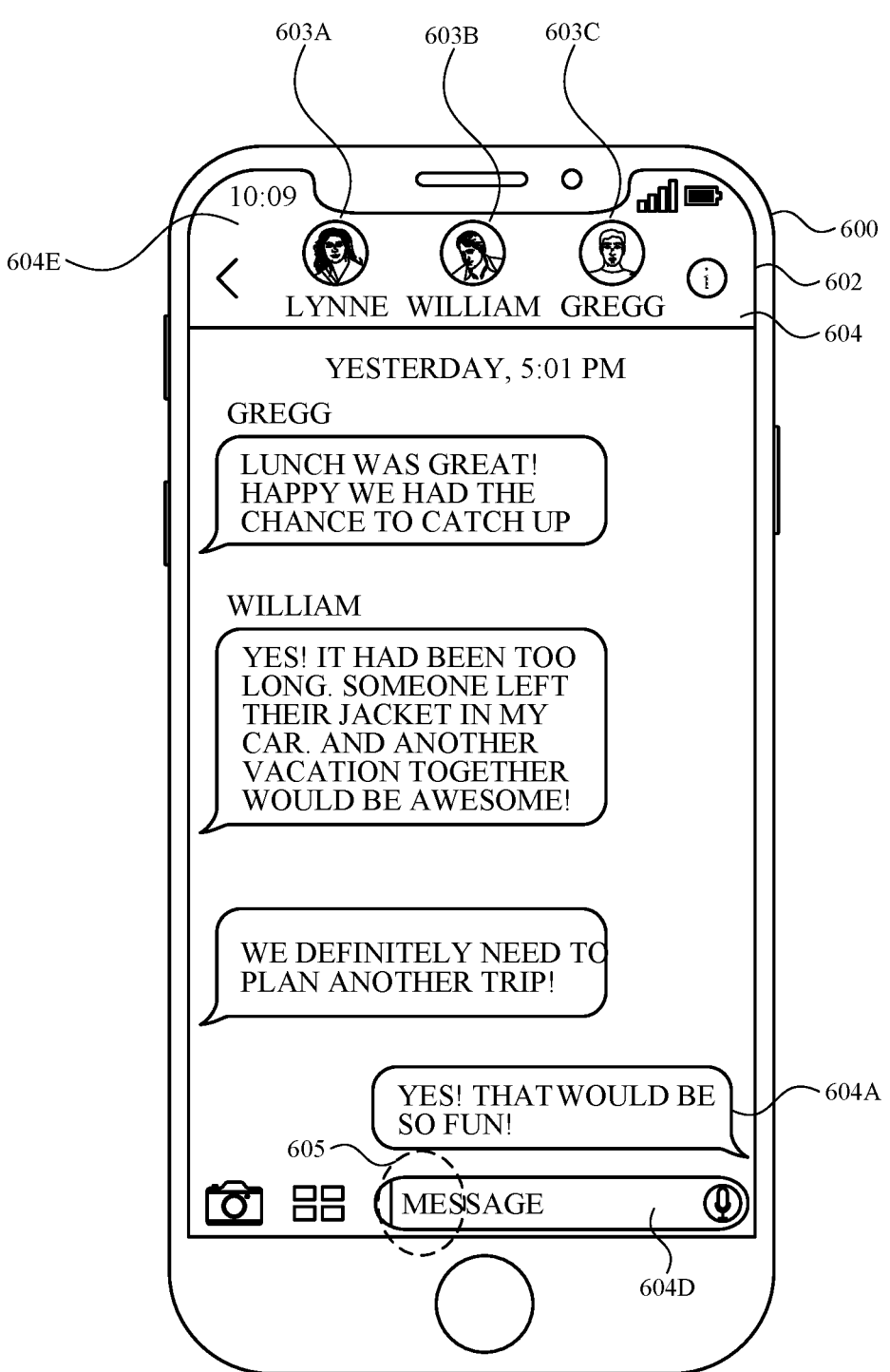
FIGS. 6A-6AAC illustrate exemplary techniques and interfaces for viewing and sharing relevant media items in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
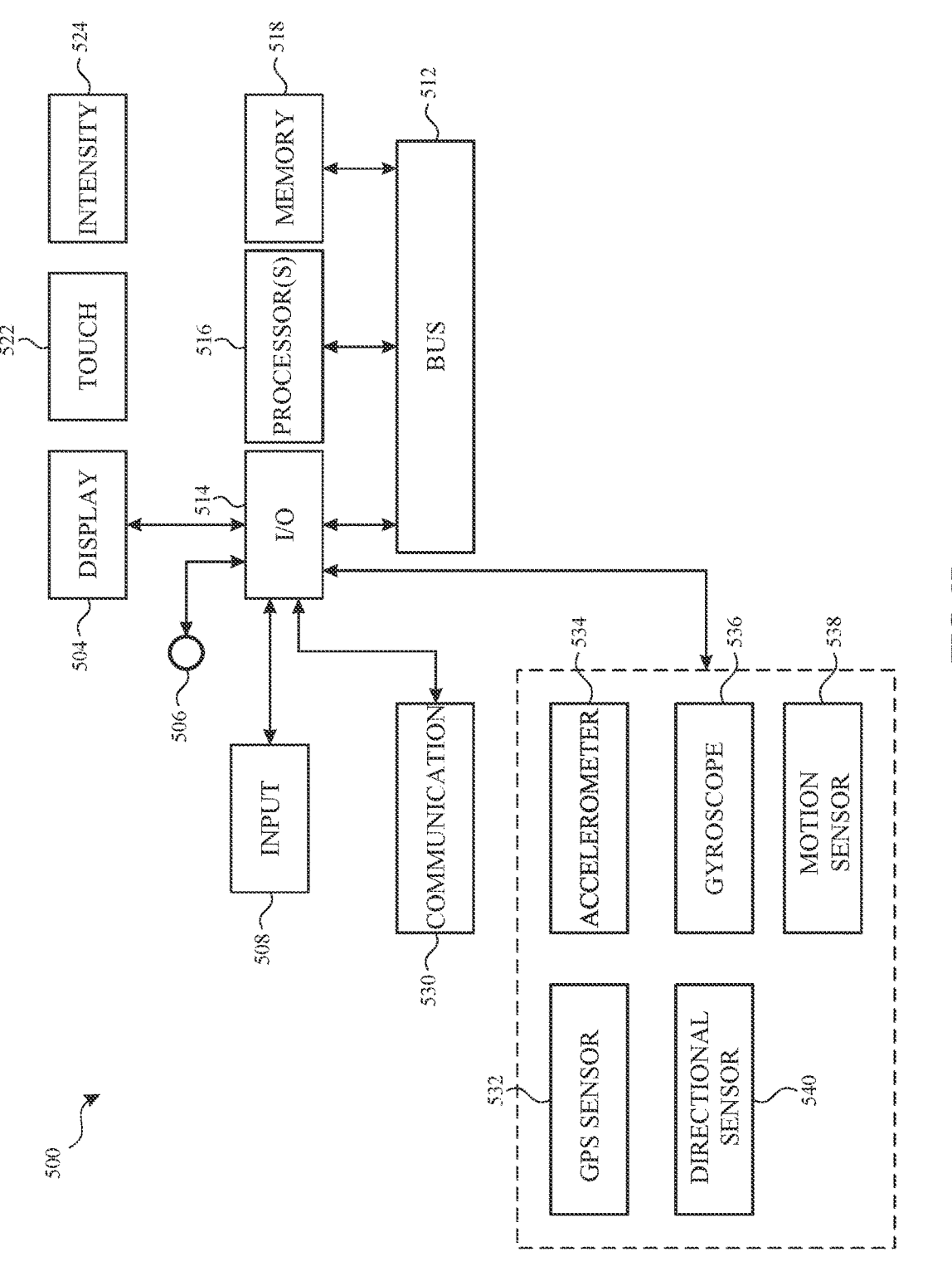
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A-7J and 9A-9G). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
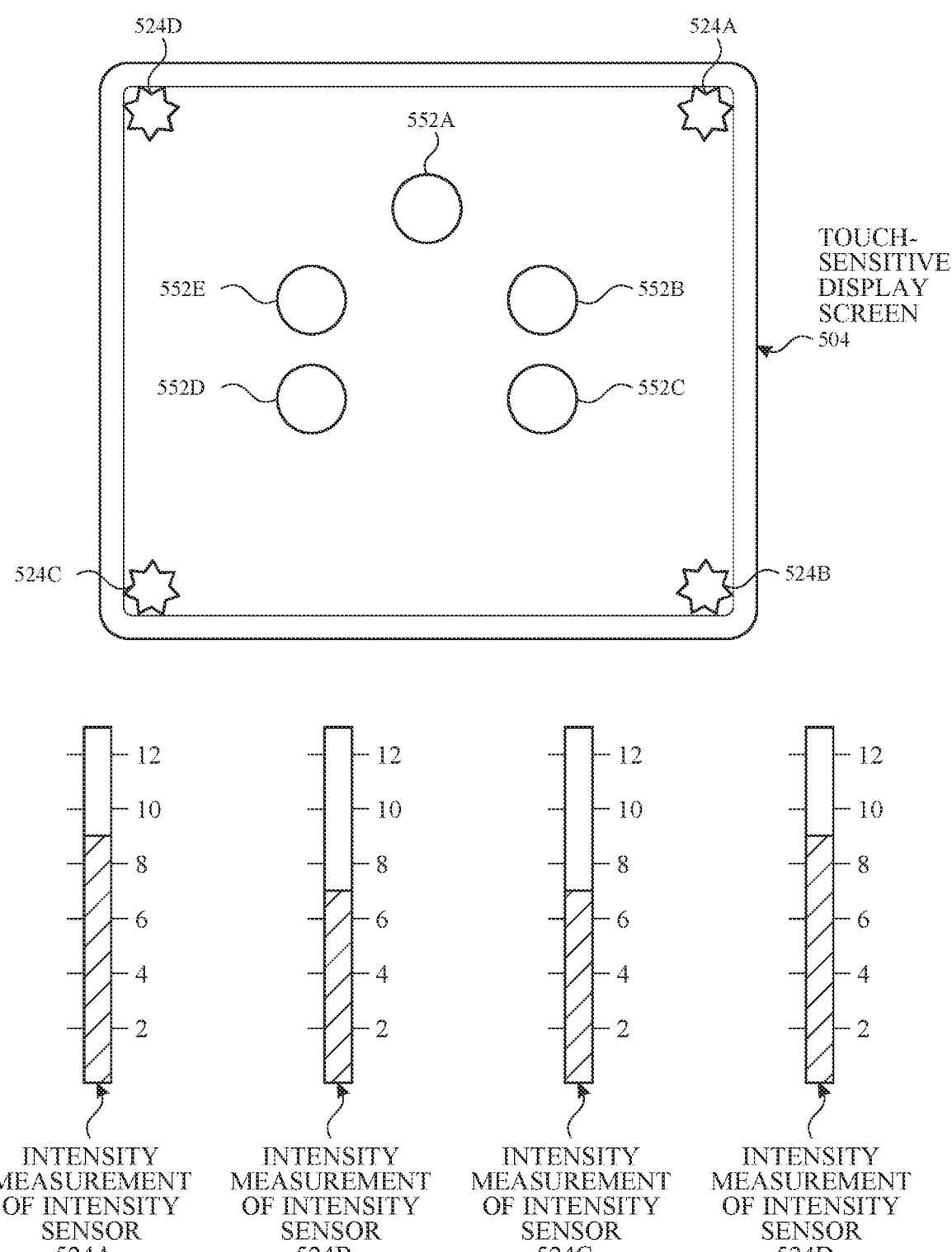
FIGS. 5C-5D illustrate exemplary components of a personal electronic device having a touch-sensitive display and intensity sensors in accordance with some embodiments.
Figure 5D:
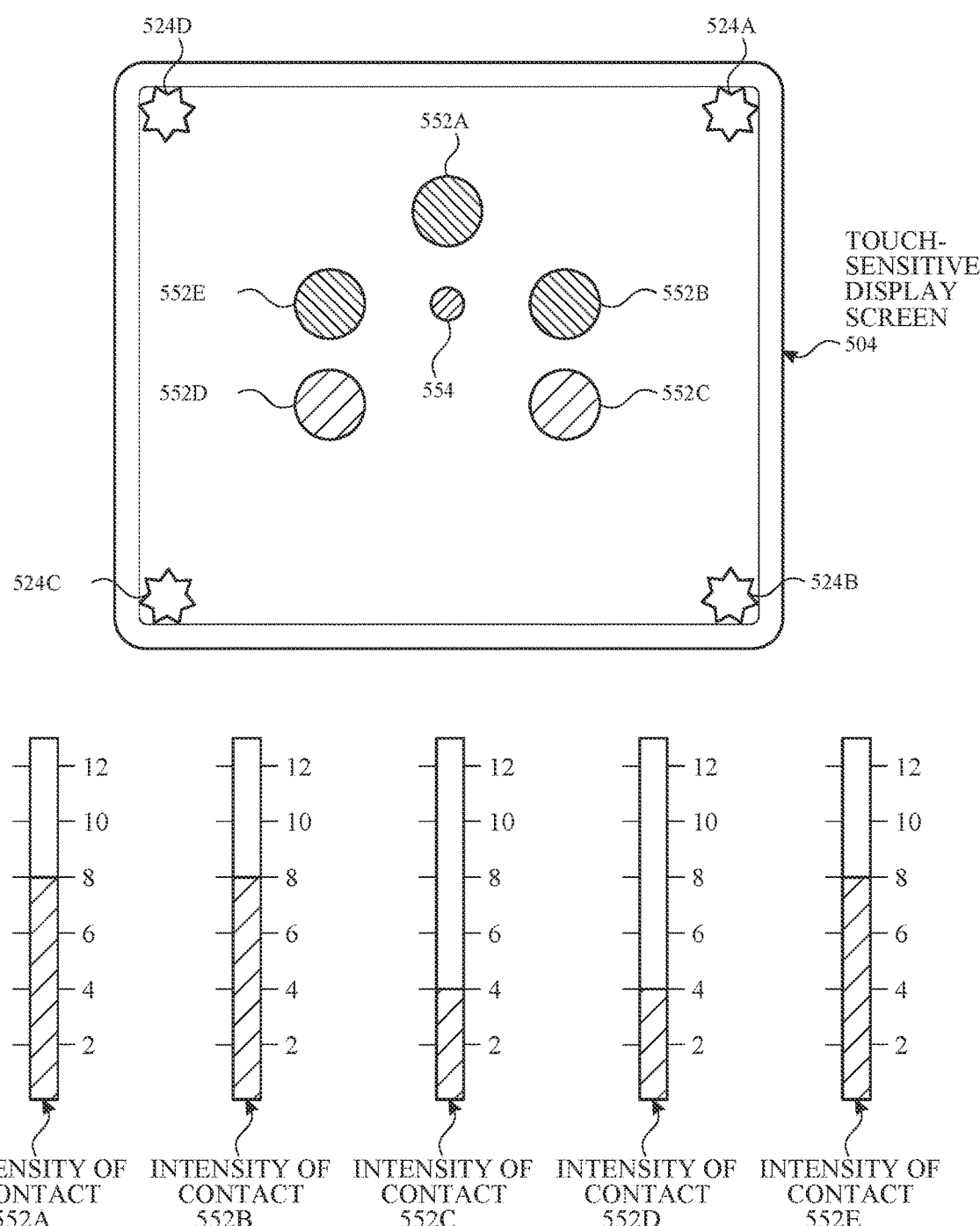

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
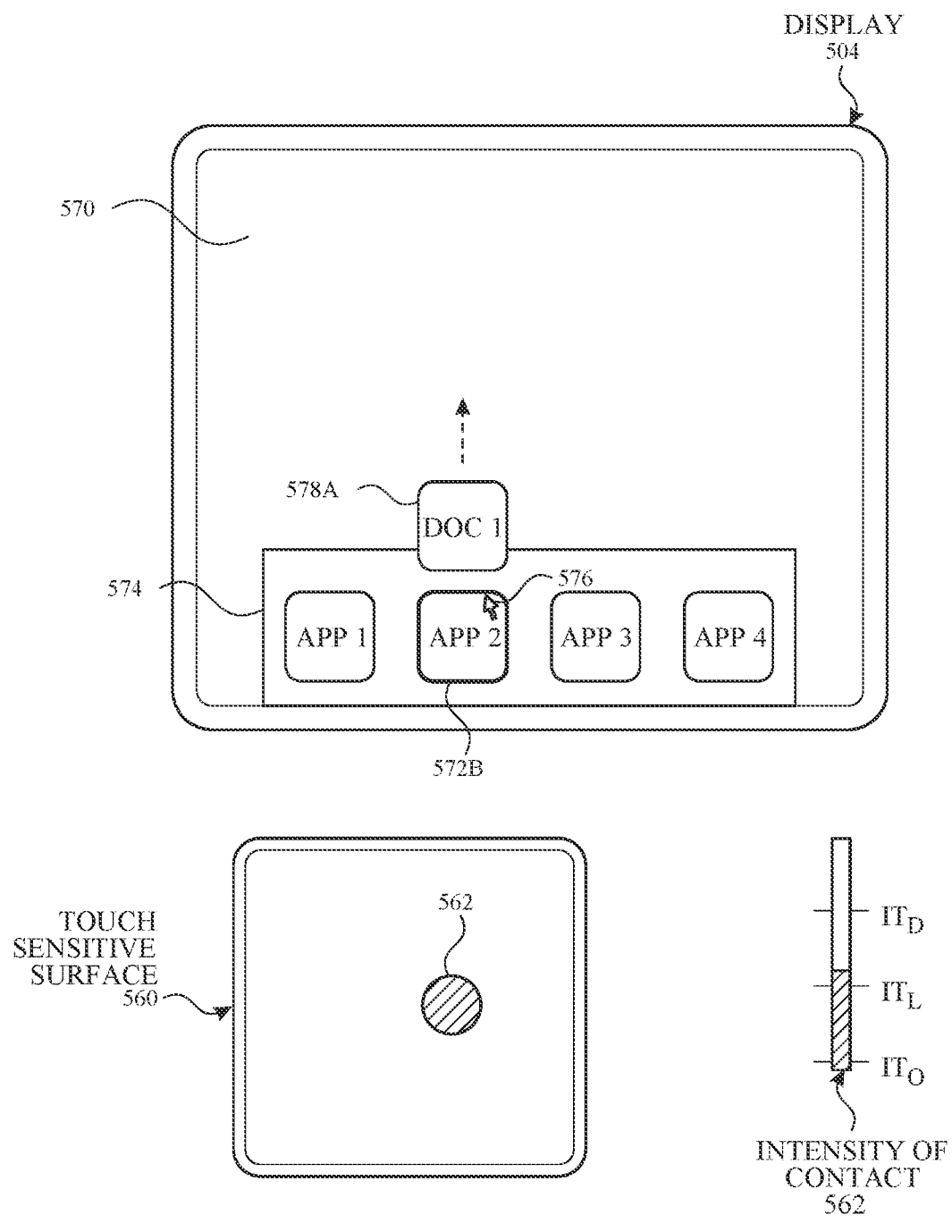
Figure 5G:
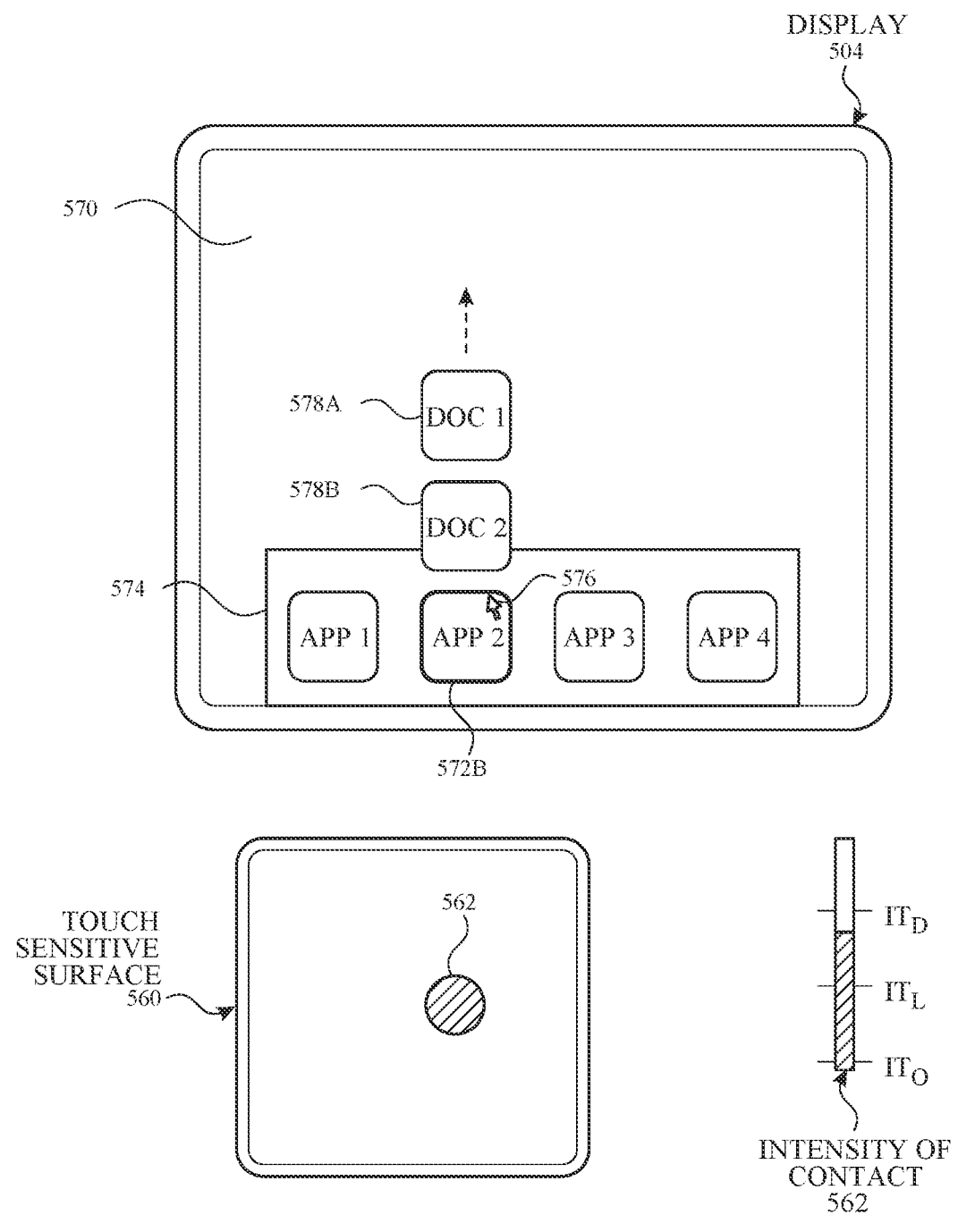
Figure 5H:
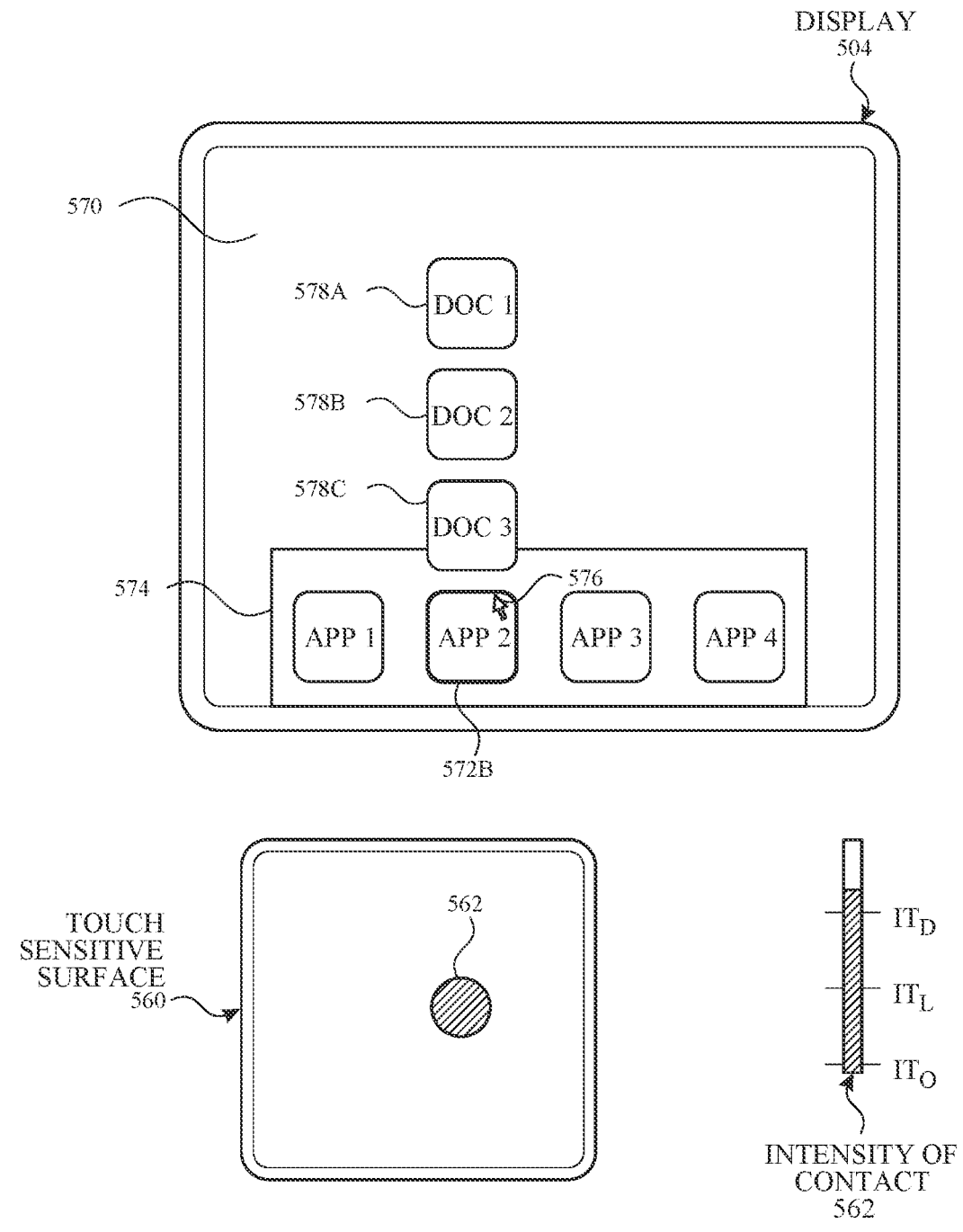

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

FIGS. 6A-6AAC illustrate exemplary user interfaces for sharing a suggested collection of media items, in accordance with some embodiments. The user interfaces in these figures are used to illustrate the processes described below, including the processes in FIGS. 7A-7J.

FIG. 6A illustrates an exemplary message interface 604, displayed on display 602 of electronic device 600. In some embodiments, device 600 includes one or more features of device 100, 300, or 500. In some embodiments, device 600 includes one or more input devices (e.g., a touch-screen display, a touch-screen surface). Message interface 604 is associated with a messaging application (e.g., executing on device 600). A messaging application, for example, is any application that can be used to send and/or receive electronic messages to a recipient. Exemplary electronic messages include messages sent using Short Message Service ("SMS"), Multimedia Messaging Service ("MMS"), and/or an internet-based messaging protocol (such as iMessage by Apple Inc. of Cupertino, CA).

In FIG. 6A, message interface 604 includes an exemplary transcript 604A representing a message conversation. In some embodiments, a transcript includes content (e.g., text, media, shared locations, or other data) that is shared between one or more parties to an electronic message conversation (also referred to herein as a message conversation). In the example shown in FIG. 6A, the conversation is between three parties, Lynne (e.g., user 603A), William (e.g., user 603B), and Gregg (e.g., user 603C), indicators for each of which are displayed in region 604E. The displayed transcript 604A includes messages aligned to the right side of the display, representing messages sent by the user of device 600 (in this example, user 603A named Lynne), and messages aligned on the left side of the display, representing message received by the user of device 600 (e.g., from either William or Gregg).

At FIG. 6A, device 600 receives user input 605, corresponding to selection of a text entry field 604D of message interface 604. In some embodiments, the device (e.g., 600) receives user input associated with the message interface, and in response displays one or more input affordances (e.g., a shown in FIGS. 6B and 6C, described below).

Figure 6B:
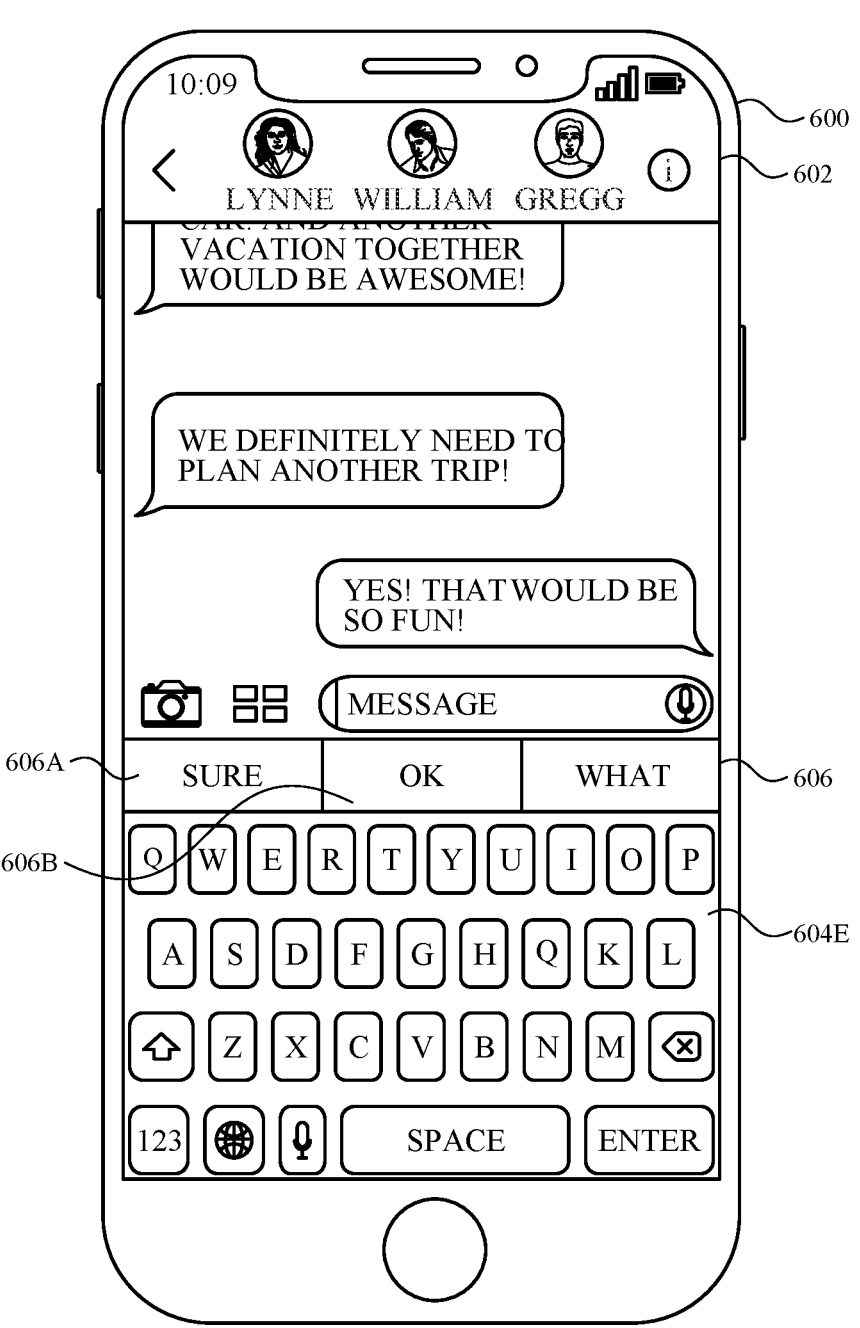

FIG. 6B illustrates message user interface 604 with several exemplary input affordances. In some embodiments, the one or more input affordances include one or more input suggestions for sharing content with the participants of the message conversation. For example, FIG. 6B illustrates message interface 604 with sharing suggestion region 606 displayed, which includes input suggestion 606A (suggesting the input of text "Sure") and input suggestion 606B (suggesting the input of text "OK"). In this example, input suggestions 606A and 606B are affordances, that in response to selection, cause device 600 to insert a pre-selected phrase into a message conversation (e.g., selection of 606B causes device 600 to insert the text "OK" into the transcript 604A or the text entry field 604D).

In some embodiments, the one or more input affordances include a keyboard (e.g., 604D). For example, keyboard 604E shown in FIG. 6B can be used to insert text, emoji, or dictation content into the transcript of the conversation.

Figure 6C:
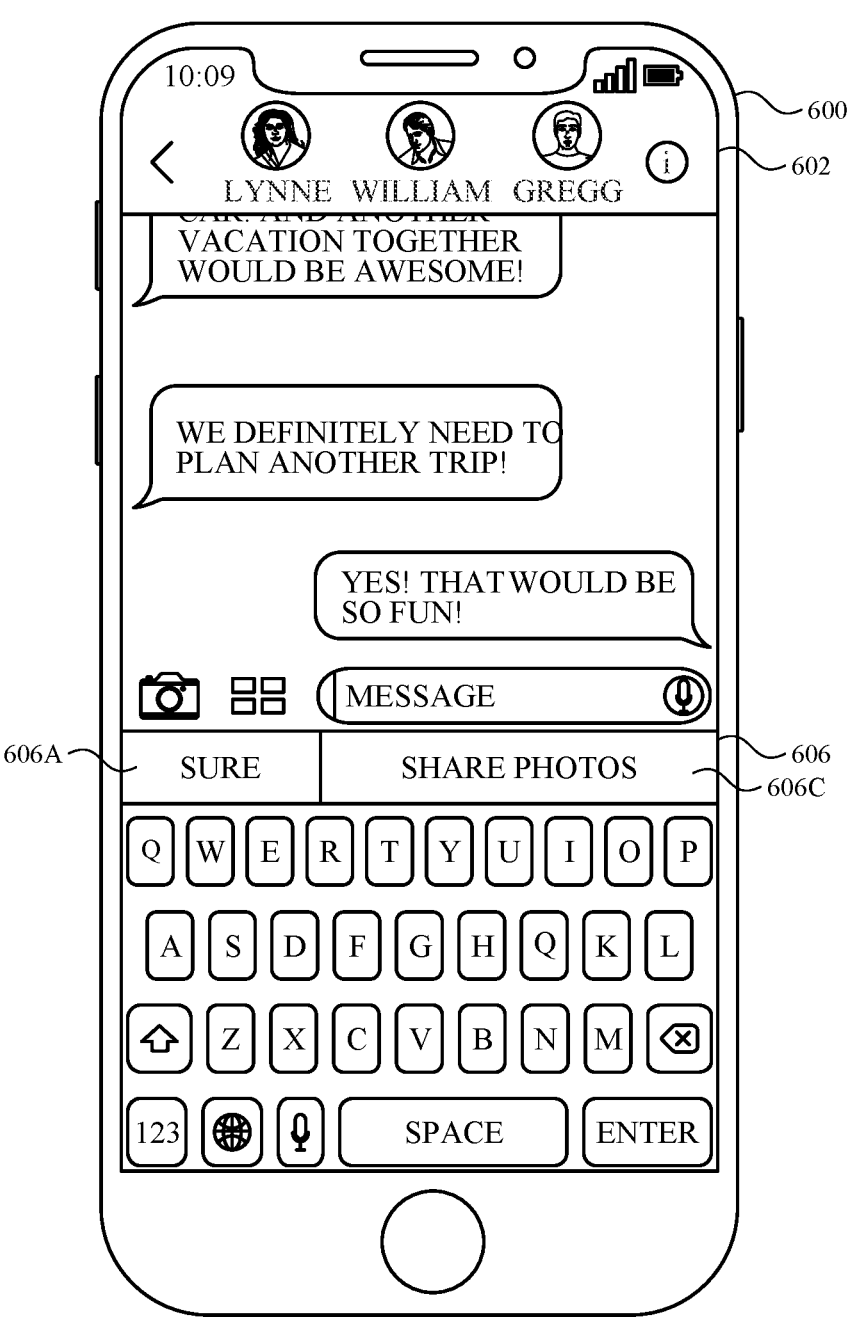

FIG. 6C illustrates an exemplary message interface 604 where an input suggestion has been replaced with an input suggestion to share media content. In some embodiments, the device (e.g., 600) displays an input suggestion that suggests sharing of media content (e.g., a collection of one or more media items). For example, as shown in FIG. 6C, device 600 has replaced display of input suggestion 606B with an exemplary input suggestion 606C. Input suggestion 606C includes the text "Share Photos", and represents a quick and easy way to access interfaces for sharing suggested media items with the participants of the current conversation, described in more detail below (e.g., with respect to FIG. 6E).

In some embodiments, the suggestion is based on (e.g., one or more) participants in the conversation. For example, device 600 displays input suggestion 606B because there are media items (e.g., in a media library associated with device 600) that include depictions of the participants (e.g., users 603A, 603B, and/or 603C) of the conversation represented by transcript 604A. For example, device 600 displays input suggestion 606B because there are media items (e.g., in a media library associated with device 600) associated with an event known to have been attended by the participants (e.g., users 603A, 603B, and/or 603C) of the conversation represented by transcript 604A. Thus, in the example shown in FIG. 6C, device 600 displays input suggestion 606C prompting the user to share photos because the user has media items (e.g., photos and/or videos) in their media library that would be appropriate to share with the participants of the current conversation. The basis for suggestions, and for suggesting particular media items, are discussed in more detail below.

Figure 6D:
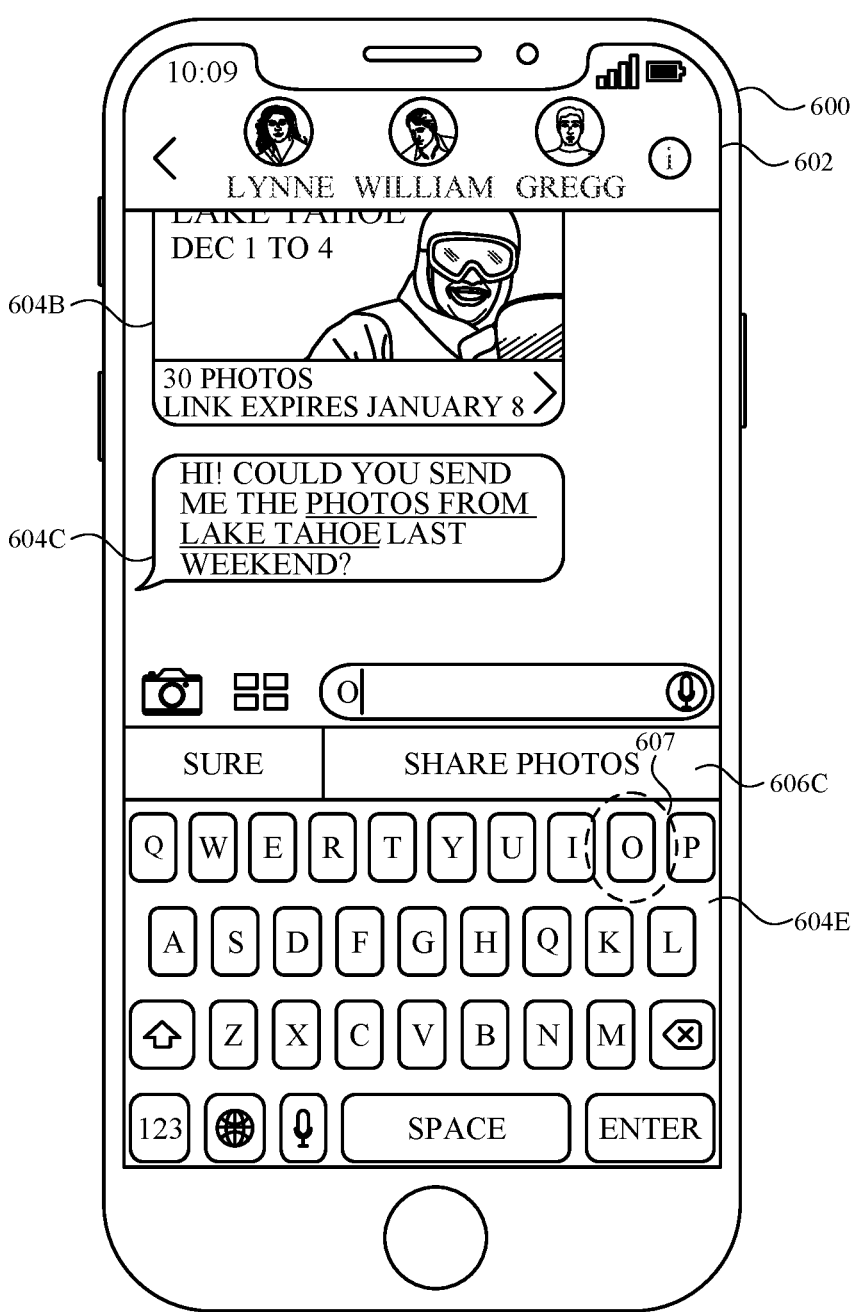

FIG. 6D illustrates an exemplary message interface after receiving one or more messages from a recipient (e.g., user 603B). As shown in FIG. 6D, William (user 603B) has added content 604B into the transcript (e.g., which is received by device 600), representing a collection of media items (e.g., one or more media items) that has been shared with the other participants in the current message conversation, Lynne (user 603A) and Gregg (user 603C) in this example. In some embodiments, an input suggestion (e.g., 606C) is displayed based on media content in the transcript (e.g., 604A). For example, input suggestion 606C is displayed because William (user 603B) shared some media related to media that exists in a media library of the user (603A) of device 600. In some embodiments, an input suggestion (e.g., 606C) is displayed in response to receiving media content that has been shared with the device (e.g., 600) (e.g., such as the collection of media items represented by 604B from William). For example, device 600 can display input suggestion 606C immediately in response to receiving the representation 604B in transcript 604A, indicating that William has shared media content.

As shown in FIG. 6D, William has also inserted a message 604C in the transcript requesting that the other participants in the conversation (e.g., the user of device 600, Lynne in this example) share media back. Message 604C reads: "Hi! Could you send me the photos from Lake Tahoe last weekend?" In some embodiments, an input suggestion (e.g., 606C) is displayed based on text content in the transcript (e.g., 604A). In some embodiments, an input suggestion (e.g., 606B) is displayed in response to receiving text content (e.g., text, such as 604C from William) (e.g., representing a request that the user of device 600 share media related to the Lake Tahoe trip last weekend). For example, device 600 can display input suggestion 606C immediately in response to receiving the message 604C in the transcript 604A that mentions photos (e.g., from Lake Tahoe).

In some embodiments, an input suggestion (e.g., 606C) is displayed in response to receiving entry at a keyboard (e.g., 604E). For example, as shown in FIG. 6D, device 600 receives user input 607 representing selection of a key (for the letter O). In response, the letter O has been entered into a text entry field. Fore example, input suggestion 606C can be displayed in response to the user (e.g., beginning) typing (e.g., user input 607).

Figure 6E:
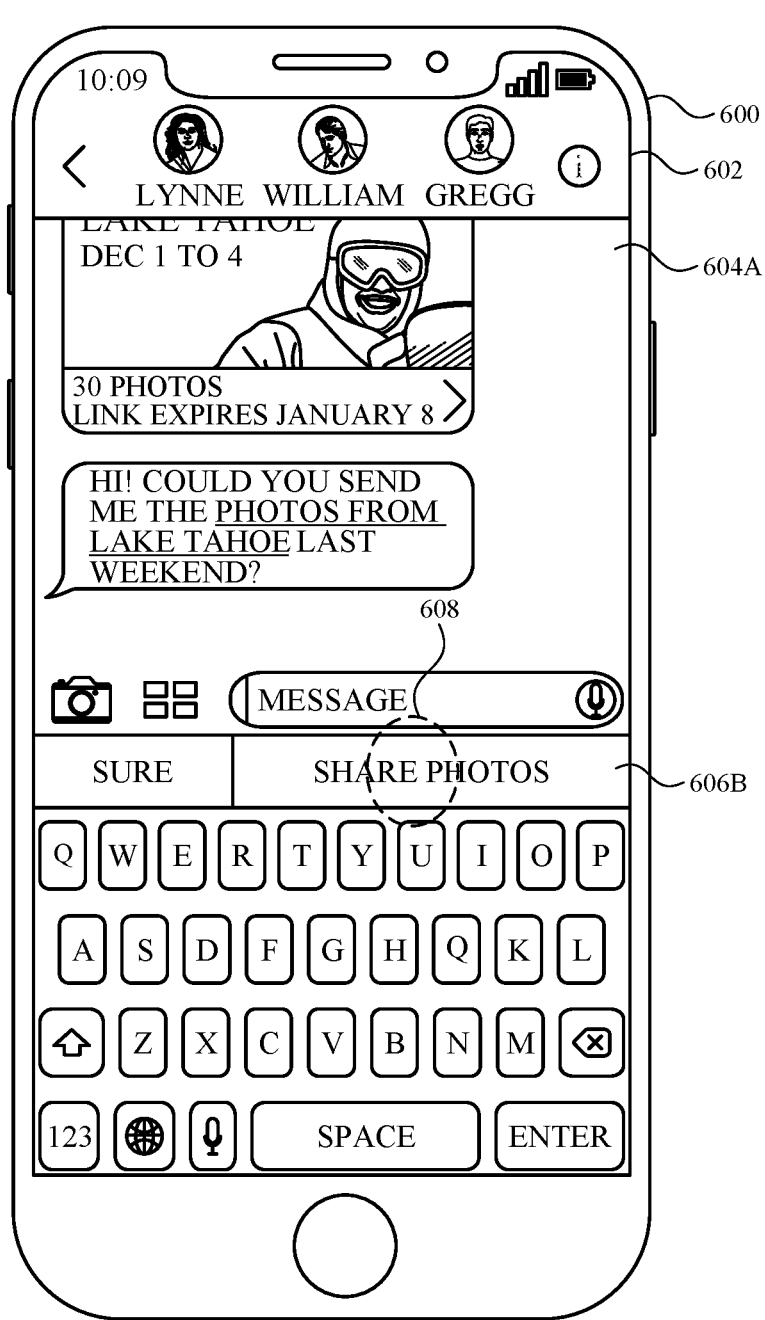

FIG. 6E illustrates selection of an exemplary input suggestion affordance 606C. In some embodiments, the device (e.g., 600) receives user input corresponding to selection of an input suggestion affordance (e.g., 606C) and, in response, displays a sharing interface (e.g., that includes a depiction of at least a portion of a suggested collection of media items for sharing). For example, at FIG. 6E, device 600 receives user input 608 corresponding to selection of input suggestion affordance 606C. In response to receiving user input 608, device 600 displays sharing interface 610 as shown in FIG. 6F.

Figure 6F:
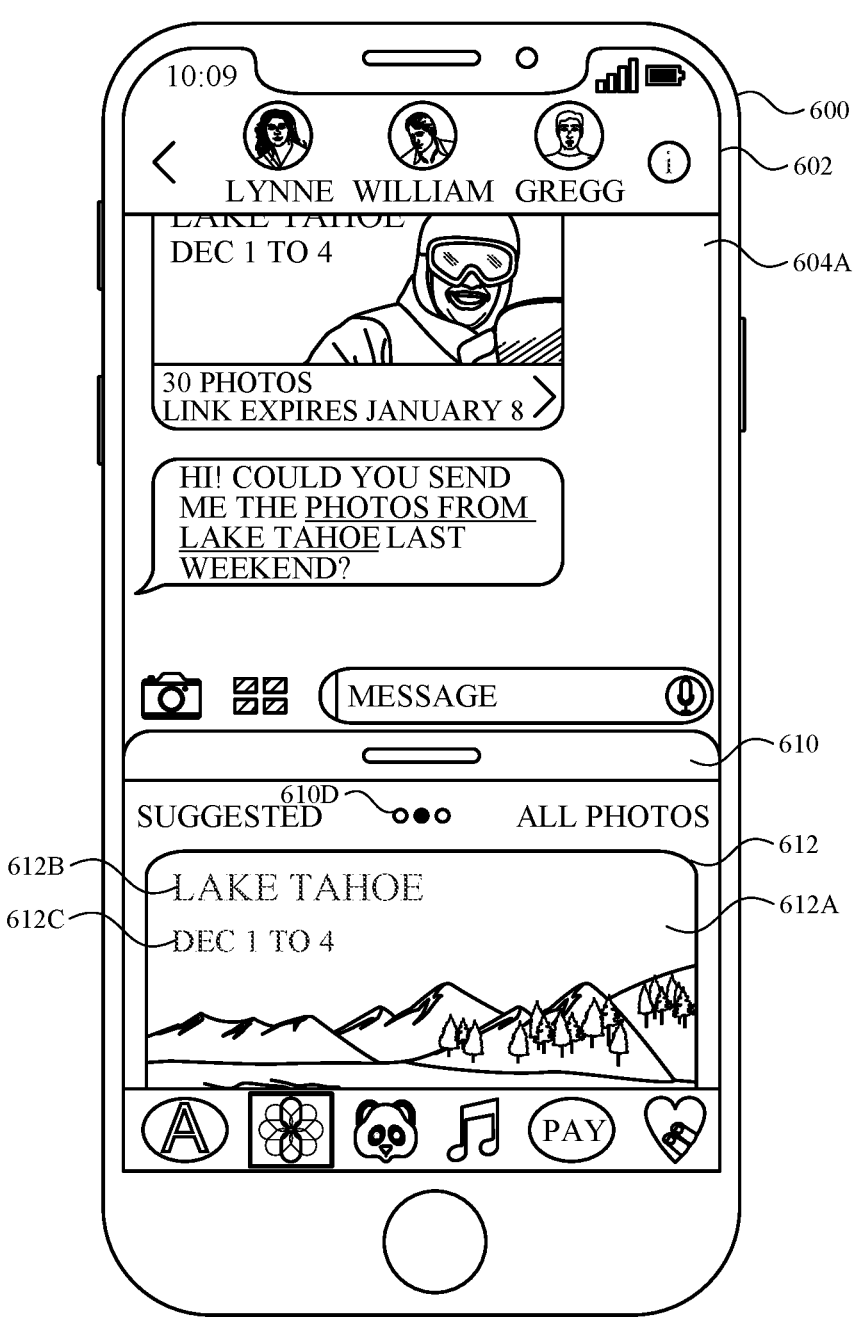

FIG. 6F illustrates an exemplary sharing interface 610. Sharing interface 610 is associated with a photos application for managing media items (e.g., photos, videos, or the like) associated with device 600 (e.g., a media library stored locally on device 600, and/or stored remotely and associated with device 600). A user of device 600 can use sharing interface 610 to select one or more media items for sharing with one or more recipients. For example, sharing interface 610 is displayed concurrently with the transcript 604A of the conversation with William and Gregg, and conveniently allows the user access to selecting media items for sharing, while continuing to view the relevant message conversation transcript (e.g., to view new messages that are received).

In some embodiments, a sharing interface includes multiple pages. For example, as shown in FIG. 6F, paging dots 610D indicate that sharing interface 610 includes three pages, with the second page (e.g., 612) being the currently selected page in this example (e.g., the second paging dot is filled in). In some embodiments, the device receives a user input (e.g., a swipe gesture), and in response to the user input, replaces display with the second page. One of skill would appreciate that other arrangements of content can be used, which are intended to be within the scope of this disclosure. For example, the content of the three pages in this example can be arranged in a single page, and viewed, for example, by vertically scrolling the single page.

FIG. 6F illustrates an exemplary suggested collection interface 612. Suggested collection interface 612 represents one or more media items (also referred to hereinafter as a "collection of media items", or a "suggested collection") available for sharing. In some embodiments, the device (e.g., 600) displays suggested collection interface 612 in response to detecting one of user inputs 608, 614, 616, or 620.

As shown in FIG. 6F, suggested collection interface 612 includes a title card 612A and descriptive elements 612B and 612C. In some embodiments, a title card and/or descriptive elements are optionally included in a suggested collection interface. Title card 612A includes a representative image from the suggested collection. Element 612B indicates a location (Lake Tahoe) associated with the suggested collection. Element 612C indicates a time associated with the suggested collection (the time range December 1st to December 4th). In this example, the year is not shown (e.g., because the date refers to the current year or relatively recent dates, such as within the last year). In other examples, a year associated with a date can be shown.

In some embodiments, a suggested collection (e.g., such represented by interface 612) is suggested (e.g., by device 600) based on one or more factors. In some embodiments, a suggested collection is determined to be relevant to a message conversation (e.g., represented by transcript 604A). In some embodiments, suggesting a collection includes displaying a suggested collection interface for a suggested collection determined to be relevant to the message conversation. In some embodiments, a suggested collection is suggested based on content (e.g., text, or one or media items) in a transcript (e.g., 604A) of the message conversation.

In some embodiments, content in the transcript is textual content. In some embodiments, a suggested collection is determined to be relevant to the textual content. In some embodiments, the suggested collection of media items is determined to be relevant to the message conversation with the recipient based on a geographic location mentioned (e.g. included) in the transcript of the message conversation. For example, device 600 can suggest the collection in suggested collection interface 612 based on the message text 604C from William that mentions the geographic location "Lake Tahoe" (e.g., requesting photos from Lake Tahoe last weekend) as shown in FIG. 6D. Because the suggested collection of 612 corresponds to the geographic location of Lake Tahoe (e.g., includes media captured at that location), device 600 suggests the collection to share in the message conversation.

The text relevant to the suggested collection does not need to relate to geography. In some embodiments, the suggested collection of media items is determined to be relevant to the message conversation with the recipient based on a reference to a time (e.g., a textual reference to a particular time, date or date range, or relative description (e.g., last week)) mentioned (e.g. included) in the transcript of the message conversation. For example, device 600 can suggest the collection in suggested collection interface 612 based on the message text 604C from William that mentions the time "last weekend" (requesting photos from Lake Tahoe last weekend) as shown in FIG. 6D. Because the suggested collection of 612 corresponds to the time (e.g., the dates that represent the most recent previous weekend) mentioned in the transcript (e.g., the suggested collection includes media captured during and/or near in time to the mentioned time), device 600 suggests the collection to share in the message conversation.

The text relevant to the suggested collection does not need to relate to time or geography. For example, other text (e.g., phrases or keywords) in a message conversation can cause a relevant collection of media items to be suggested for sharing. For instance, mention of the term "birthday" can cause a suggestion of a collection of media from a birthday celebration (e.g., includes birthday in the title, or is on a date known to be the birthday of one or more persons depicted in the collection). Of course, other text in a message conversation can be relevant to a collection of media items.

In some embodiments, content in the transcript is media content. In some embodiments, a suggested collection is determined to be relevant to the media content. For example, the suggested collection of interface 612 can be suggested by device 600 based on the received media items shared by William. In this example, the received media items shared by William (represented by 604B) are associated with the location Lake Tahoe and the time range December 1 to December 4. Notably, device 600 can suggest the suggested collection represented by suggested collection interface 612 because the suggested collection is also associated with the location Lake Tahoe and the time range December 1 to December 4.

In some embodiments, the suggested collection of media items is determined to be relevant to the message conversation with the recipient based on the identity of one or more participants in the message conversation. In some embodiments, a participant is a user associated with a user account (e.g., of cloud based service, of social media). In some embodiments, a participant is a contact (e.g., from an address book) associated with the device (e.g., 600) or a user of the device. In some embodiments, the suggested collection of media items is a collection of media items in which one or more of the participants (or more than a threshold number of the participants) in the conversation appear in media items in the suggested collection. For example, the suggested collection of media items (of 612) includes media items taken during a camping trip (e.g., to Lake Tahoe) that some or all of the participants (e.g., 603A, 603B, and 603C) in the conversation attended. Thus the collection of media items is suggested for sharing with the participants in the conversation because the participants in the conversation attended the camping trip.

In some embodiments, the suggested collection of media items is determined to be relevant to the message conversation with the recipient based on an event known to have been attended by one or more participants in the message conversation. In some embodiments, an event includes media items captured at one or more geographic locations and within a particular time range. For example, the suggested collection of interface 612 corresponds to an event defined by, and optionally includes media items captured at, the geographic location "Lake Tahoe" and the time range December 1 to December 4. In some embodiments, an event is automatically determined (e.g., based on geographic locations and capture times of the media items). In some embodiments, the event is user-created (e.g., a user creates a collection manually using device 600). As an example, suggested collection interface 612 can be suggested based on data associated with the suggested collection that indicates the participants in the conversation attended an event associated with the suggested collection. For instance, the suggested collection of media items, represented by suggested collection interface 612, can correspond to an event (e.g., Lake Tahoe media taken between December 1 and December 4) known to have been attended by William (e.g., based on identification of a face associated with William in media items of the suggested collection, or based on other metadata associated with the media items of the suggested collection).

Figure 6G:
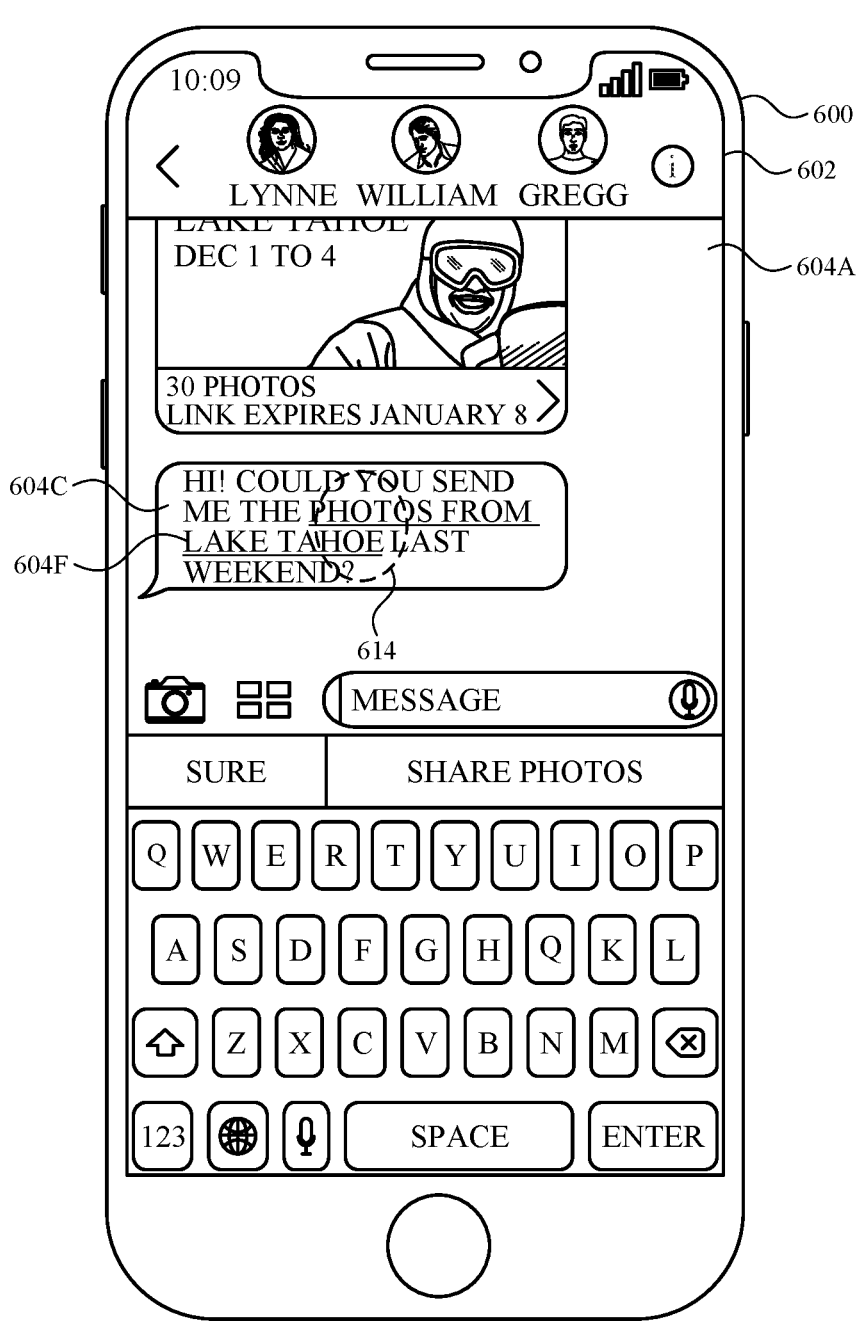

FIGS. 6G-6K illustrate other techniques for accessing a suggested collection interface. FIG. 6G illustrates an exemplary technique for selecting message text to view a suggested collection for sharing. In some embodiments, a portion of message text in the transcript is selectable. For example, as shown in FIG. 6G, a portion 604F of message 604C is visually emphasized (e.g., underlined) and selectable—the portion that reads "photos from Lake Tahoe". In some embodiments, the device (e.g., 600) (or a cloud-based service in communication with the device) detects that the text of a message (e.g., message 604C) includes text related to an action that can be performed by the device. For example, device 600 detects that the message 604C includes text related to sharing media items, and that device 600 is able to share (e.g., is associated with sharable media). In such case, the text 604F of the message is made selectable, and is optionally displayed with a visual indication that such text is selectable. As shown in FIG. 6G, the portion 604F "photos form Lake Tahoe" is displayed with underlining, and is selected by user input 614. In some embodiments, in response to receiving user input corresponding to selection of selectable text (e.g., 604F), the device (e.g., 600) displays a sharing interface (e.g., 610 as shown in FIG. 6F) and/or a suggested collection interface (e.g., as shown in FIG. 6F). At FIG. 6G, device 600 receives user input 614, corresponding to selection of portion 604F of message 604C.

Figure 6H:
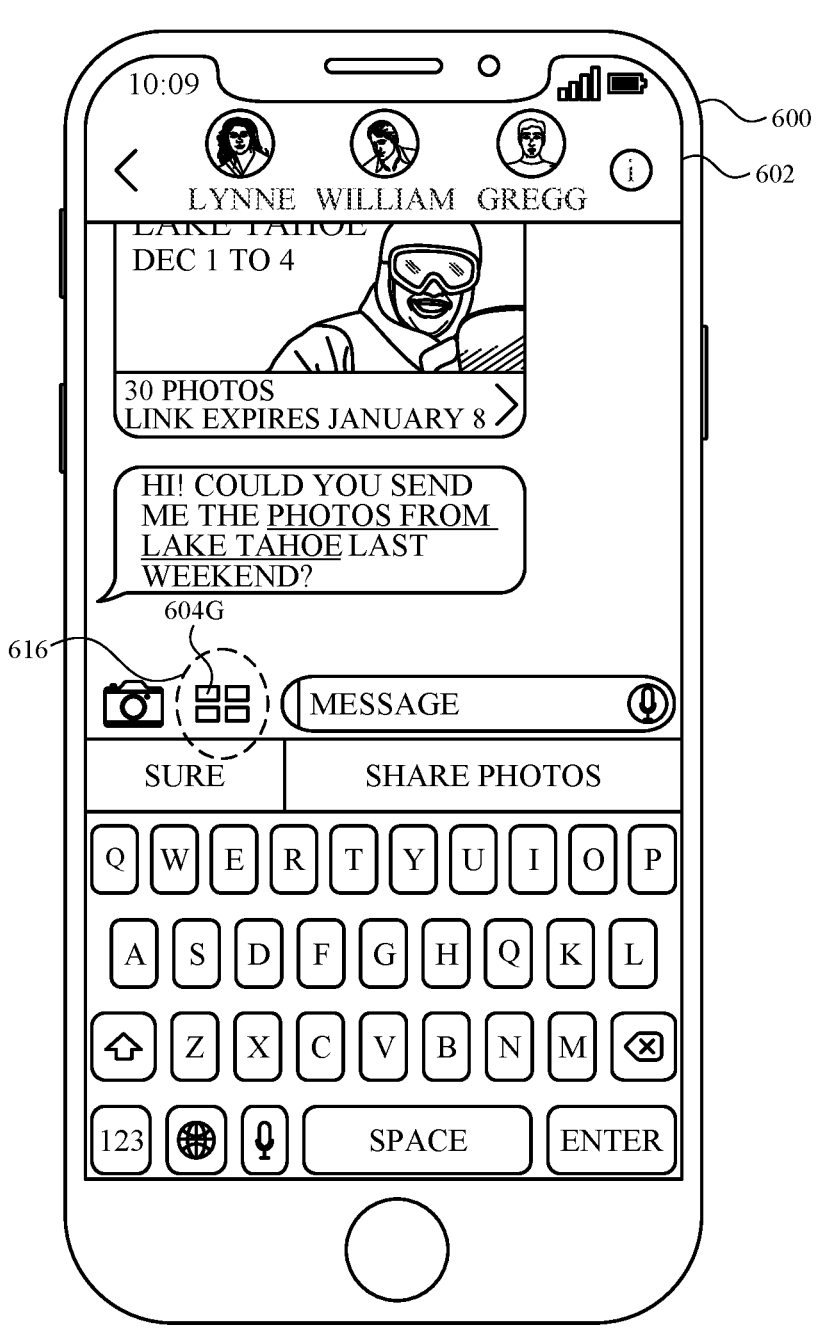

At FIG. 6H (e.g., the same interface as in FIG. 6D), device 600 receives user input 616, corresponding to selection of application selection affordance 604G. Application selection affordance 604G can be used to access one or more sharing interfaces (e.g., 610) associated with one or more applications for sharing content in a message conversation. In some embodiments, in response to receiving user input 612, device 600 displays sharing interface 610 (e.g., as shown in FIG. 6I or 6F).

In some embodiments, the device (e.g., 600) displays one or more interfaces associated with applications other than the photos application. For example, application selector region 610A in FIG. 6I depicts photos application affordance 610B selected (e.g., is surrounded by a box). In FIG. 6I, music application affordance 610C is associated with a music application, and is not selected. In some embodiments, user input corresponding to selection of an application affordance causes display of a sharing interface associated with the corresponding application. For example, in response to selection of music application affordance 614C, device 600 replaces display of sharing interface 610 with a sharing interface associated with the music application.

In some embodiments, in response to selection of the application affordance (e.g., 604G), the device (e.g., 600) displays a sharing interface not associated with a photos application. For example, in response to user input 616, device 600 can display an interface associated with affordance 610A (e.g., an application storefront for accessing interfaces to download one or more applications) or with affordance 610C (e.g., interfaces for sharing content music-related). In some embodiments, while displaying a sharing affordance not associated with a photos application, the device displays a sharing interface associated with the photos application in response to user input. For example, the user input can be one or more swipes at a location of one or more other sharing interfaces. For instance, two left swipes from an interface of the music application (represented by affordance 610C) causes sharing interface 610 associated with the photos application to be displayed (e.g., because the respective affordances 610B and 60C are separated by one icon). For example, if a sharing interface includes multiple pages (e.g., like 610), a swipe received while displaying an end page in a direction away from the other pages causes the device to display a sharing interface for the next adjacent application. In some embodiments, the most recent sharing interface is displayed in response to selection (e.g., 616) of an application affordance (e.g., 604G). For example, if the sharing interface 610 was the most recently displayed sharing interface that was previously displayed, device 600 displays sharing interface 610 in response to user input 616.

Figure 6I:
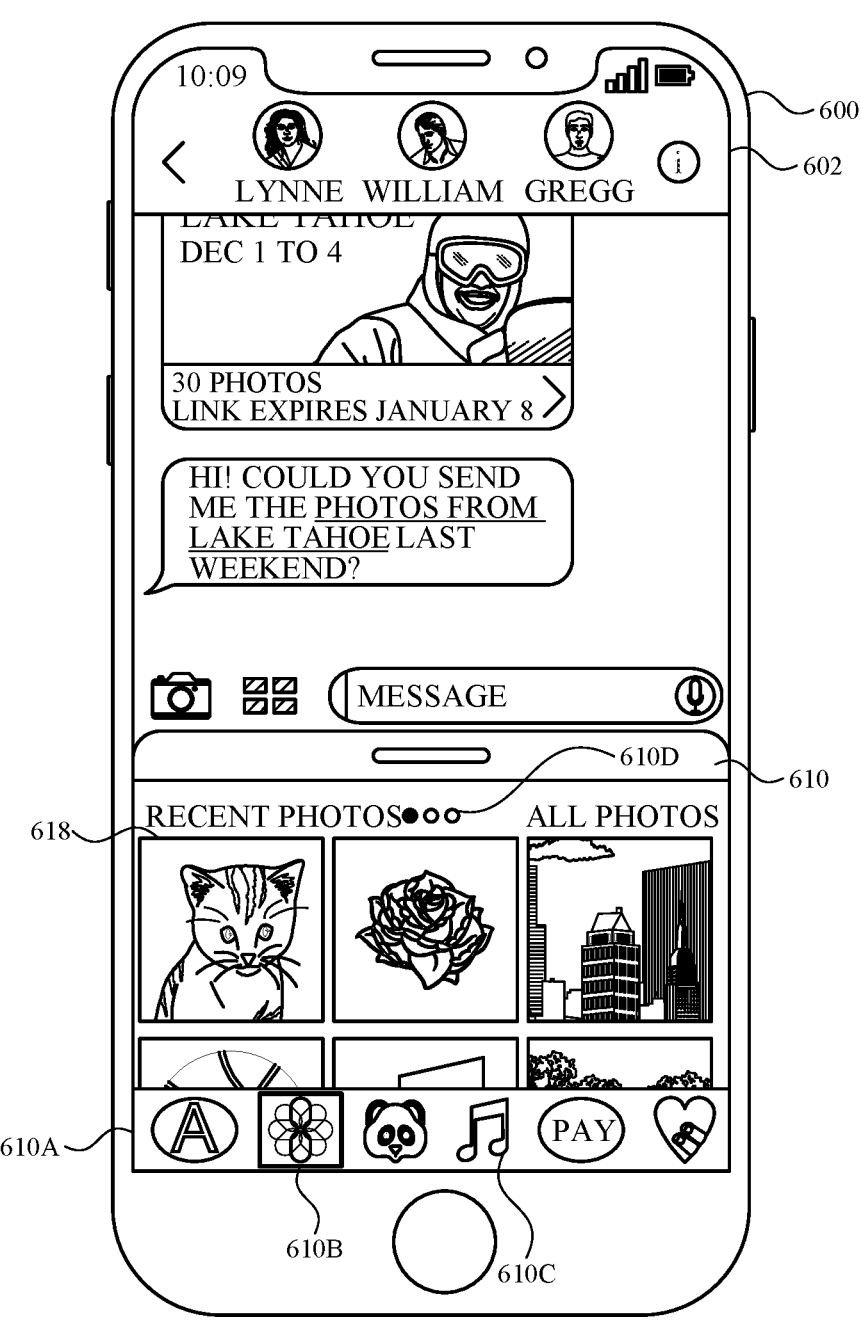
Figure 6J:
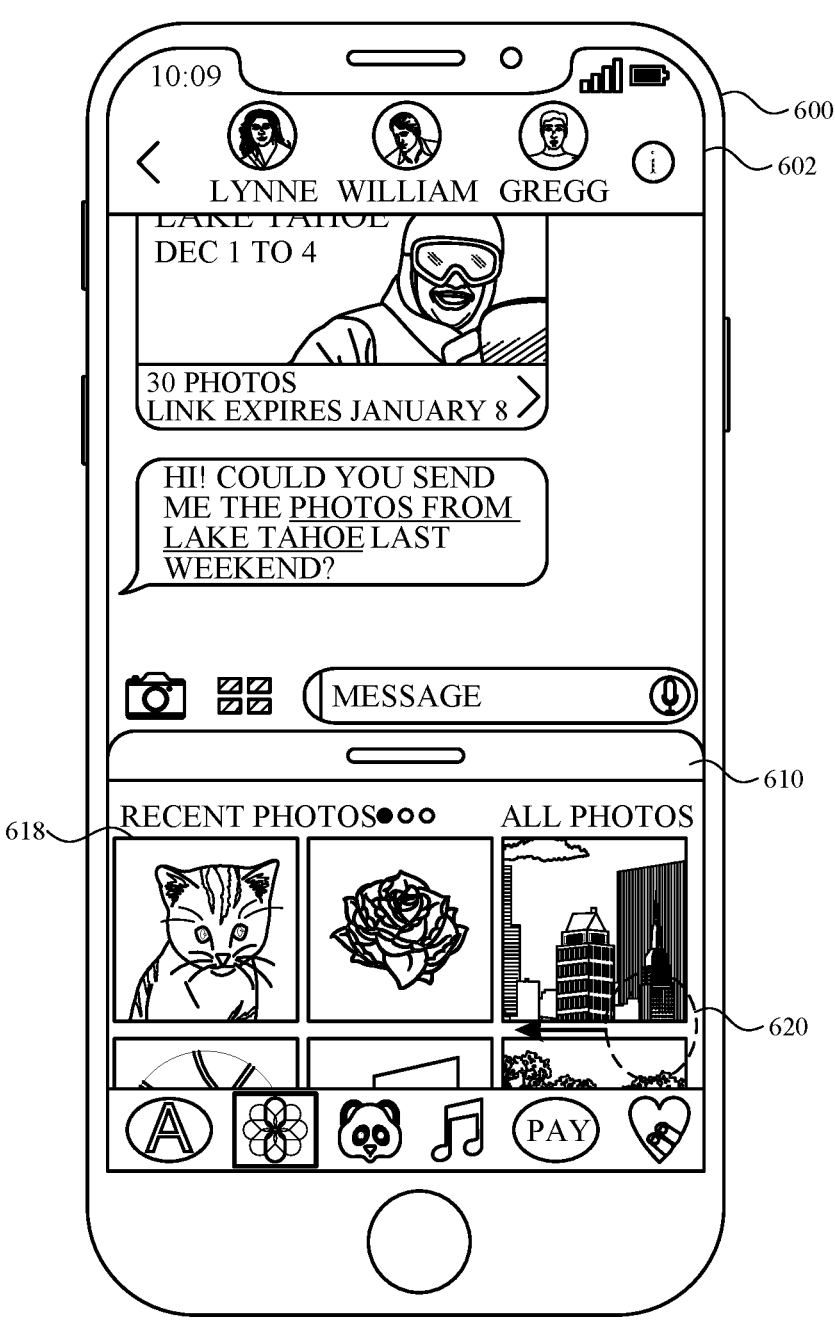
Figure 6K:
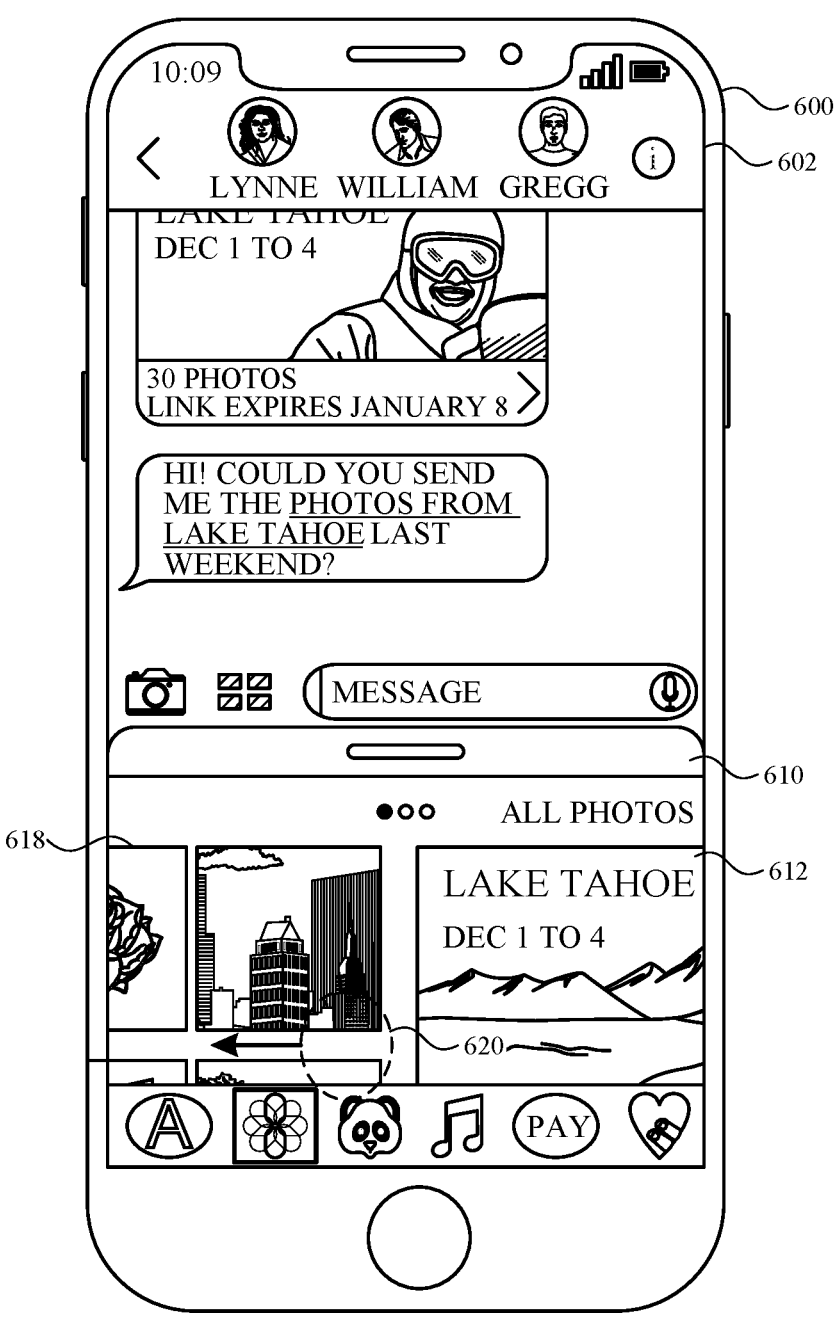

FIG. 6I illustrates an exemplary sharing interface 610 that includes an exemplary recent photos page 618. In this example, recent photos page 618 includes the most recent media items associated with a media library associated with device 600 (e.g., arranged in a chronological ordering by the most recently captured media item). In this example, page 618 is the first page (e.g., associated with a first page dot of 610D). At FIG. 6J, device 600 receives user input 620. User input 620 is a left swipe gesture at recent photos page 618. In response to receiving user input 620, device 600 replaces display of recent photos page 618 with display of an adjacent page, suggestion page 612 (also referred to as suggested collection interface 612). For example, FIG. 6K shows that user input 620, representing a contact on a touch-sensitive display of device 600, continues to be applied but has moved to the left (relative to FIG. 6J). In FIG. 6K, a portion of suggested collection interface 612 is now displayed, while a portion of recent photos page 618 is no longer displayed.

In some embodiments, the device (e.g., 600) displays a suggested collection interface (e.g., 612) without displaying a sharing interface (e.g., 610). For example, as described herein throughout, device 600 can display one or more elements of a suggested collection interface (e.g., 612) without displaying a sharing interface (e.g., 610) (e.g., without displaying paging dots, or application affordances).

Figure 6L:
Figure 6M:
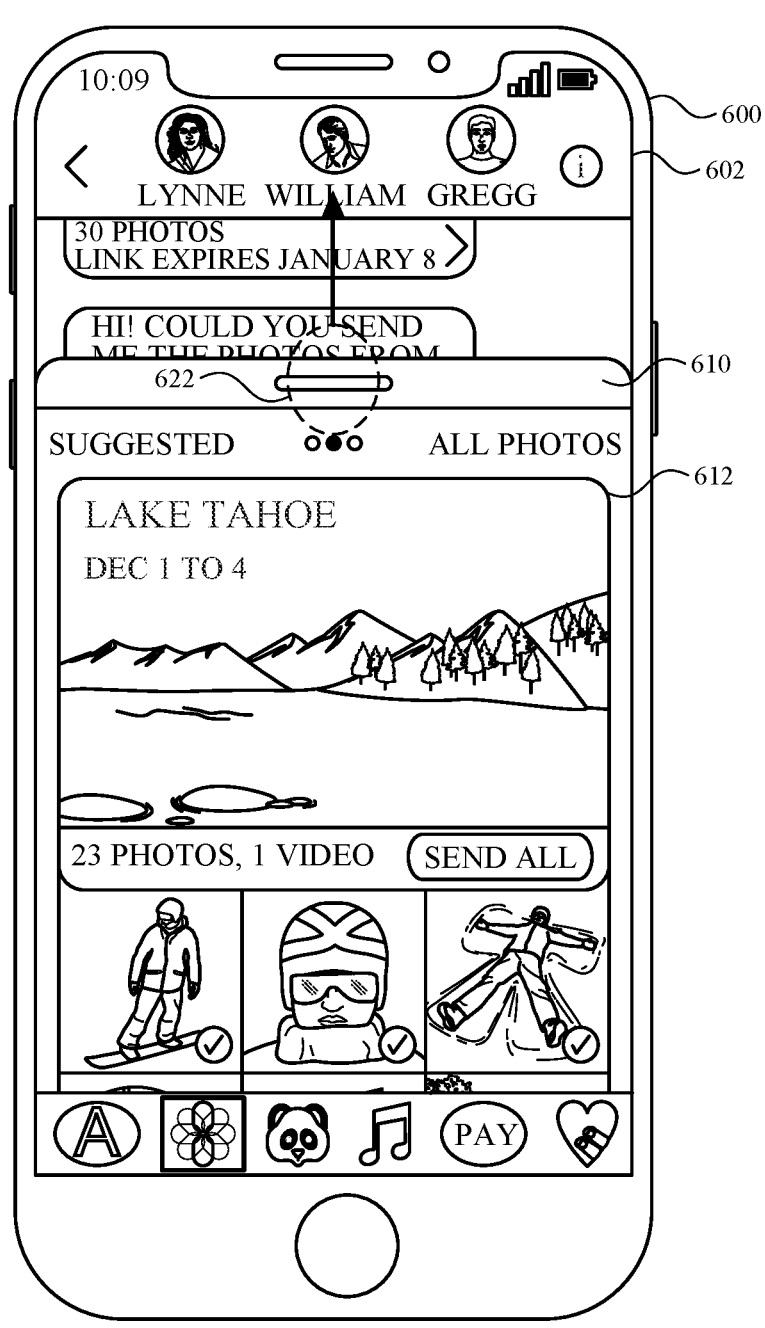
Figure 6N:
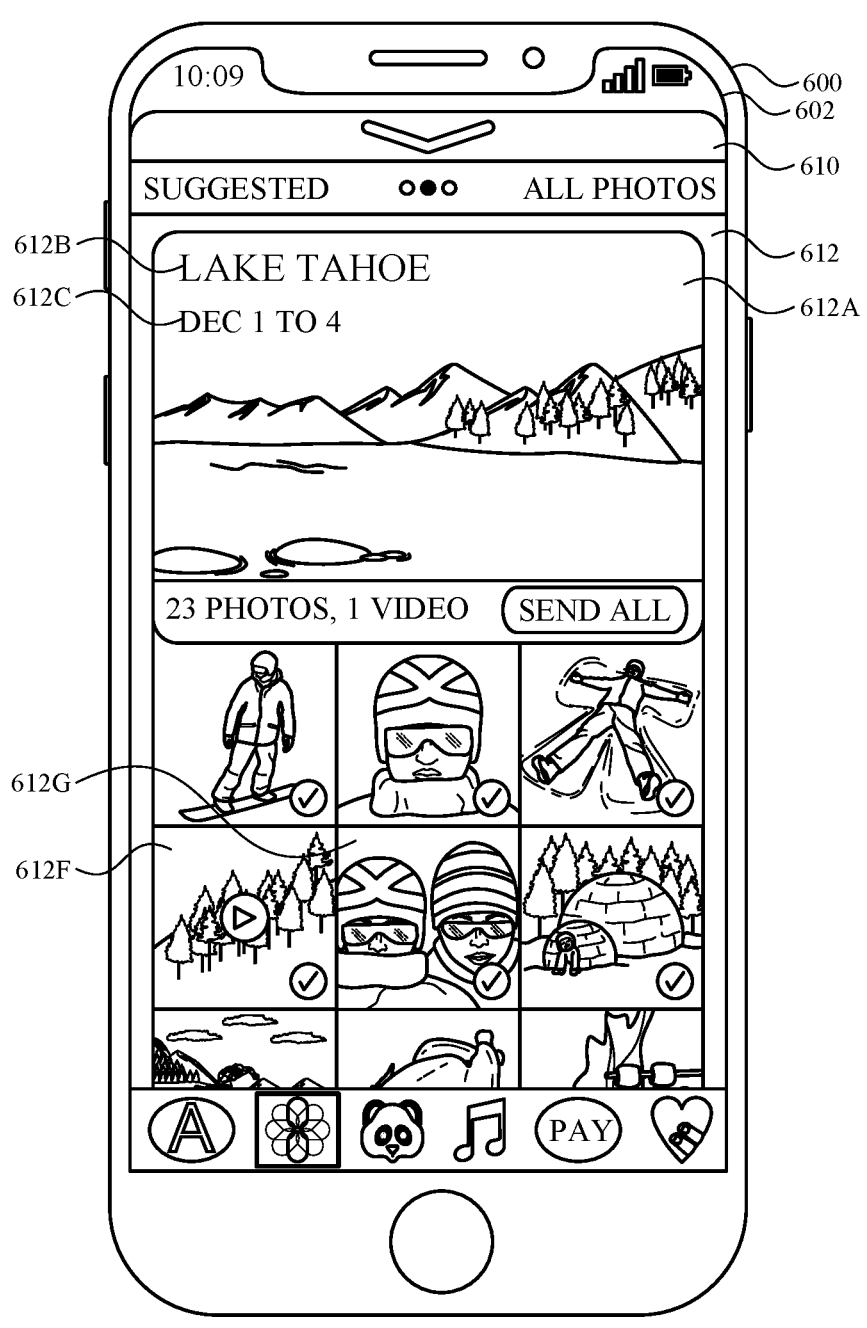
Figure 6O:
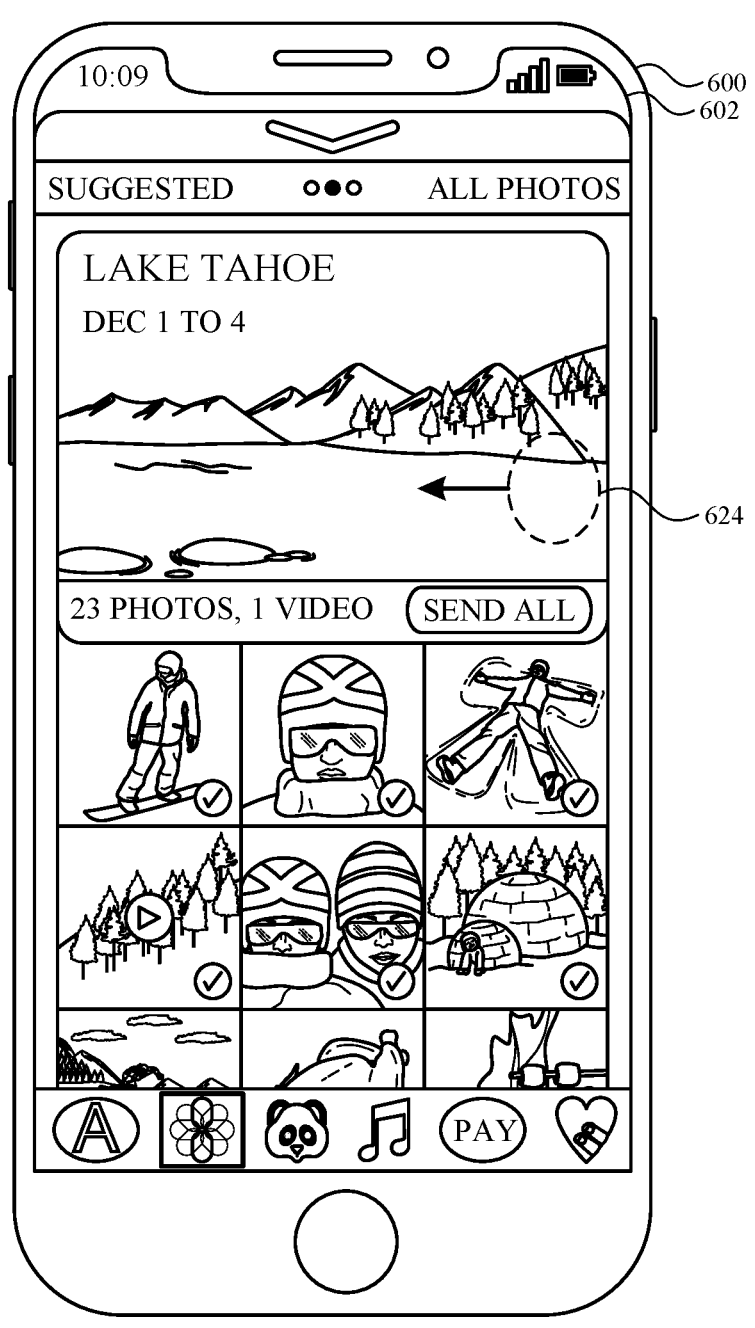

FIGS. 6L-6N illustrate an exemplary technique for expanding a suggested collection interface (e.g., 612). As shown in FIG. 6L, suggested collection interface 612 is displayed concurrently with transcript 604A. In some embodiments, the device (e.g., 600) expands a suggested collection interface in response to user input. For example, at FIG. 6L, device 600 receives user input 622 (e.g., an upward swipe on a graphical handle associated with suggested collection interface 612). As shown in FIG. 6M, in response to detecting user input 622, device 600 expands the displayed suggested collection interface 612 (e.g., so that more of suggested collection interface 612 is displayed). In FIG. 6M, user input 622 continues to be detected and has moved upward (relative to FIG. 6L) on the touch-sensitive display, and suggested collection interface 612 has expanded while less of transcript 604A is displayed.

FIG. 6N illustrates a suggested collection interface fully expanded. For example, in response to completion of the upward swipe gesture of user input 622, device 600 displays suggested collection interface 612 fully expanded. In some embodiments, displaying a suggested collection interface fully expanded causes a reduction (e.g., partial or full) of the amount of the transcript that is displayed. For example, as shown in FIG. 6N, transcript of the message conversation is no longer concurrently displayed with suggested collection interface 612. In some embodiments, the transcript is concurrently displayed with a fully expanded suggested collection interface. For example, some portion of the transcript can be displayed concurrently with the fully expanded suggested collection interface, wherein the portion is less than what is displayed when the suggested collection interface is not fully expanded. In some embodiments, a suggested collection of media items (e.g., as shown in interface 612) is scrollable (e.g., to reveal additional content or elements as described herein with respect to interface 612). For example, user input representing a request to scroll (e.g., upward or downward swipe on 612) causes additional media items in the collection to be displayed.

Figure 6P:
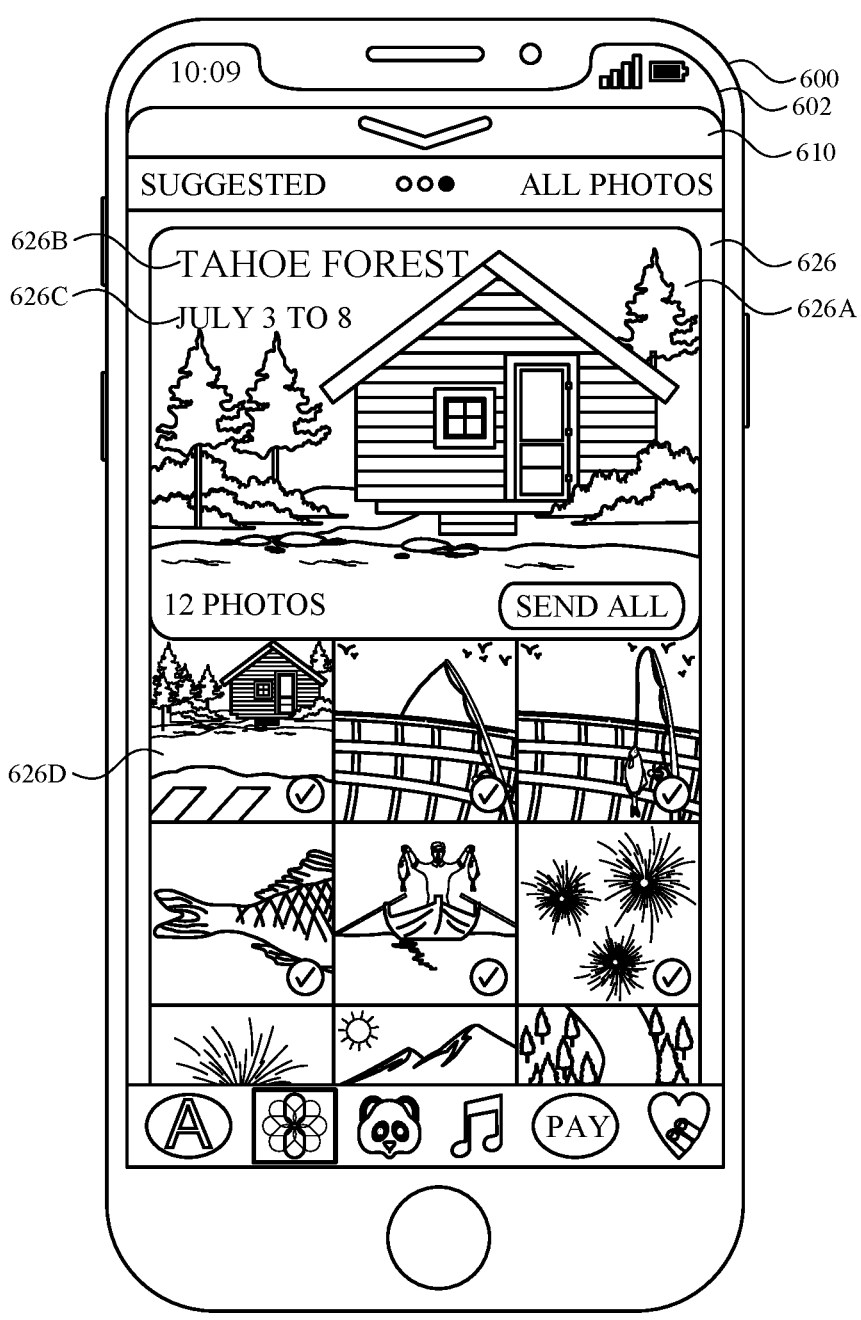
Figure 6Q:

FIGS. 6O-6R illustrate an exemplary technique for navigation between pages associated with a photos application in a sharing interface. While viewing suggested collection interface 612 fully expanded, the user can still move between pages associated with the photos application (e.g., sharing interface 610). In some embodiments, the device (e.g., 600) displays a different suggested collection for a different suggested collection in response to receiving user input. For example, at FIG. 6O, device 600 receives user input 624 at suggested collection interface 612, representing a left swipe gesture on a location of interface 612 (e.g., title card 612A). In response to receiving user input 624, device 600 replaces display of suggested collection interface 612 with display of an adjacent page associated with another suggested collection, suggestion page 626 (also referred to as suggested collection interface 626) as shown in FIG. 6P.

FIG. 6P illustrates an exemplary suggested collection interface 626. In some embodiments, suggested collection interface 626 includes one or more of the features of suggested collection interface 612 as described herein. Similar to suggested collection interface 612, suggested collection interface 626 represents a suggested collection (e.g., a "second" suggested collection) of media items (different than the suggested collection represented by suggested collection interface 612). Suggested collection interface 626 also includes a title card 626A (e.g., with a representative image from its respective suggested collection), an indication of location 626B (Tahoe Forest), and an indication of date 626C (July 3rd to July 8th). Suggested collection interface 626 also includes a representation of one or more media items in the respective collection (e.g., representation 626D). In this example, the suggested collection represented by suggested collection interface 626 is determined to be relevant to the message conversation represented by transcript 804A and suggested based on a geographic location included in the text of the transcript 604A of the conversation with William and Gregg-William asked for photos of Lake Tahoe, and the suggested collection is associated with a nearby geographic location called "Tahoe Forest". Thus, suggested collection interface 626 offers a second suggested collection of media items that is available for sharing, and that is relevant to the potential recipients William and Gregg (e.g., is related to the text of the conversation with participants William and Gregg).

In some embodiments, suggested collections determined to be relevant to the message conversation are displaying in an order (e.g., of descending relevance). In some embodiments, the order is based on relevance to the message conversation. For example, if the suggested collection of interface 612 is related to the transcript 604A in FIG. 6D because it depicts participants 603B and 603C and relates to the geographic location mentioned in the text, but the suggested collection 612 is only related to the transcript 604A based on geographic location (e.g., Tahoe Forest is near Lake Tahoe) but does not depict the participants, interface 612 is more relevant to the conversation. Thus, for example, interface 612 can be displayed immediately in response to selection of an input suggestion affordance (e.g., 606C), while interface 626 can be accessed using a swipe over from 612. Additionally, interface 612 can be assigned a second page (e.g., of paging dots 610D) while interface 626 is assigned to a third (later) page dot.

In this example, the photos requested by William in transcript 604A correspond to the suggested collection represented by suggested collection interface 612 (e.g., the "first" suggested collection). Thus, the user can swipe to return to interface 612. At FIG. 6Q, device 600 receives user input 628 (e.g., representing a right swipe gesture) at a location associated with interface 626. In response to receiving user input 628, device 600 displays suggested collection interface 612 again, as shown in FIG. 6R.

Figure 6R:
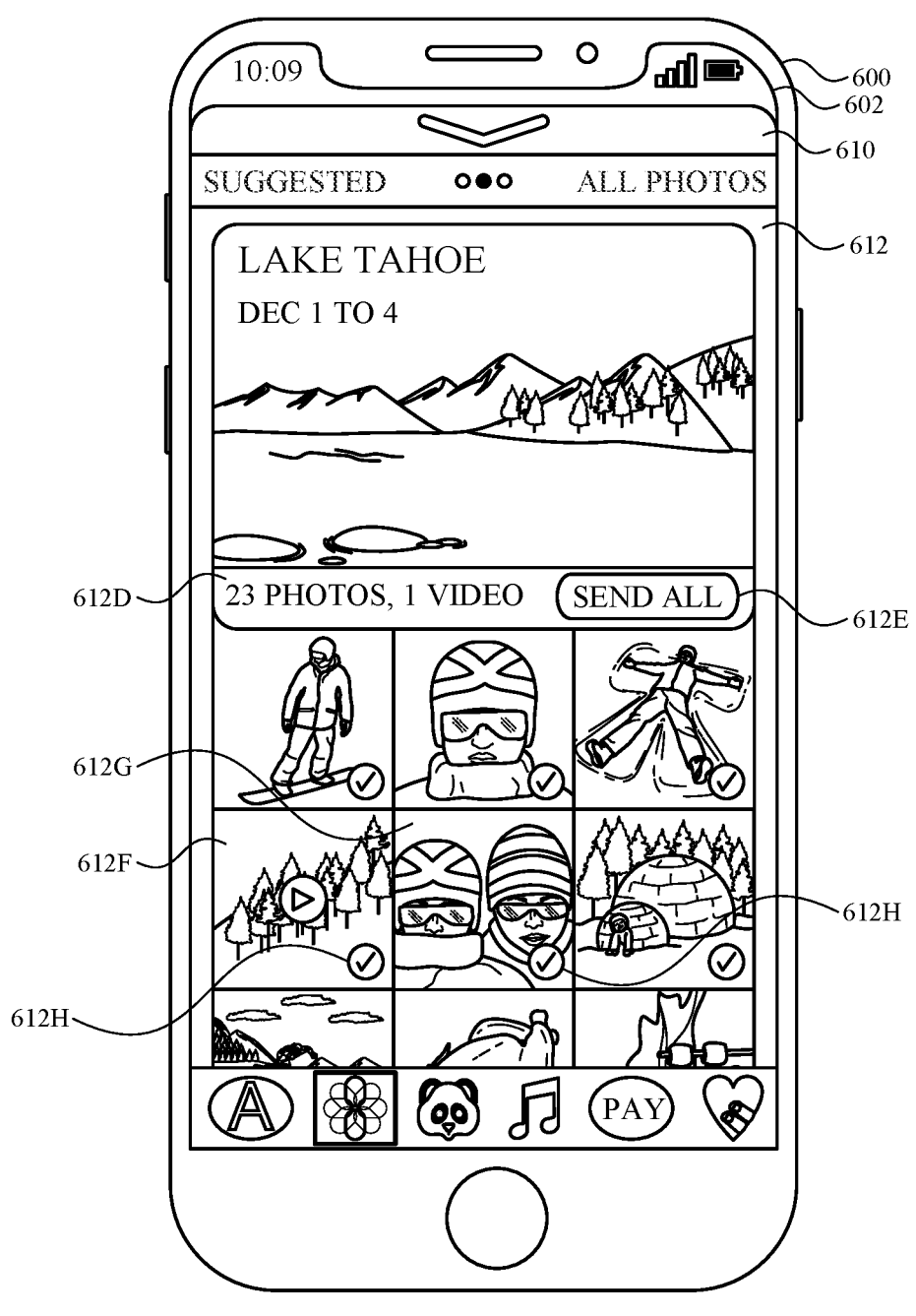

FIG. 6R illustrates exemplary suggested collection interface 612. In some embodiments, a suggested collection interface (e.g., 612) includes an indication of the amount of media items in the corresponding suggested collection. For example, indicator 612D indicates that the suggested collection includes 23 photos and 1 video (e.g., 24 media items total). In some embodiments, a suggested collection interface (e.g., 612) includes a sharing affordance for transmitting one or more media items from the corresponding suggested collection. For example, sharing affordance 612E can be selected in order to share one or more media items as discussed below. In some embodiments, a suggested collection interface (e.g., 612) includes representations of one or more media items. For example, suggested collection interface 612 includes media items 612F and 612G, each representing a media item in the suggested collection of 612 (Lake Tahoe collection). In some embodiments, a suggested collection interface (e.g., 612) includes one or more selection indicators that indicate whether one or more media items are currently selected (e.g., for sharing in response to selection of a sharing affordance). In some embodiments, a selection indicator is visually associated with a media item that is currently selected, and is optionally not displayed when the same media item is not selected. For example, media items 612F and 612G each includes a selection indicator 612H, indicating that media items 612F and 612G are currently selected.

In some embodiments, the device (e.g., 600) enters into a selection mode (e.g., in response to user input) after displaying a suggested collection interface (e.g., 612). In some embodiments, the device (e.g., 600) is in selection mode (e.g., initially) upon display of a suggested collection interface (e.g., 612). In some embodiments, a suggested collection interface (e.g., 612) includes one or more of the features of 814, as described below.

Figure 6S:
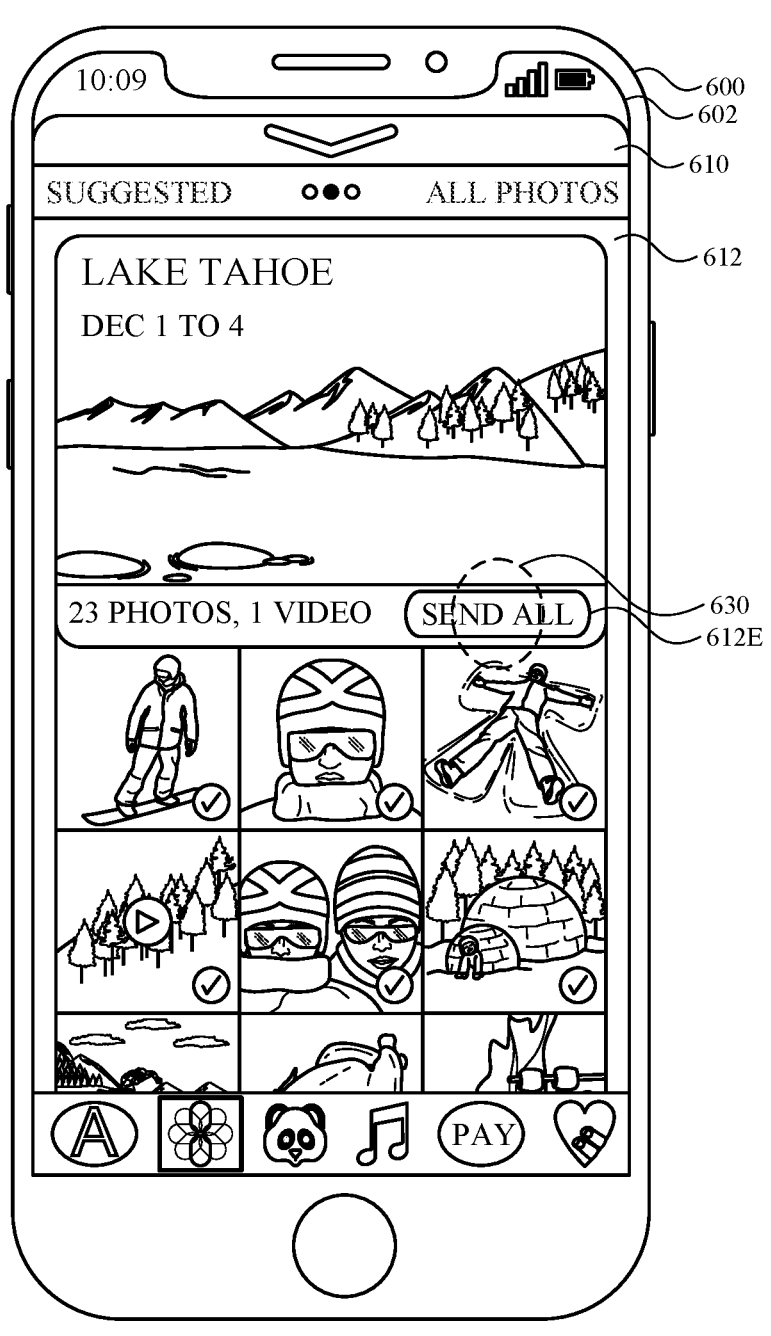
Figure 6T:
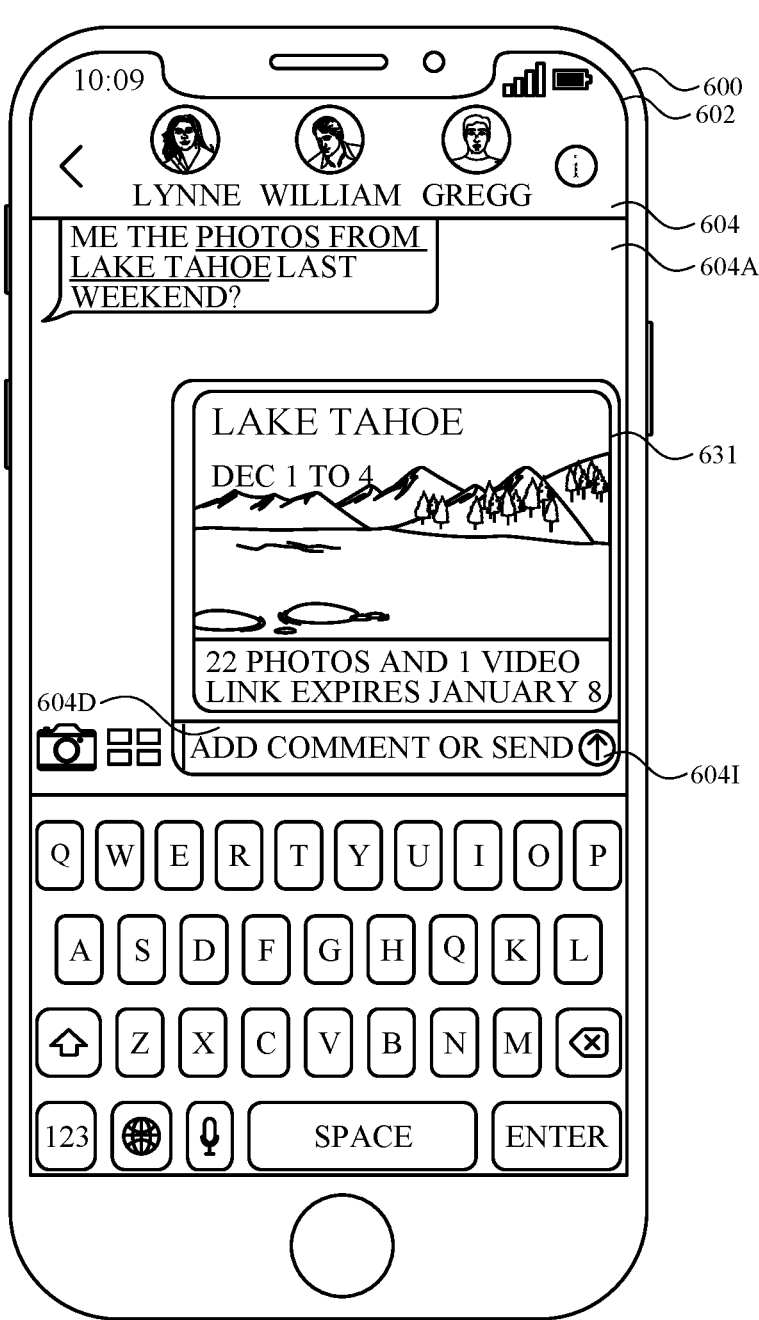
Figure 6U:
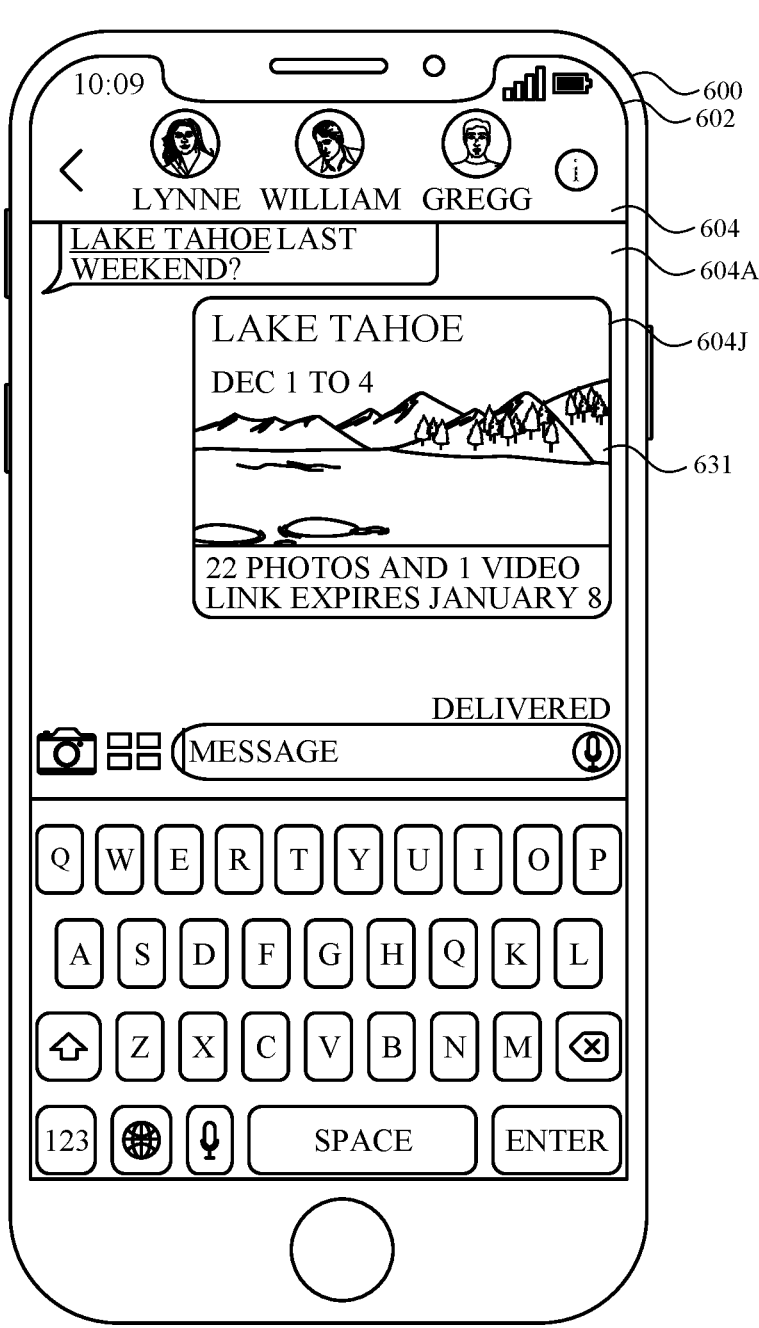

FIGS. 6S-6U illustrate exemplary techniques for sharing a suggested collection of media items. In some embodiments, the device (e.g., 600) receives input (e.g., 630) representing a request to share one or more media items from a suggested collection (e.g., of 612). For example, at FIG. 6S, device 600 receives user input 630 at sharing affordance 612E. As shown in FIG. 6S, when user input 630 is received, sharing affordance 612E indicates that all media items in the collection are currently selected (e.g., sharing affordance 612E reads "SEND ALL"). In response to receiving user input 630, device 600 can prepare to share the selected media items in the suggested collection, which in this case is all media items.

FIG. 6T illustrates an exemplary representation 631 of a collection of media items inserted into an exemplary text entry field 604D for sharing. In some embodiments, preparing to share the media items includes inserting a representation of the media items into a text entry field (e.g., 604D of FIG. 6T). For example, once inserted into the text entry field 604D, the user optionally adds accompanying text (or other content) before transmitting a message that provides access to the selected media items (e.g., by inserting the media items, or a representation of the media items, into a transcript of a message conversation).

FIG. 6U illustrates an exemplary representation 631 inserted into the transcript of a message conversation after sharing. In some embodiments, in response to receiving a request to share a suggested collection of media items (e.g., 630), the device (e.g., 600) transmits a message that provides access to at least a portion of the suggested collection. For example, device 600 can transmit a message that provides access to the suggested collection of media items (e.g., represented by representation 631 as shown in FIG. 6U) in response to receiving user input 630, and optionally not require additional user input to send the message, or provide an opportunity to add accompanying content. Alternatively, device 600 can transmit a message that provides access to the suggested collection of media items (e.g., represented by representation 631 as shown in FIG. 6U) in response to user input corresponding to selection of affordance 604I of FIG. 6T.

In some embodiments, the device (e.g., 600) shares fewer than all of the media items in a suggested collection. In some embodiments, a suggested collection interface (e.g., 612) has fewer than all media items selected initially. For example, a curated set of fewer than all media items can be selected and presented upon the initial display of interface 612 (e.g., similar to as shown in FIG. 6W). In some embodiments, the device (e.g., 600) allows addition (e.g., via user input) of media items to the initial selection. This can be helpful where a suggested collection includes a large number of media items. In some embodiments, the device (e.g., 600) allows removal (e.g., via user input) of media items from the initial selection. In some embodiments, the curated set of fewer than all media items in the suggested set is selected based on characteristics of individual media items (e.g., that the media item is in focus, has good composition, or the like) and/or based on characteristics of the collection as a combination (e.g., prevent selection of duplicate or very similar media items, select media items that depict a variety of identified faces, select media items that show a variety of subject matter, or the like).

Figure 6V:
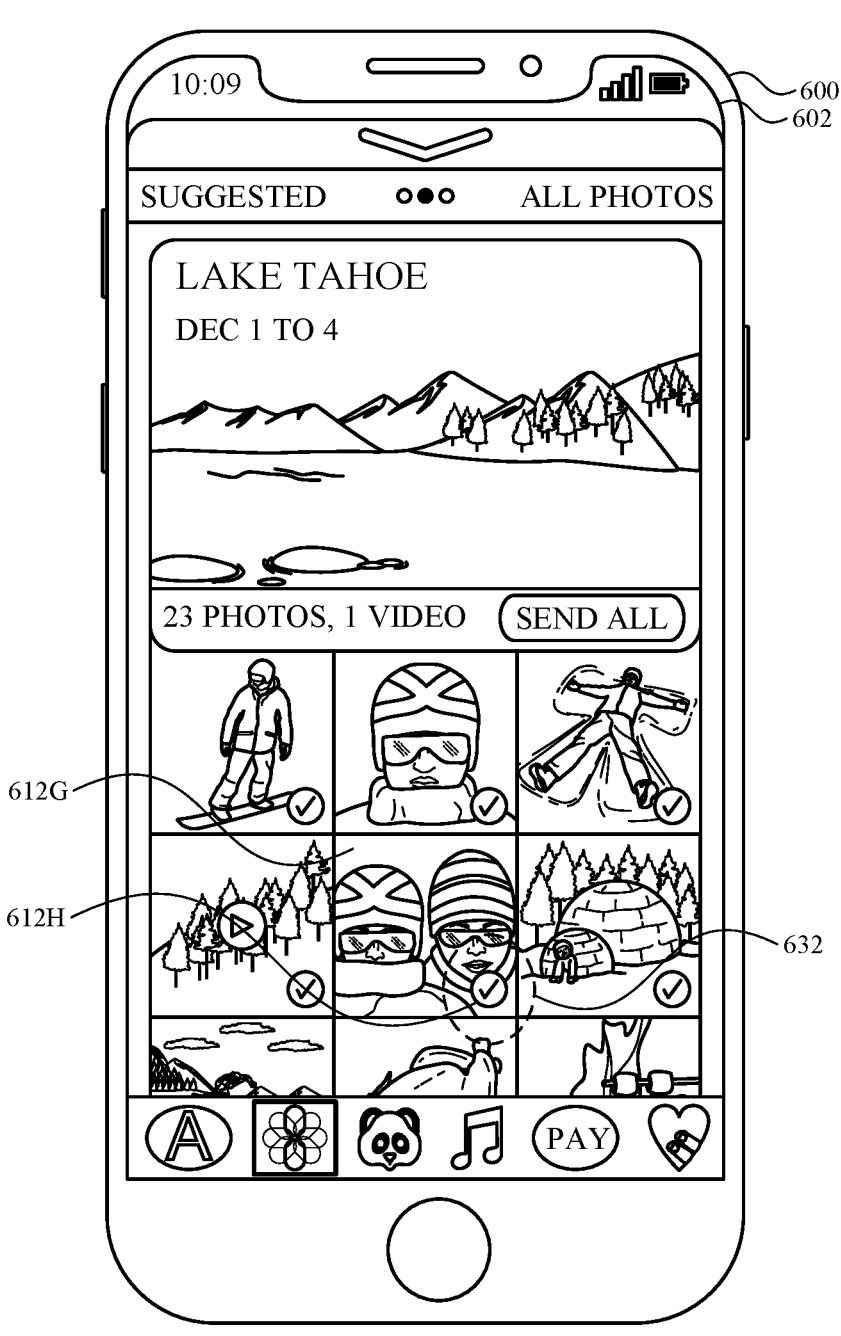
Figure 6W:
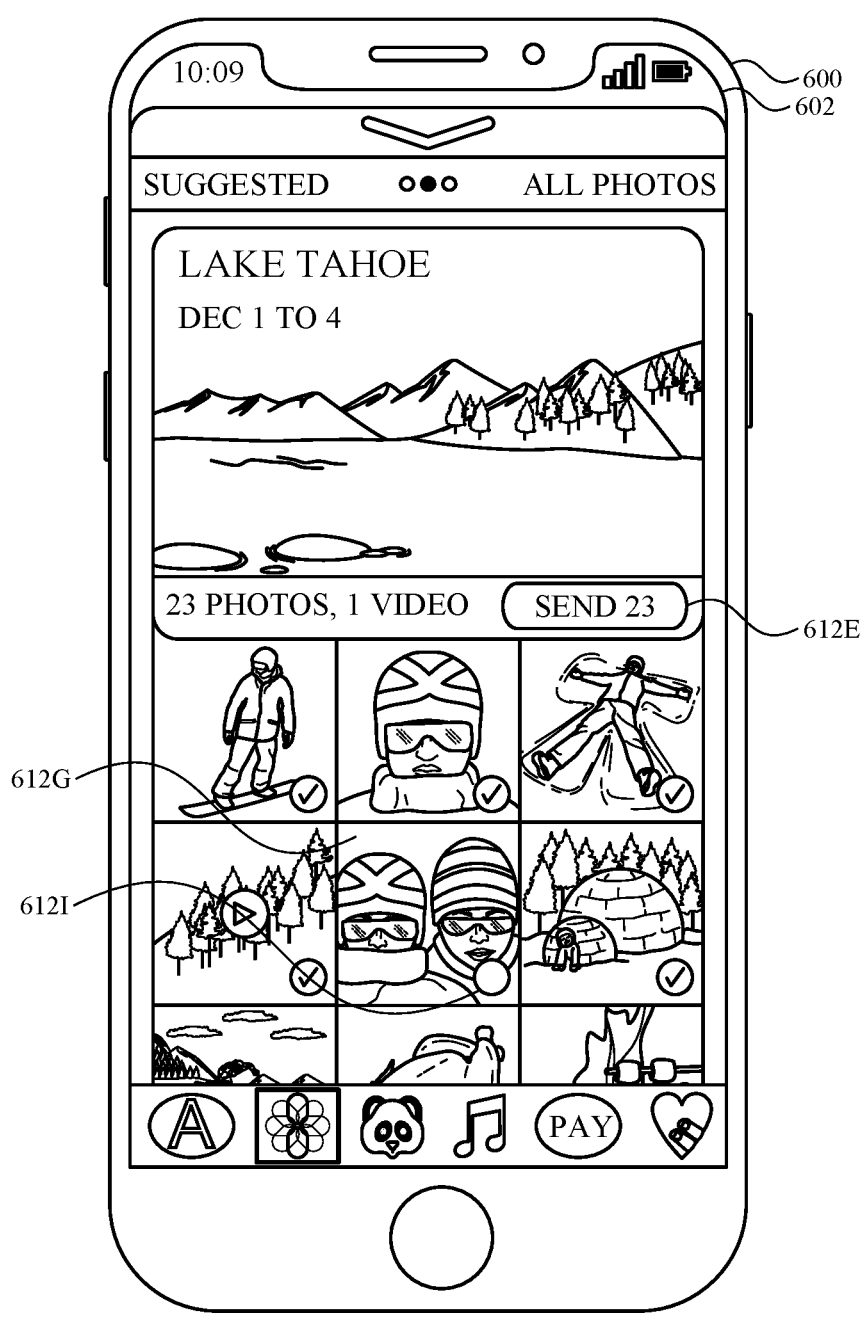

FIGS. 6V-6AG illustrate exemplary interfaces for customizing selection of media items of a suggested collection for sharing. In some embodiments, the device (e.g., 600) receives user input representing a request to toggle whether a media item is selected (e.g., to select an unselected item, or to unselect a selected item). For example, at FIG. 6V, device 600 receives user input 632 associated with (e.g., a location of) media item 612G. In some embodiments, in response to user input the device (e.g., 600) toggles selection of a media item. In some embodiments, if toggling selection causes the media item to be selected, the device displays a selection indicator associated with the item. In some embodiments, if toggling selection causes the media item to be unselected, the device ceases display of a selection indicator associated with the item. In some embodiments, if toggling selection causes the media item to be unselected, the device displays an unselected indicator associated with the item (e.g., in place of a selection indicator). As shown in FIG. 6W, in response to receiving user input 632, device 600 ceases to display selection indicator 612H, and optionally instead displays unselected indicator 612I. Thus, user input 632 causes media item 612G to no longer be selected, which is visually represented by selection indicator 612H ceasing to be displayed.

As shown in FIG. 6V, user input 632 is received at a location of selection indicator 612H. In some embodiments, user input to toggle selection (e.g., 632) is received at a location of the media item (e.g., 612G) that does not include a selection indicator, which causes the device (e.g., 600) to toggle selection of the corresponding media item. For example, the user input that toggles selection does not have to be at a location of a (e.g., displayed) selection indicator (or of a (e.g., displayed) unselected indicator) in order to toggle selection the media item. For instance, if user input 632 was instead a tap centered on a top left corner of media item 612G in FIG. 6V (e.g., not on indicator 612H), device 600 can toggle selection of media item 612G in response.

In some embodiments, a change to the selection of media items causes a displayed indication (e.g., 612E) of an amount of selected media to be updated. In some embodiments, the indication of the amount of selected media is included in a sharing affordance (e.g., 612E). For example, as shown in FIG. 6W, in response to user input 632, sharing affordance 612E has been updated (now reads "SEND 23") to indicate that 23 media items are selected for sharing (22 photos and 1 video), which reflects that photo 612G has been unselected. Contrast this with FIG. 6V, in which sharing affordance 612E indicates ("SEND ALL") that the amount of media items to be shared is all media items in the suggested collection (e.g., all 23 photos and 1 video indicated in title card 612A). In some embodiments, the amount indicates the type of media selected (e.g., whether there are photos and/or videos selected, such as in the statement "22 photos and 1 video").

Figure 6X:
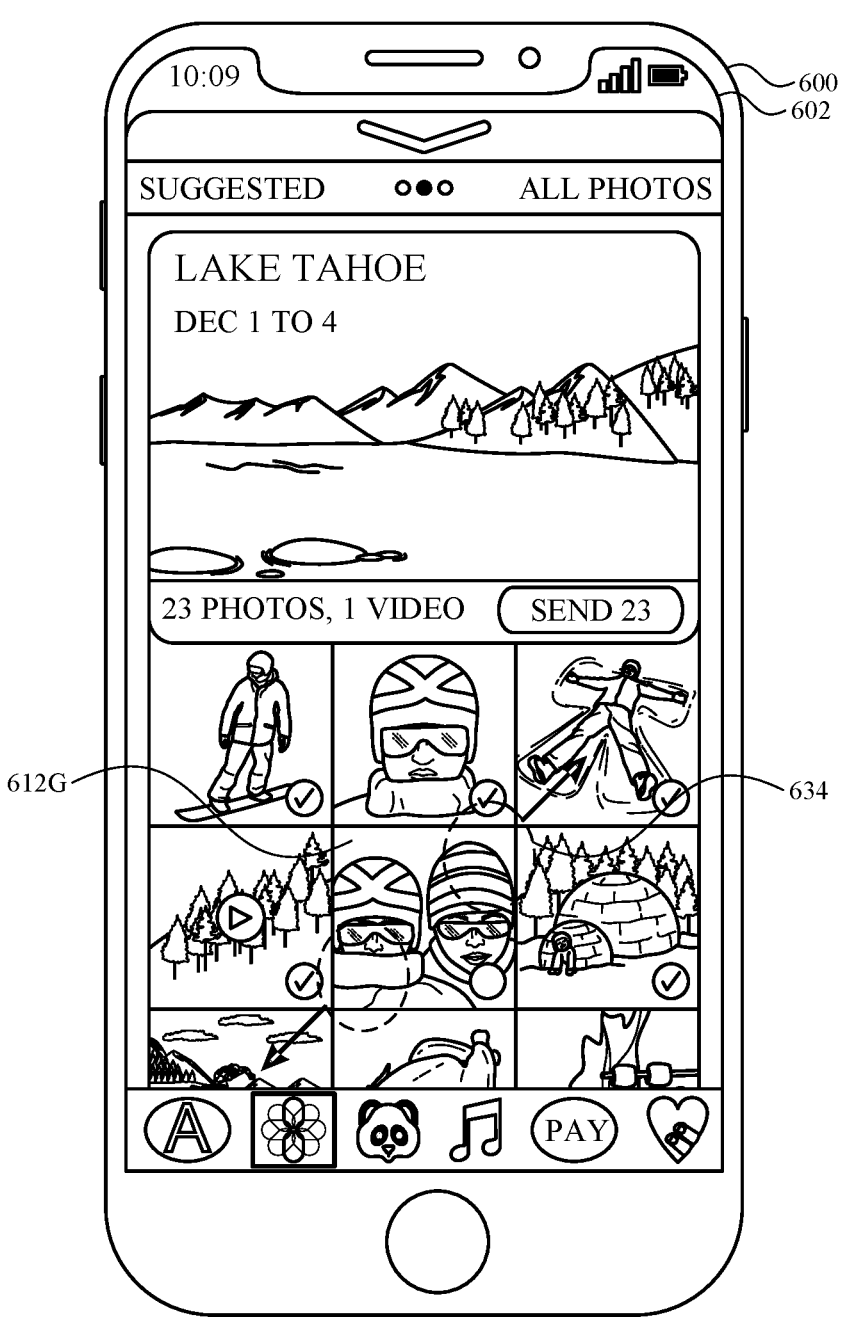

FIG. 6X illustrates an exemplary technique for entry into a one-up view of a suggested collection of media items. As shown in FIG. 6X, the media items in the suggested collection of media items are displayed in an exemplary grid view at interface 612. In some embodiments, a grid view includes representations, of media items, that are substantially similar or identical dimensions. For example, FIG. 6X shows media items arranged as equal-sized squares. In some embodiments, a grid view includes representations, of media items, that are arranged aligned along one or more of a vertical or horizontal axis. For example, FIG. 6X shows media items aligned along both vertical axes and horizontal axes (e.g., each square's edges are aligned to two horizontal axes and two vertical axes). While displaying media items in a grid view as shown in FIG. 6X, the device 600 optionally provides the user with the option to inspect a media item more closely, for example to determine whether to select or unselect the media item for sharing. In some embodiments, the device (e.g., 600) receives user input (e.g., 634) associated with a media item (e.g., in a grid view) and, in response to receiving the user input, displays the media item in the one-up view (e.g., 636 of FIG. 6Y).

Figure 6Y:
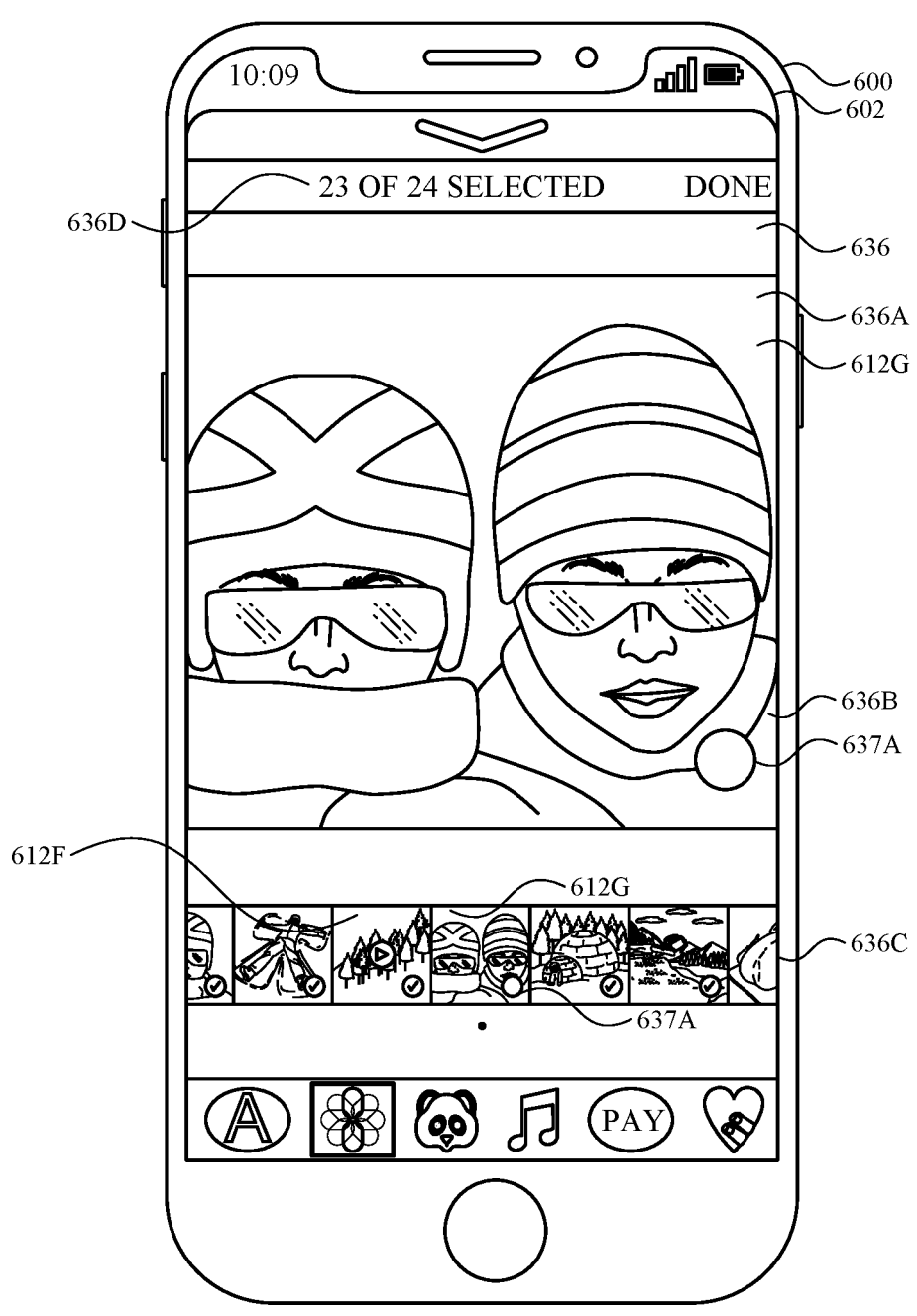

FIG. 6Y illustrates an exemplary one-up view of a media item. In some embodiments, the device (e.g., 600) displays a media item in a one-up view. In some embodiments, displaying a media item in a one-up view includes displaying the media item where: it is displayed alone on the display, it is displayed substantially larger than other media items on the display, it is displayed so that it extends from one edge of the display to an opposite edge of the display in at least one dimension (e.g., between the left and right edges, and/or between the top and bottom edges), and/or it is displayed larger (e.g., zoomed in) than it was displayed before detecting user input that causes the media item to be displayed in the one-up view. For example, in response to receiving user input 634 on media item 612G in FIG. 6X, device 600 displays one-up view 636 as shown in FIG. 6Y. In this example, the user input associated with media item 612G is a "de-pinch" gesture (e.g., movement of two contacts apart from each other by more than a threshold distance). In some embodiments, the user input associated with media item (e.g., 612G) is a long press gesture (e.g., a contact exceeding a predetermined length of time). In some embodiments, the user input associated with media item (e.g., 612G) is a hard press gesture (e.g., a contact with a characteristic intensity that exceeds a threshold intensity such as a threshold intensity that is greater than a nominal contact detection intensity threshold at which a tap input can be detected). In some embodiments, the user input associated with media item (e.g., 612G) that causes display of the one up view is a tap gesture (e.g., a contact not exceeding a predetermined length of time) if the device (e.g., 600) is not currently in a selection mode. For example, a simple tap on a media item while not in selection mode opens up a one-up view. In some embodiments, one up view 636 includes one or more of the features of one up view described below with respect to shared collection interface 814.

As shown in FIG. 6Y, media item 612G is displayed in an exemplary one-up view 636. In some embodiments, a one-up view (e.g., 636) includes an area (e.g., 636A) that includes the media item (e.g., 612G) displayed in the one-up view (e.g., displayed in a zoomed state larger than in the grid view of suggested collection interface 612 as shown in FIG. 6X). In some embodiments, a one-up view (e.g., 636) also includes an indication of selection (e.g., 636B, currently displaying an unselected indicator 637A) that indicates whether the media item in area 636A is currently selected (or deselected). As shown in FIG. 6Y, media item 612G is currently not selected (e.g., due to user input 632 at FIG. 6V). If media item 612G were currently selected, the indication of selection 636B would, for example, include a selection indicator (e.g., a checkmark, such as 637B of FIG. 6AA). In some embodiments, a one-up view includes a scrubbing region (e.g., 636C) that includes representations of a plurality of media items from the suggested collection. For example, one-up view 636 also includes scrubbing region 636C, which includes representations of additional media items (e.g., different than the media item currently in the one-up view, media item 612G), displayed smaller than the media item 612G being displayed in the one-up view. In some embodiments, the plurality of media items (e.g., 636C) include an indication of whether one or more media items are currently selected. For example, the media items represented in scrubbing region 636C that are selected (e.g., as shown in FIG. 6X) each include a selection indicator (e.g., a checkmark), and the representation of the single media item that is unselected (media item 612G) does not include the selection indicator (e.g., lacks a checkmark, but includes unselected indicator 637A). One of skill would understand that other techniques for indicating whether an item is selected or unselected are possible, and are intended to be within the scope of this disclosure.

In some embodiments, a one-up view (e.g., 636) includes an indication of an amount of media items that are currently selected. In some embodiments, a one-up view includes an indication of a total amount of media items in the respective collection of media items. For example, indicator 636D shown in FIG. 6Y indicates both an amount of selection (23 items are selected) and that a total amount of media items in the collection being viewed (24 items), where it states: "23 of 24 selected".

Figure 6Z:
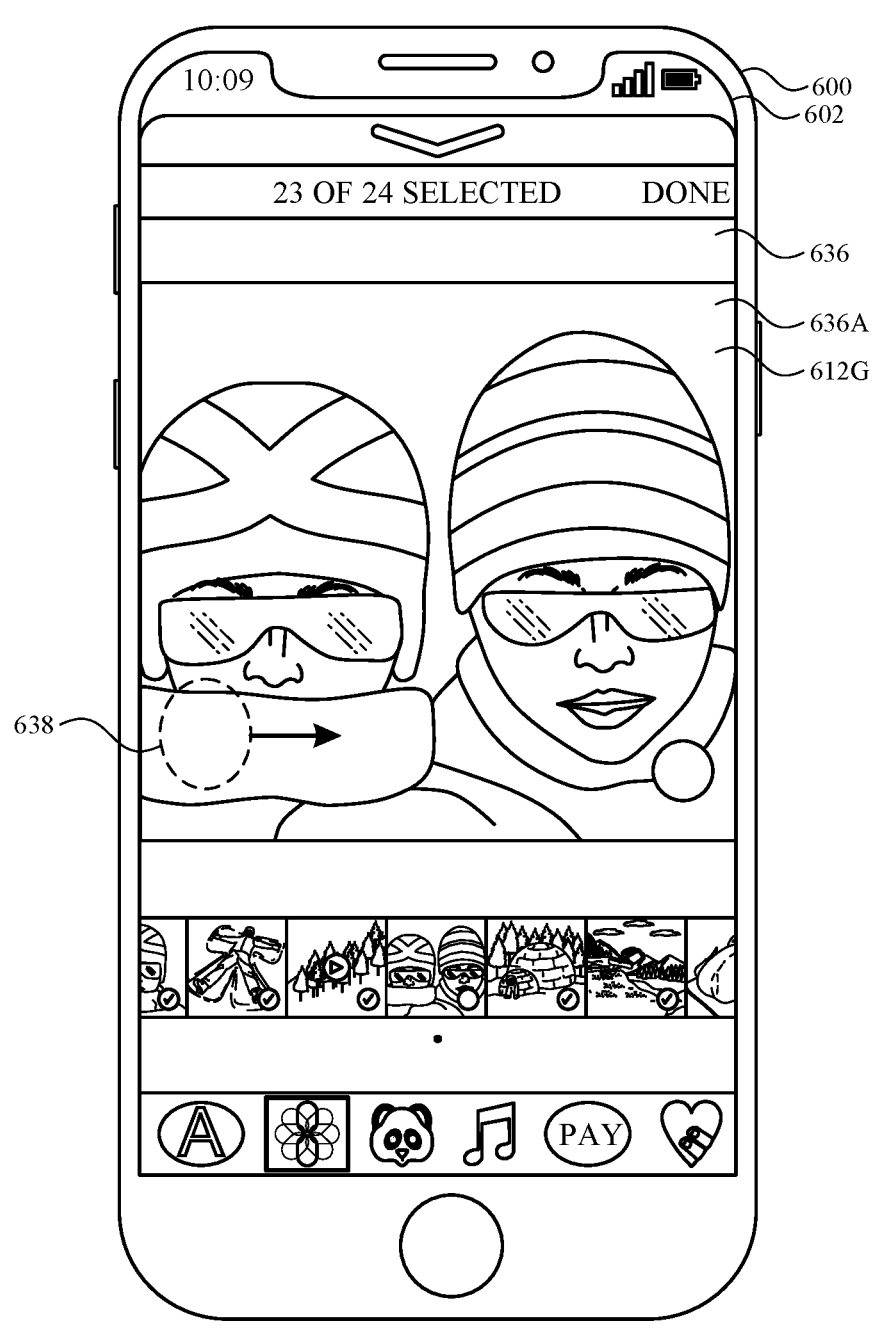
Figure 6A:
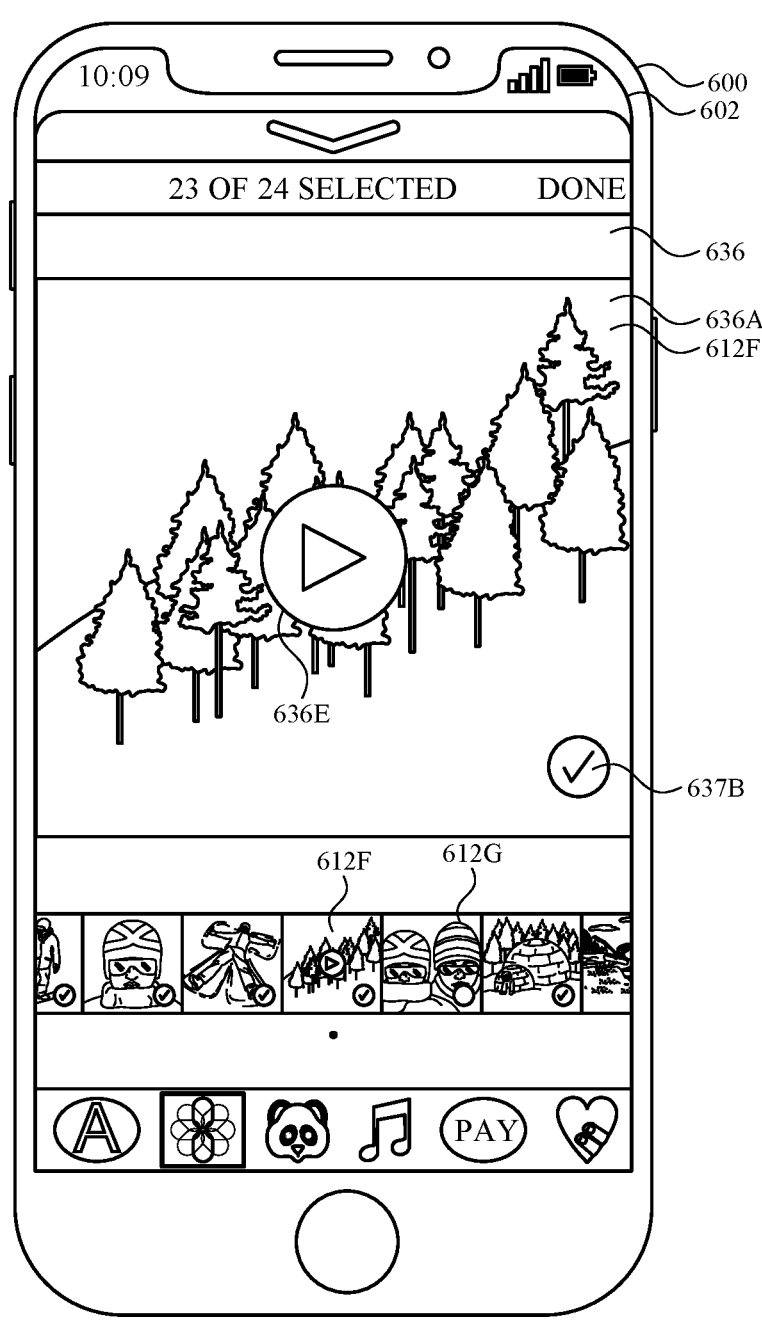
Figure 6A:
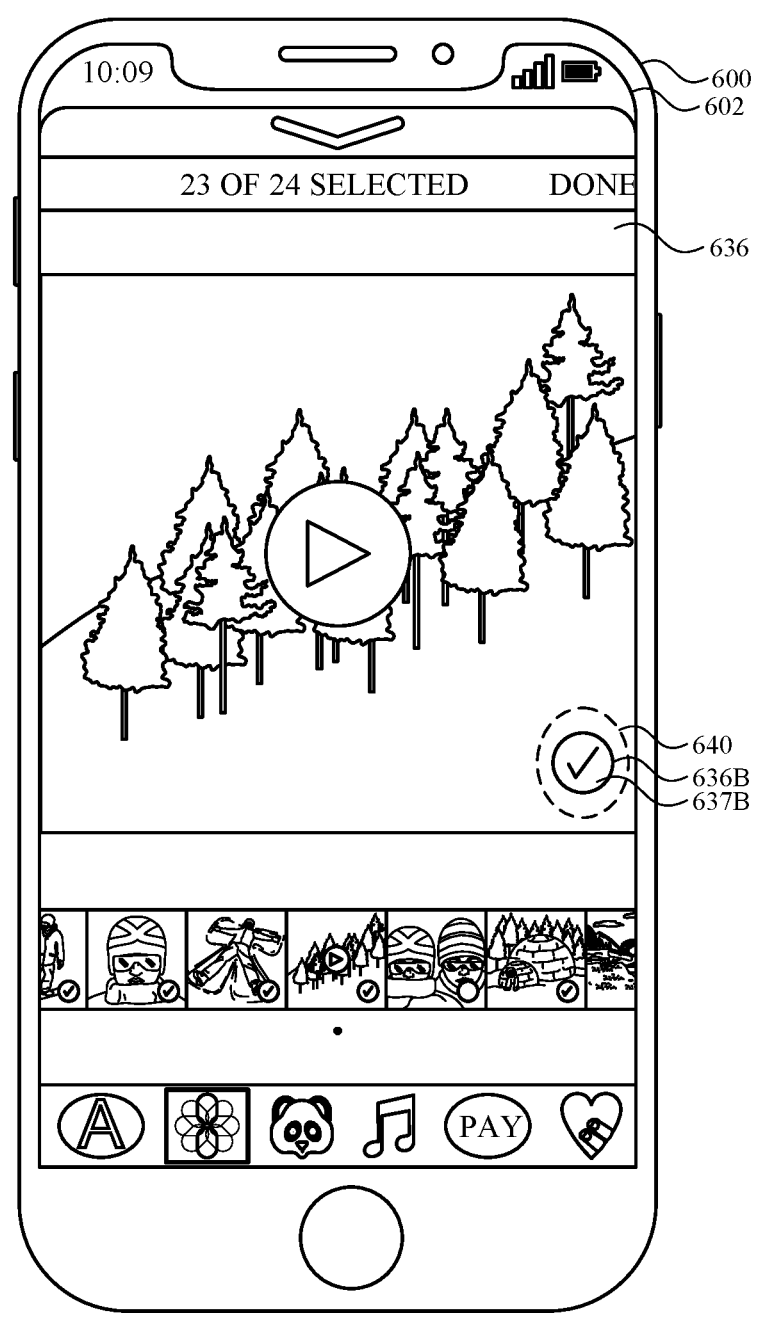
Figure 6A:
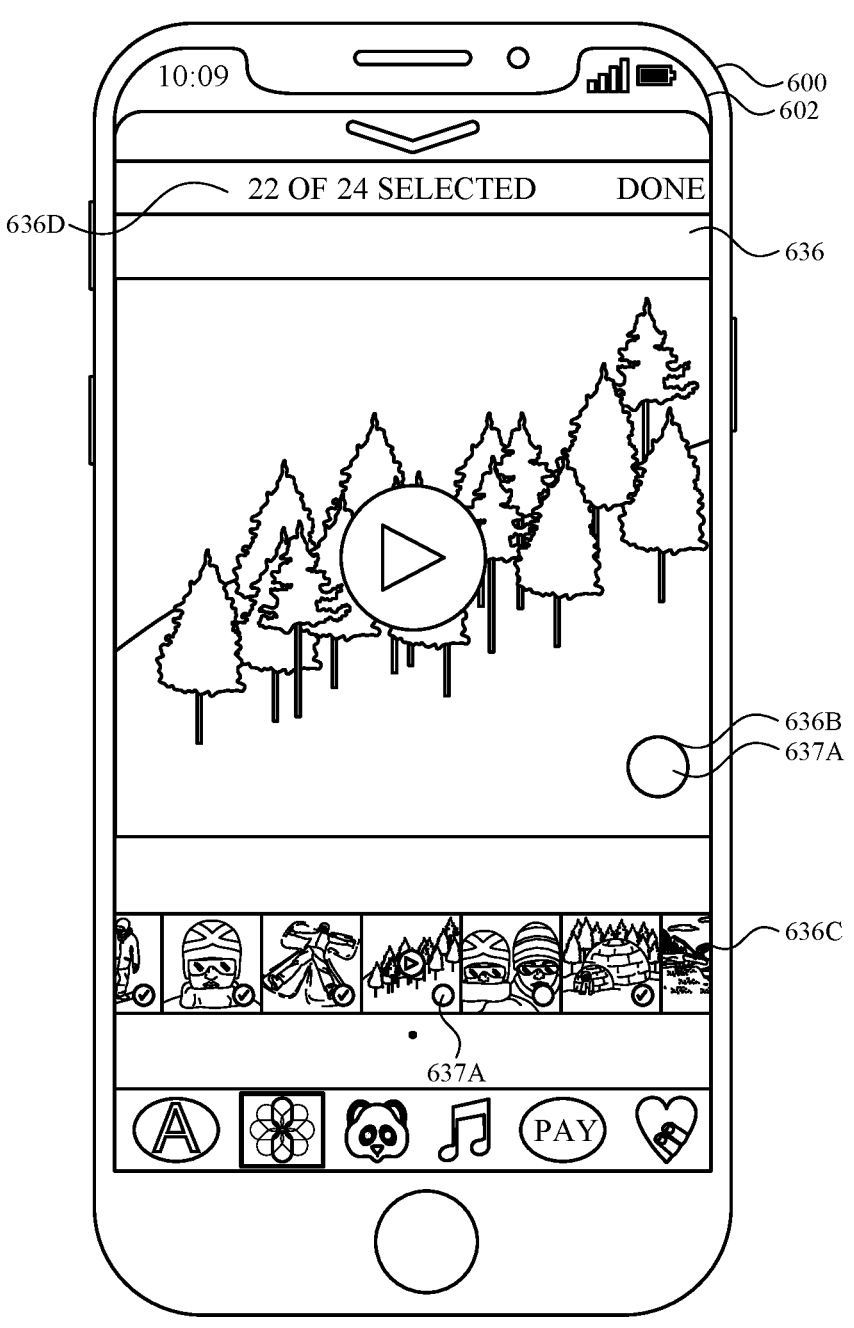
Figure 6A:
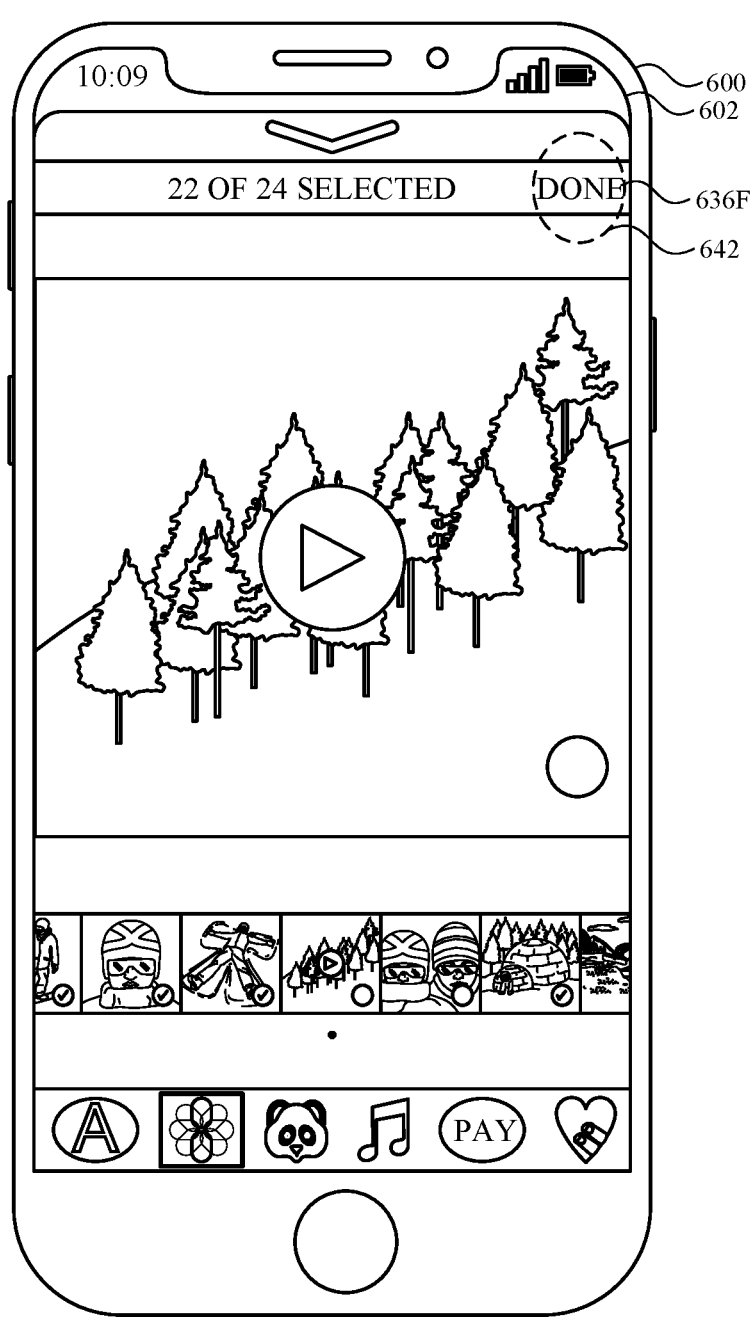
Figure 6A:
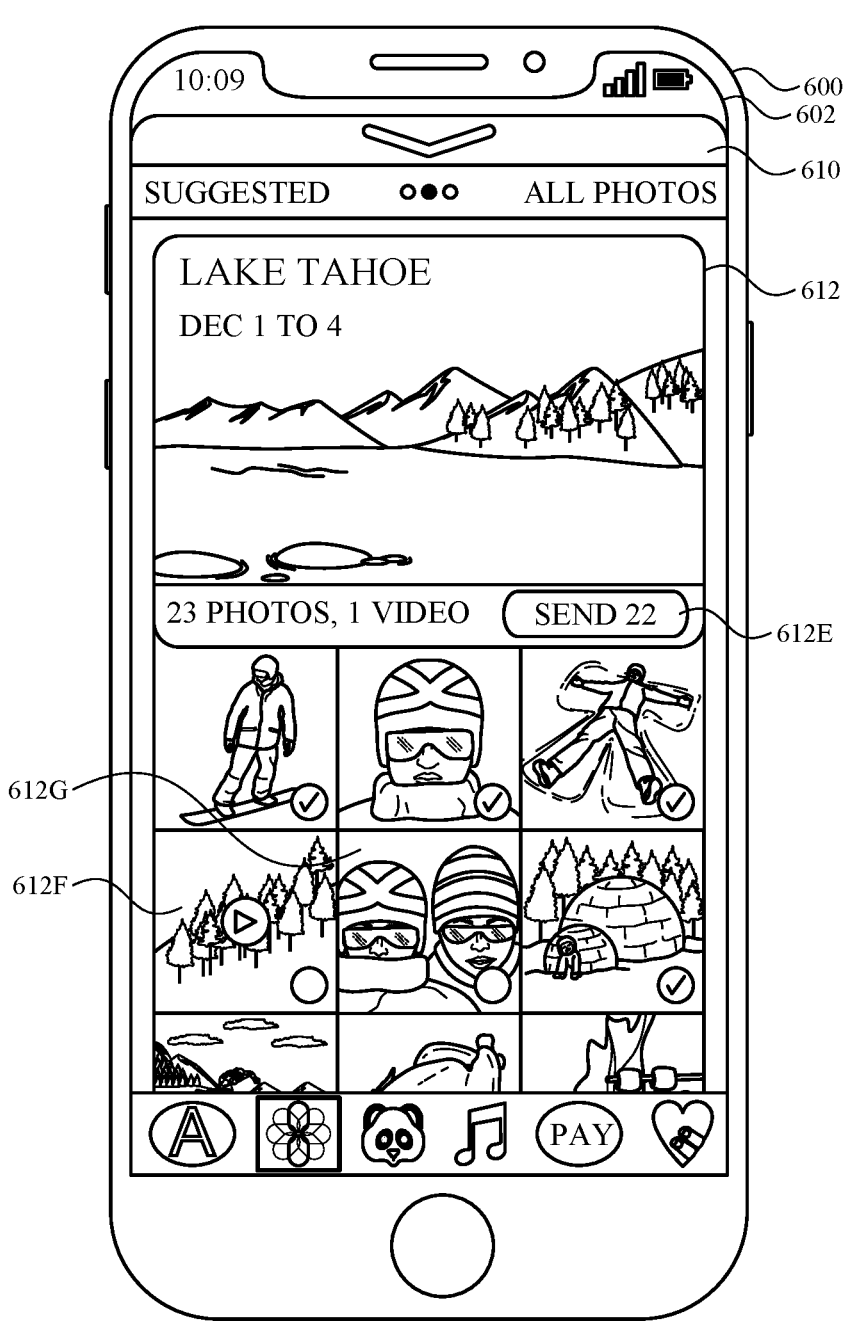
Figure 6A:
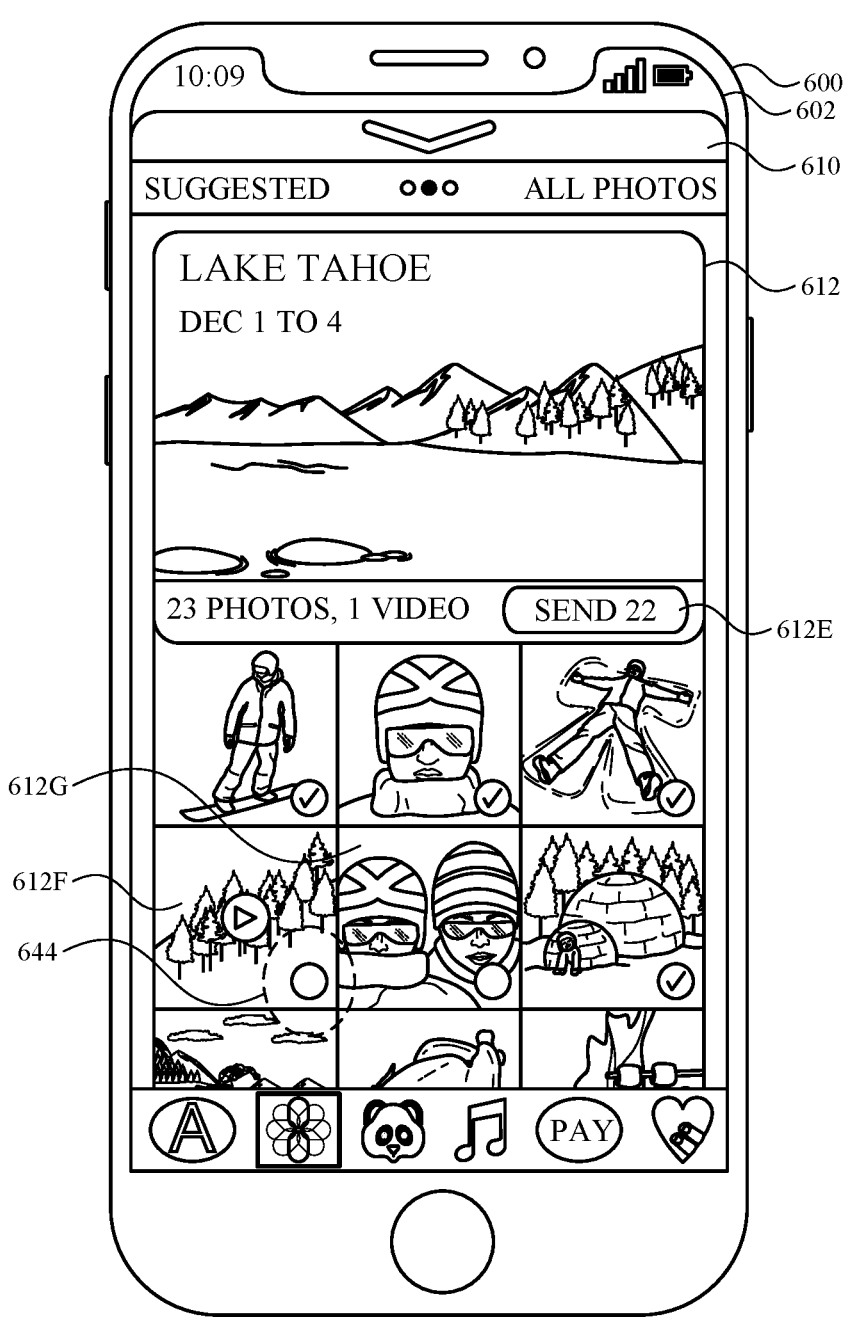
Figure 6A:
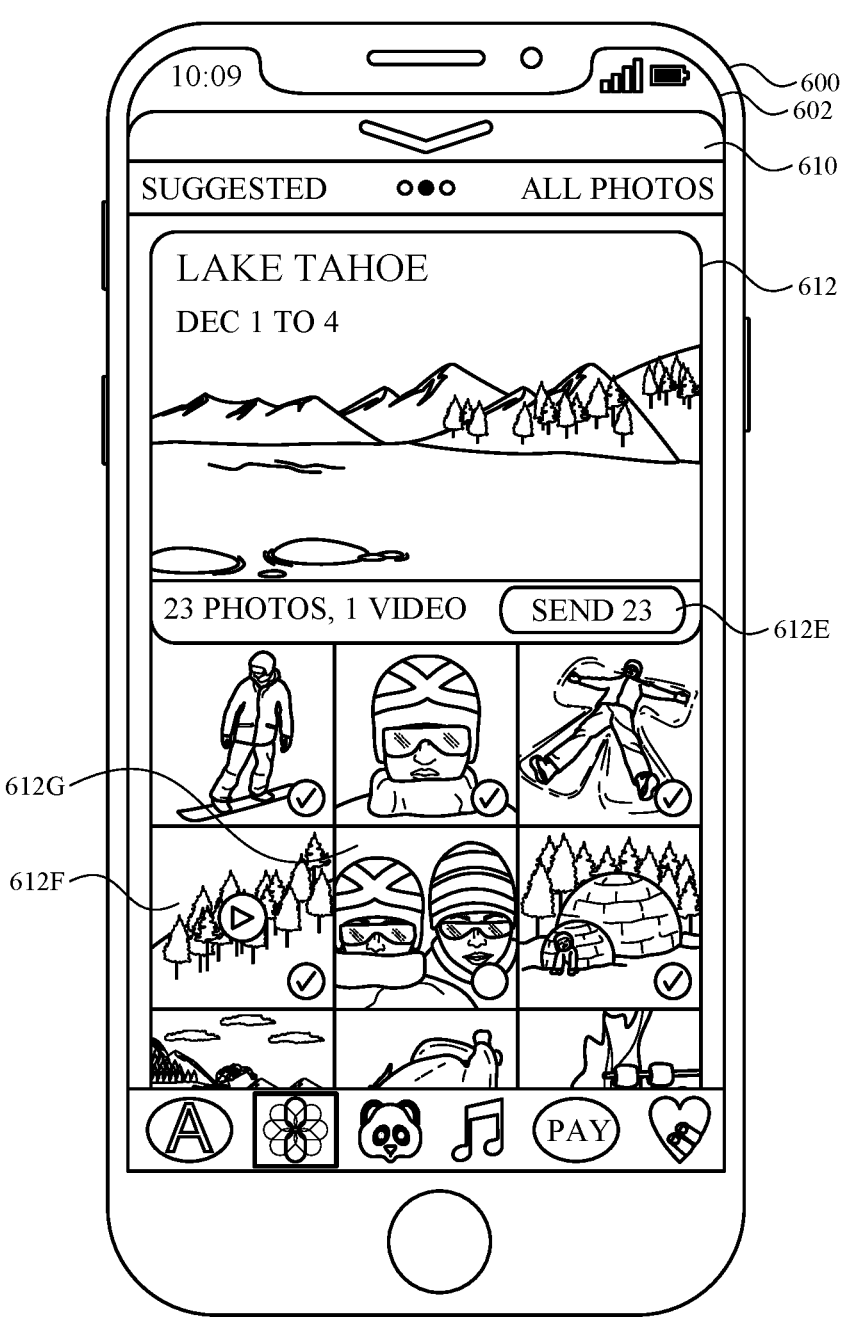
Figure 6A:
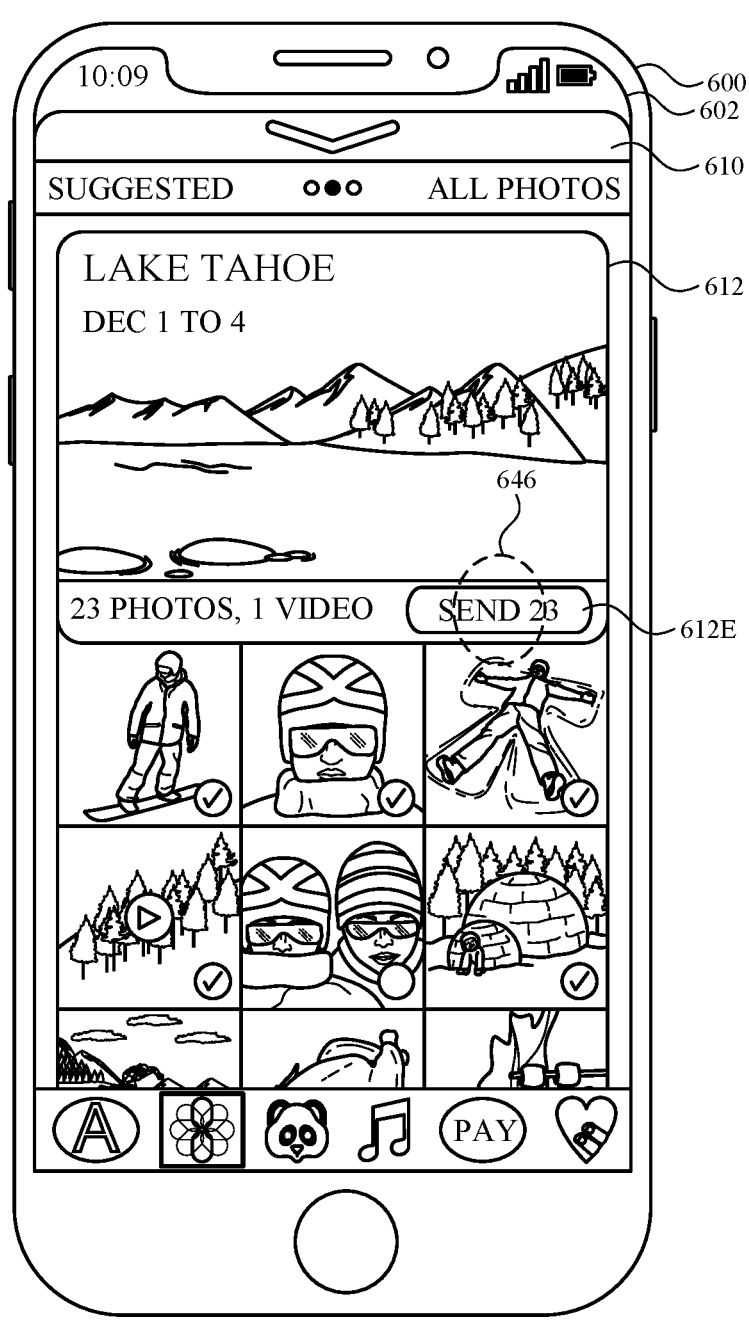
Figure 6A:
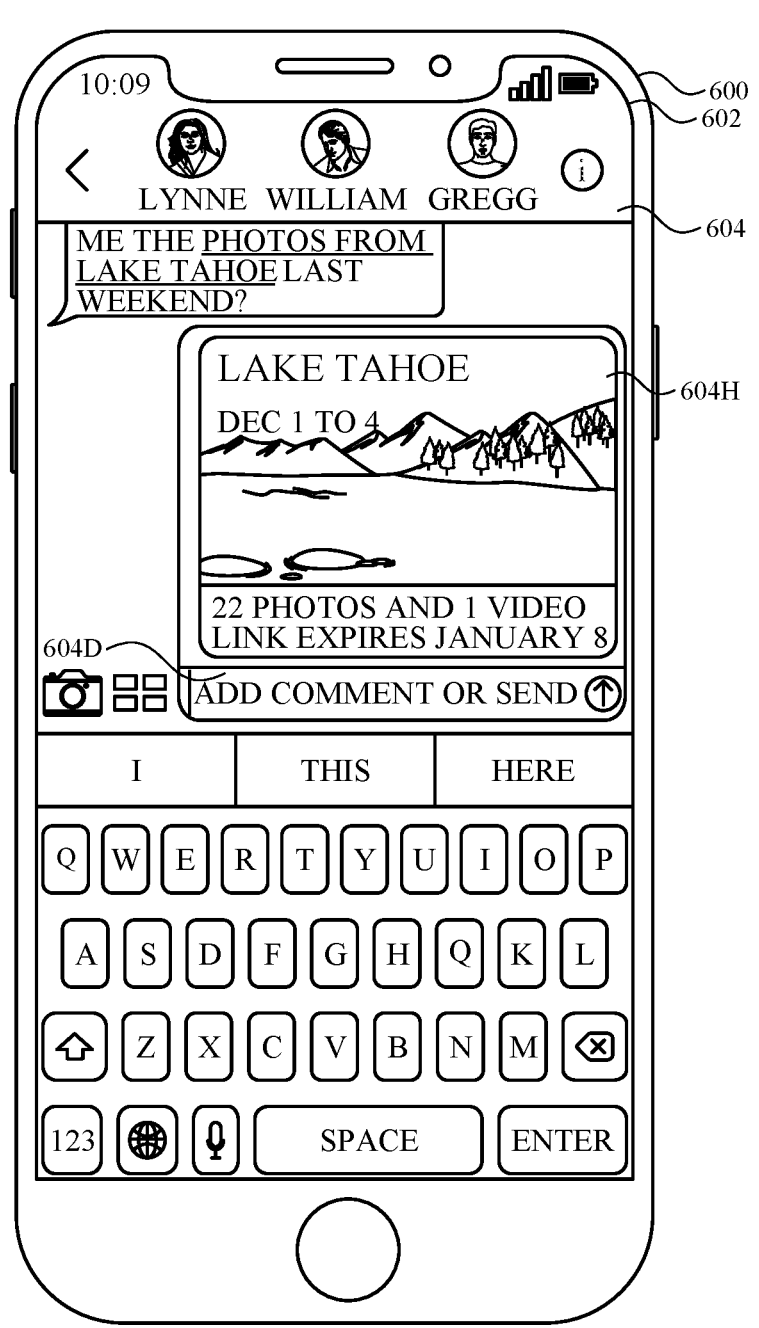
Figure 6A:
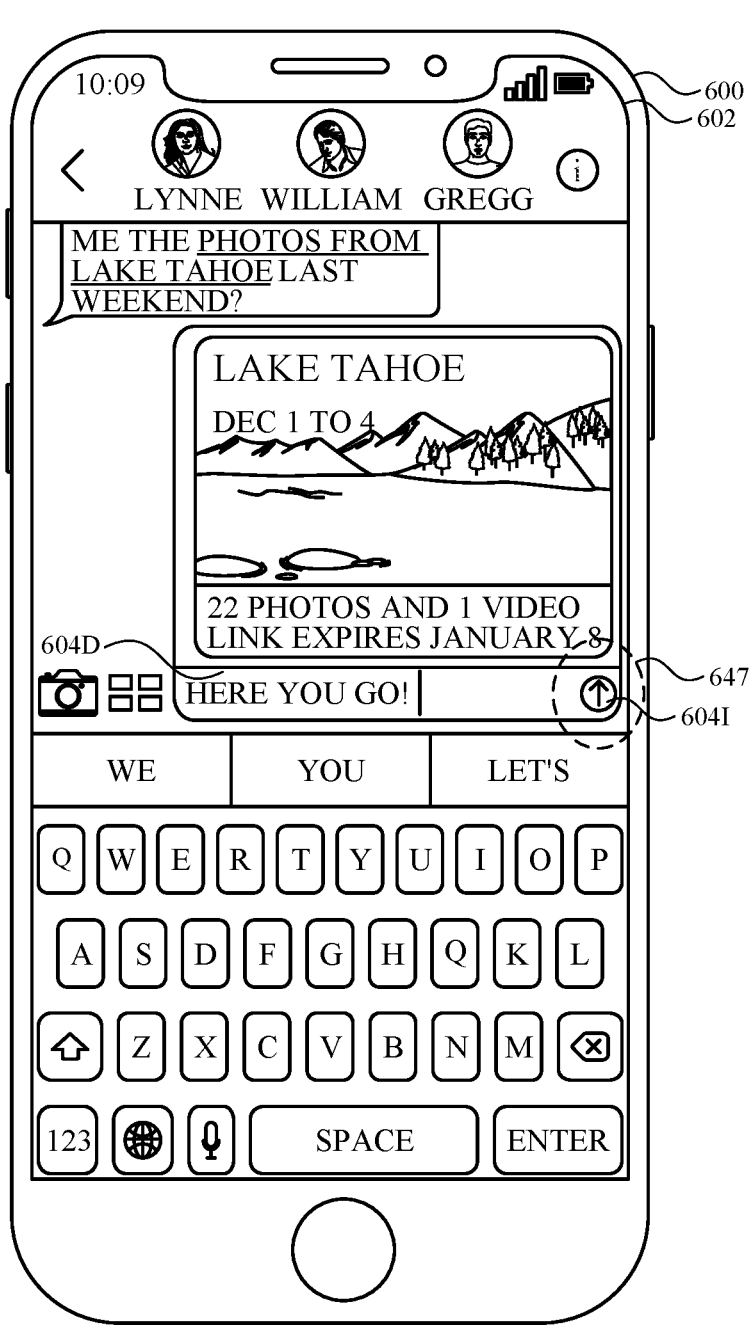
Figure 6A:
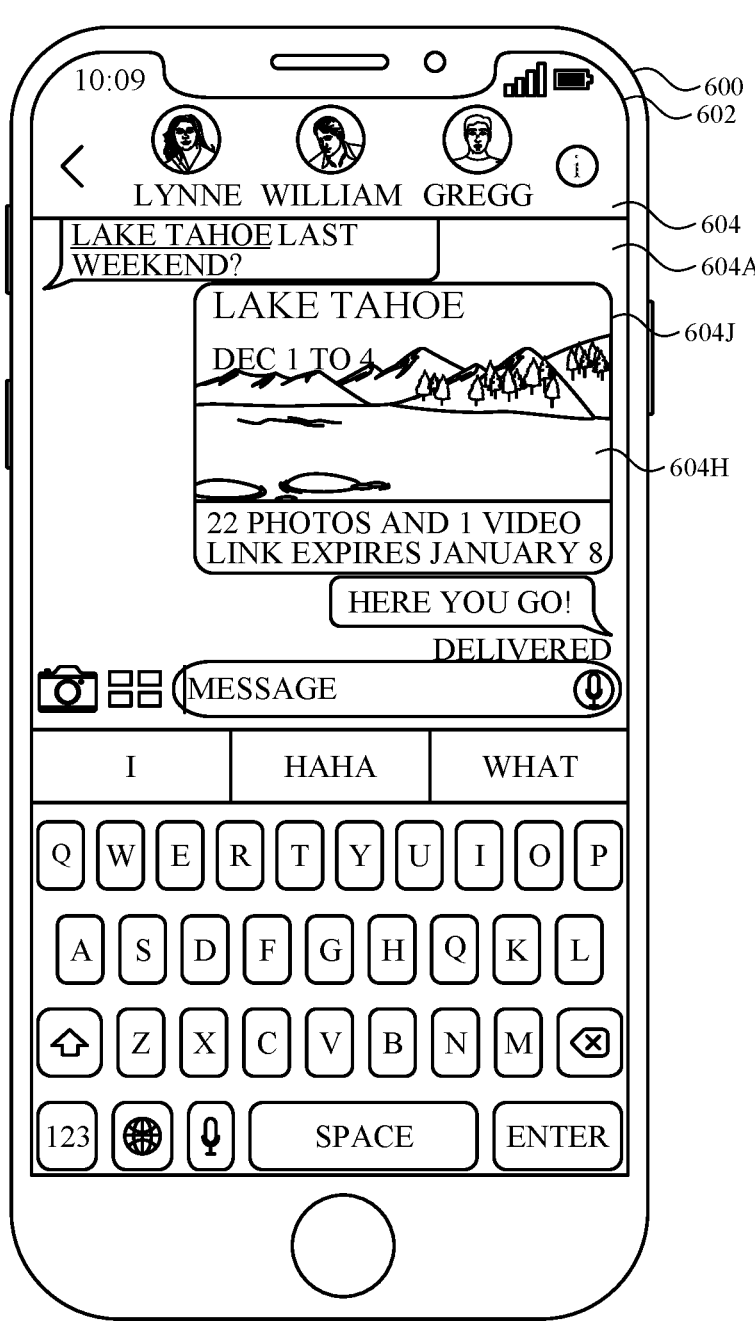
Figure 6A:
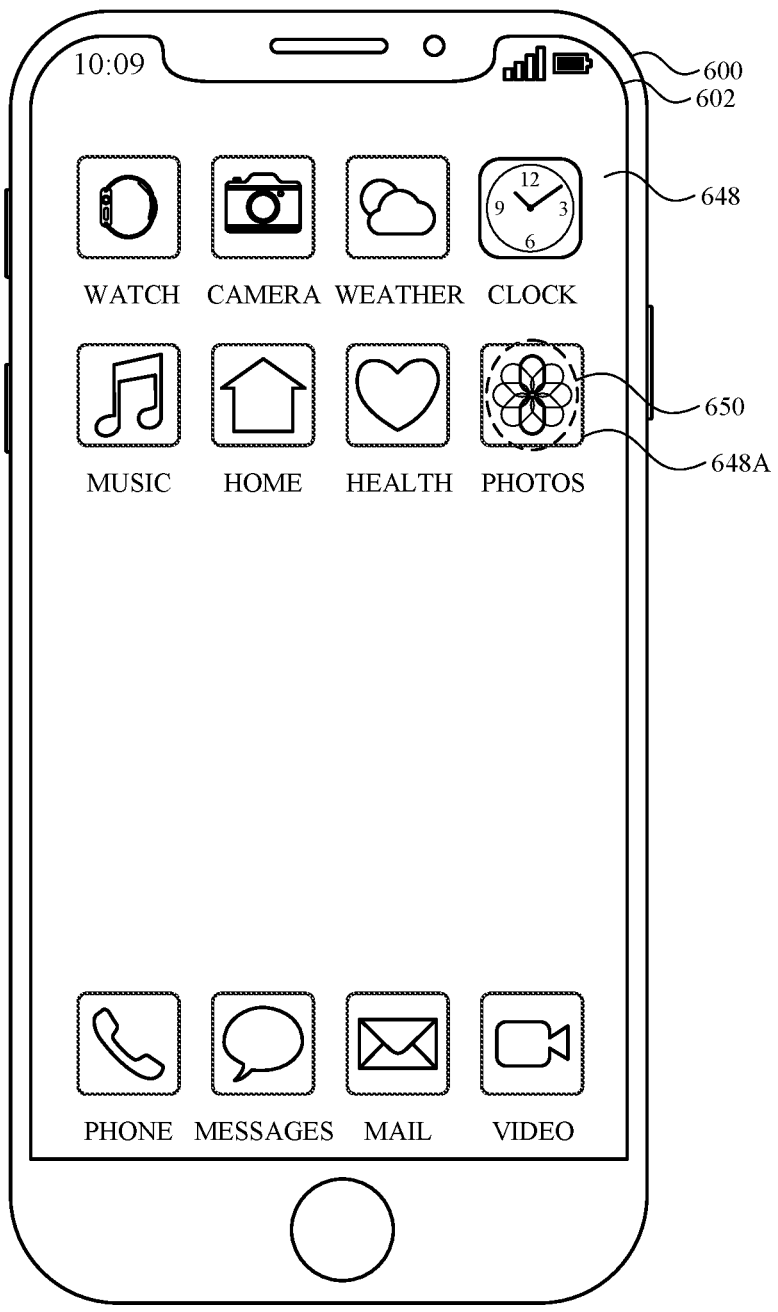
Figure 6A:
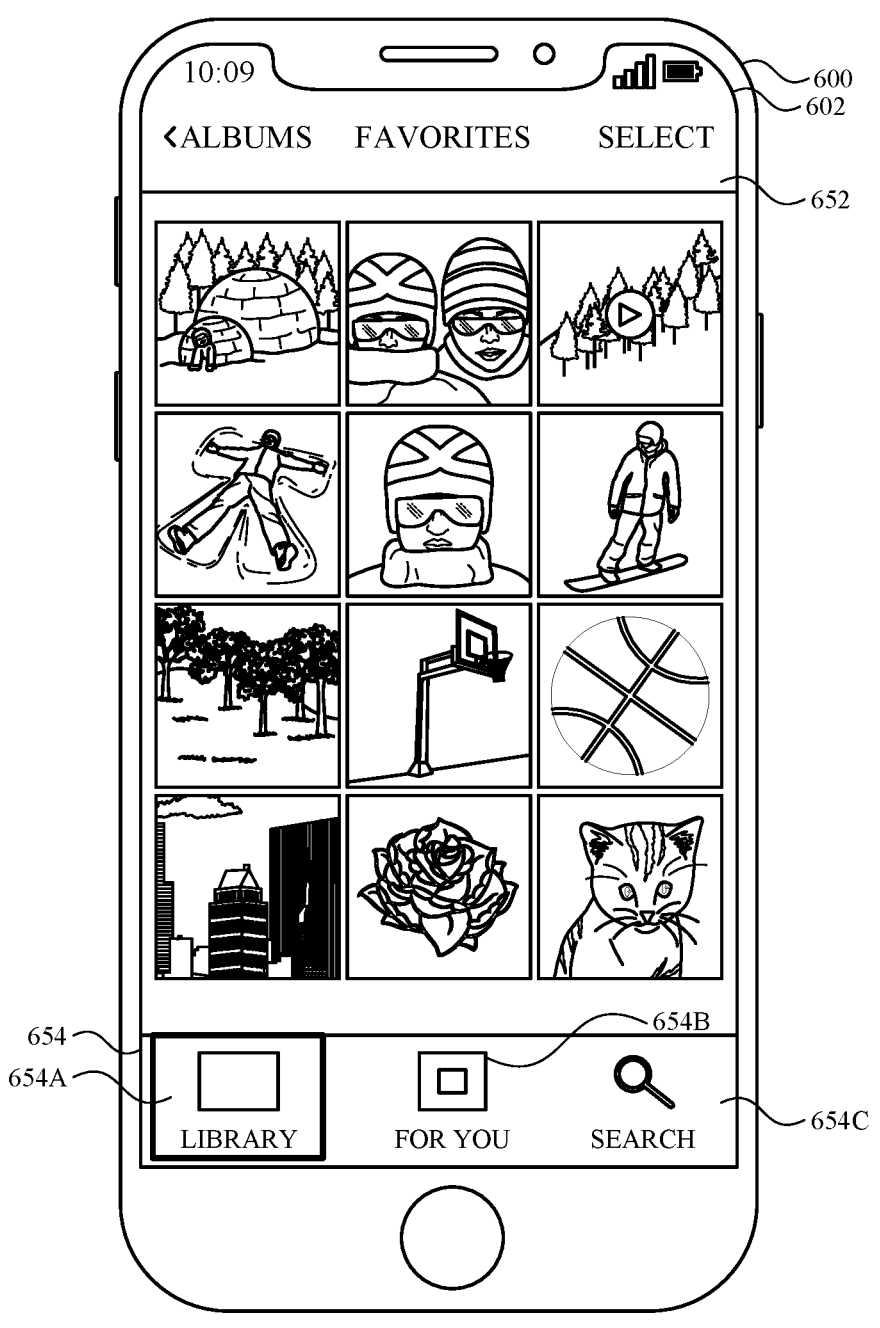
Figure 6A:
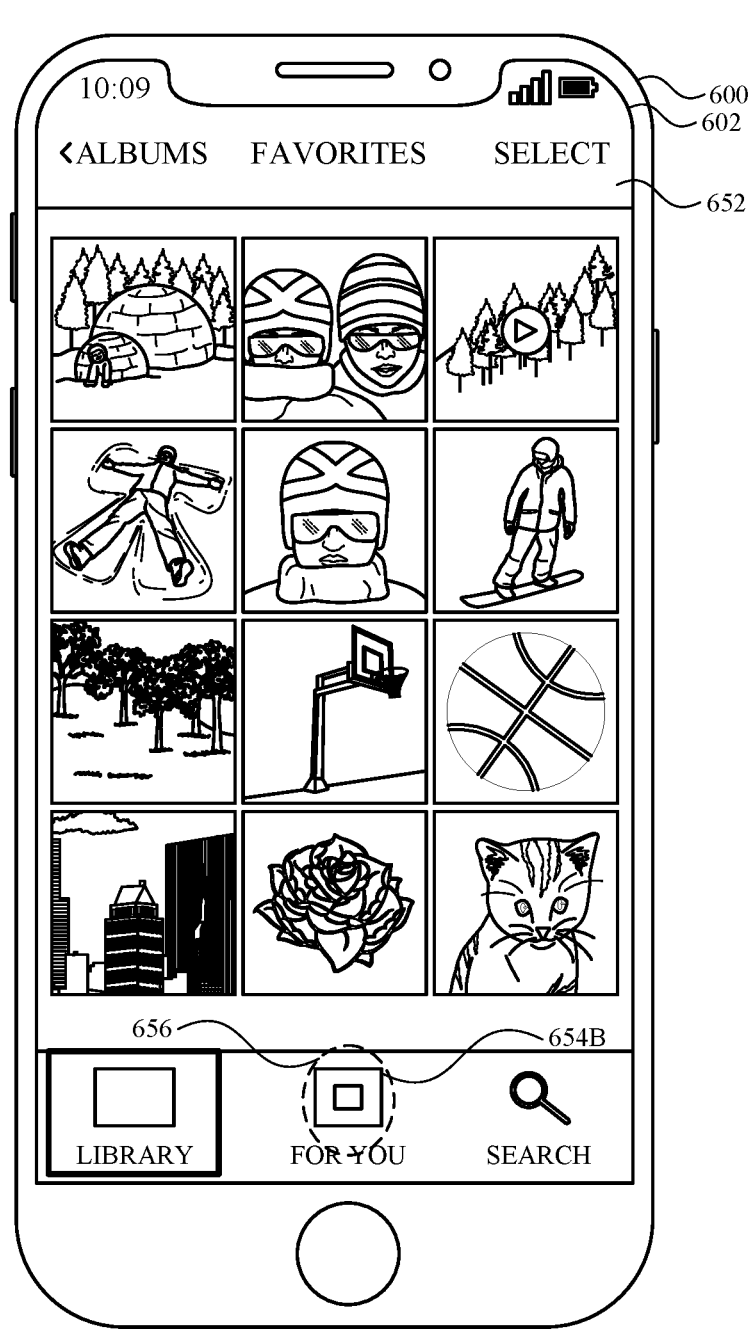
Figure 6A:
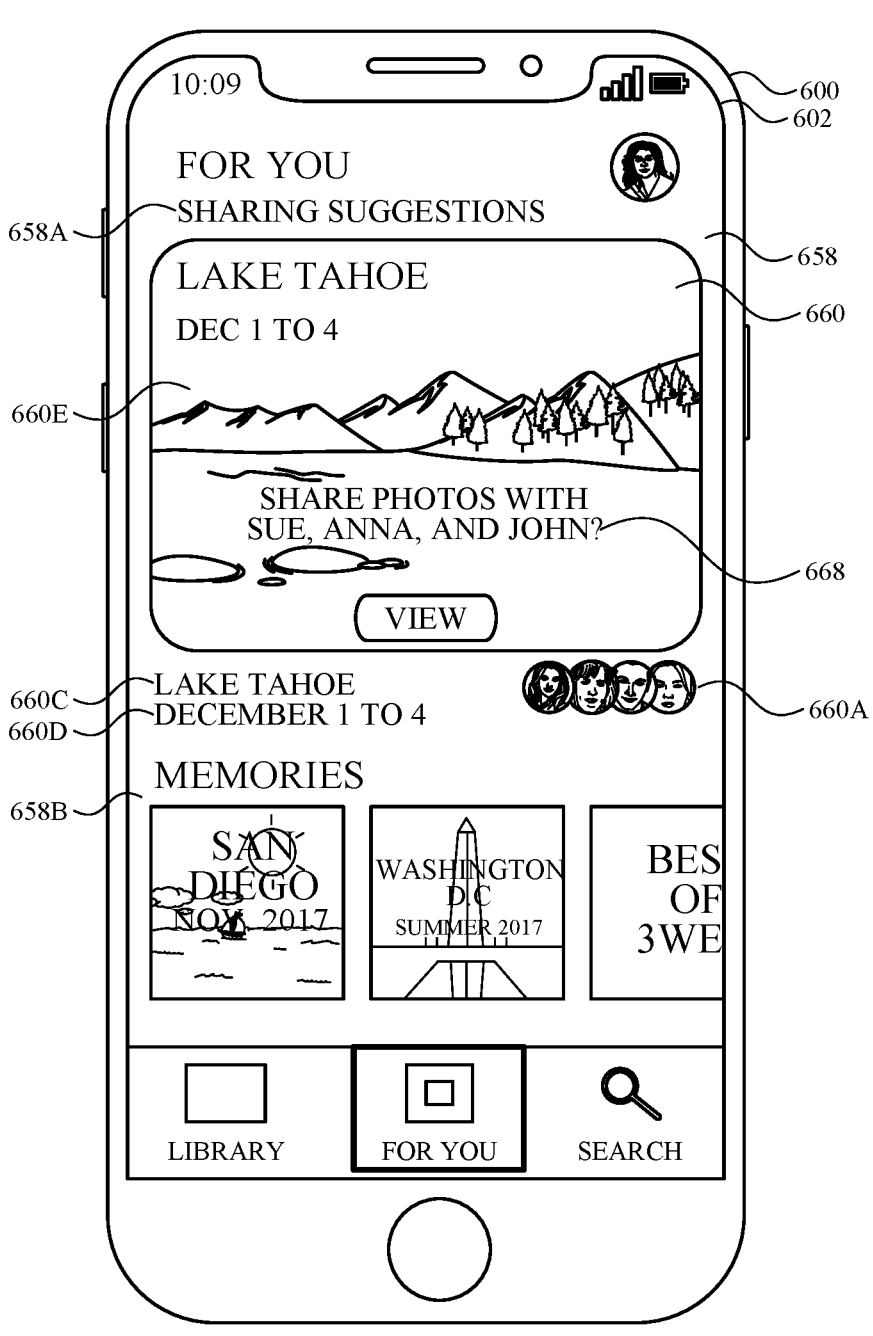
Figure 6A:
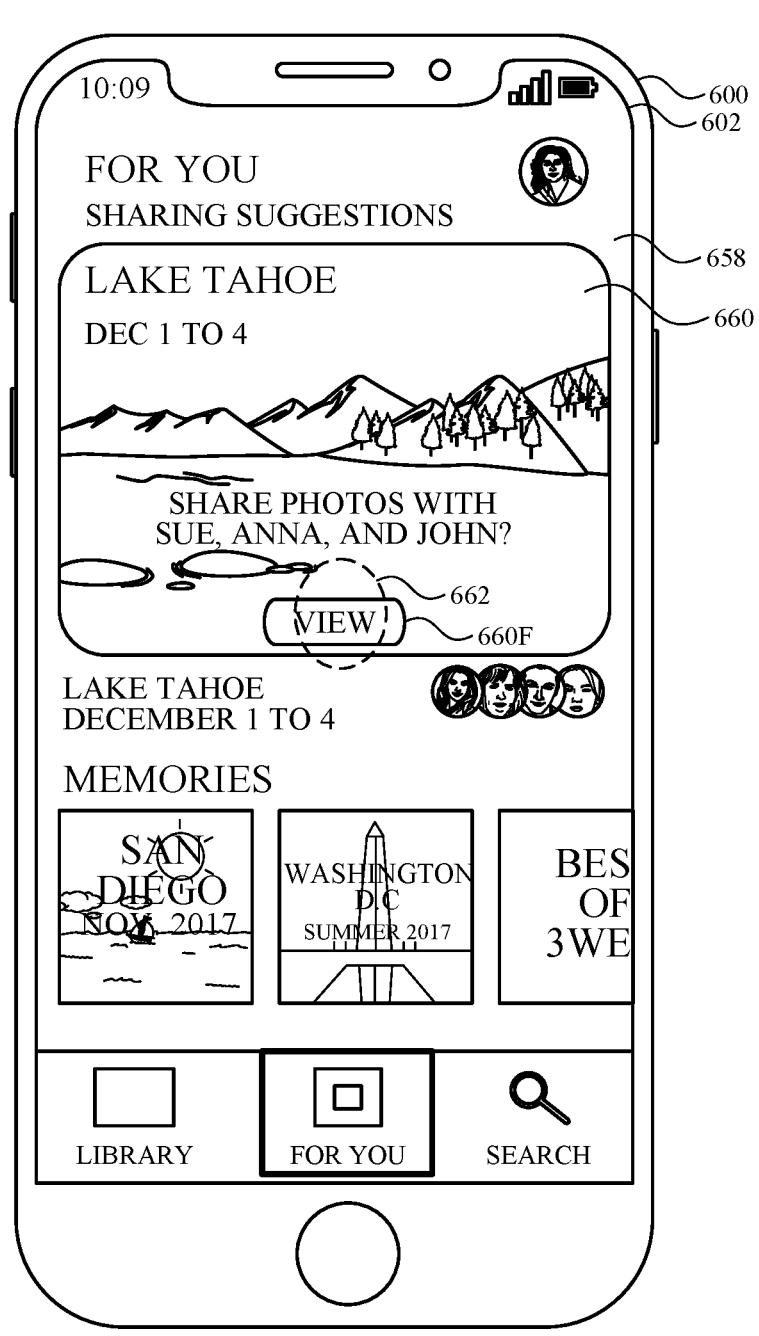
Figure 6A:
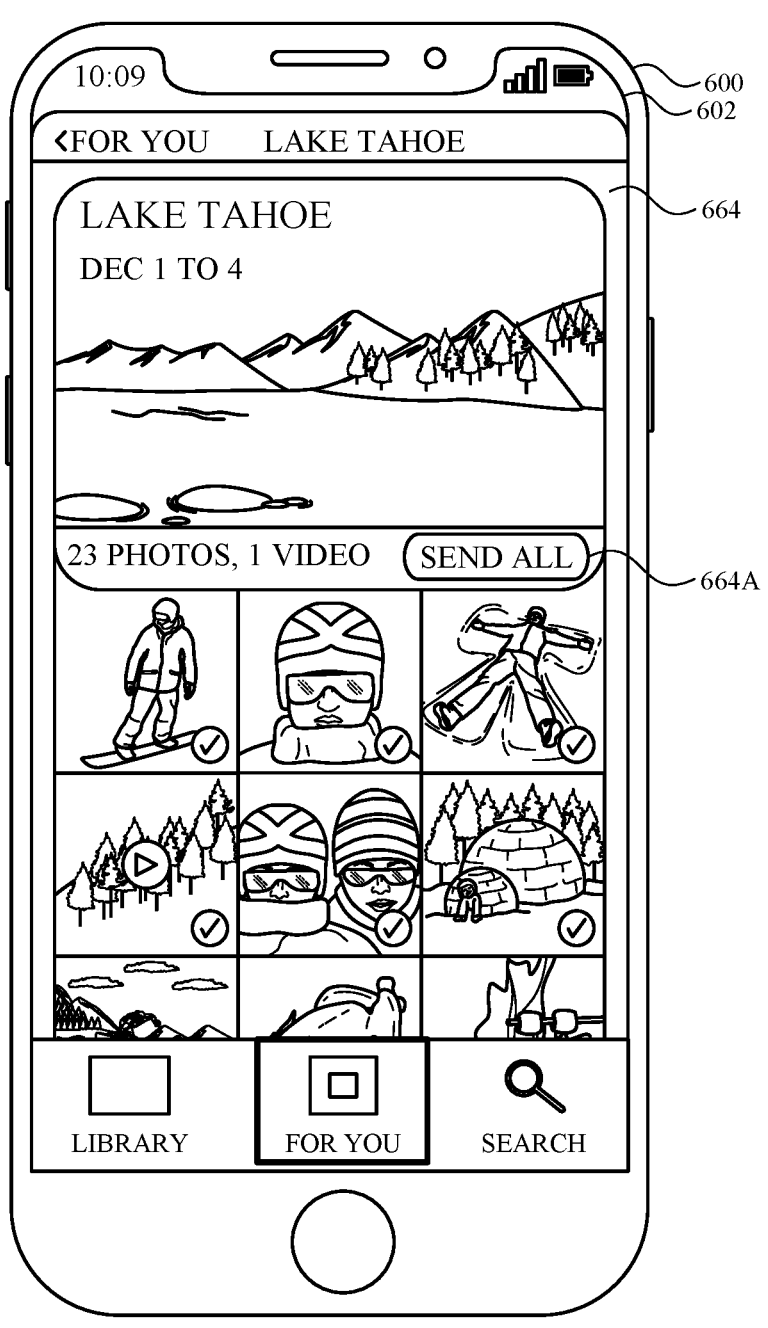
Figure 6A:
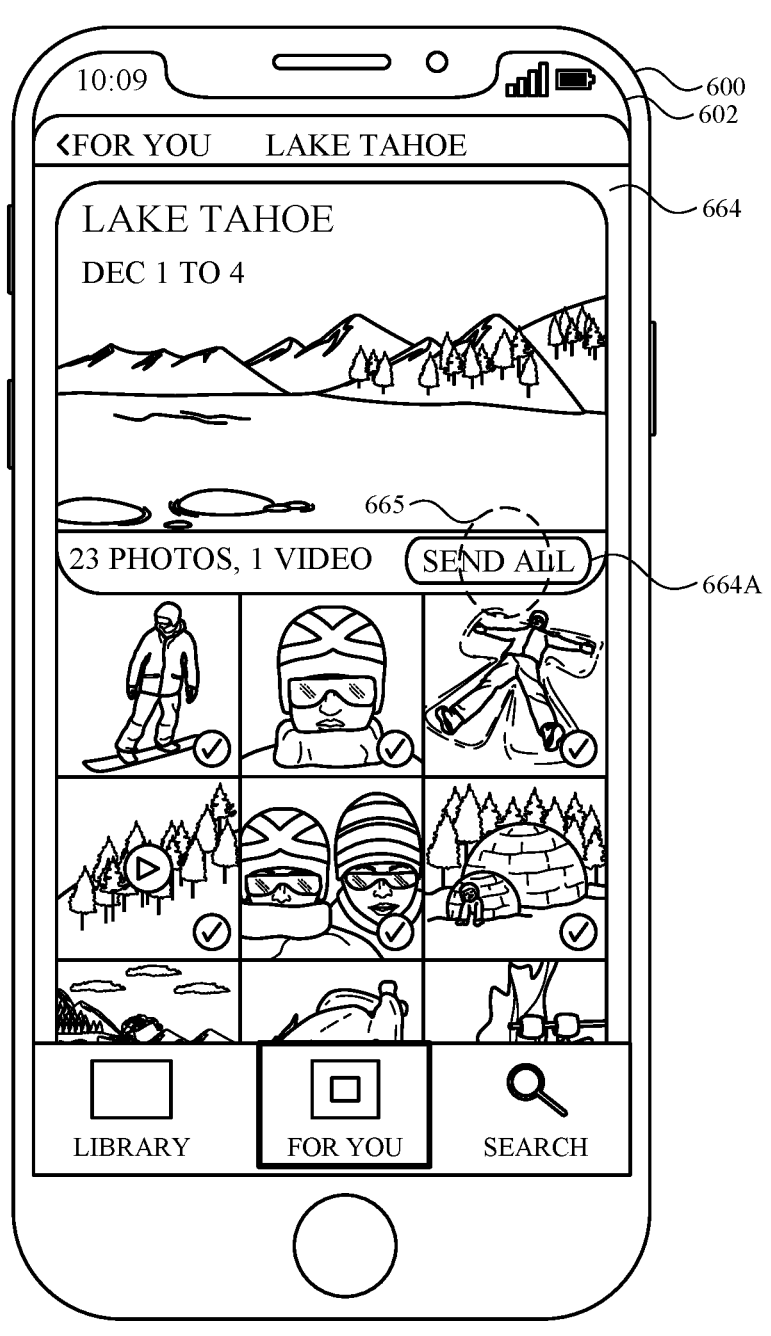
Figure 6A:
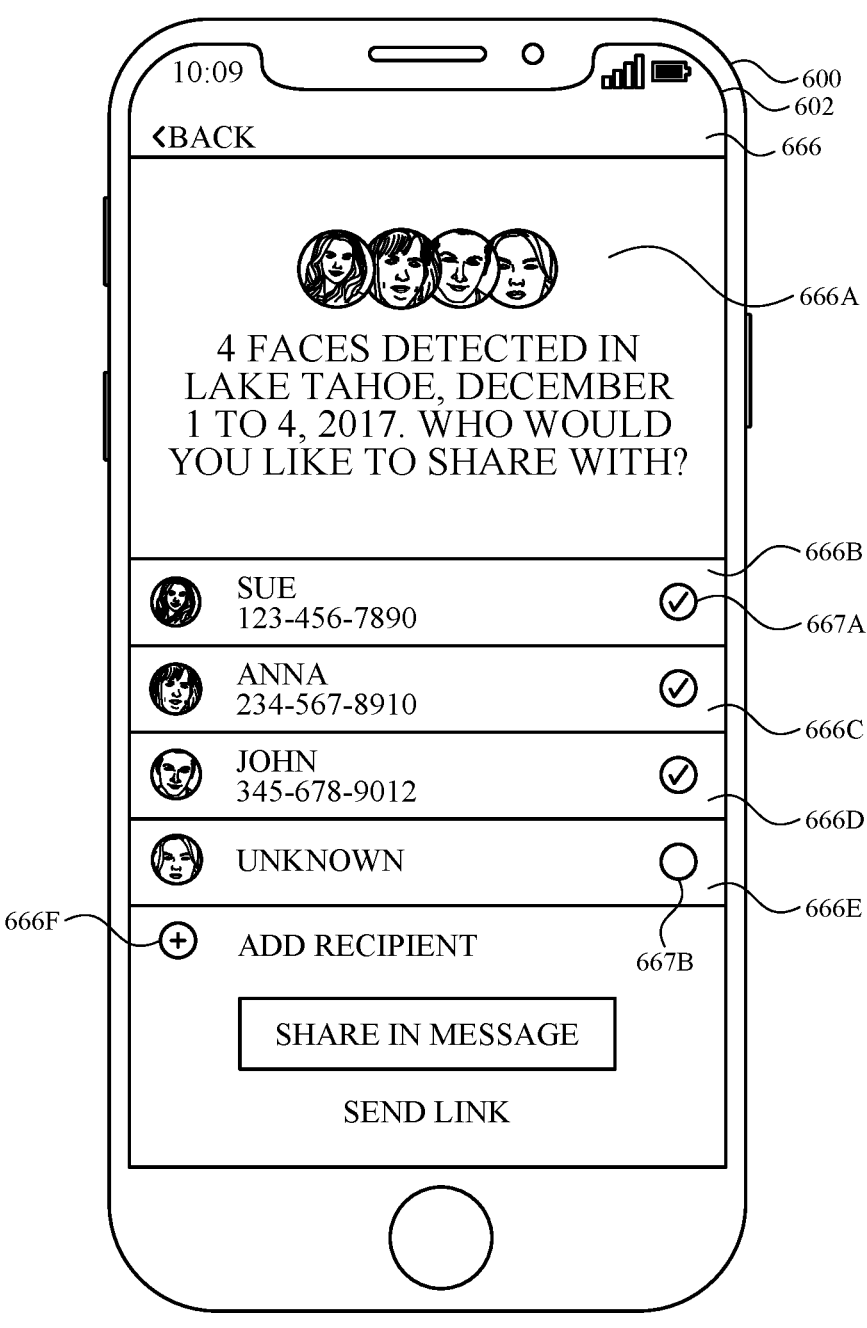
Figure 6A:
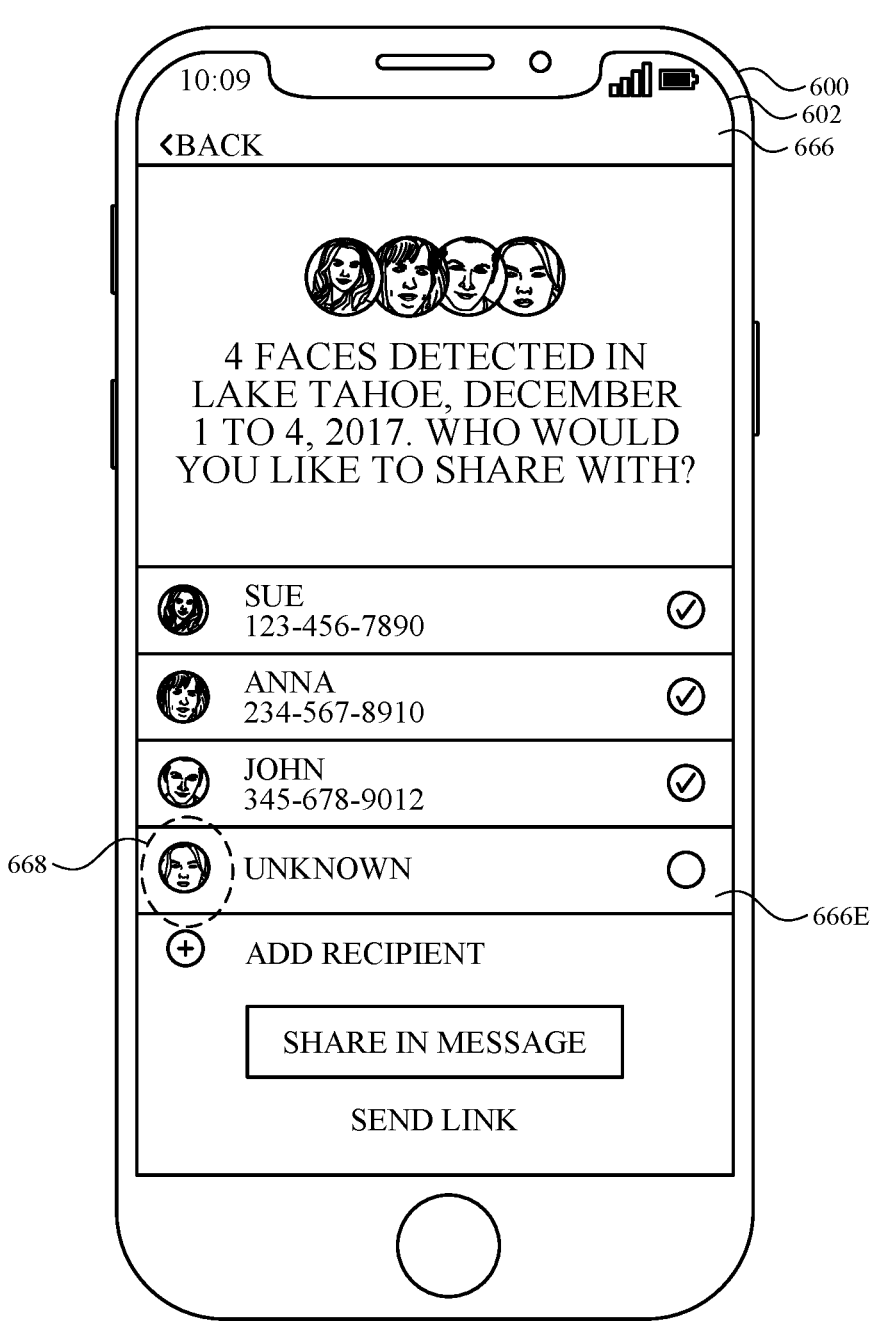
Figure 6A:
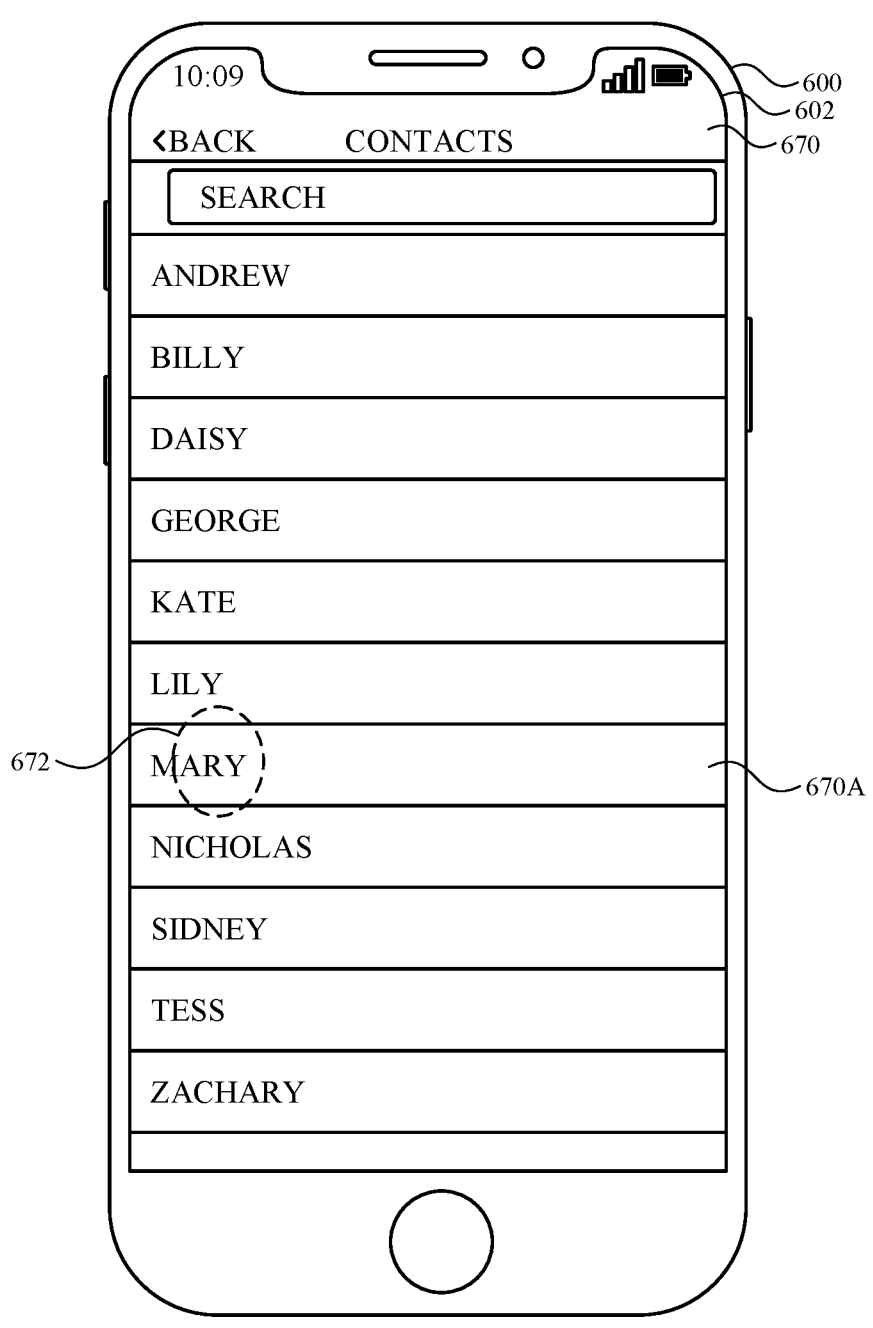
Figure 6A:
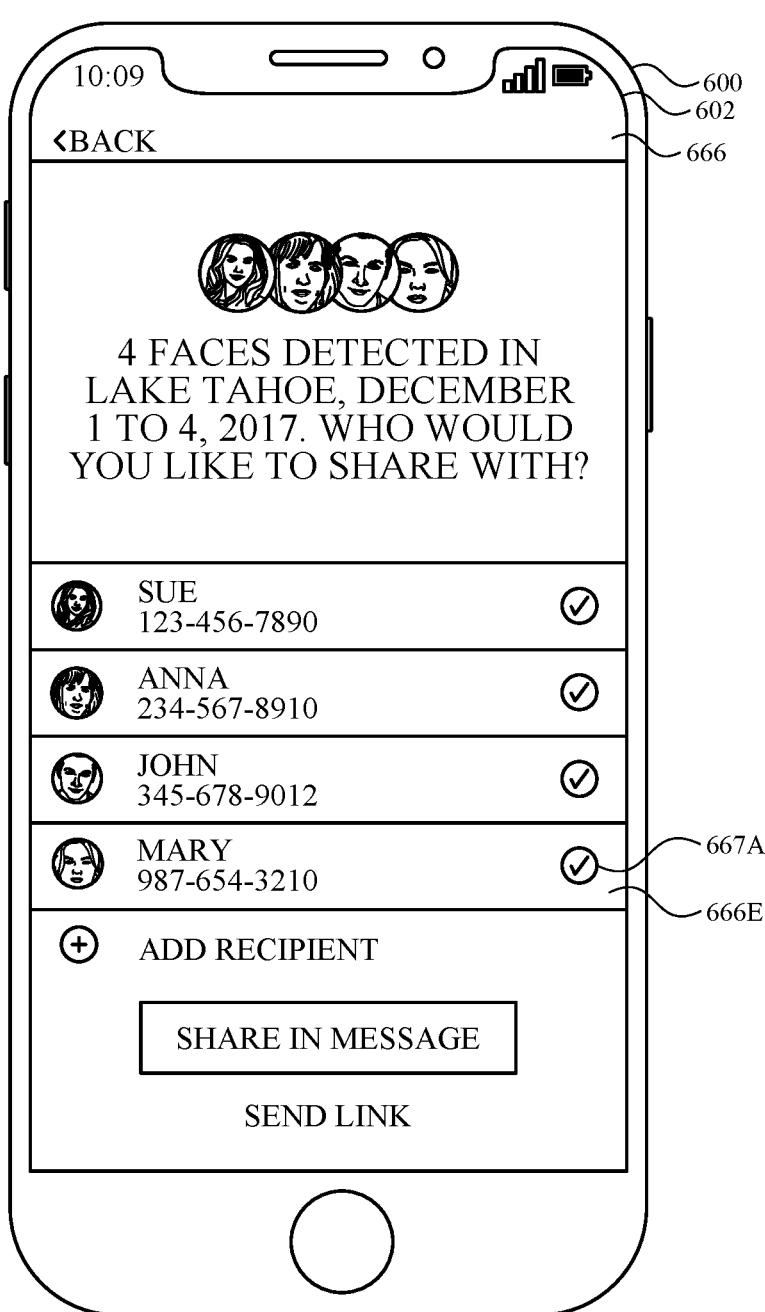
Figure 6A:
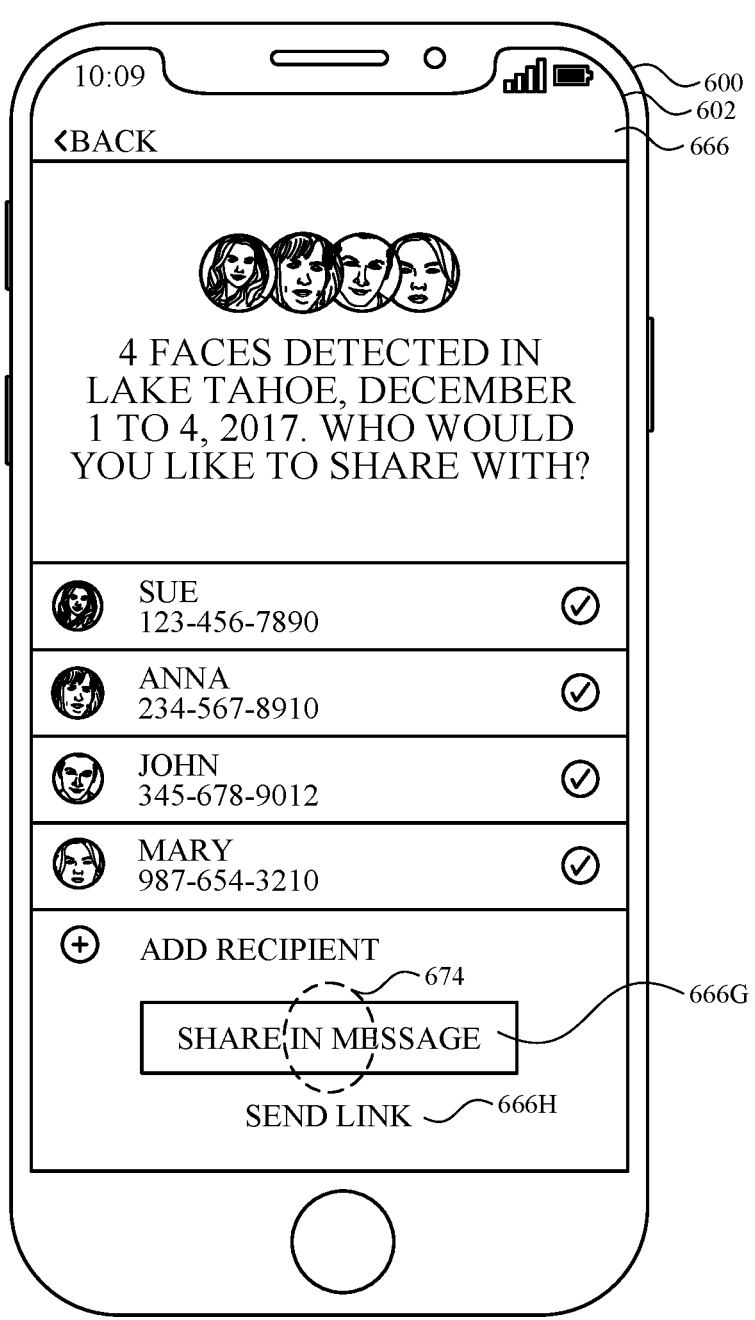
Figure 6A:
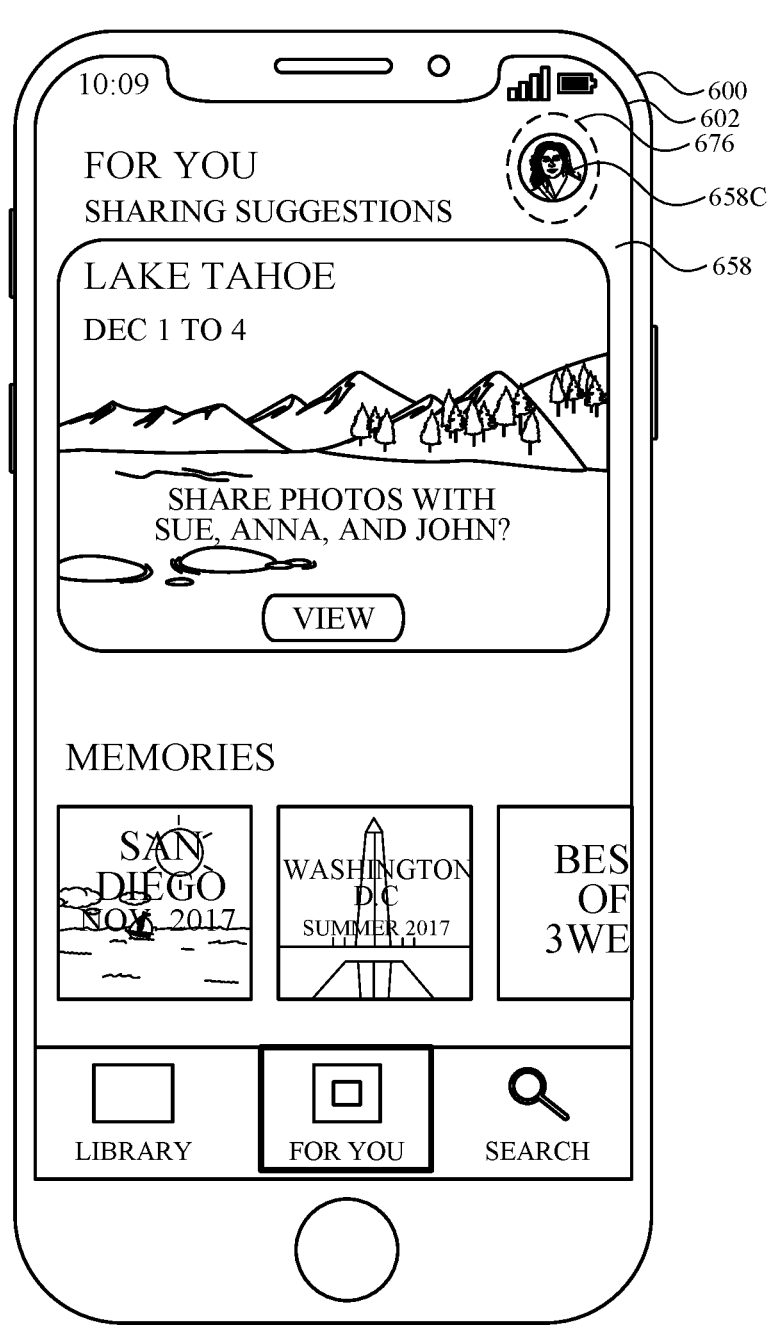
Figure 6A:
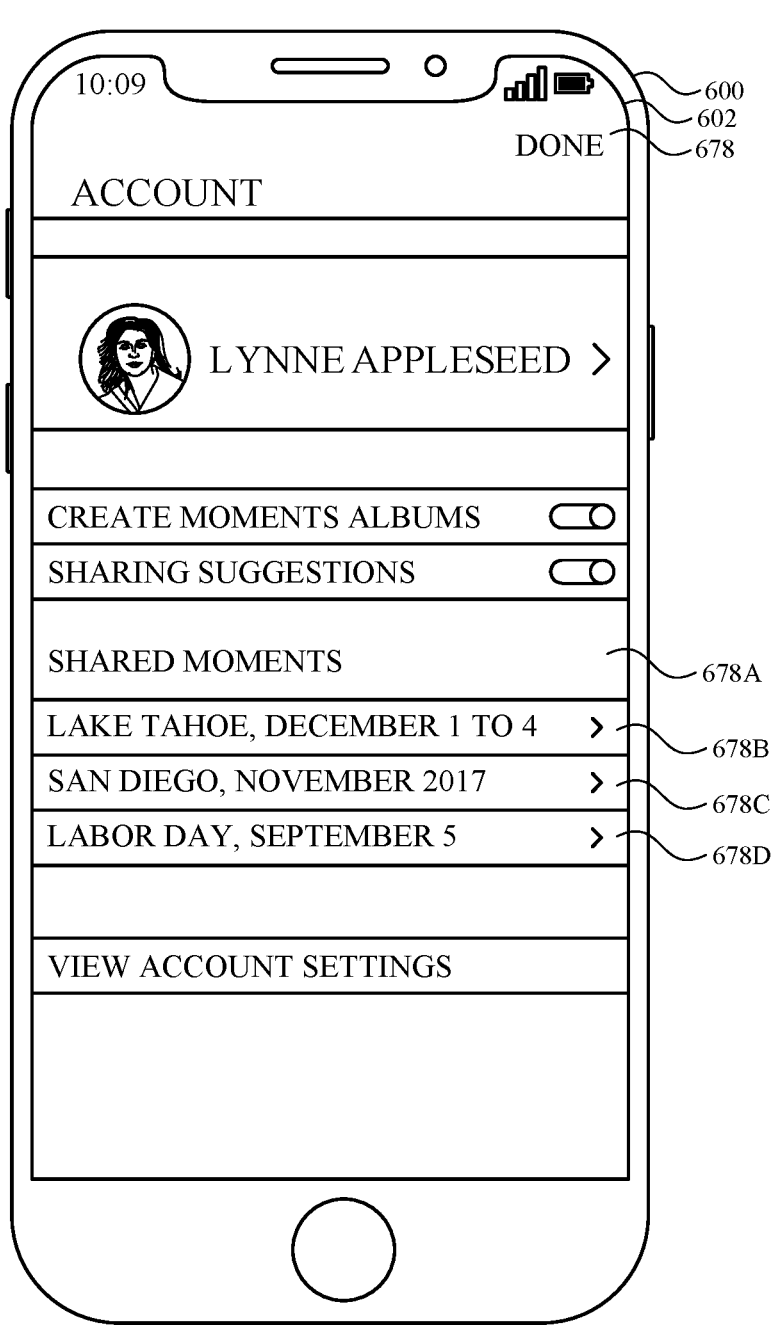
Figure 6A:
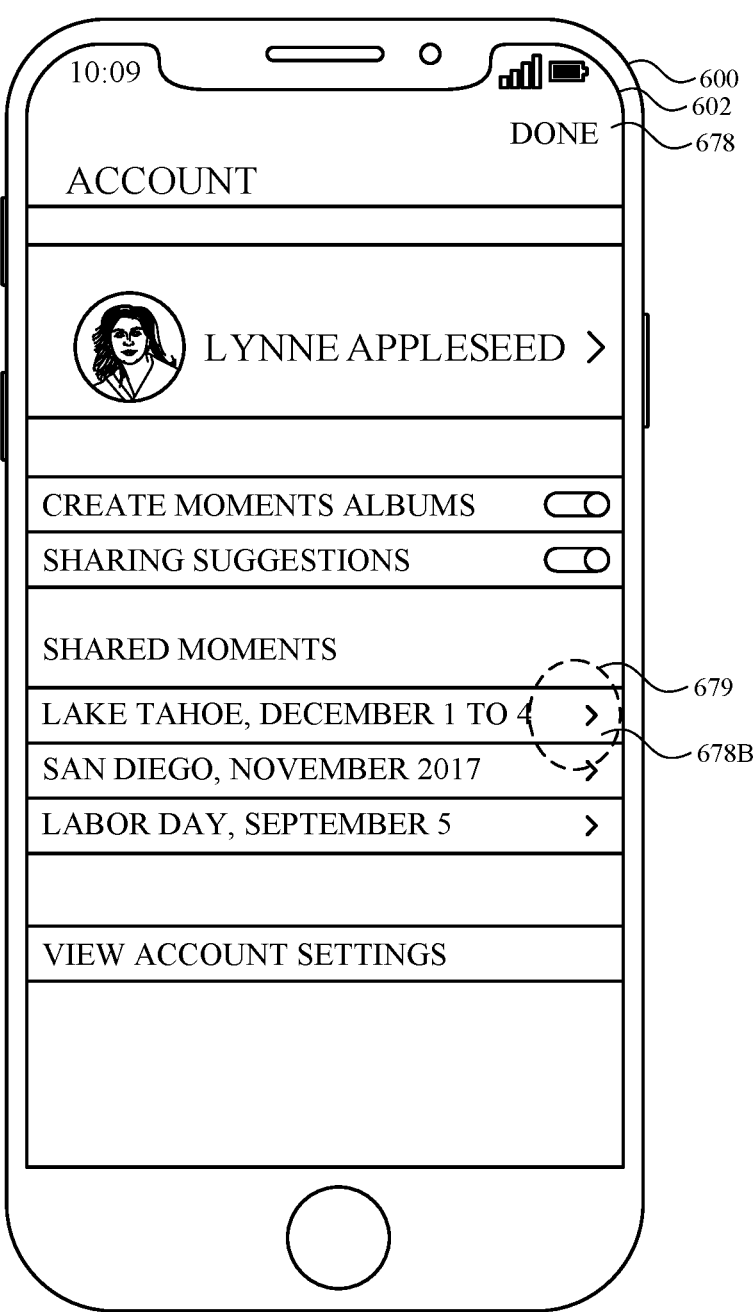

While displaying a media item in the one-up view, the device optionally provides the user with the option to view another media item from the suggested collection in the one-up view without having to return to the grid view. In some embodiments, the device receives user input (e.g., 638) while displaying a first media item in a one up view, and in response, replaces display of the first media item (e.g., 612G in FIG. 6Y) in a one up view with display of a second media item (e.g., 612F in FIG. 6AA) in a one up view. For example, at FIG. 6Z, device 600 receives user input 638, representing a right swipe gesture, while media item 612G is displayed in one-up view 636. In response to receiving user input 638, device 600 displays media item 612F in one-up view 636, as shown in FIG. 6AA. In some embodiments, the user input is associated with a scrubbing region (e.g., 636C). For example, interface 636 as shown in FIG. 6AA can be displayed in response to selection of 612F in scrubbing region 636, or in response to a swipe that scrubs the selection in region 636C to another media item.

FIG. 6AA illustrates media item 612F in one-up view 636. Media item 612F is adjacent and to the left of media item 612G (e.g., as shown in suggested collection interface 612 of FIG. 6X, and as shown in area 636C of FIG. 6Y). Thus, the single right swipe gesture 638 causes display of media item 612G in the one up view with media item 612F in the one up view. In some embodiments, the device (e.g., 600) plays a video in response to user selection received while in a one-up view of a media item. For example, as shown in FIG. 6AA, device 600 displays playback affordance 636E associated with (e.g., overlaying) media item 612F, which is a video. In response to user input representing selection of playback affordance 636E, device 600 begins playback of at least a portion of media item 612F.

As shown in FIG. 6AA, media item 612F is currently selected—thus, media item 612F includes a selection indicator 637B (a checkmark in this example) in one up view 636. In some embodiments, the device (e.g., 600) toggles whether a media item is selected in response to user input request to toggle selection of a media item that is received while in a one-up view of a media item. For example, at FIG. 6AB, device 600 receives user input 640, representing selection of selection indicator 637B, while media item 612F is selected. In response to user input 640, device 600 toggles the selection of media item 612F from being selected to being unselected. For example, in FIG. 6AC, media item 612F is no longer selected, and thus selection indicator 637B is no longer displayed, but unselected indicator 637A is displayed instead in the indication of selection 636B. Likewise, if user input 640 is received while media item 612F is not currently selected (e.g., while indicator 637B is not displayed with media item 612F, but unselected indicator 637A is displayed), then in response to user input 640, device 600 would toggle selection of media item 612F from being unselected to being selected, and optionally display selection indicator 637B with media item 612F. Also shown in FIG. 6AC, an unselected indicator 637A is also displayed (and selection indicator 637B ceases to be displayed) associated with (e.g., at a location of) the reduced size representation of media item 612F in scrubbing region 636C.

In some embodiments, in response to toggling selection, the device updates an indication of an amount of selected media. For example, as shown in FIG. 6AC indicator 636D has been updated in response to user input 640, and now indicates that only 22 items are selected, stating: "22 of 24 selected".

In some embodiments, the device (e.g., 600) receives user input and, in response to receiving the user input, replaces display of the one-up view with display of the grid view. For example, at FIG. 6AD, device 600 receives user input 642 corresponding to selection of done affordance 636F. As shown in FIG. 6AE, in response to receiving user input 642, device 600 ceases displaying a one-up view 636 of a suggested collection interface and displays a grid view (e.g., suggested collection interface 612).

In some embodiments, the set of media items that are currently selected is independent of how the media items are viewed. For example, FIG. 6AE illustrates that sharing affordance 612E in the grid view has again been updated to reflect an amount of media items that are currently selected. That is, because media item 612F is no longer selected, sharing affordance 612E has changed from reading "SEND 23" in FIG. 6X to now read "SEND 22" (e.g., reflecting that 22 items are currently selected, due to media items 612F and 612G being unselected of the total of 24 media items). Thus, the set of media items that were currently selected in the one-up view are still selected in the grid view (and unselected media items remain unselected). Accordingly, the one-up view can be used to undo changes made in the grid view can be used to undo changes made in the one-up view, as shown in FIGS. 6AF-6AG.

At FIG. 6AF, device 600 receives user input 644 corresponding to selection of unselected media item 612F. As shown in FIG. 6AG, in response to receiving user input 644, device 600 toggles selection of media item 612F and displays a selection indicator associated with it. Further, sharing affordance 612E has been updated and has changed from reading "SEND 22" in FIG. 6AE to now read "SEND 23". Thus, the selection changes made in the one-up view that carried over to the grid view can be further customized.

FIGS. 6AH-6AK illustrate exemplary user interfaces for sharing a suggested collection of media items with a recipient. In this example, after customizing selection, the device 600 optionally provides the user with the option to share the selected items with the participants of the message conversation (e.g., of transcript 604A). FIG. 6AH illustrates the same set of selected media items depicted in FIG. 6AF. At FIG. 6AH, device 600 receives user input 646, corresponding to selection of sharing affordance 612E. In some embodiments, in response to receiving selection of a sharing affordance (e.g., 612E), the device (e.g., 600) shares the suggested collection (e.g., shown in suggested collection interface 612) with one or more recipients. In some embodiments, sharing a suggested collection includes transmitting data that provides access to at least a portion of the suggested collection of media items to the one or more recipients, and optionally to a cloud-based service. For example, in response to receiving user input 644, device 600 can transmit a message (e.g., 604J of FIG. 6AK, described below) to William and Gregg that includes data representing the set of selected media items (e.g., the 23 selected media items in FIG. 6AH). In some embodiments, transmitting data providing access to at least a portion of media items includes transmitting one or more media items (e.g., copies, which can be reduced in size or quality). In some embodiments, transmitting data providing access to at least a portion of media items includes sending information that provides access to one or more media items of the suggested collection through one or more remote devices (e.g., remote from device 600) (e.g., sending one or more of: a link, an address, a credential, a passcode, and/or data that instructs a remote (e.g., cloud-based) service to allow access by a recipient).

In some embodiments, in response to receiving selection of a sharing affordance, the device (e.g., 600) inserts a representation (e.g., 604H) of the suggested collection of media items (e.g., represented by suggested collection interface 612) into a text entry field (e.g., of a messaging interface). For example, in response to receiving user input 646, device 600 displays message interface 604 as shown in FIG. 6AI. In FIG. 6AI, message interface 604 now includes representation 604H in text entry field 604D that represents the suggested collection of media items of suggested collection interface 612.

In some embodiments, the device (e.g., 600) receives input of text in a text entry field that includes a representation of a suggested collection. For example, in FIG. AJ, device 600 receives input of the text "Here you go!" (e.g., via typing in keyboard region) to accompany representation 604H.

In some embodiments, the device (e.g., 600) receives user input (e.g., 647) selection of a send affordance (e.g., 604I) of a message interface (e.g., 604). In some embodiments, in response to receiving selection of the send affordance, the device (e.g., 600) transmits a message (e.g., 604J) that provides access to the suggested collection. For example, at FIG. 6AJ, device 600 receives user input 647 corresponding to selection of send affordance 604I. As shown in FIG. 6AK, in response to receiving user input 647, device 600 transmits a message 604J to the recipients William and Gregg that includes the representation 604H of the suggested collection, and inserts message 604J into transcript 604A. In this example, device 600 also transmits the accompanying text "Here you go!" in response to receiving user input 647 (e.g., which can be included as part of the same message (e.g., 604J), or as a separate message that is sent in response to the same input). Alternatively, device 600 transmits message 604J that provides access to the collection, without accompanying text, in response user input 646.

As shown in FIGS. 6AJ and 6AK, input suggestions in a sharing suggestion region can change, depending the state of a message interface (e.g., 604) or a conversation. For example the input suggestions shown in FIG. 6AJ "I", "THIS", and "HERE" have changed in FIG. 6AK to be replaced with "WE", "YOU", "LET'S", respectively. In some embodiments, the change to input suggestions is based on text in the text entry field. In some embodiments, the change to input suggestions is based on content in the transcript (e.g., changes to the content).

In some embodiments, a representation of a suggested collection includes descriptive information (e.g., title, date, geographic location). For example, representation 604H includes text representing a geographic location associated with the suggested collection, "Lake Tahoe". This can also be considered the title of the suggested collection, however a title can be different than a geographic location associated with the collection (e.g., "Lake Tahoe" could instead have the title "Lynne's Birthday Celebration" as defined by (e.g., user-defined) metadata associated with the suggested collection). In some embodiments, a representation of a suggested collection includes an indication of time. For example, representation 604H includes the text "December 1 to 4", representing the dates December 1st to December 4th. In some embodiments, a representation of a suggested collection includes an indication of an amount of media being shared. For example, representation 604H includes the text "22 photos and 1 video", identifying the number of photos and videos being shared. In some embodiments, a representation of a suggested collection includes an expiration time. For example, representation 604H includes the text "Link expires January 8", which indicates that the access provided to a recipient (e.g., via a link) will expire at a particular time.

In some embodiments, a representation (e.g., 604H) of a collection includes an indication of transmission status (e.g., uploading, downloading, and/or a progress of the upload/download). In some embodiments, a representation (e.g., 604H) of a collection includes link expiration time (e.g., expires in 13 days). For example, in FIG. 6AK, 604H includes the text "Link expires January 8". In some embodiments, a representation (e.g., 604H) includes status of receipt (e.g., delivered, read, opened, viewed, or the like)).

FIGS. 6AL-6AW illustrate other exemplary user interfaces for sharing a suggested collection of media items. As described above, a device can provide access to interfaces for sharing a suggested collection of media items from a messaging application. Specifically, the device can provide access to the suggested collection while displaying a transcript of a conversation, wherein the suggested collection can be shared into that conversation. In some embodiments, an interface for sharing a suggested collection of media items can be accessed via another application (e.g., different than a messaging application). In some embodiments, another application is an application for managing and/or viewing media items (e.g., in a media library) associated with a device (e.g., device 600). For example, such an application is also referred to as a photos application.

FIG. 6AL illustrates an exemplary home screen 648. Home screen 648 includes a plurality of affordances associated with applications. At FIG. 6AL, device 600 receives user input 650, corresponding to selection of photos application affordance 648A. In response to detecting user input 650, device 600 displays an interface associated with the photos application.

FIG. 6AM illustrates an exemplary interface (e.g., 652) associated with a photos application. Interface 652 includes a plurality of representations of media items that are associated with (e.g., included in) a media library associated with device 600. Interface 652 represents an album of photos that have been designated as a "favorite". In some embodiments, an interface associated with a photos application includes one or more affordances for accessing media collections (e.g., suggested collections for sharing). For example, at the display of interface 652, menu 654 is displayed. Menu 654 includes affordances 654A-654C (also referred to as tabs). Tab 654A is currently selected, and provides access to interfaces for browsing a media library. Tab 654B includes the text "For You", and provides access to interfaces for accessing personalized features related to a media library of the device (e.g., including one or more suggestions for sharing collections of media with recipients). Tab 654C provides access to an interface for searching for media items.

At FIG. 6AN, device 600 receives user input 656, corresponding to selection of tab 654B. In some embodiments, in response to receiving input (e.g., 656), the device (e.g., 600) displays a personalized media interface (e.g., associated with the photos application) (e.g., 658). FIG. 6AO illustrates an exemplary personalized media interface 658. In some embodiments, a personalized media interface (e.g., 658) includes a sharing suggestion region (e.g., 658A). For example, personalized media interface 658 includes a sharing suggestion region 658A. In some embodiments, a personalized media interface (e.g., 658) includes additional content. In some embodiments, a sharing suggestion region includes one or more suggestions (e.g., prompts) for sharing media collections with one or more suggested recipients. In some embodiments, a personalized media interface includes collections of media items received from other users (e.g., via a message conversation). For example, interface 658 can include access to (e.g., display a representation of) the collection received from William (e.g., represented by 604B).

In some embodiments, a personalized media interface includes representations of one or more pre-selected collections of media items related based on a context. For example, personalized media interface 658 includes a memories region 658B, that includes representations of collections that are related to a context (e.g., the location San Diego during the month of November 2017, or the location Washington D.C. during the summer of 2017). In some embodiments, the pre-selection collections can be shared (e.g., similar to a suggested collection). In some embodiments, the pre-selected collections are related to one or more of a message conversation and/or one or more recipients associated with device 600.

As described above, a sharing suggestion region 658A can include one or more suggestions (e.g., prompts) to share one or more suggested collections of media items with one or more suggested recipients. Sharing suggestion region 658A includes a prompt 660 to share a suggested collection of media items with four suggested potential recipients (e.g., represented by the four faces under the title card). In some embodiments, the prompt includes an indication of the one or more recipients. In some embodiments, an indication of a recipient includes an identified face associated with the recipient. In this example, four identified faces 660A are shown in prompt 660, each representing a suggested recipient. In some embodiments, an indication of a recipient includes a name associated with the recipient. In this example, only three of the identified faces are associated with names, and thus prompt 660 only includes three names 660B: Sue, Anna, and John. Thus, in this example, the fourth face was identified as having been depicted in at least one media item in the suggested collection of media items, however the identified face has not been matched with a known profile (e.g., a profile that includes one or more of a name or contact information associated with an identified face). In some embodiments, the identified face is not matched because a profile for the face does not exist. In some embodiments, the identified face is not matched because a profile for the recipient has not previously been associated with any identified face. For example, the device 600 includes correct contact information for the person of the identified face, but the contact information is not associated with the identified face in device 600.

In some embodiments, a suggested recipient is suggested based on an identified face associated with the recipient. As touched on above, a suggested recipient displayed at prompt 660 can be a recipient whose identified face is present in one or more media items in the suggested collection of media items. In this example, at least one media item from the suggested collection "Lake Tahoe" includes a depiction of the respective identified faces of each of Sue, Anna, and John. Further, as will be explained in detail below, a suggested recipient can be an identified face for which contact information is not currently associated (e.g., by device 600). In this way, by presenting the user with a face depicted in the photos, the user can be reminded of parties to whom they may wish to send data, even if the device is not currently able to (e.g., lacks associated contact information). Further, as shown below with respect to FIGS. 6AS-6AV, the device can provide the user an interface for easily associating the suggested recipient with contact information.

In some embodiments, the prompt (e.g., 660) includes information associated with the suggested collection. In some embodiments, the information includes one or more of a title of the suggested collection, an indication of an event associated with the suggested collection, an indication of a geographic location associated with the suggested collection, or an indication of a time (e.g., date, date range) associated with the suggested collection. For example, prompt 660 includes an indication 660C of a geographic location "Lake Tahoe" and an indication 660D of a time range "December 1 to 4". In some embodiments, the prompt includes one or more representations of one or more media items of the suggested collection of media items. For example, prompt 660 includes a title card 660E which depicts a media item (e.g., photo) from the Lake Tahoe collection. In other examples, the media item is a video or images played in sequence.

As can be seen in FIG. 6AO, the suggested collection represented by sharing suggestion prompt 660 is the same suggested collection of media items associated with suggested collection interface 612. Thus, in the example of prompt 660, the prompt represents a suggestion to share a previously shared collection of media items with at least one additional recipient. However, in other examples, a prompt (e.g., at interface 658) can suggest sharing one or more other collections, or suggest sharing with the recipients that were already shared with (e.g., William and Greg in FIG. 6AK).

In some embodiments, in response to user input (e.g., 656), the device (e.g., 600) displays a prompt to share a different suggested collection (e.g., than the suggested collection of 612) with a recipient (e.g., 603B, William). For example, after navigating to a sharing interface (e.g., "For You" tab) of a photos application (e.g., after displaying the message conversation in a messaging application), the device displays one or more additional suggestions for sending to the recipient that was already shared with, William. In this way, the device provides a convenient path to share additional content (e.g., related to one or more conversations or other contexts) with the recipient with whom the user of the current device is in a sharing relationship (e.g., a suggestion was previously made or the user previously transmitted access to media items).

In some embodiments, in response to user input (e.g., 656), the device (e.g., 600) displays a different suggested media collection (e.g., of 626) if a first suggested collection (e.g., of 612) was previously transmitted to the recipient. For example, the device provides a new suggestion after the first suggested collection of interface 612 was shared by the user (e.g., as shown in FIG. 6AK). That is, the device 600 can suggest further collections to share with William and Gregg.

In some embodiments, in response to user input (e.g., 656), the device (e.g., 600) displays a different suggested media collection if the first suggested collection (e.g., of 612) was not previously transmitted to the recipient. For example, the device provides a new suggestion if the first suggestion was not acted upon by the user. In some embodiments, if the first suggested collection (e.g., of 612) was not previously shared, in response to receiving user input (e.g., 656), the device displays a prompt to share the first suggested collection (e.g., 612) with the recipient. For example, if the user has not previously transmitted access to the suggested collection while in a messages application, the device provides a prompt and opportunity to transmit the suggested collection to the recipient again (e.g., at a personalized media interface 658 of a photos application).

Using the prompt 660 in sharing suggestion region 658A, a user can easily share a suggested collection of media items with one or more suggested recipients. In some embodiments, the device (e.g., 600) receives user input (e.g., 662) associated with a prompt (e.g., 660) in the sharing suggestion region (e.g., 658A). For example, at FIG. 6AP, device 600 receives user input 662 corresponding to selection of affordance 660F. In some embodiments, in response to user input (e.g., 662) associated with the prompt (e.g., 660), the device (e.g., 600) displays a suggested collection interface associated with the collection of media items associated with the prompt. For example, in response to receiving user input 662, device 600 displays suggestion page 664 (also referred to as suggested collection interface 664) as shown in FIG. 6AQ. Suggested collection interface 664 corresponds to the same suggested collection of media items as suggested collection interface 612. In this example, suggested collection interface 664 is identical to suggested collection interface 612. In some embodiments, suggested collection interface 664 includes one or more features as described with respect to suggested collection interface 612.

In some embodiments, in response to user input (e.g., 662) associated with the prompt (e.g., 660), the device (e.g., 600) transmits a message to one or more suggested recipients that provides access to the suggested collection of media items. For example, in response to user input 662, device 600 immediately shares (e.g., transmits a message) the suggested collection with one or more of the suggested recipients (e.g., Sue, Anna, John).

At FIG. 6AR, device 600 receives user input 665 corresponding to selection of sharing affordance 664A. In some embodiments, in response to receiving user input corresponding to selection of an affordance associated with the prompt (e.g., affordance 660F, or 664A), the device (e.g., 600) displays a recipient confirmation interface (e.g., 666 of FIG. 6AS).

FIG. 6AS illustrates an exemplary recipient confirmation interface 666. In some embodiments, a recipient confirmation interface includes an indication of one or more faces detected in the suggested collection. For example, recipient confirmation interface 666 includes region 666A, which indicates a number of faces have been detected in the Lake Tahoe suggested collection. As described with respect to prompt 660 of FIG. 6AO, region 666A indicates that four (4) faces were detected in the Lake Tahoe suggested collection. In some embodiments, a recipient confirmation interface includes one or more affordances for selecting recipients for sharing. For example, recipient confirmation interface 666 includes recipient indicators 666B-666E, each corresponding to one of the detected faces. Each of the recipient indicators 666B-666D includes an indication of a profile associated with the detected face, including a name (e.g., Sue, Anna, or John) and contact information (e.g., a phone number, such as 123-456-7890 for Sue). Notably, recipient indicator 666E is displayed, but does not include a name or contact information, as the detected face is not associated with profile information. In some embodiments, a recipient who is associated with known profile information is selected by default. For example, upon initial display of recipient confirmation user interface 666 as shown in FIG. 6AS, the recipients Sue, Anna, and John are selected (e.g., as shown by the selection indicator 667A, a checkmark, in each of recipient indicators 666B-666D), yet the recipient associated with recipient indicator 666E is not selected (e.g., no selection indicator 667A is displayed in recipient indicator 666E, but an unselected indicator 667B is displayed).

In some embodiments, a recipient confirmation interface (e.g., 666) includes an affordance for adding a recipient. For example, recipient confirmation interface 666 includes affordance 666F. In this example, in response to user input corresponding to selection of 666F, device 600 provides an interface for selecting one or more additional recipient. An interface for selecting one or more additional recipient can include one or more of the features of contact selection user interface 670 of FIG. 6AU, described in more detail below.

As described briefly above, device 600 can provide a quick and easily-accessed interface for associating a suggested recipient with contact information. In some embodiments, the device (e.g., 600) receives user input associated with a suggested recipient (e.g., not associated with contact information). For example, at FIG. 6AT, device 600 receives user input 668 corresponding to selection of recipient indicator 666E, which is not associated with contact information.

In some embodiments, in response to receiving user input associated with a suggested recipient, the device (e.g., 600) provides (e.g., displays) an interface for associating the suggested recipient with contact information. For example, FIG. 6AU illustrates an exemplary contact selection user interface 670 displayed in response to receiving user input 668. In some embodiments, a contact selection user interface (e.g., 670) includes one or more representations of one or more contacts (e.g., 670A). For example, contact selection user interface 670 includes a plurality of representations each associated with a contact (e.g., Andrew, Billy), including representation 670A, associated with the contact named "Mary". In some embodiments, a contact represented in a contact selection user interface (e.g., 670) is associated with contact information. In some embodiments, contact information includes one or more of a phone number, an e-mail address, a link, a network address, or other data for addressing or directing data to a recipient (e.g., a device, a user account).

At FIG. 6AU, device 600 receives user input 672 corresponding to selection of a representation of a contact. In some embodiments, in response to detecting a user input corresponding to selection of a representation of a contact, the device (e.g., 600) associates contact information associated with the selected contact (e.g., 670A) with the suggested recipient (e.g., 666E). For example, in response to receiving user input 672, device 600 associates the detected face associated with recipient indicator 666E with contact information associated with the contact named Mary of representation 670A.

FIG. 6AV illustrates recipient confirmation interface 666. In some embodiments, the device (e.g., 600) displays the recipient confirmation interface (e.g., 666 in FIG. 6AV) subsequent to (e.g., in response to) user input (e.g., 672) corresponding to selection of a contact (e.g., 670A). For example, in response to receiving selection of Mary, device 600 ceases displaying contact selection interface 670, and returns to display of recipient confirmation interface 666 as shown in FIG. 6AV. In FIG. 6AV, recipient indicator 666E now includes the name of the selected contact, Mary, and a phone number associated with the selected contact. In this example, the detected face that was previously not associated with contact information is now associated with Mary's contact information. In some embodiments, the association between the contact and the detected face is persistent. For example, if the same face is detected in another collection, Mary's name would be displayed alongside a recipient indicator in a recipient confirmation interface, without the need for selection of Mary again at a contact selection user interface. In some embodiments, in response to user input (e.g., 672) corresponding to selection of a contact (e.g., 670A), the device automatically selects the suggested recipient (e.g., 666E). For example, in response to user input 672 selecting Mary, device 600 selects the suggested recipient Mary, and displays a selection indicator 667A associated with recipient indicator 666E in FIG. 6AV.

In some embodiments, the device (e.g., 600) receives user input associated with a suggested recipient, and in response to receiving such input, toggles selection of the suggested recipient. For example, at FIG. 6AV, the user can select Mary's indicator (e.g., 666E) to toggle selection (change from selected to unselected, or change from unselected to selected). In some embodiments, the device (e.g., 600) does not share the suggested collection of media with an unselected suggested recipient in response to user input (e.g., 674, described below) that causes the suggested collection of media to be shared with selected suggested recipients.

In some embodiments, a recipient confirmation interface (e.g., 666) includes one or more affordances for sharing the corresponding suggested collection of media items. For example, as shown in FIG. 6AW, recipient confirmation interface 666 includes sharing affordances 666G and 666H. In some embodiments, in response to receiving user input corresponding to selection of a sharing affordance, the device (e.g., 600) transmits data that provides access to one or more media items of the suggested collection of media items. In some embodiments, providing access comprises providing access through a particular cloud-based service, and optionally transmitting a message to the recipient indicating that such access has been provided, including data usable to access the media through the cloud-based service. For example, providing access through the particular cloud-based service can be done when a recipient has an account with the cloud-based service. In such case, access can be provided to the recipient's account (e.g., to media items hosted by the cloud-based service, but shared by the user of device 600), while preventing access to other accounts on the cloud-based service (or non-users of the cloud-based service). In some embodiments, providing access comprises sharing a direct link that provides access to one or more suggested collection of media items. For example, providing a direct link can include sending a publically-accessible but non-guessable web address to a recipient. In some embodiments, sending a direct link does not prevent access by parties (e.g., devices) other than the recipient. For example, the recipient can forward the direct link to other non-intended recipients, who could use the link to view the shared collection. However, the option of sending a direct link provides an alternative option for sharing media items, particularly with recipients not associated with the particular cloud-based service. For example, in response to selection of affordance 666H, device 600 transmits a direct link to the selected recipients.

At FIG. 6AW, device 600 receives user input 674 corresponding to selection of affordance 666G. In response to receiving user input 674, device 600 transmits data that provides access to one or more media items of the suggested collection of media items through a particular cloud-based service (e.g., as described above). In some embodiments, in response to receiving user input (e.g., 674) corresponding to selection of a sharing affordance, device 600 displays a transcript of a messages conversation with the selected recipients that includes a representation of the shared suggested collection. In this example, such a message conversation would include Sue, Anna, John, and Mary, and include a representation that includes one or more features as that described with respect to the representation 604H shown in FIG. 6AK.

FIGS. 6AX-6AAB illustrates exemplary interfaces for ceasing to share a collection of media items. FIG. 6AX illustrates personalized media interface 658. At FIG. 6AX, device 600 receives user input 676 corresponding to selection of affordance 658C. For example, affordance 658C can be an avatar (e.g., face) associated with a user of device 600. In some embodiments, in response to receiving user input (e.g., 676) associated with a personalized media interface (e.g., 658), the device (e.g., 600) displays a sharing management interface (e.g., 678).

FIG. 6AY illustrates an exemplary sharing management interface 678. In some embodiments, a sharing management interface includes one or more options for managing one or more collection of media items that have been shared with one or more recipients. For example, sharing management interface 678 includes shared moments region 678A, which includes affordances 678B-678D, each associated with a collection of media items that has been shared. Affordance 678B corresponds to the "Lake Tahoe" collection of media items that was shared with William and Gregg, as shown in FIG. 6AK.

In some embodiments, the device receives user input (e.g., 679) associated with (e.g., corresponding to selection of an affordance associated with) a collection of media items that has been shared. For example, at FIG. 6AZ, device 600 receives user input 679 corresponding to selection of affordance 678B.

In some embodiments, in response to receiving user input (e.g., 679) associated with a collection of media items that have been shared, the device (e.g., 600) displays a shared collection management interface (e.g., 678). For example, in response to receiving user input 679, device 600 displays exemplary shared collection management interface 680, as shown in FIG. 6AAA. In some embodiments, a shared collection management interface (e.g., 680) includes information related to the shared collection, including one or more of the following (as shown in FIG. 6AAA): a geographic location (e.g., Lake Tahoe), a time (e.g., December 1 to 4), an amount of media items shared (e.g., 22 photos and 1 video), an expiration time (e.g., January 8), and recipient information (e.g., the collection was shared with William and Gregg).

The device optionally provides the user with the option to cease sharing a previously shared collection of media items that can still be accessed by one or more recipients (e.g., access to a shared collection has not expired). In some embodiments, an interface (e.g., 680) associated with a personalized media interface (e.g., 658) includes an option (e.g., 680A) to cease sharing the collection of media items. For example, shared collection management interface 680 includes affordance 680A for ceasing to share the associated shared collection from Lake Tahoe.

At FIG. 6AAB, device 600 receives user input 682 corresponding to selection of affordance 680A, representing a request to stop (also referred to as cease) sharing the associated collection of media items. In some embodiments, in response to receiving user input representing a request to stop sharing a collection of media items, the device (e.g., 600) ceases providing access to one or more of the recipients of the shared collection. For example, if the device 600 previously provided access via predetermined cloud-based service to a user account, such access (e.g., permission to access the media items) can be revoked by transmitting a message to the cloud-based service (e.g., a server). For example, if device 600 previously provided a direct link for accessing the media items, the device can cause such link to be deactivated. For instance, if the media items are hosted on a server and accessed via the link, the device 600 can transmit a message that causes the server to cease to provide access to the media items when a device requests a connection via the address in the link (e.g., deactivates the link).

FIG. 6AAC illustrates an exemplary representation of an expired shared collection of media items. For example, FIG. 6AAC depicts message interface 604, which includes transcript 604A and representation 604H, representing the Lake Tahoe collection of media items shared by Lynne, the user of device 600. In some embodiments, a shared collection of media items expires in response to an expiration time passing. For example, in FIG. 6AK, the representation 604H included an expiration time of January 8. Accordingly, on January 9 after the expiration date, the representation 604H can appear in the transcript as shown in FIG. 6AAC. In some embodiments, a shared collection of media items expires in response to user input (e.g., 682) request to cease sharing. For example, in response to receiving user input 682, as described above, the shared collection can cease to be shared, thus causing representation 604H to appear in the transcript as shown in FIG. 6AAC.

FIGS. 7A-7J is a flow diagram illustrating a method for sharing a suggested collection of media items using an electronic device in accordance with some embodiments. Method 700 is performed at a device (e.g., 100, 300, 500, 600) with a display and one or more input devices (e.g., a touch sensitive display, a touch sensitive surface, a mouse). Some operations in method 700 are, optionally, combined, the orders of some operations are, optionally, changed, and some operations are, optionally, omitted.

As described below, method 700 provides an intuitive way for sharing a suggested collection of media items. The method reduces the cognitive burden on a user for sharing a collection of media items, thereby creating a more efficient human-machine interface. For battery-operated computing devices, enabling a user to share a collection of media items faster and more efficiently conserves power and increases the time between battery charges.

The electronic device (e.g., 600) receives (702), via the one or more input devices (e.g., one or more of a touch sensitive display, a touch sensitive surface, a mouse, or the like), a first input (e.g., 608, 614, 616, 620, or 656).

In response to receiving the first input, the electronic device (e.g., 600) displays (704), on the display (e.g., 602), a suggested collection of media items (e.g., represented by 612) for sharing with a recipient (e.g., 603B, 603C), wherein the suggested collection is relevant to a message conversation (e.g., transcript 604A of message interface 604 in FIG. 6A-6D) with the recipient. In some embodiments, the suggested collection (e.g., represented by 612) of media items includes one or more media items (e.g., one or more photos, one or more videos, or one or more of both). In some embodiments, the suggested collection includes a media item (e.g., 612G) depicting the recipient (e.g., 603B), and/or that was taken at an event known to have been attended by the recipient. For example, the event can be media captured at the geographic location "Lake Tahoe" between the dates December 1 to December 4, as shown in FIG. 6N. In some embodiments, the suggested collection includes a subset of media items (e.g., photos or videos) that meet selection criteria (e.g., media items taken within a particular time frame at a particular location or a collection of locations). In some embodiments, the suggested collection includes all media items that meet the selection criteria. For example, the collection represented by suggested collection interface 612 includes all media items captured by the user that meet the selection criteria of: captured at the geographic location "Lake Tahoe" between December 1 and December 4.

Displaying a suggested collection of media items for sharing with a recipient that is relevant to a message conversation with that recipient allows the user to quickly identify media that the user is likely to want to share with the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Subsequent to displaying the suggested collection of media items, the electronic device (e.g., 600) receives (706), via the one or more input devices, a second input (e.g., 630 of FIG. 6S, 646 of FIG. 6AH, or 647 of FIG. 6AJ) representing a request to transmit at least a portion of the suggested collection of media items to the recipient.

In response to receiving the second input, the electronic device (e.g., 600) transmits (708) a message (e.g., 631 of FIG. 6U, or 604J of FIG. 6AK) to the recipient as part of the message conversation (e.g., represented by transcript 604A of FIG. 6U or 6AK) that provides access to the at least a portion of the suggested collection of media items (e.g., represented by 612). For example, the electronic device inserts an affordance 604H representing the shared collection into a transcript of the conversation, as shown in FIG. 6AK.

In some embodiments, further in response to receiving the first input, and while displaying at least a portion of the suggested collection of media items, the electronic device (e.g., 600) displays (710), on the display, an indication of selected media (e.g., 612E of FIG. 6R, or indicators 612H of FIG. 6R) that identifies an initial set of selected media items from the suggested collection that were automatically selected (e.g., without input to select) for sharing. For example, in FIG. 6R, device 600 displays selection indicators 612H on media items (e.g., that make up an initial set of selected media items). Also, for example, in FIG. 6R, sharing affordance 612E includes an indication of the selected media items (e.g., identifying an amount of items in the first collection that are selected), and states "SEND ALL" (e.g., all media items are selected). In some embodiments, the initial set of selected media items includes fewer than all media items in the suggested collection of media items (e.g., as shown in FIG. 6W). For example, in FIG. 6W, fewer than all media items are selected. In FIG. 6W, media item 612G is not selected. Also in FIG. 6W, sharing affordance 612E includes an indication of the selected media items (e.g., an amount of items in the first collection that are selected), and states "SEND 23" (e.g., 23 media items are selected).

Displaying an indication of selected media that identifies an initial set of selected media items allows the user to quickly view a pre-selected set of media from a relevant collection of media items, reducing the number of inputs required to select and transmit media items to the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the indication of selected media that identifies the initial set of selected media items, the electronic device (e.g., 600) receives (712), via the one or more input devices, the second input (e.g., 630, or selection of 604I (e.g., 647)) representing the request to transmit at least a portion of the suggested collection of media items to the recipient. In response to receiving the second input, the electronic device (e.g., 600) transmits (714) a message (e.g., 631 as shown in FIG. 6U, 604J as shown in FIG. 6AK) to the recipient (e.g., 603B, 603C) as part of the message conversation and providing access to the initial set of selected media items. In some embodiments, the electronic device provides access to selected media items (e.g., fewer than all) if less than all are selected.

Transmitting a message to the recipient as part of the message conversation that provides access to the initial set of selected media items allows the user to quickly send a pre-selected set of media from a relevant collection of media items, reducing the number of inputs required to select and transmit media items to the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the indication of selected media is a first affordance (e.g., 612E) and the second input (e.g., 630, 646) corresponds to selection (716) of the first affordance, and the first affordance includes an indication of an amount of media items included in the initial set of selected media items. In some embodiments, an amount of media items corresponds to a total number of selected media items. For example, affordance 612E includes the exemplary amount "ALL" in FIG. 6S (e.g., all media items are currently selected). For example, affordance 612E includes the exemplary amount "22" in FIG. 6AH (e.g., 22 media items are currently selected).

In some embodiments, the initial set of selected media items includes (718) fewer than all media items in the suggested collection of media items. For example, suggested collection interface 612 of FIG. 6AH depicts fewer than all media items in a suggested collection of media items selected.

In some embodiments, the electronic device (e.g., 600) receives (722), via the one or more input devices, input (e.g., 632 of FIG. 6V, 640 of FIG. 6AB, 642 of FIG. 6AD, 644 of FIG. 6AF), representing a change (e.g., additional selection, or removing selection) to the initial set of selected media items from the suggested collection to form a user-selected set of selected media items from the suggested collection, wherein the initial set of selected media items differs from the user-selected set of selected media items with respect to the selection of at least one media item of the first collection. The electronic device (e.g., 600) updates (724) the indication (e.g., updates 612E as shown in FIG. 6W, updates 636D as shown in of FIG. 6AC, updates 612E as shown in FIG. 6AG, or replaces 612H with 612I as shown in FIG. 6W) of selected media based on the user-selected set of selected media items. For example, the electronic device changes a send affordance 612E from "SEND ALL" to "SEND 23" to identify the number of items in the user selection, and/or updates selection indicators associated with the media items. While displaying the indication of selected media that is updated based on the user-selected set of selected media items, electronic device (e.g., 600) receives (726), via the one or more input devices, the second input (e.g., 630 of FIG. 6S, 646 of FIG. 6AH, or 647 of FIG. 6AJ). For example, the second input represents request to provide access to (e.g., transmit) at least a portion of the suggested collection of media items to the recipient. In response to receiving the second input, the electronic device (e.g., 600) transmits (728) a message (e.g., 631 of FIG. 6U, or 604J of FIG. 6AK) to the recipient as part of the message conversation that provides access to the user-selected set of selected media items.

Receiving input representing a change to the initial set of selected media items from the suggested collection to form a user-selected set of selected media items from the suggested collection, and transmitting a message to the recipient as part of the message conversation that provides access to the user-selected set of selected media items allows the user to quickly modify a pre-selected set of media from a relevant collection of media items, reducing the number of inputs required to select and transmit media items to the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the indication (e.g., 612E) of selected media comprises (730) an indication of an amount of media items from the suggested collection that are currently selected, and updating the indication of selected media comprises updating the indication to include display of the amount of media items in the user-selected set of selected media items (e.g., 612E as shown in FIGS. 6V-6W), and the indication of selected media is a second affordance (e.g., 612E of FIG. 6AH) and the second input (e.g., 646 of FIG. 6AH) corresponds to selection of the second affordance.

Updating the indication to include display of the amount of media items in the user-selected set of selected media items provides the user with visual feedback about the amount of media items that are selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the suggested collection of media items, and while in a media item selection mode, the electronic device (e.g., 600) receives (734), via the one or more input devices, a third input (e.g., 632 or 634) associated with a first media item (e.g., 612G) of the suggested collection of media items (e.g., represented by interface 612). In accordance with a determination (736) that the third input associated with the first media item is a first gesture (e.g., user input 632) (e.g., a tap on single media), the electronic device: toggles (738) whether the first media item is selected without displaying the first media item in a one-up view (e.g., as shown in FIG. 6W); in accordance with the toggling causing the first media item to be selected, displays (740), on the display, a selection indicator (e.g., 612H of FIG. 6V) associated with the first media item (e.g., 612G of FIG. 6V); and in accordance with the toggling causing the first media item to be unselected (e.g., 612G of FIG. 6W), ceases to display (742), on the display, the selection indicator (e.g., as shown in FIG. 6W, 612G is no longer displayed) associated with the first media item. In accordance with a determination that the third input associated with the first media item is a second gesture (e.g., user input 634) (e.g., a deep press gesture, a press and hold gesture, a de-pinch gesture), different than the first gesture, the electronic device (e.g., 600): displays (744), on the display, the first media item in the one-up view (e.g., 612G in one up view 636 as shown in FIG. 6Y) without toggling whether the first media item is selected (e.g., 612G remains unselected as shown in FIG. 6Y). In some embodiments, in response to receiving a subsequent user input (e.g., corresponding to the first gesture, such as a tap) (e.g., similar to user input 640 of FIG. 6AB) received at a location associated with the first media item displayed while in a one-up view, the electronic device toggles selection of the first media item. In some embodiments, in response to receiving a subsequent user input (e.g., corresponding to a gesture, such as a pinch gesture as illustrated by user input 845 shown in FIG. 8AG) received at a location associated with the first media item displayed while in a one-up view, the electronic device exits the one-up view, and optionally displays a grid view.

Entering or forgoing entering into a media item selection mode, depending on whether a input that causes a one-up view to be displayed is a second gesture or a first gesture, respectively, provides with user with more control of the device by allowing gesture-dependent, different outcomes from a input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first gesture (e.g., user input 632) is a tap gesture, and the second gesture (e.g., user input 634) is selected from the group consisting of: a de-pinch gesture (e.g., movement of two contacts apart from each other by more than a threshold distance), a long press gesture (e.g., a contact exceeding a predetermined length of time), and a hard press gesture (e.g., a contact with a characteristic intensity that exceeds a threshold intensity such as a threshold intensity that is greater than a nominal contact detection intensity threshold at which a tap input can be detected).

In some embodiments, while displaying the first media item in the one-up view, and while in the media item selection mode (746) the electronic device (e.g., 600): receives (748), via the one or more input devices, a fourth input (e.g., 640) associated with the first media item displayed in the one-up view (e.g., 612F as shown in FIG. 6Y, 612F as shown in FIG. 6AA). In response to receiving the fourth input (750), the electronic device: toggles whether the first media item is selected (e.g., changing from unselected to selected, or from selected to unselected); in accordance with the toggling causing the first media item to be selected, displays, on the display, a selection indicator (e.g., 637B as shown in FIG. 6AA) associated with the first media item; and in accordance with the toggling causing the first media item to be unselected, ceases to display, on the display, the selection indicator (e.g., as shown in FIG. 6AC, 637B is no longer displayed) associated with the first media item.

In some embodiments, the suggested collection of media items is determined to be relevant (720) to the message conversation with the recipient based on an identified face associated with the recipient (e.g., face displayed for recipient 603B of FIG. 6A), and wherein one or more media items in the suggested collection of media items for sharing with the recipient are selected based on the identified face associated with the recipient being identified in at least a portion of the one or more media items in the suggested collection of media items. For example, the collection represented by suggested collection interface 612 is suggested based on media item 612G (e.g., as shown in FIG. 6N) including a depiction of recipient 603B's identified face. In some embodiments, the electronic device selects the media items. In some embodiments, a cloud-based service selects the media items (e.g., which are accessible by, or are communicated to, the electronic device).

Selecting media items based on an identified face associated with the recipient allows the user to quickly identify media that the user is likely to want to share with the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the suggested collection of media items is determined to be relevant (732) to the message conversation with the recipient based on an event known to have been attended by the recipient, and one or more media items in the suggested collection of media items for sharing with the recipient are selected based on an indication that the one more media items in the suggested collection are associated with (e.g., depict, or were taken at the time and place of, or include metadata identifying) the event known to have been attended by the recipient. For example, the suggested collection represented by suggested collection interface 612 (e.g., as shown in FIG. 6F) includes media captured at an event defined by the geographic location Lake Tahoe and the time period December 1 to December 4 (e.g., as identified by 612B and 612C of FIG. 6F) known to have been attended by recipient 603B named William. In some embodiments, the suggested collection is suggested because the event is mentioned in the transcript of the conversation (e.g., 604A). For example, at FIG. 6F, the transcript 604A includes mention of the event defined by the geographic location Lake Tahoe and time period December 1 to December 4 in the text "Hi! Could you send me the photos from Lake Tahoe last weekend" (e.g., in this example, the last weekend corresponds to December 1 to December 4. In some embodiments, an event is determined by a time period and/or a geographic location associated with media items, and automatically determined based on metadata. In some embodiments, an event is determined based on a user-defined metadata. In some embodiments, event is known to have been attended by the recipient based on a proximity of a device associated with the recipient (e.g., to device 600) (e.g., during the event). In some embodiments, event is known to have been attended by the recipient based on user input identifying the recipient has having attended the event.

Selecting media items based on the event known to have been attended by the recipient allows the user to quickly identify media that the user is likely to want to share with the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the first input comprises receiving (752) the first input while displaying, on the display, a transcript (e.g., 604A) of the message conversation with the recipient. For example, device 600 receives user input 608 in FIG. 6E while displaying a transcript of the conversation. For example, device 600 receives user input 614 in FIG. 6G while displaying a transcript of the conversation. For example, device 600 receives user input 616 in FIG. 6H while displaying a transcript of the conversation. For example, a transcript is a representation of at least a portion of messages exchanged between two users, such as a user (e.g., user account) of the first device and the recipient (e.g., the recipient's user account or device).

Receiving a input (that causes display of a suggested collection of media items for sharing with a recipient) while displaying a transcript of the message conversation with the recipient allows the user to quickly view and share relevant media with the recipient by reducing the number of inputs needed to access the relevant media. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the suggested collection of media items is determined (754) to be relevant to the message conversation with the recipient based on the identity of one or more participants (e.g., 603B and/or 603C) in the message conversation. For example, a participant can be a user associated with a user account (e.g., of cloud-based service, of a social media service), or a contact (e.g., from an address book) associated with the electronic device or a user (e.g., account) of the electronic device (e.g., 600). In some embodiments, the collection of media items is a collection of media items in which one or more of the participants (or more than a threshold number of the participants) in the conversation appear in media items in the suggested collection. For example, the collection of media items includes photos and/or videos of a camping trip that some or all of the participants in the conversation attended and thus the collection of media items is suggested for sharing with the participants in the conversation because the participants in the conversation attended the camping trip.

Suggesting a collection of media items that are determined to be relevant to participants of a message conversation with the recipient allows the user to quickly identify media that the user is likely to want to share with the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the suggested collection of media items (e.g., represented by interface 612) is determined (756) to be relevant to the message conversation with the recipient (e.g., 603B) based on content (e.g., text, or media items (images, videos)) of the transcript (e.g., 604A of FIG. 6D) of the message conversation. For example, the suggested collection corresponding to interface 612 of FIG. 6F is relevant to the text "Hi! Could you send me the photos from Lake Tahoe last weekend?" represented by message 604C of FIG. 6G. For example, the suggested collection corresponding to interface 612 of FIG. 6F is relevant to the received shared collection corresponding to representation 604B (e.g., which is also associated with the location "Lake Tahoe" and the dates December 1 to December 4, because it represents the media items captured by William during the same trip that the user of device 600 attended) in transcript 604A as shown in FIG. 6D.

Suggesting a collection of media items that are determined to be relevant to content of the transcript of a message conversation with the recipient allows the user to quickly identify media that the user is likely to want to share with the recipient. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the suggested collection of media items (e.g., represented by interface 612) is determined (758) to be relevant to the message conversation with the recipient (e.g., 603B) based on text (e.g., 604C) of messages included in the transcript (e.g., 604A of FIG. 6G) of the message conversation. For example, the suggested collection corresponding to interface 612 of FIG. 6F is relevant to the text "Hi! Could you send me the photos from Lake Tahoe last weekend?" represented by message 604C of FIG. 6G.

In some embodiments, the suggested collection of media items (e.g., represented by interface 612) is determined (760) to be relevant to the message conversation with the recipient (e.g., 603B) based on a reference to a time (e.g., "last weekend" in message 604C) mentioned (e.g. included) in the transcript (e.g., 604A of FIG. 6G) of the message conversation. In some embodiments, the reference to a time is a textual reference to a particular time, date or date range, or relative description of time (e.g., last week, last month). For example, the suggested collection corresponding to interface 612 of FIG. 6F is relevant to the mention of "last weekend" in the text "Hi! Could you send me the photos from Lake Tahoe last weekend?" represented by message 604C of FIG. 6G.

In some embodiments, the suggested collection of media items (e.g., represented by interface 612) is determined (762) to be relevant to the message conversation with the recipient (e.g., 603B) based on a geographic location (e.g., "Lake Tahoe" in message 604C) mentioned (e.g. included) in the transcript (e.g., 604A of FIG. 6G) of the message conversation. For example, the suggested collection corresponding to interface 612 of FIG. 6F is relevant to the mention of "Lake Tahoe" in the text "Hi! Could you send me the photos from Lake Tahoe last weekend?" represented by message 604C of FIG. 6G.

In some embodiments, the suggested collection of media items (e.g., represented by interface 612) is determined (764) to be relevant to the message conversation with the recipient (e.g., 603B) based on a collection of media items that was received from the recipient and that is represented in the transcript of the message conversation (e.g., representation 604B). In some embodiments, In some embodiments, the electronic device received the media items in the collection of media items from the recipient that are represented in the transcript. In some embodiments, the electronic device received a link or other data for accessing the media items, in the collection of media items from the recipient that are represented in the transcript, from a remote device (e.g., a server).

In some embodiments, prior to displaying (e.g., FIG. 6B) a sharing affordance (e.g., 606C of FIG. 6C) that corresponds to the suggested collection of media items, the electronic device (e.g., 600) displays (766), on the display, the transcript (e.g., 604A of FIG. 6B) of the message conversation concurrently with a keyboard region (e.g., 604E) that includes a suggestion region (e.g., 606) that is populated with input suggestions (e.g., 606A and 606B). For example, input suggestions can include one or more of: autocorrect suggestions, autocomplete suggestions, or the like. While displaying the transcript of the message conversation concurrently with the keyboard region (e.g., as shown in FIG. 6B), the electronic device (e.g., 600) replaces (768) display of an input suggestion (e.g., 606B of FIG. 6B) in the keyboard region with the sharing affordance (e.g., 606C of FIG. 6C), wherein the sharing affordance is displayed concurrently with the transcript of the message conversation, wherein receiving the first input (e.g., 608 of FIG. 6E) comprises receiving input corresponding to selection of the sharing affordance. In some embodiments, the sharing affordance is displayed concurrently with the keyboard region. In some embodiments, the sharing affordance is displayed in response to receiving a message from the recipient. For example, the sharing affordance 606C can be displayed in response to receiving an indication that the recipient (e.g., 603B) has shared one or more media items (e.g., upon receiving representation 604B of FIG. 6D), providing the user of the first device streamlined access to an interface for sharing back media items with the recipient.

Displaying an affordance while displaying the transcript allows the user to quickly access media that the user is likely to want to share with the recipient. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the sharing affordance that corresponds to the suggested collection of media items, and while displaying the transcript (e.g., 604A of FIG. 6D) of the message conversation with the recipient (770): the electronic device (e.g., 600) receives (772), via the one or more input devices, input (e.g., 607 of FIG. 6D) associated with a text entry field (e.g., 604D) displayed concurrently with the transcript of the message conversation. For example, the electronic device receives a tap on the text entry field 604D, or receives character input (e.g., 607). In response to receiving the input associated with the text entry field, the electronic device (e.g., 600) displays (774), on the display, the sharing affordance (e.g., 606C) concurrently with the transcript of the message conversation.

In some embodiments, receiving the first input comprises receiving (776) input (e.g., 614) corresponding to selection of a portion (e.g., 604F of FIG. 6G) of a message (e.g., 604C) in the transcript (e.g., 604A) of the message conversation. In some embodiments, a portion (e.g., 604F) of a message is determined to be relevant to a shareable collection of media items (e.g., the collection represented by interface 612). In some embodiments, the electronic device makes the portion of the message selectable. For example, the device displays a message by the recipient in the transcript that reads "Hi! Could you send me the photos from Lake Tahoe last weekend?" with a portion that is selected. For example, in FIG. 6G "photos from Lake Tahoe" is selectable and displayed with a visual indication that it is selectable (e.g., underlined). In response to user selection of the selectable text (e.g., user input 614), the device displays a suggested collection of media items (e.g., suggested collection interface 612 as shown in FIG. 6F or 6N, or in a one-up view 636).

Receiving input corresponding to selection of a portion of a message in the transcript allows the user to quickly access media that the user is likely to want to share with the recipient that is related to the selected portion, reducing the number of inputs needed to do so. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to receiving the first input (e.g., 620 of FIG. 6J), and while displaying the transcript (e.g., 604A) of the message conversation with the recipient (e.g., 603B), the electronic device (e.g., 600) displays (780) a plurality of affordances (e.g., 610A of FIG. 6I) including an affordance (e.g., 610B) associated with a first (e.g., photos application) application and an affordance (e.g., 610C) associated with a second application (e.g., music application), different than the first application. The electronic device (e.g., 600) receives (782), via the one or more input devices, input corresponding to selection of the affordance (e.g., 610B) associated with the first application. In response to receiving the input corresponding to selection of the affordance associated with the first application, and while continuing to display the transcript of the message conversation with the recipient, the electronic device (e.g., 600) displays (784), on the display, an interface (e.g., 610 of FIG. 6J) associated with the first application. While displaying the interface associated with the first application, the electronic device (e.g., 600) displays (786), on the display, the suggested collection of media items (e.g., 612 of FIG. 6F or FIG. 6N, or in a one-up view 636) for sharing with the recipient. In some embodiments, the electronic device displays the suggested collection of media items (e.g., 612 of FIG. 6F or FIG. 6N) for sharing with the recipient in response to user input received while displaying the interface associated with the first application (e.g., 610). For example, at the display of page 618 at interface 610, as shown in FIG. 6J, the device receives a swipe gesture input (e.g., 620), and in response displays page 612, as shown in FIG. 6L.

In some embodiments, the input corresponding to selection of the affordance (e.g., 610B) associated with the photos application is the first input and the display of the photos application user interface (e.g., 610) includes display of the suggested collection of media items (e.g., 612) for sharing with the recipient (e.g., 603B). For example, the electronic device can display interfaces 610 and 612 as shown in FIG. 6F in response to user input 616, and optionally not require a swipe over from interface 618. In some embodiments, the first input (e.g., 620) is received while the photos application user interface (e.g., 610 of FIG. 6J) is displayed (e.g., a swipe over from "Recent Photos" interface 618 to interface 612 as shown in FIG. 6J). In some embodiments, in response to an additional input (e.g., 622 of FIG. 6L) (e.g., swipe up on the drawer handle) received while the photos application user interface is displayed, the device expands the size of the displayed photos application user interface (e.g., to make larger, to take up all of the display, to replace the transcript). In some embodiments, the displayed suggested collection of media items (e.g., as shown in interface 612) is scrollable. For example, user input representing a request to scroll (e.g., upward or downward swipe on 612) causes additional media items in the collection to be displayed.

In some embodiments, the transcript (e.g., 604A) of the message conversation with the recipient is displayed (778) concurrently with the suggested collection of media items (e.g., represented by interface 612) for sharing with the recipient. For example, transcript 604A is displayed concurrently with suggested collection interface 612 in FIG. 6F.

In some embodiments, transmitting the message to the recipient as part of the message conversation that provides access to the at least a portion of the suggested collection of media items comprises inserting (7102) a representation (e.g., 631 of FIG. 6U, or 604H of FIG. 6AK) of the suggested collection of media items into the transcript (e.g., 604A). In some embodiments, the representation includes an indication of transmission (e.g., upload or download) status (e.g., 2 of 23 uploading, 10 of 23 downloading, uploading, downloading, or the like). In some embodiments, the representation includes an expiration time (e.g., expiration of a link or access) (e.g., expires in 13 days, or the like). In some embodiments, the representation includes a status of receipt (e.g., delivered, read, opened, viewed, or the like). In some embodiments, the electronic device receives text to accompany the representation that is inserted with the representation into the transcript. For example, at FIG. 6AK, the device 600 inserted the accompanying text "Here you go!" along with representation 604H as part of message 604J. In some embodiments, the device inserts the representation of the collection into a text entry field (e.g., before transmitting to third party), and then receives accompanying text before transmitting and inserting the representation and the accompanying text into the transcript. For example, at FIG. 6J, device 600 receives the accompanying text (e.g., via user input at the keyboard) in text entry field, before inserting (e.g., in response to user input 647) the text and the representation in the transcript 604A (e.g., as shown in FIG. 6AK).

In some embodiments, transmitting the message to the recipient as part of the message conversation that provides access to the at least a portion of the suggested collection of media items comprises (794): in accordance with a determination that the recipient (e.g., 603B) is eligible to receive messages through a predetermined cloud-based service (e.g., a recipient is associated with a device that can receive messages through a specific cloud-based service for sending and/or receiving electronic messages (e.g., via the internet)), the electronic device (e.g., 600) provides (796) access to the at least a portion of the suggested collection of media items through the predetermined cloud-based service, wherein the access provided through the predetermined cloud service restricts access by users other than the recipient; and in accordance with a determination that the recipient is not eligible to receive messages through the predetermined cloud-based service, the electronic device provides (798) access to the at least a portion of the suggested collection of media items by sending a link (e.g., publically-accessible, non-guessable URL) to the recipient, wherein the access provided by sending a link does not restrict access by users other than the recipient. In some embodiments, providing access through the cloud-based service provides access to the recipient only, and the recipient is not permitted or able to forward access to another party (e.g., another user of the cloud-based service). For example, the access provided is limited to an account associated with the recipient.

Providing restricted access to a collection of media through a predetermined service, dependent on whether the recipient is eligible to receive messages through the service, increases the security of sharing media items by the user without requiring additional input. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, transmitting the message to the recipient as part of the message conversation that provides access to the at least a portion of the suggested collection of media items comprises transmitting (7100), to the recipient, the media items in the at least a portion of the suggested collection of media items.

In some embodiments, subsequent to transmitting the message (e.g., 604J of FIG. 6AK) to the recipient (e.g., 603B) as part of the message conversation that provides access to the at least a portion of the suggested collection of media items (788) (e.g., represented by interface 612): the electronic device (e.g., 600) receives (790), via the one or more input devices, input (e.g., 682 of FIG. 6AAB) representing revocation of the recipient's access to the at least a portion of the suggested collection of media items. In response to receiving the input representing revocation of the recipient's access, the electronic device transmits (792) data (e.g., to a server, such as a server of a cloud-based service for sending and/or receiving messages) that causes termination of the access to the at least a portion of the suggested collection of media items that was provided in the message (e.g., 604J of FIG. 6AK) to the recipient (e.g., 603B). For example, device 600 sends instructions to a server of a cloud-based messaging service in order to revoke the user's access, or that de-activates a hyperlink.

Causing termination of recipient's access rights increases the security of sharing media items by the user without requiring an excessive number of inputs to ensure control of media items. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to transmitting the message to the recipient as part of the message conversation that provides access to the at least a portion of the suggested collection of media items (7104): the electronic device (e.g., 600) receives (7106), via the one or more input devices, a fifth input (e.g., 656 of FIG. 6AN). For example, the fifth input is associated with a photos application, such as selection of the "For You" tab 654B in the interface 652 shown in FIG. 6AN. In response to receiving the fifth input, the electronic device (e.g., 600) displays (7108), on the display, a prompt (e.g., 660 of FIG. 6AO) to share the suggested collection (e.g., represented by interface 612) with a (e.g., one or more) suggested recipient (e.g., recipients 660A of FIG. 6AO, recipients associated with 666B-666D of FIG. 6AS) different than the recipient (e.g., 603B). For example, selecting the "For You" tab causes a sharing suggestions interface to be displayed, which includes the suggested collection of media items and one or more additional recipients (e.g., users, user accounts, contacts) with whom to share the suggested collection with.

Displaying a prompt to share the suggested collection with a suggested recipient different than the recipient allows the user to quickly identify an additional recipient with whom the user is likely to want to share media. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to the fifth input, the device displays a prompt to share a different suggested collection (than the suggested collection displayed in response to the first input) with the recipient (e.g., 603B). For example, after navigating to a sharing interface (e.g., "For You" tab) of a photos application (e.g., after displaying the message conversation in a messaging application), the device displays one or more additional suggestions for sending to the recipient (e.g., 603B). Thus, the device provides a convenient path to share additional content (e.g., related to conversations or other relationship) with the recipient with whom the user of the current device is in a sharing relationship (e.g., a suggestion was previously made or the user previously transmitted access to media items). In some embodiments, the device displays a different suggested media collection if the suggested collection was previously transmitted to the recipient. For example, the device provides a new suggestion after the first suggestion (e.g., of suggested collection interface 612) was acted upon by the user (e.g., sent to recipient 603B). In some embodiments, the device displays a different suggested media collection if the suggested collection was not previously transmitted to the recipient (e.g., 603B). For example, the device provides a new suggestion if the first suggestion was not acted upon by the user. In some embodiments, if the first suggestion was previously not acted upon by the user, in response to receiving the fifth input, the device displays a prompt to share the suggested collection with the recipient. For example, if the user has not previously transmitted access to the suggested collection while in a messages application, the device provides a prompt and opportunity to transmit the suggested collection to the recipient again (e.g., at a sharing interface of a photos application).

In some embodiments, the suggested recipient is suggested based on one or more of (7110): an identified face (e.g., shown in 660A of FIG. 6AO) associated with the suggested recipient (e.g., Sue, Anna, or John mentioned in FIG. 6AO) being identified in at least a portion of the media items of the suggested collection; and an event known to have been attended by the suggested recipient (e.g., wherein the suggested collection includes media taken at the event), wherein suggested collection is associated with (e.g., depicts, includes media taken at the time and place of, is tagged with metadata of) the event known to have been attended by the suggested recipient.

In some embodiments, while displaying an interface (e.g., 666 of FIG. 6AS) associated with the prompt (e.g., 660) to share the suggested collection with the suggested recipient: the electronic device (e.g., 600) displays (7112), on the display, an indication (e.g., 666E) of the suggested recipient that includes a depiction of an identified face associated with the suggested recipient.

In some embodiments, the suggested recipient (e.g., associated with 666E of FIG. 6AS) is not associated with (7114) contact information associated with the device, and the identified face associated with the suggested recipient is depicted in at least a portion of the media items of the suggested collection. While displaying the indication of the suggested recipient that includes the depiction of the identified face associated with the suggested recipient, the electronic device (e.g., 600) receives (7116), via the one or more input devices, a sixth input (e.g., 668 of FIG. 6AT) representing selection of the suggested recipient. In response to receiving the sixth input, the electronic device displays (7118), on the display, a prompt (e.g., 670 of FIG. 6AU) to match the suggested recipient (e.g., represented by 666E of FIG. 6AT) with contact information associated with the device. The electronic device receives (7120), via the one or more input devices, a seventh input (e.g., 672 of FIG. 6AU) representing selection of an item of contact information (e.g., 670A) from the contact information associated with the device. In response to receiving the seventh input, the electronic device associates (7122) the suggested recipient with the item of contact information. In some embodiments, the electronic device updates the indication of the suggested recipient based on the item of contact information (e.g., to include a contact name as shown in FIG. 6AV). Subsequent to associating the suggested recipient with the item of contact information, the electronic device transmits (7124), using the item of contact information, a message (e.g., such as 604J of FIG. 6AK) to the suggested and providing access to at least a portion of the suggested collection of media items in response to selection (e.g., user input 674 or 665) of an affordance (e.g., 664A of FIG. 6AR, or 666G or 666H of FIG. 6AW) included in an interface (e.g., 664 or 666) associated with (e.g., accessed via) the prompt.

Note that details of the processes described above with respect to method 700 (e.g., FIGS. 7A-7J) are also applicable in an analogous manner to the methods described below. For example, method 900 optionally includes one or more of the characteristics of the various methods described above with reference to method 700. For brevity, these details are not repeated below.

FIGS. 8A-8AQ illustrate exemplary user interfaces for sharing a suggested collection of media items that is related to a received collection of media items, in accordance with some embodiments. The user interfaces in these figures are used to illustrate the processes described below, including the processes in FIGS. 9A-9G.

FIGS. 8A-8AL illustrate exemplary user interface for viewing and managing a received a shared collection of media items. FIG. 8A illustrates an exemplary message user interface 804, displayed on display 602 of electronic device 600 (described above). In some embodiments, message interface 804 includes one or more features of message interface 604. The message interface 804 includes a transcript 804A of a message conversation between the parties shown in parties region 804B. In this example, the conversation is between users named Lynne (e.g., user 805A), William (e.g., user 805B), and Gregg (e.g., user 805C). In this example, Lynne is the user of device 600 (e.g., an account associated with Lynne is logged in), who is communicating with William and Gregg (e.g., each using their own devices remote from device 600).

In some embodiments, the device (e.g., 600) receives an indication that a collection of media items has been shared with the device. For example, device 600 can receive a message that includes information for accessing the shared collection (e.g., the media items themselves, a link, or other data for accessing the shared collection). In some embodiments, the device (e.g., 600) displays a representation (e.g., 804C) of the received shared collection. In some embodiments, the device displays the representation of the received shared media collection in a transcript (e.g., 804A) of a message conversation. For example, message interface 804 also includes an exemplary representation 804C of a received shared collection of media items that has been shared with Lynne by William. For example, William has provided access (e.g., as described above) to the shared collection of media items to Lynne (e.g., provided access via a cloud-based service to a device or account associated with Lynne). Techniques for providing access to a collection of media items are discussed above, and hereby incorporated.

In some embodiments, the representation (e.g., 804CD) of the received shared collection includes an indication of transfer status. For example, an indication of transfer status can include an indication that the received shared collection is currently being uploaded or downloaded. As shown in FIG. 8A, representation 804C includes an indication of upload status, included in the text "William is uploading 2 of 30", which indicates that the sender/sharer (William) is uploading the media items in the shared collection, as well as the progress of such upload (2 out of 30 media items have been uploaded already). As shown in FIG. 8D, described in more detail below, representation 804C includes an indication of download status, including the text "Downloading 2 of 30", indicating that device 600 is currently downloading the media items of the shared collection, as well as the progress of such download.

Figure 8B:
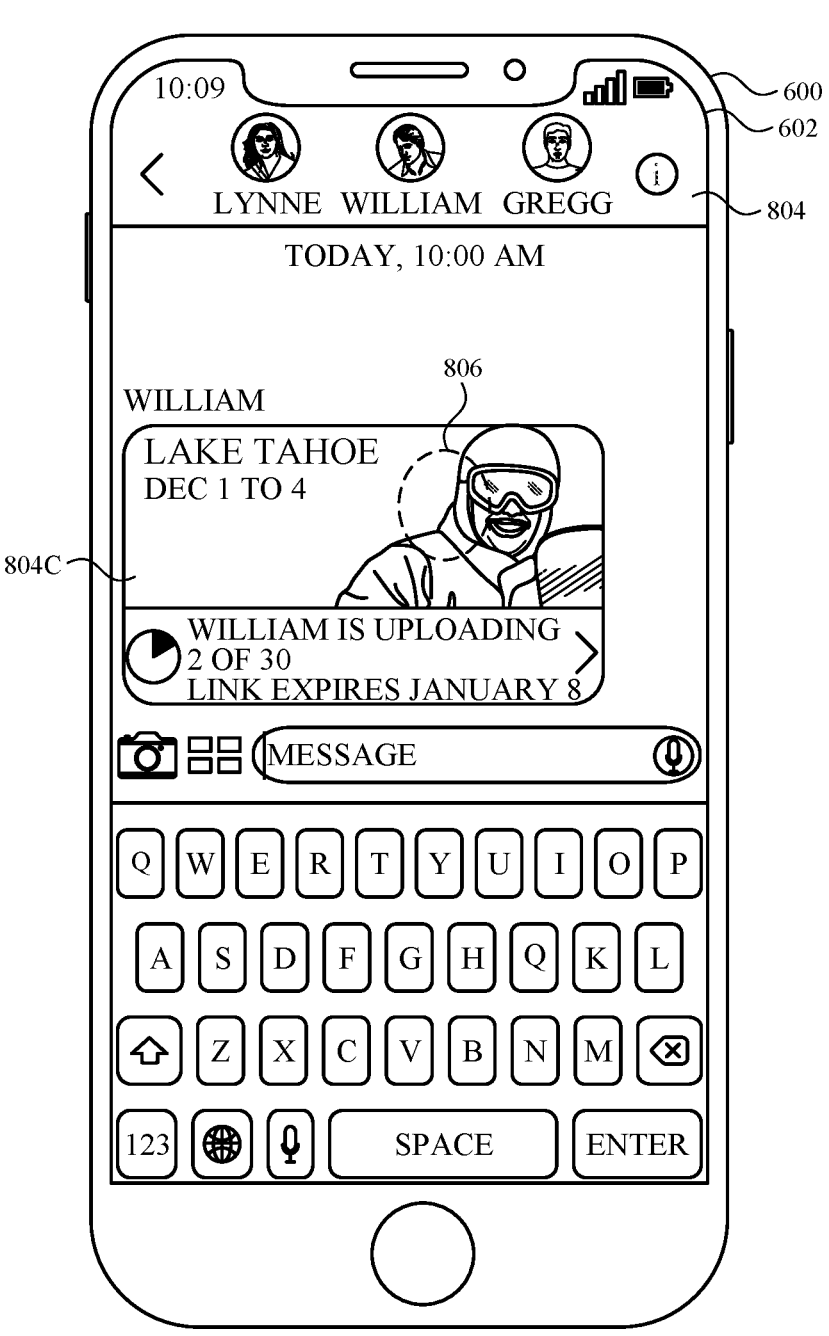
Figure 8C:
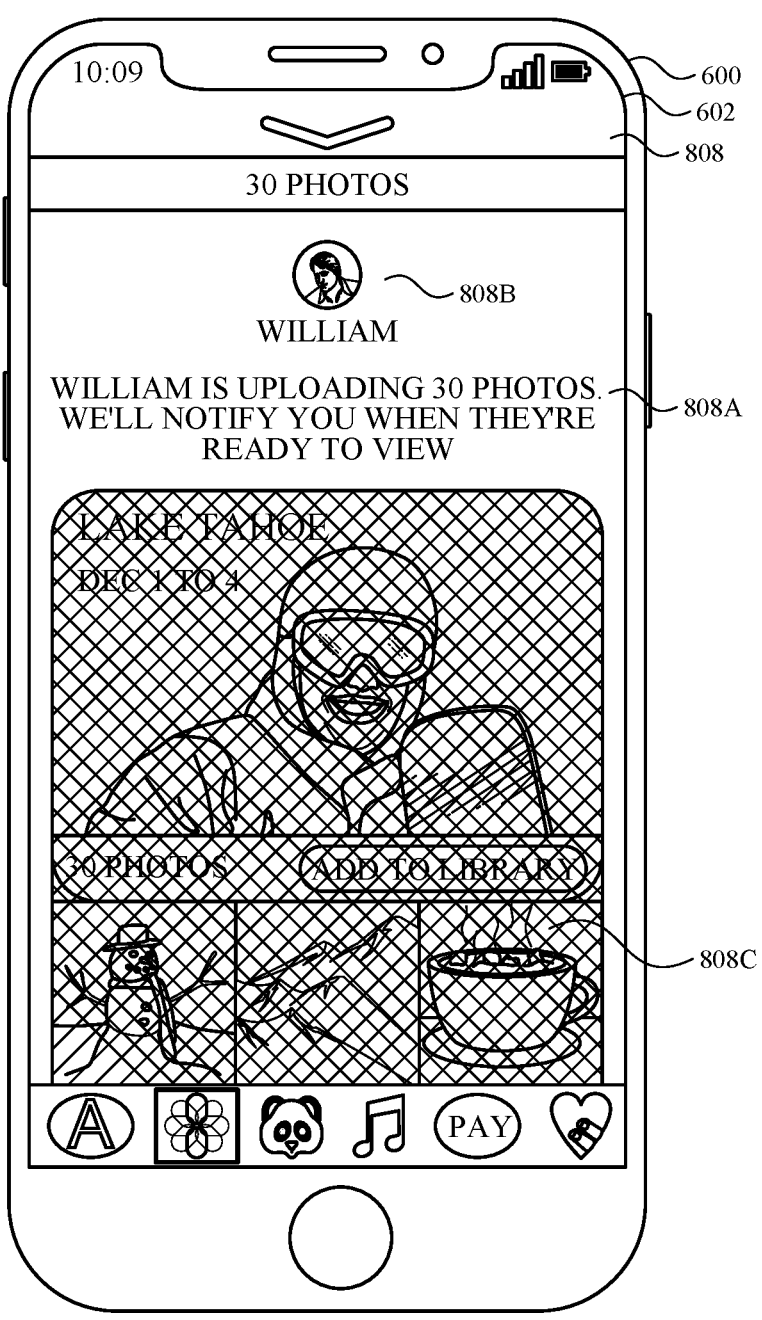
Figure 8D:
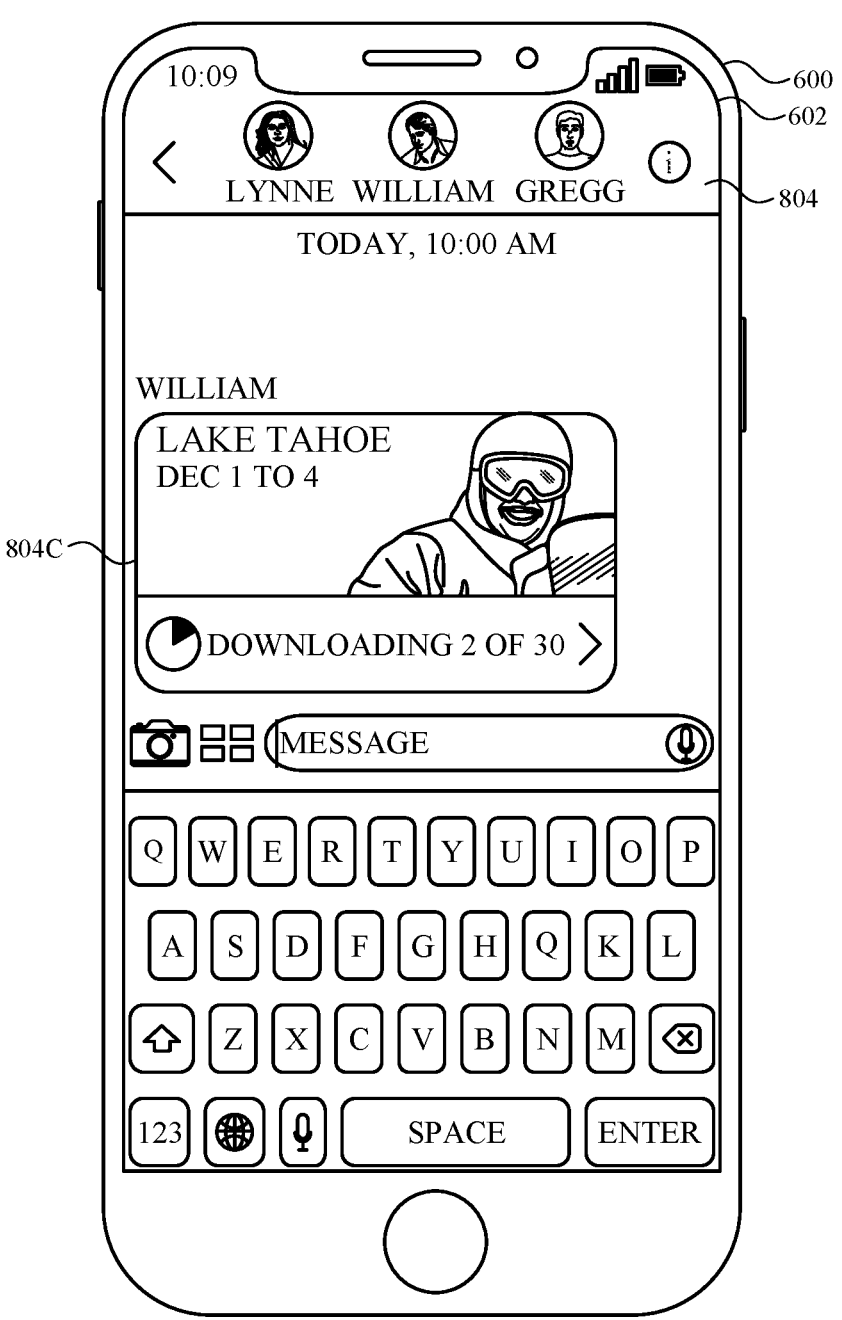

FIGS. 8B-8C illustrate an exemplary technique for previewing a received shared collection of media items (e.g., that has not been fully transferred (e.g., downloaded or uploaded)). In some embodiments, the device (e.g., 600) displays a preview (e.g., 808) of one or more media items in the received shared collection of media items in response to user input (e.g., 806) received while the collection of media items is currently being transferred. For example, at FIG. 8B, device 600 receives user input 806 corresponding to selection of representation 804A. As can be seen in FIG. 8B, William (the sender/sharer) is still uploading the shared collection of media items. In response to receiving user input 806, device 600 displays preview interface 808, as shown in FIG. 8C.

FIG. 8C illustrates an exemplary preview interface 808. In some embodiments, a preview interface (e.g., 808) includes an indication of transfer status (e.g., 808A). For example, preview interface 808 includes an indication 808A that William is currently uploading 30 photos. In some embodiments, a preview interface includes an indication (e.g., 808B) of the identity of the sender/sharer (e.g., includes his name and an avatar with his face). For example, preview interface 808 includes an indication 808B that William is the sender/sharer. In some embodiments, a preview interface includes representations (e.g., 808C) of one or more media items in the shared collection. In some embodiments, the representations in the preview interface are presented different in at least one respect than if the media items had completed being downloaded (e.g., by device 600). For example, as shown in FIG. 8C, the media items 808C are displayed dimmed (e.g., with a gray hue, also referred to as "grayed out") to indicate that the media items are still being transferred. In other examples, the media items can be reduced quality representations of the actual media items. In other examples, the media items can be displayed, but be non-selectable (e.g., such that when input attempting to select or view a displayed representation of a media item is received, the device does not perform an action such as toggle selection of the media item or display a one-up view of the media item). Accordingly, previewing a collection while still transferring allows the user to view some of the media items in the collection.

FIGS. 8D-8I illustrate various interfaces for downloading and accessing a received shared collection of media items. FIG. 8D illustrates an exemplary representation 804C of a received shared collection of media items while it is being downloaded (e.g., by device 600). In some embodiments, the device (e.g., 600) initiates a download of media items of a received shared collection of media items in response to user input (e.g., selection of representation 804C). For example, in response to user input 806 of FIG. 8B representing a tap on representation 804C (e.g., before or after William has finished uploading the collection), device 600 initiates download of the shared collection and displays representation 804C with a download status as shown in FIG. 8D.

While a received shared collection is downloading, a representation (e.g., 804C) of the shared collection might cease to be displayed (e.g., due to user action, or due to new messages inserted into a transcript that includes the representation). Accordingly, device 600 can display a notification (e.g., a pop-up window or banner) to provide a user with easy access to the collection upon completion of the download. Thus, the user can continue using device 600 and does not need to continually monitor the download, or perform an extraneous number of inputs to find the original (e.g., selected) representation of the shared collection. FIGS. 8E-8H are illustrative.

Figure 8E:
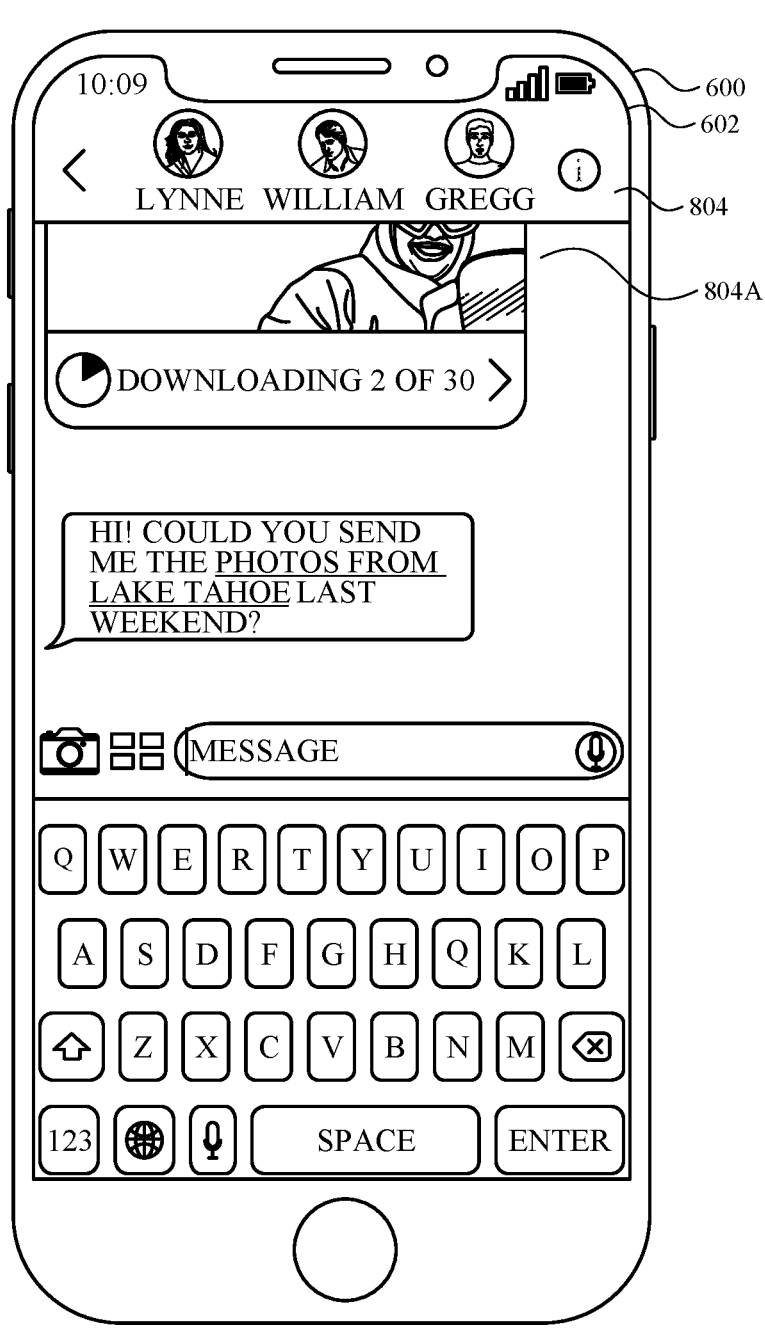

FIG. 8E illustrates message interface 804, where a new message has been received from William (e.g., user 805B) and added to the transcript 804A. As shown in FIG. 8E, the new message "Hi! Could you send me the photos from Lake Tahoe last weekend?" has been received from William (e.g., a device used by William) by device 600 and displayed in the transcript 804A, pushing representation up in the transcript.

Figure 8F:
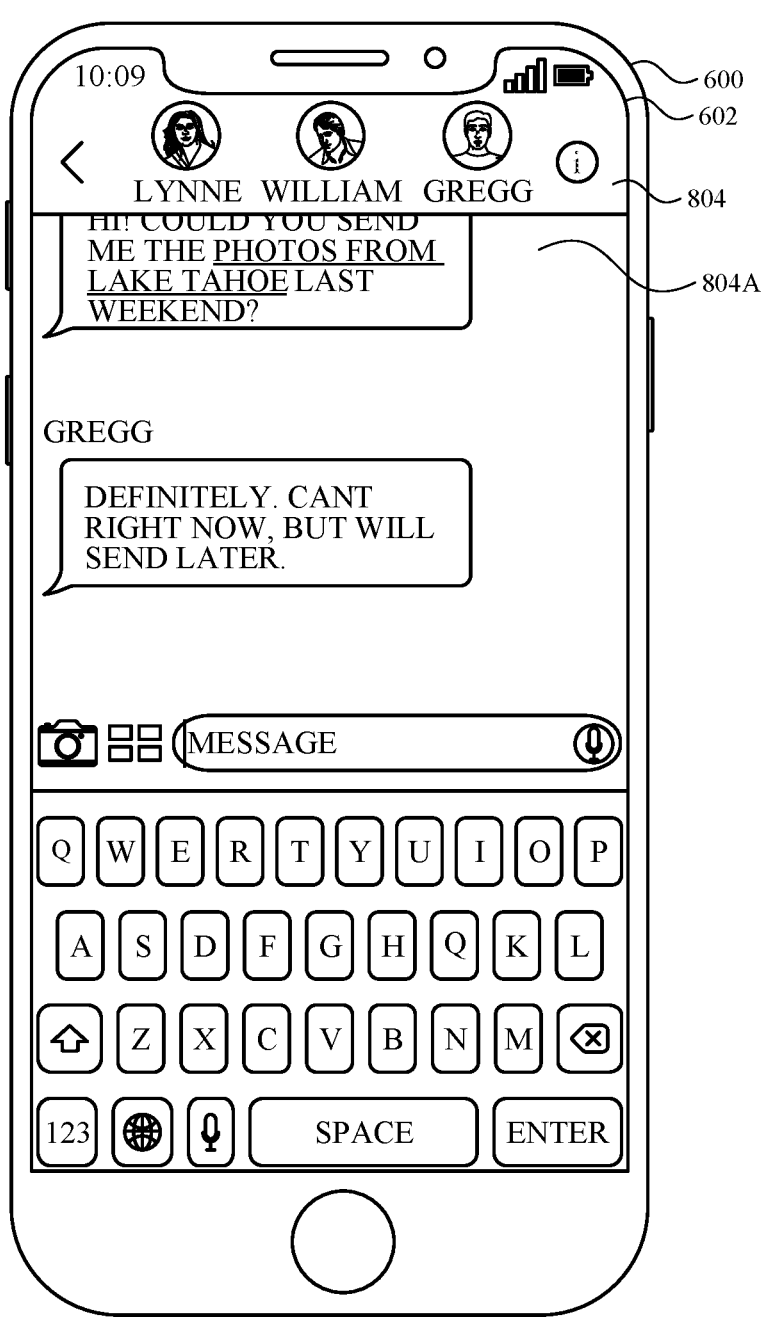

At FIG. 8F, device 600 receives another new message in transcript 804A, this time from Gregg (e.g., a device used by Gregg) that reads "Definitely. Can't right now, but will send later." As can be seen in FIG. 8F, the new message from Gregg caused representation 804C to cease to be displayed. In this example, the newer messages in the transcript 804A caused older content (including representation 804C) to be pushed off the display in favor of displaying new content in the transcript (e.g., chronologically by time of message transmission). In some embodiments, the transcript is scrollable. For example, device 600 can receive user input representing a request to scroll the content of the transcript (e.g., scroll it up), and cause representation 804C to be displayed again.

Figure 8G:
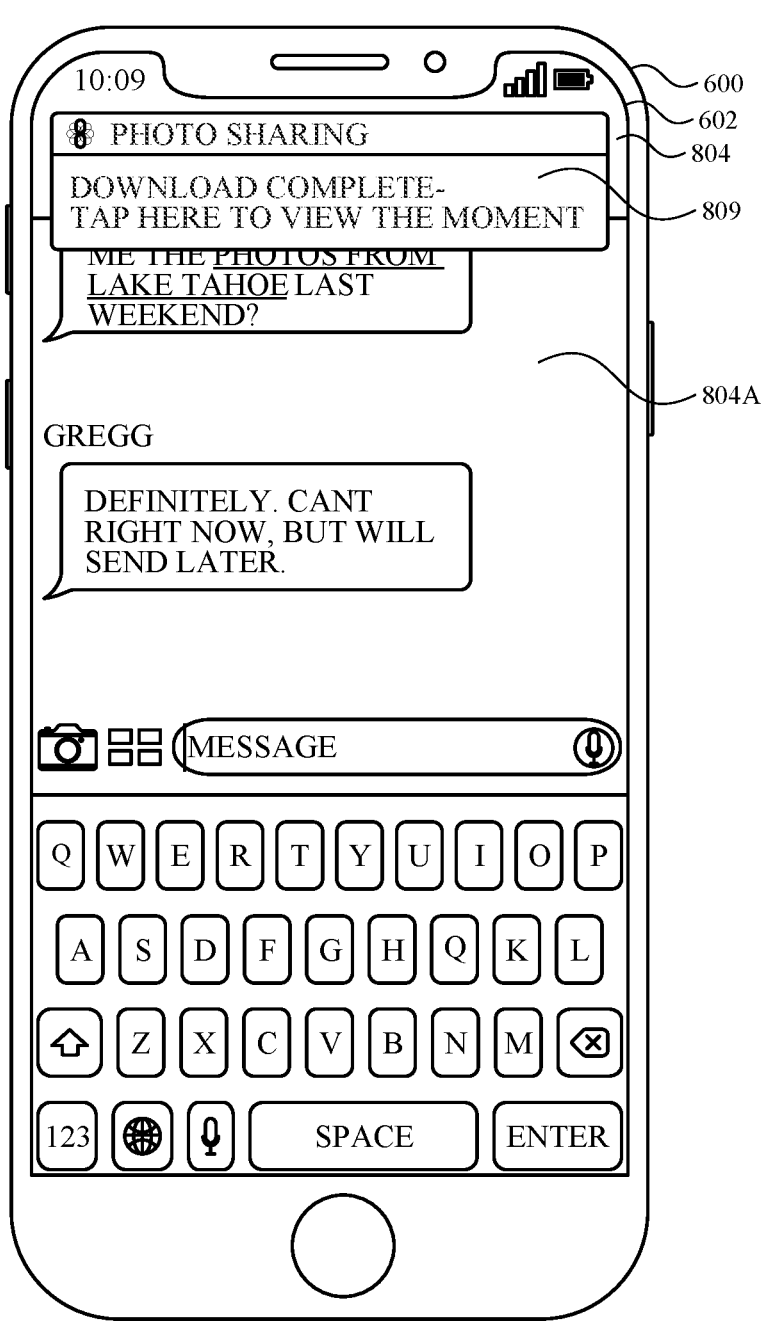
Figure 8H:
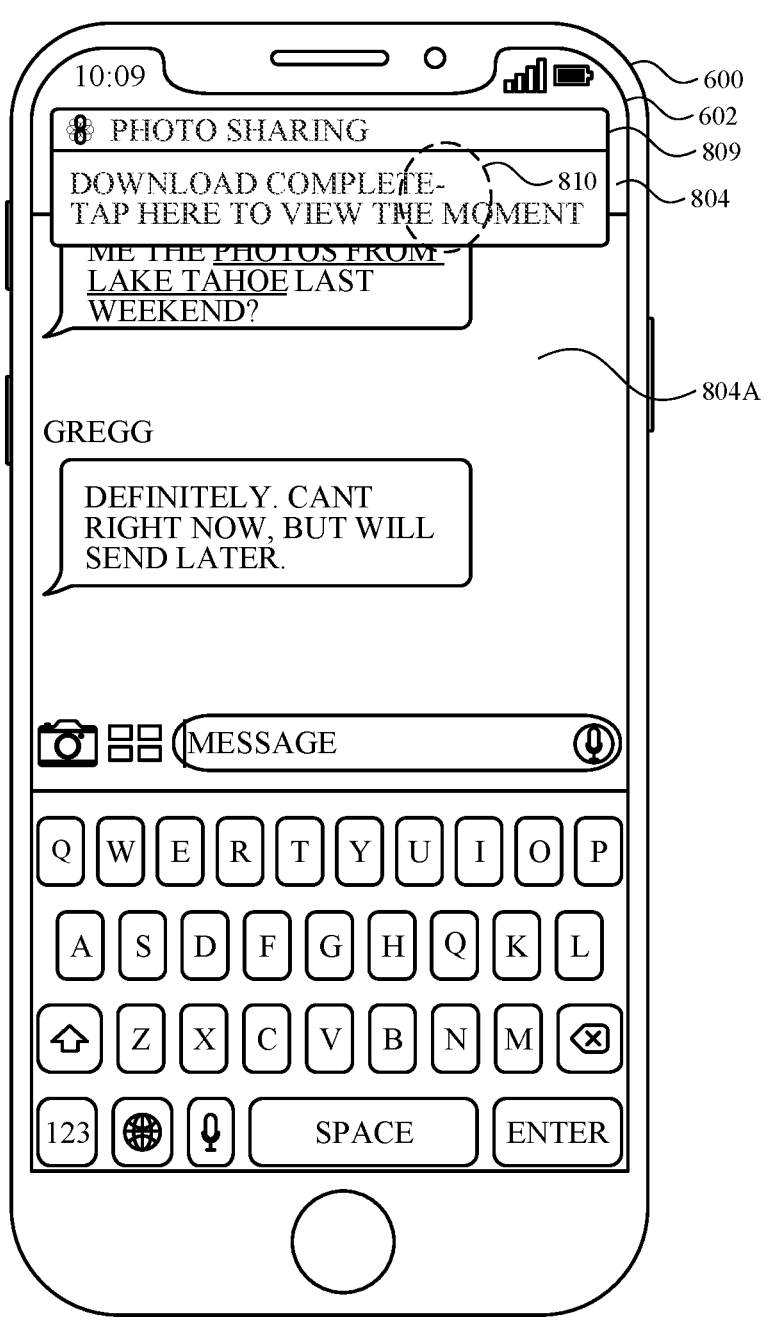

At FIG. 8G, device 600 has completed downloading the received shared collection of representation 804C. In some embodiments, in response to detecting completion of the download of a received shared collection of media items, the device (e.g., 600) displays an affordance (e.g., 809) for accessing the downloaded collection. For example, in FIG. 8G, device 600 displays notification 809, an exemplary affordance. In some embodiments, the affordance (e.g., 809) for accessing the downloaded collection is displayed in accordance with a determination that a representation (e.g., 804C) of the downloaded collection is not currently displayed on the display (e.g., 602 of device 600). For example, in FIG. 8G, device 600 determines that representation 804C is no longer displayed, and thus displays notification 809. In some embodiments, if representation 804C is displayed when the download completed, device 600 forgoes displaying notification 809 in response to completion.

In some embodiments, the device (e.g., 600) receives user input (e.g., 810) associated with the affordance (e.g., 809) and, in response, displays one or more representations of media items in the received shared collection of media items. For example, at FIG. 8H, device 600 receives user input 810 corresponding to selection of notification 809 and, in response, displays shared collection interface 814 (e.g., in a one-up view as shown in FIG. 8J, described in more detail below) or shared collection interface 814 (e.g., in a grid view as shown in FIG. 8V, described in more detail below).

Figure 8I:
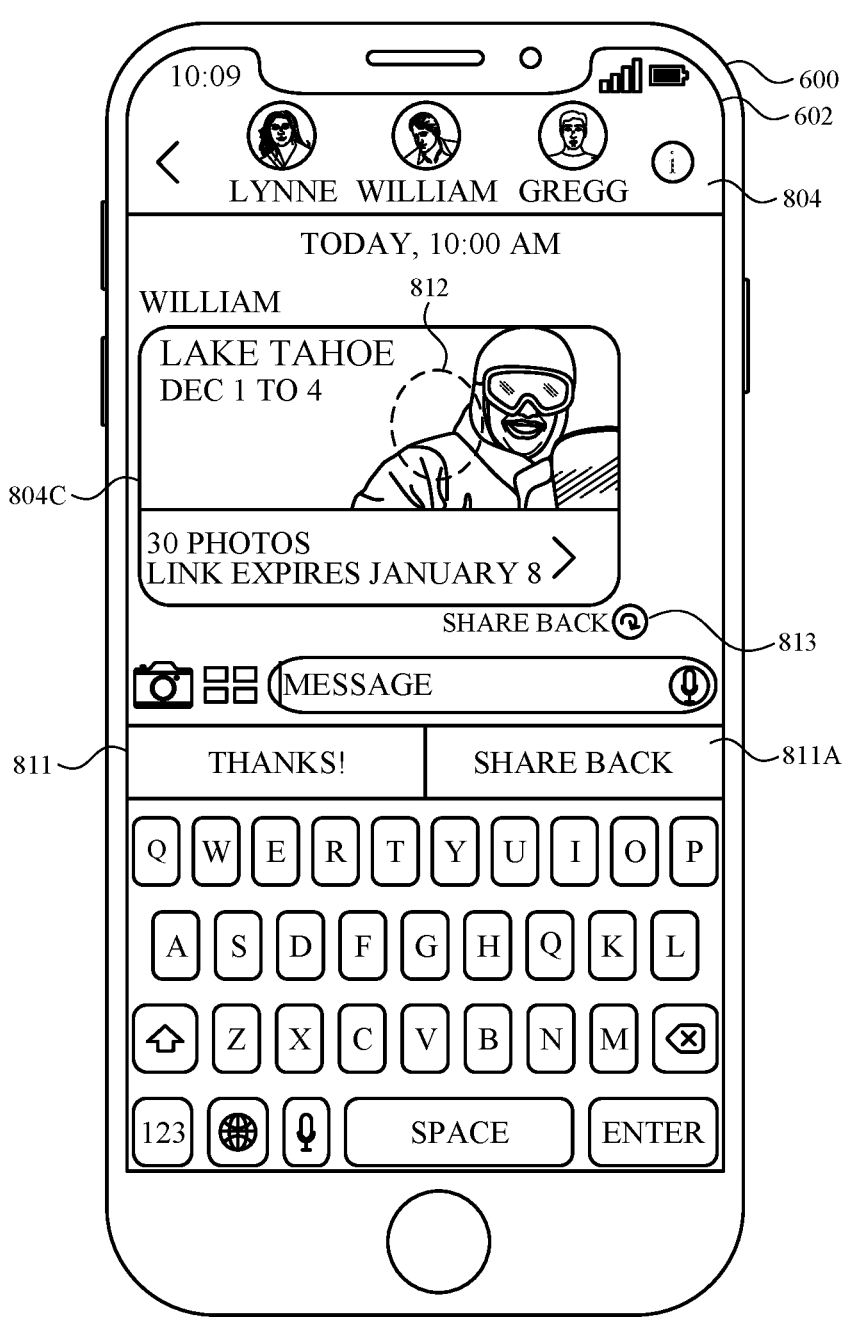
Figure 8J:
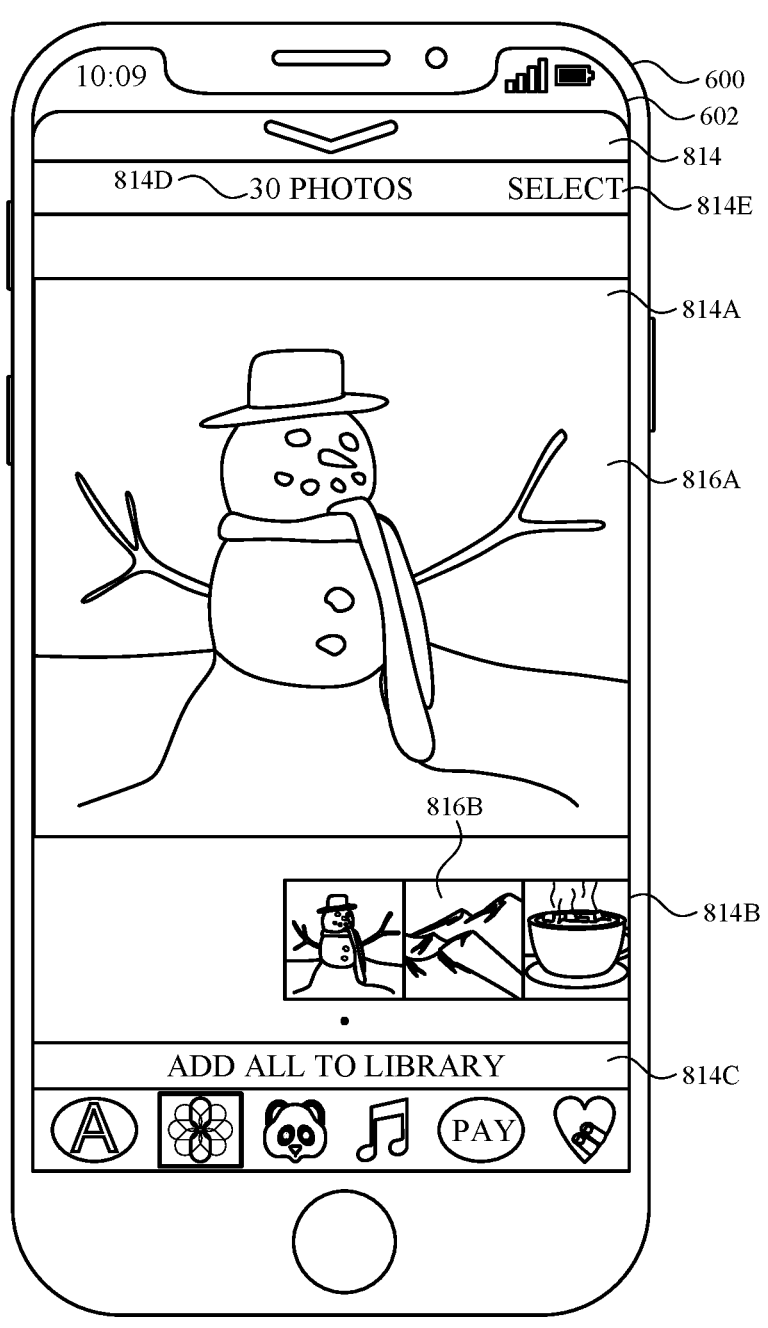

FIG. 8I illustrates an exemplary representation 804C for a collection of media items (e.g., that has completed downloading). For example, device 600 displays representation 804C as shown in FIG. 8I upon completion of the download initiated by user input selecting representation 804C before the collection had been downloaded (e.g., user input 806 of FIG. 8B). At FIG. 8I, device 600 receives user input 812 corresponding to selection of representation 804C and, in response, displays shared collection interface 814 (e.g., in a one-up view as shown in FIG. 8J, described in more detail below) or shared collection interface 814 (e.g., in a grid view as shown in FIG. 8V, described in more detail below).

In response to receiving a shared collection (e.g., 804C), the device 600 optionally provides the user with the option to quickly and easily share back media with the other participants in the conversation. In some embodiments, the device (e.g., 600) displays one or more prompts (e.g., 811A, 813) to share back media in response to receiving an indication that another user (e.g., 805B) has shared media with a user of the device (e.g., 805A). In some embodiments, a prompt (e.g., 811A, 813) is displayed at message interface (e.g., 804) concurrently with a transcript of a message conversation (e.g., 804A). For example, FIG. 8I illustrates a prompt 811A, which is a input suggestion affordance in an input suggestion region 811. Prompt 811A includes the text "Share Back", prompting the user to reciprocate sharing media. Input suggestion affordance 811A includes one or more of the features of input suggestion affordance 606C, described above. FIG. 8I also illustrates prompt 813, displayed next to representation 804C. In some embodiments, the device (e.g., 600) displays a prompt (e.g., 813) associated with (e.g., near, adjacent) a displayed representation (e.g., 804C) of a received shared collection. For example, prompt 813 can be persistently displayed alongside 804C, so that the user always has a quick entry point to access interfaces for sharing back media that is specifically relevant to the received shared collection represented by 804C. Thus, even if 804C ceases to be displayed, the device allows the user to scroll the transcript and select prompt 813. Also, if input suggestion region updates and the device ceases displaying 811A (e.g., replaces it with other suggestions), the user can use prompt 813.

In some embodiments, user input corresponding to selection of a prompt (e.g., 811A, 813) to share back media causes display of a suggested collection interface (e.g., that includes one or more features as described above with respect to interfaces 612 and/or 634). In some embodiments, user input corresponding to selection of a prompt (e.g., 811A, 813) to share back media causes display of another prompt interface (e.g., 854, described below).

FIGS. 8J-8AL illustrate exemplary interfaces for viewing and managing media items in a received shared collection of media items.

FIG. 8J illustrates an exemplary shared collection interface 814, representing the received shared collection shared by William (e.g., represented by 804C in FIG. 8I). For example, shared collection interface 814 can be displayed in response to user input 810 or 812. In some embodiments, a shared collection interface (e.g., 814) includes representations of one or more media items in a shared collection of media items. For example, FIG. 8J represents a one-up view of a media item 816A from the received shared collection of media items of representation 804C.

A shared collection interface such as 814 can be used to view media items. For example, still referring to FIG. 8J, shared collection interface 814 includes one-up region 814A for viewing a media item in a one-up style view (e.g., as described above). Shared collection interface 814 also includes scrubbing region 814B, which includes reduced-size representations (e.g., relative to their actual dimensions and/or relative to the media item displayed in one-up view) of other media items in the received shared collection. In some embodiments, user input corresponding to selection of a media item in the scrubbing region (e.g., 814B) causes the device (e.g., 600) to display the corresponding media item in the one up region (e.g., 814A). In some embodiments, user input corresponding to a directional swipe gesture (e.g., left swipe, or right swipe) in the scrubbing region (e.g., 814B) causes the device (e.g., 600) to perform a scrubbing action through the collection of media items, and display a different media item based on when the scrubbing action ends. For example, after completion of the scrubbing action, device 600 displays the media item that is centered in the scrubbing region, or that is adjacent to an indicator (e.g., the dot shown under region 814B), in the one-up region 814A.

The device that receives a shared collection of media items optionally provides the user with the option to save one or more of the media items into a media library associated with the user. This can be beneficial because, as described above, access to received shared media can expire. In some embodiments, the receiving party (e.g., of a shared collection) can add one or more media items, from the shared collection, to a media library. In some embodiments, the receiving party can access the media items in the media library after access provided by the sharer has expired (e.g., after expiration time, or after access is revoked). For example, the access provided by the sharer to the shared media can be hosted by a third-party cloud service, which facilitates the sharing from the sharing party to the receiving party. This can provide the benefit of simplifying the process for sharing. For instance, the sharer does not need to worry about creating and maintaining a dedicated connection to the receiving party (e.g., via proximity dependent technology such as Wi-Fi or Bluetooth, or via non-proximity dependent technology such as file transfer protocol (FTP) or a virtual private network (VPN) (or the like) between two devices). Further, the sharer also does not need to worry about facilitating third-party hosting, such as dealing with manually configuring or hosting an environment for sharing (e.g., a website). However, the hosting can be temporary, thus limiting the time for accessing the shared collection.

In view of the above, interfaces for saving media items are discussed below. In some embodiments, a shared collection interface provides the ability to save media items from a received shared collection. In some embodiments, a shared collection interface (e.g., 814) includes an affordance for saving one or more media items to a media library associated with the user of the device (e.g., 600). For example, still referring to FIG. 8J, shared collection interface 814 includes affordance 814C. In this example, affordance 814C includes the text "Add All to Library". Affordance 814C can be used to quickly and easily add (e.g., save) all of the media items in the received shared collection to a media library. Thus, the user of device 600 does not need to perform extraneous inputs to select media items individually in order to eventually add them to their media library. Moreover, the user can decide to save all media items in the received collection with or without having viewed them all (e.g., all media can be saved at the display of the first media item 816A as shown in FIG. 8J, without swiping over to other media items). In some embodiments, a shared collection interface (e.g., 814) includes an indication of the amount of media in the collection of media items. For example, shared collection interface 814 includes indicator 814D, which indicates that the shared collection being viewed includes a total of 30 media items (e.g., photos).

Figure 8K:
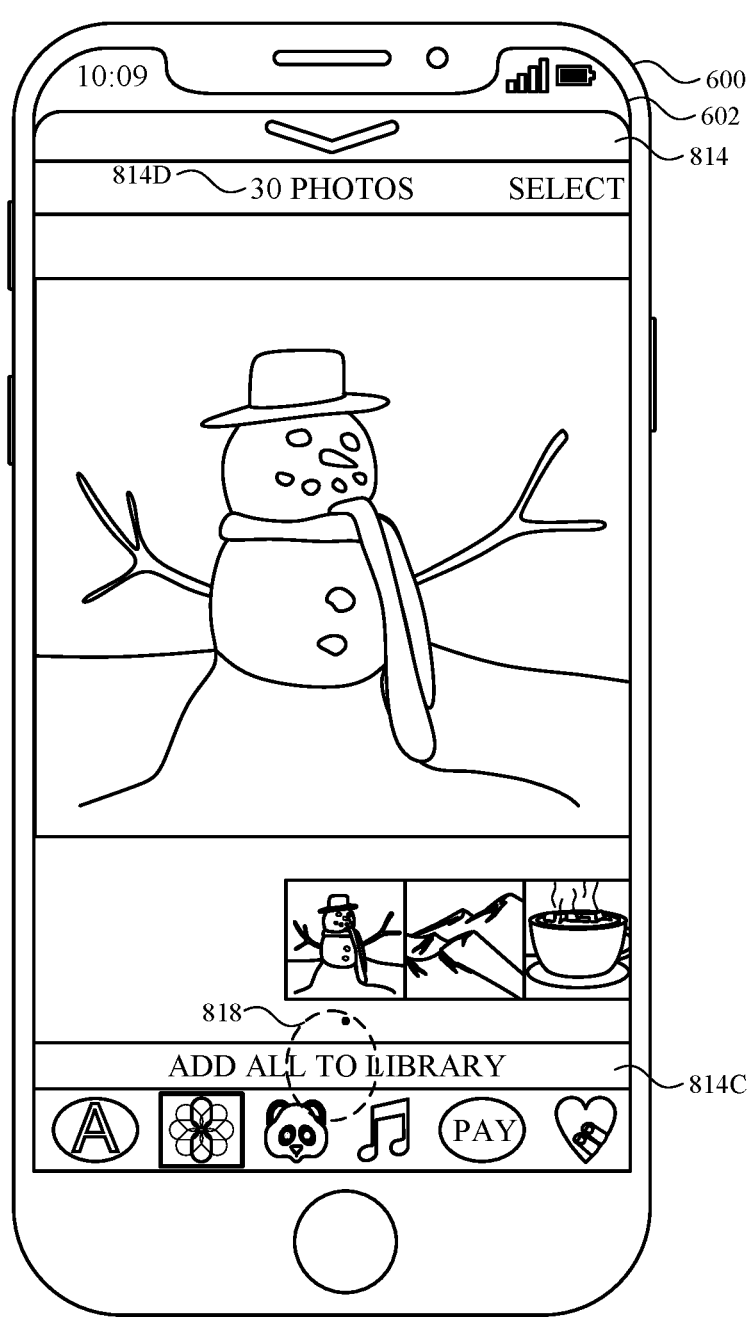

At FIG. 8K, device 600 receives user input 818 corresponding to selection of affordance 814C. In some embodiments, in response to receiving a request to save media items (e.g., user input 818), the device (e.g., 600) causes one or more media items from the corresponding collection to be added to a media library (e.g., associated with the device, or a user account associated with the device). For example, in response to receiving user input 818, device 600 causes all of the media items (e.g., 30 photos) to be added to a media library associated with device 600. In some embodiments, adding media to a media library comprises saving the media items to local storage (e.g., on device 600). In some embodiments, adding media to a media library comprises saving the media items to remote storage (e.g., a cloud-based media library maintained on a cloud-based service provider's server). An example of a cloud-based service includes "iCloud" provided by Apple Inc. of Cupertino, California.

Figure 8L:
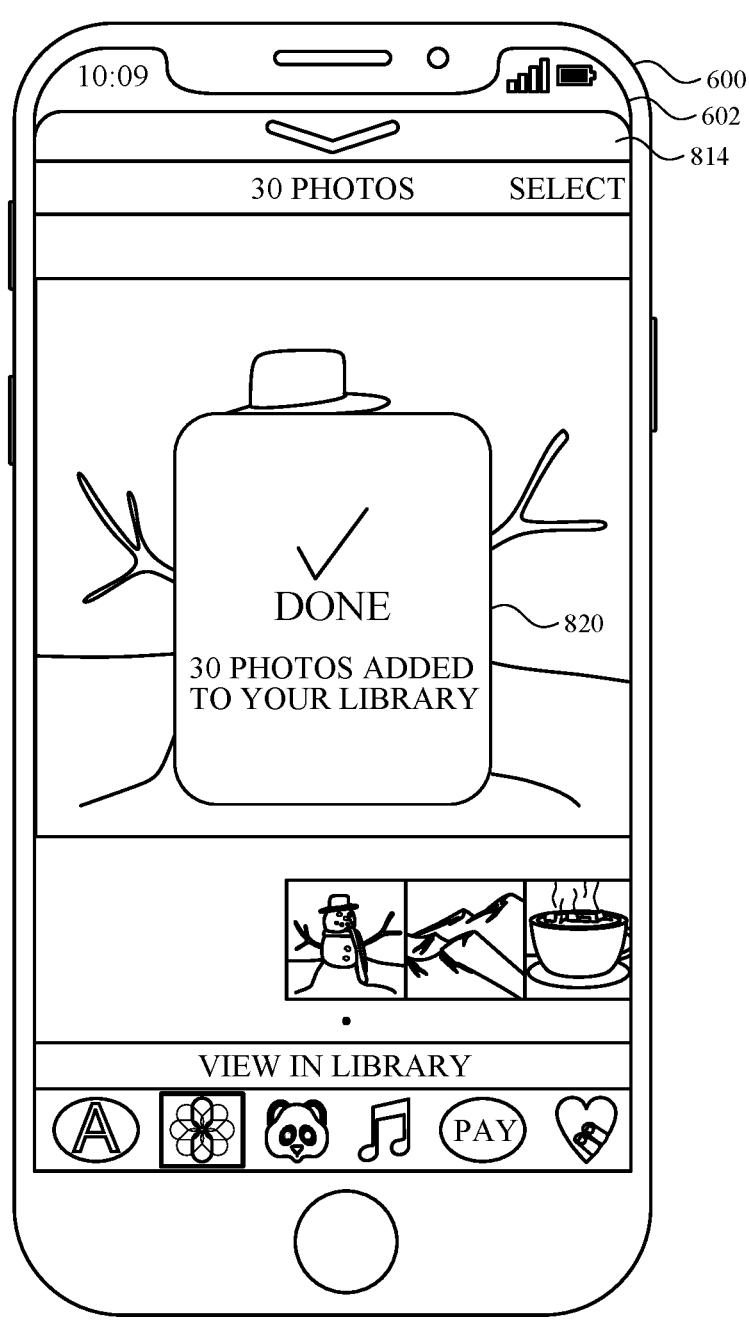

FIG. 8L illustrates an exemplary save confirmation indicator 820. In some embodiments, the device (e.g., 600) displays a save confirmation indicator in response to a request to save one or more media items to a media library (e.g., associated with the device). For example, device 600 displays save confirmation indicator 820 in response to receiving user input 818 corresponding to selection of the "Add All to Library" affordance 814C in FIG. 8K. In some embodiments, a save confirmation indicator includes an indication of the amount of media saved. For example, save confirmation indicator 820 indicates that 30 media items (e.g., photos) were added to the media library in the text: "30 photos added to your library".

Figure 8M:
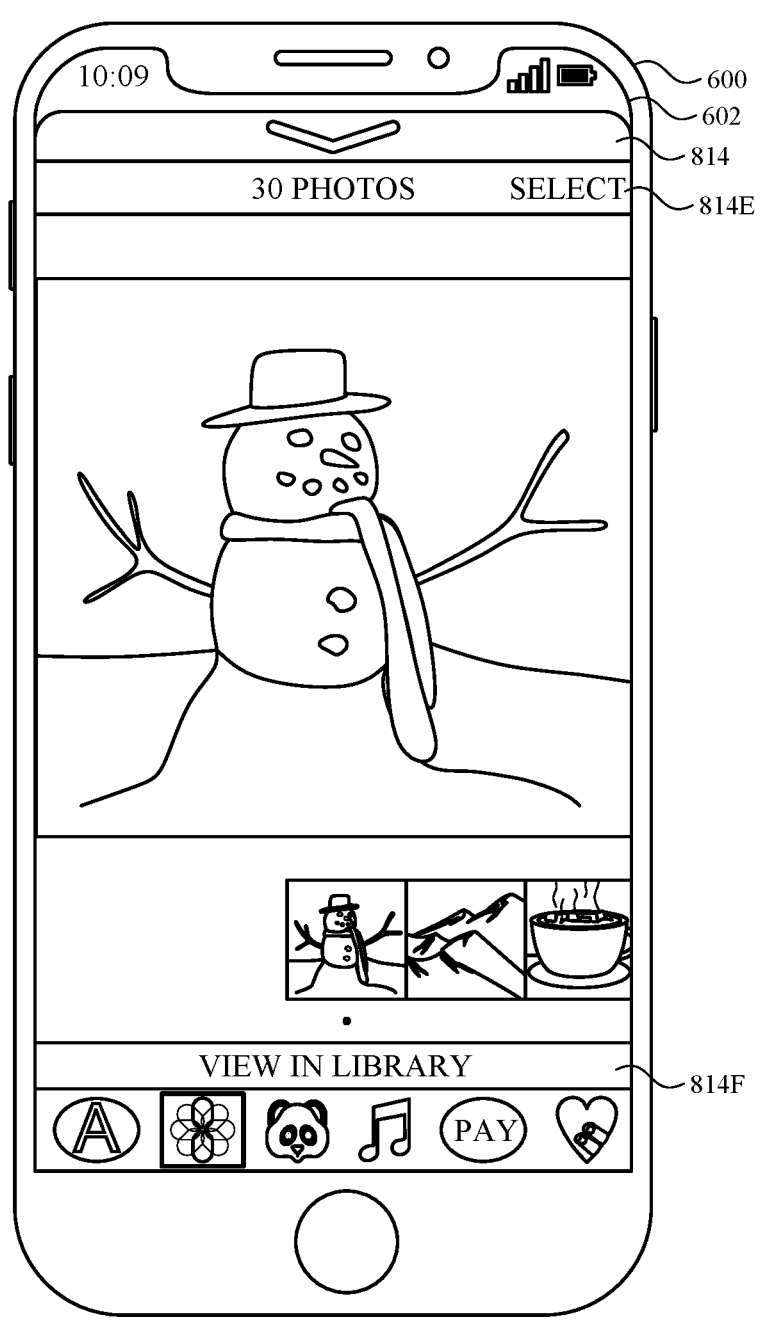

FIG. 8M illustrates shared collection interface 814 after successfully adding media items to a library. In some embodiments, subsequent to adding media to the library, an affordance for adding media to a library ceases to be displayed. For example, 814C is no longer displayed at interface 814. In some embodiments, subsequent to adding media to the library, an affordance for viewing media in a media library is displayed. For example, affordance 814F is now displayed, and reads "View in Library". Affordance 814F includes one or more of the features described with respect to affordance 814L, described in more detail below with respect to FIGS. 8AJ-8AL.

Figure 8N:
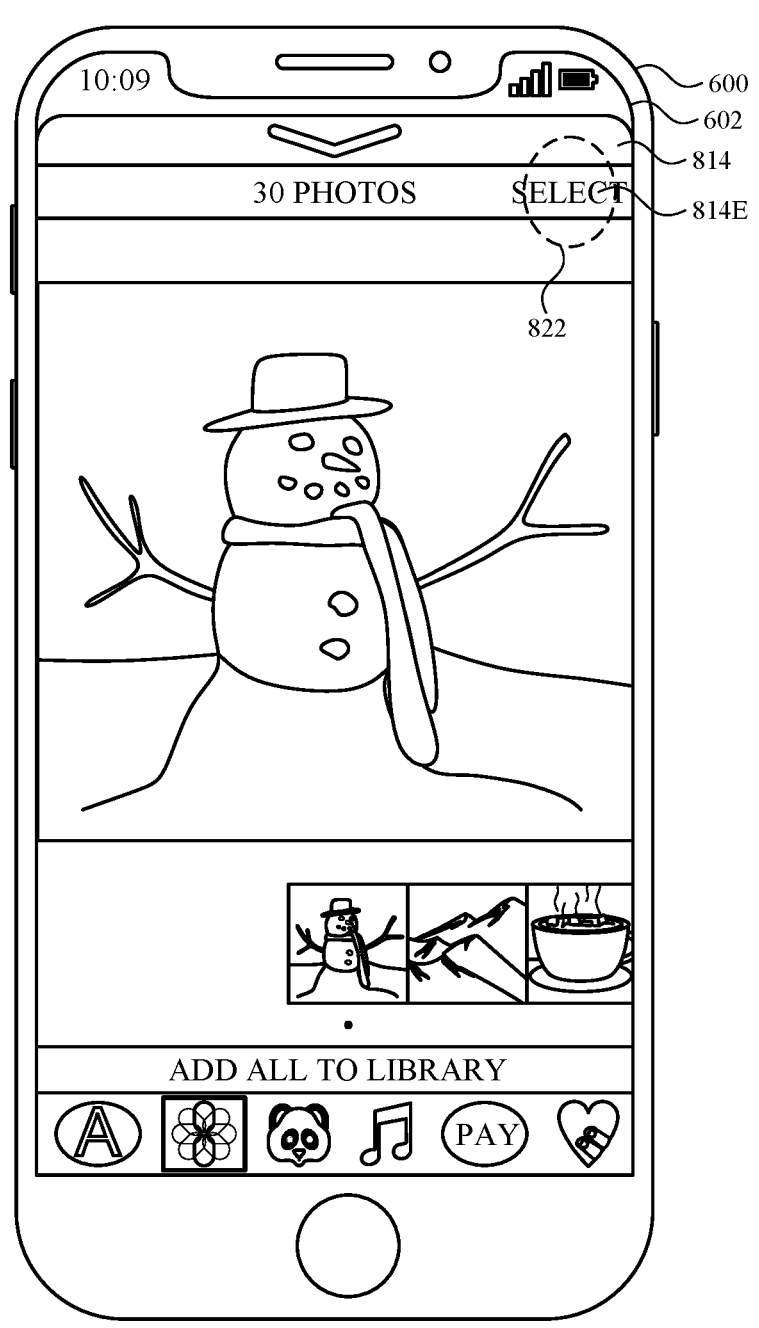

The device optionally provides the user with the option to add fewer than all of the media items in a received shared collection to a media library. FIGS. 8N-8AI illustrate various interfaces for selecting and saving fewer than all media items in a received shared collection.

FIG. 8N illustrates shared collection interface 814 (e.g., the same shown in FIG. 8J). In FIG. 8N, shared collection interface 814 includes select affordance 814E. In some embodiments, in response to receiving user input (e.g., 822) representing a request to enter into a selection mode, the device (e.g., 600) enters into a selection mode. In this example, select affordance 814E can be used to enter into a selection mode, in which the device allows the user to customize the selection of media items to be saved to their media library (e.g., to select fewer than all media items).

At FIG. 8N, device 600 receives user input 822 corresponding to selection of select affordance 814E. In response to receiving user input 822, device 600 enters into a selection mode.

Figure 8O:
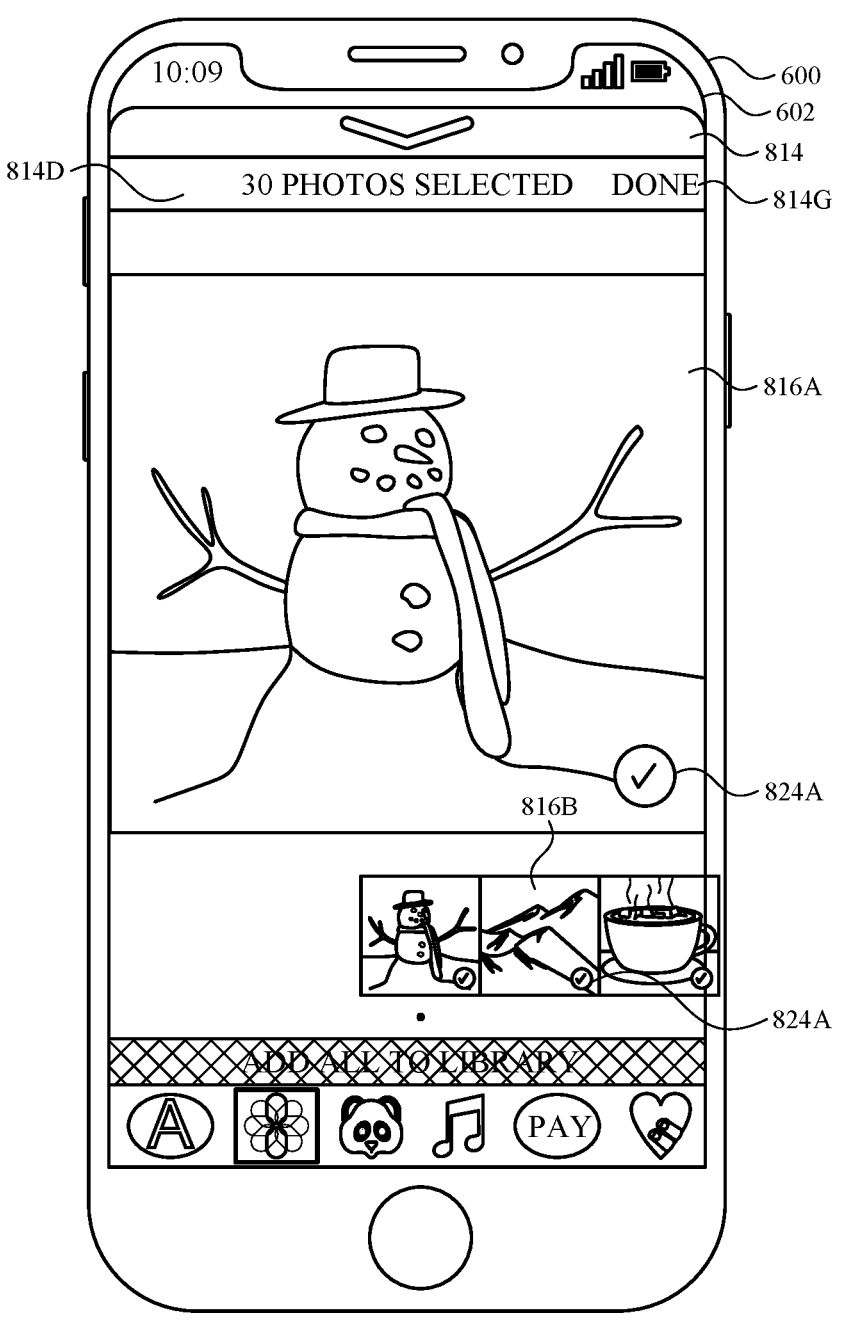
Figure 8P:
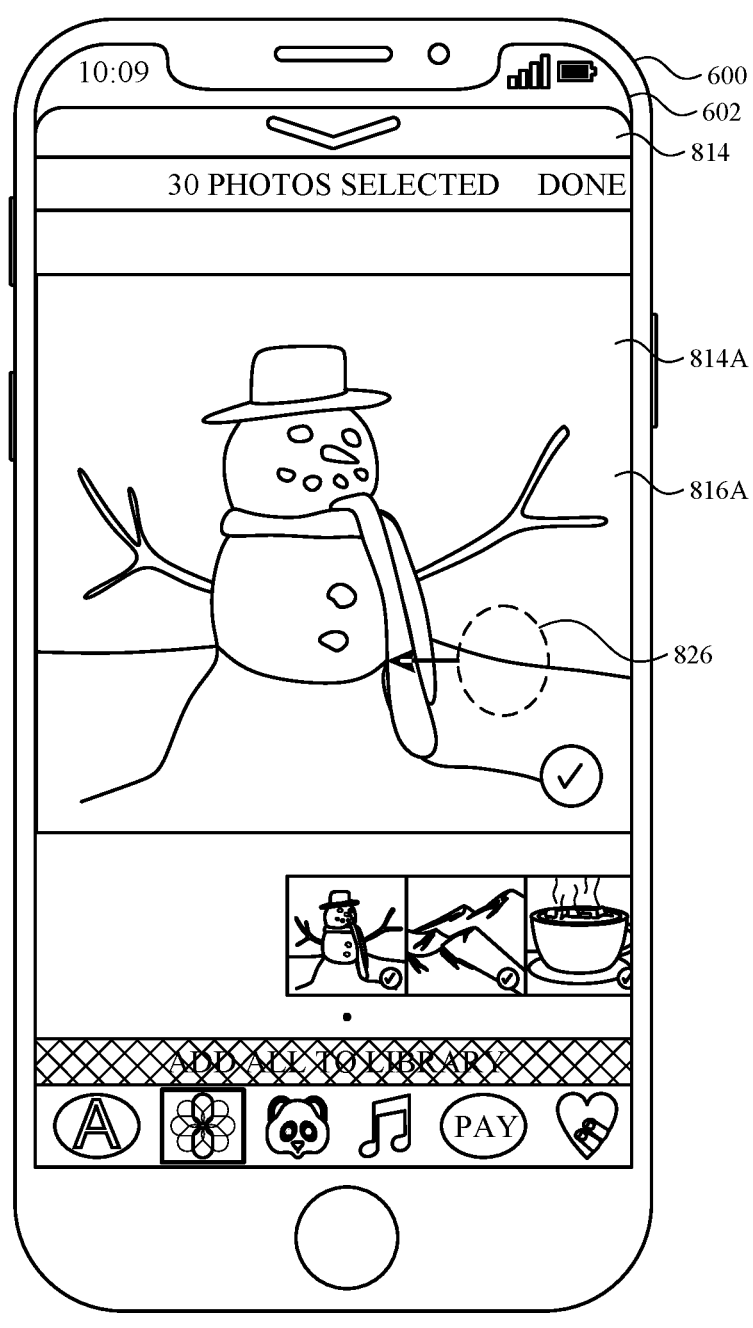

FIG. 8O illustrates an exemplary sharing user interface 814 while in an exemplary selection mode. For example, device 600 displays sharing user interface 814, as shown in FIG. in response to receiving user input 822. In some embodiments, entering a sharing mode comprises displaying (e.g., on display 602 of device 600) one or more selection indicators associated with one or more media items of a collection of media items. For example, in FIG. sharing user interface 814 includes a selection indicator 824A associated with media item 816A, and a selection indicator 824A associated with media item 816B (e.g., in the scrubbing region).

In some embodiments, while in a selection mode, the device (e.g., 600) disables one or more affordance for saving media items. For example, in FIG. 8O, device 600 changes the appearance of affordance 814C (e.g., it appears grayed out) and make it non-selectable. For instance, because the device entered selection mode (e.g., for customizing selection), deactivating affordance 814C for adding all media items to library prevents unintentional selection (e.g., accidental saving of all media instead of the custom selection) by the user. In some embodiments, in response to entering into a selection mode, the device (e.g., 600) displays an affordance for saving a selection of media items. For example, in FIG. 8O, device 600 displays done affordance 814G (e.g., replacing affordance 814E) that, when selected, causes the currently selected media items to be added to the media library associated with the device.

In some embodiments, while in a selection mode, the device (e.g., 600) displays an indication of an amount of media items that are currently selected. For example, in FIG. 8O, shared collection interface 814 includes indicator 814D, which has been updated to indicate that the amount (e.g., number) of media items in the shared collection that are currently selected (e.g., "30 photos selected").

In some embodiments, in response to entering a selection mode, an initial set of media items are currently selected. In some embodiments, the initial set of media items includes all media items in the collection of media items. For example, in FIG. 8O, all 30 media items of the collection are selected by default (e.g., upon entering the selection mode initially (for the first time)). In some embodiments, the initial set of media items includes fewer than all media items in the collection. For example, upon entering selection mode (as shown in FIG. 8O), one or more media items are not selected (e.g., a selection indicator is not displayed associated with them) by default. For example, fewer than all media items are selected, similar to as shown in FIG. 8S. In some embodiments, one or more media items (e.g., fewer than all) are selected based on selection criteria. For example, selection criteria are discussed above, and for brevity is not repeated here. In some embodiments, the initial set of media items is an empty set (e.g., includes no media items). For example, upon entering selection mode, no media items are selected by default, but the user can add to the empty set by selecting one or more media items.

As described above with respect to one-up view 636 (e.g., FIGS. 6Y-6AD), device 600 can navigate between media items displayed in a one-up view (e.g., in region 814A), and select and/or deselect media items while in a selection mode. In some embodiments, the device (e.g., device 600) replaces display of a first media item in a one up-view (e.g., 816A) with display of a second media item in a one-up view (e.g., 816B) in response to user input (e.g., 826) received while displaying the first media item in a one-up view. For example, at FIG. 8P, device 600 receives user input 826 representing a left swipe gesture in the one-up view region 814A while media item 816A is displayed in region 814A.

Figure 8Q:
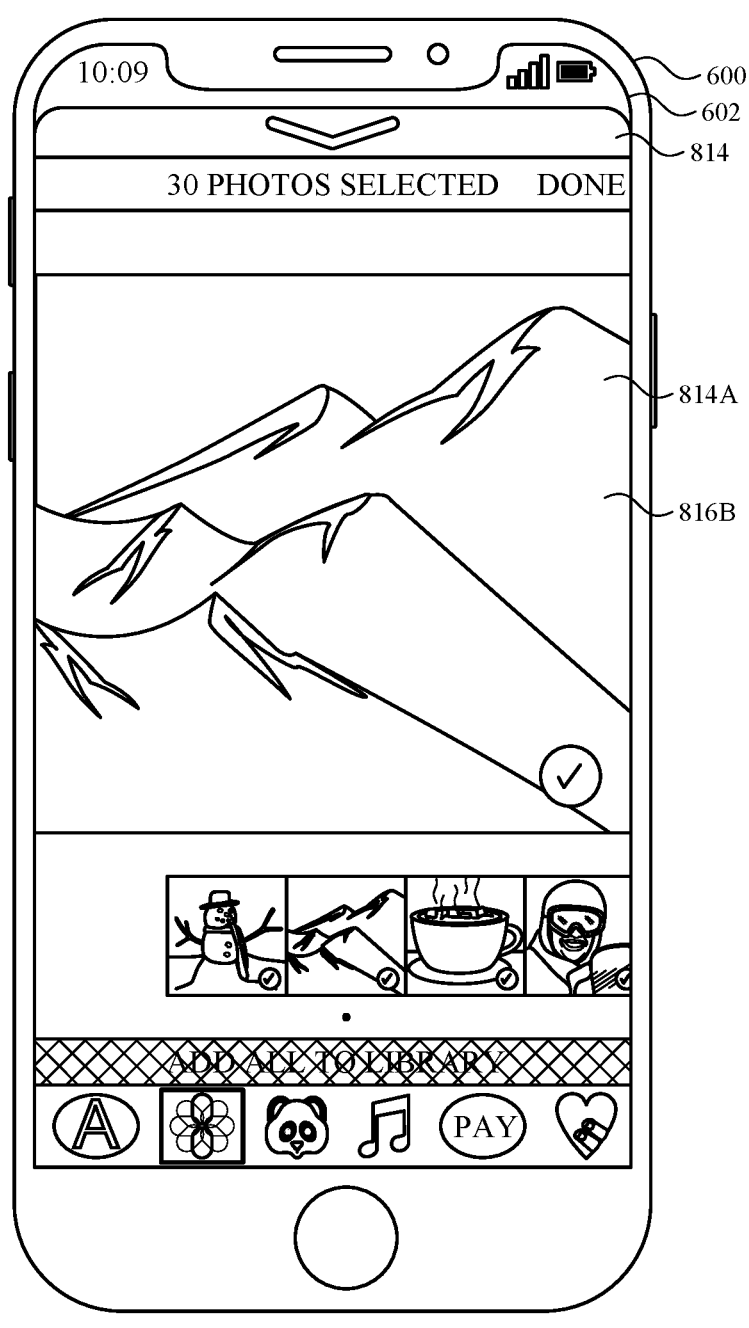

FIG. 8Q shows an exemplary second media item from a collection displayed in a one-up view. For example, in response to receiving user input 826 representing a left swipe gesture in the one-up view region 814A while media item 816A is displayed in region 814A, device 600 replaces display of media item 816A in region 814A with media item 816B. Thus, the user can navigate between media items displayed in a one-up view to inspect particular media items in detail in order to determine whether to include such media items in a selection.

In some embodiments, navigating between media items in a one-up view can be performed while not in a selection mode. For example, if user input 826 is received while not in a selection mode (e.g., at interface 814 as shown in FIG. 8J or 8M), device 600 replaces display of media item 816A with media item 816B in region 814A.

FIGS. 8R-8U illustrate the selection and saving of a customized selection of an exemplary set of media items from a received shared collection of media items. In some embodiments, the device (e.g., 600) receives user input (e.g., at a location associated with a media item) representing a request to toggle selection of a media item (e.g., while in a selection mode). In some embodiments, the user input representing a request to toggle selection of a media corresponds to selection of a selection indicator. For example, at FIG. 8R, device 600 receives user input 828 corresponding to selection of selection indicator 824A associated with media item 816B.

FIG. 8S illustrates an exemplary media item in a one-up view that is not currently selected. For example, device 600 displays sharing interface 814 as shown in FIG. 8S in response to receiving user input 828. Because user input 828 was received while media item 816B was selected, user input 828 causes it to become unselected and thus selection identifier 824A ceases to be displayed, as shown in FIG. 8S. In some embodiments, the device (e.g., 600) displays an unselected indicator (e.g., 824B) associated with a media item that is currently unselected (e.g., while the device is in a selection mode). For example, in FIG. 8S, unselected indicator 824B is displayed. Displaying an unselected indicator (e.g., an unfilled region for a selection indicator) associated with a media item can, for example, affirmatively indicate to a user that the device is in the selection mode, and/or that the corresponding media item is unselected.

In some embodiments, a user input representing a request to toggle selection of a media item corresponds to input at a location of a media item. For example, a user touch anywhere on media item 816B (e.g., not just on a selection indicator or unselected indicator) causes device 600 to select it or unselect it, depending on the current selection state.

Figure 8R:
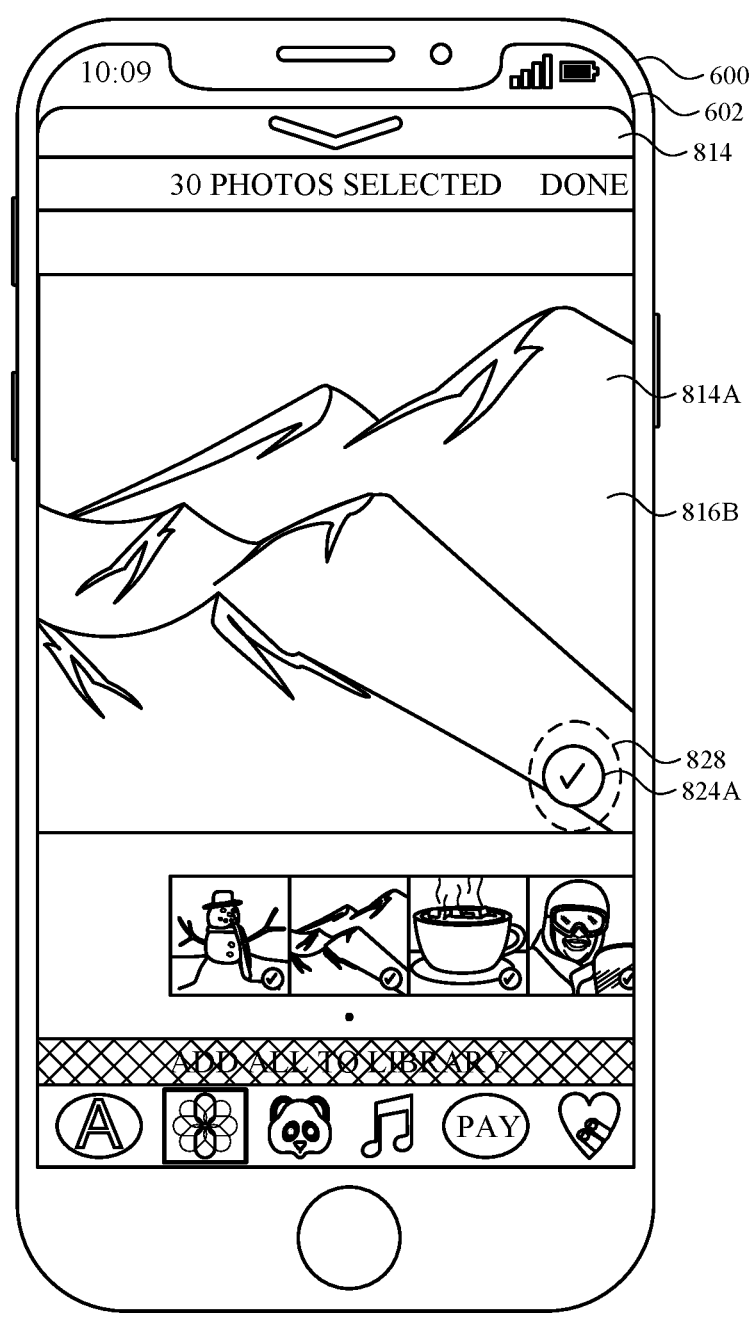
Figure 8S:
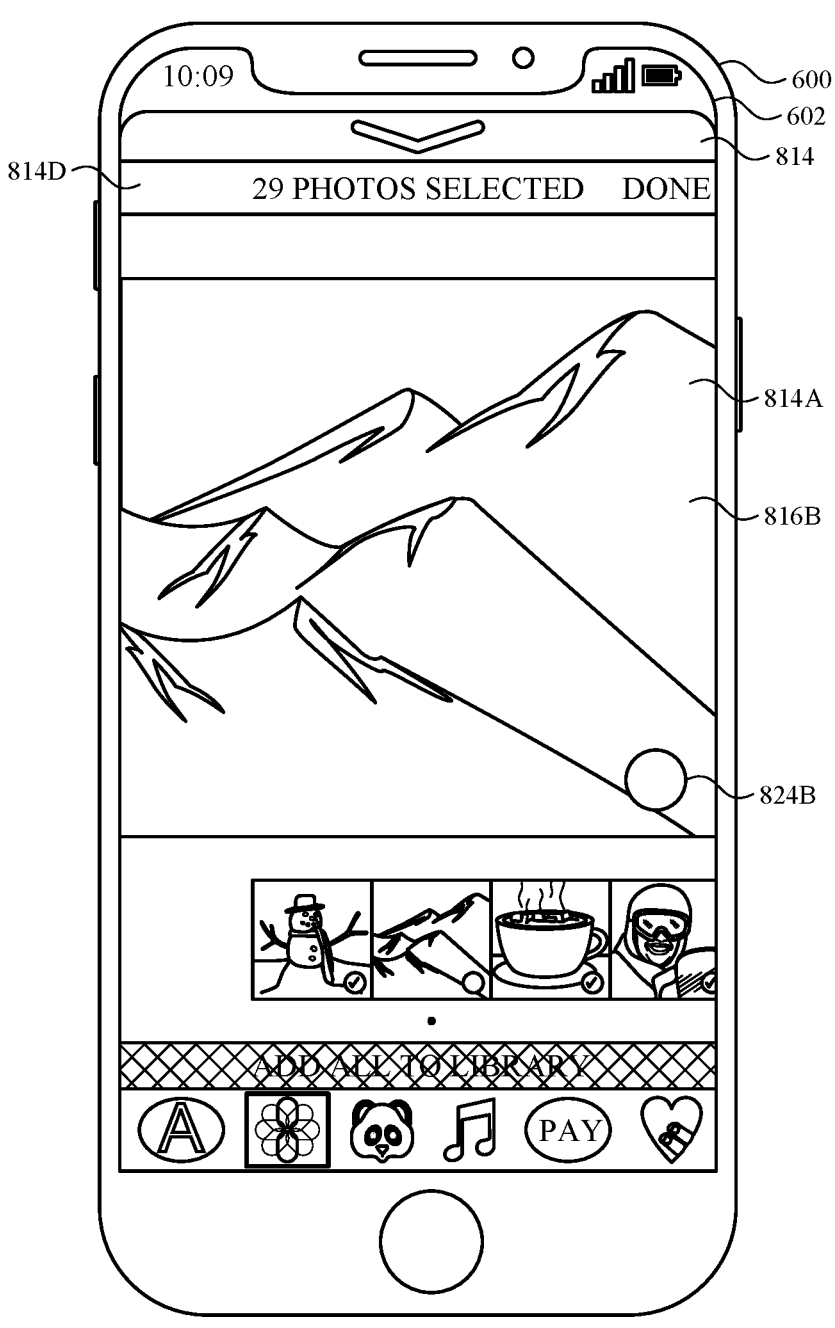

In some embodiments, the user input representing a request to toggle selection of a media is selection of an unselected indicator (e.g., 824C). For example, at FIG. 8S, interface 814 includes unselected indicator 824B (e.g., an empty circle). In some embodiments, the selection is received while the unselected indicator is displayed. For instance, if user input 828 of FIG. 8R is received instead while media item 816B is not currently selected (e.g., as shown in FIG. 8S, described below), device 600 causes media item 816B to be selected and displays selection indicator 824A (e.g., as shown in FIG. 8R).

In some embodiments, subsequent to (e.g., in response to) a change in the currently selected media items, the device (e.g., 600) updates a displayed indication of an amount of media items that are currently selected. For example, in FIG. 8S, shared collection interface 814 includes indicator 814D, which has been updated to indicate that the amount (e.g., number) of media items in the shared collection that are currently selected (e.g., "29 photos selected").

Figure 8T:
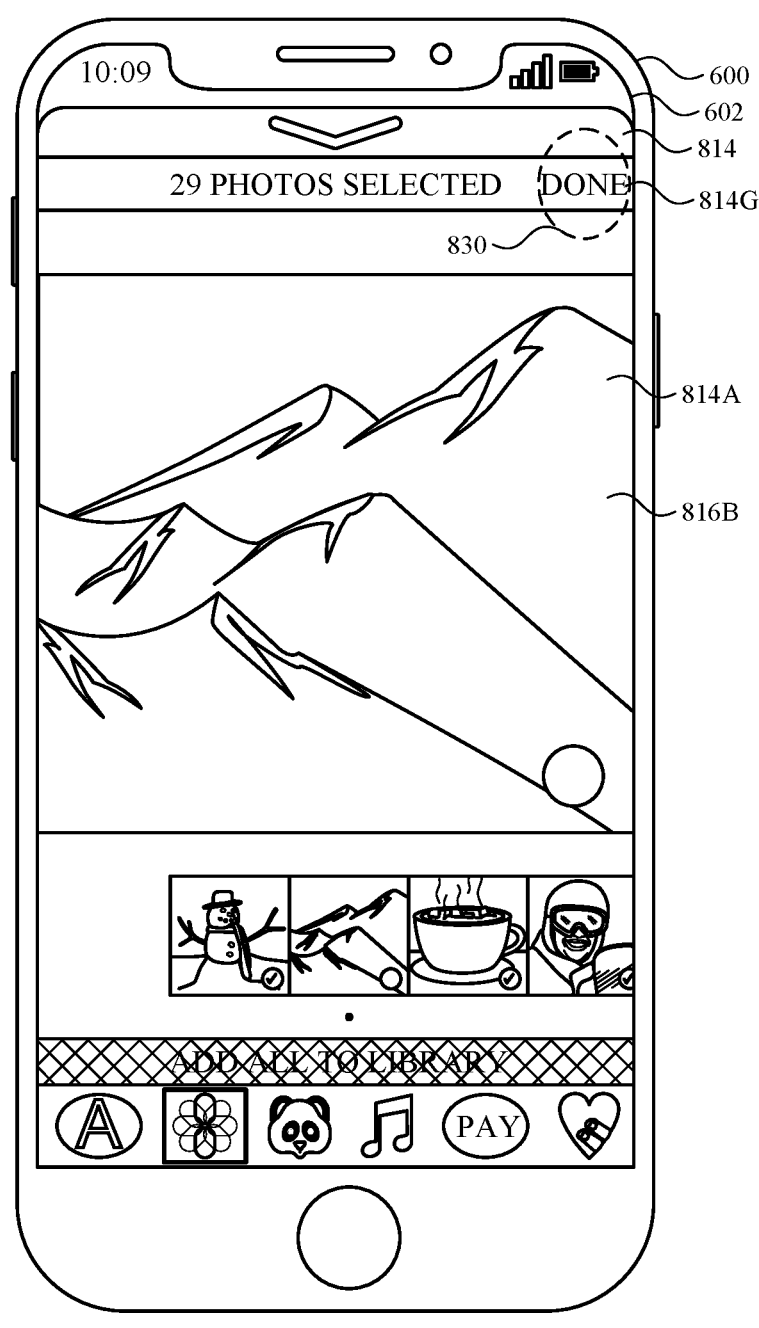

After customizing the selection of media items, the device optionally provides the user with the option to add the selected items to a media library (e.g., as discussed previously). At FIG. 8T, after receiving user input 828 to unselect media item 816B, device 600 receives user input 830 on done affordance 814G. In some embodiments, in response to user input (e.g., 830), the device (e.g., 600) causes one or more media items in a user-selected set of media items to be added to a media library. For example, in response to receiving user input 830, device 600 causes the 29 selected media items indicated in FIG. 8T, representing a user-selected set of media items from the received shared collection, to be added to a media library (e.g., associated with the device or, the associated with a user (e.g., account) associated with the device). In this example, all media items except media item 816B are added to a media library in response to user input 830.

Figure 8U:
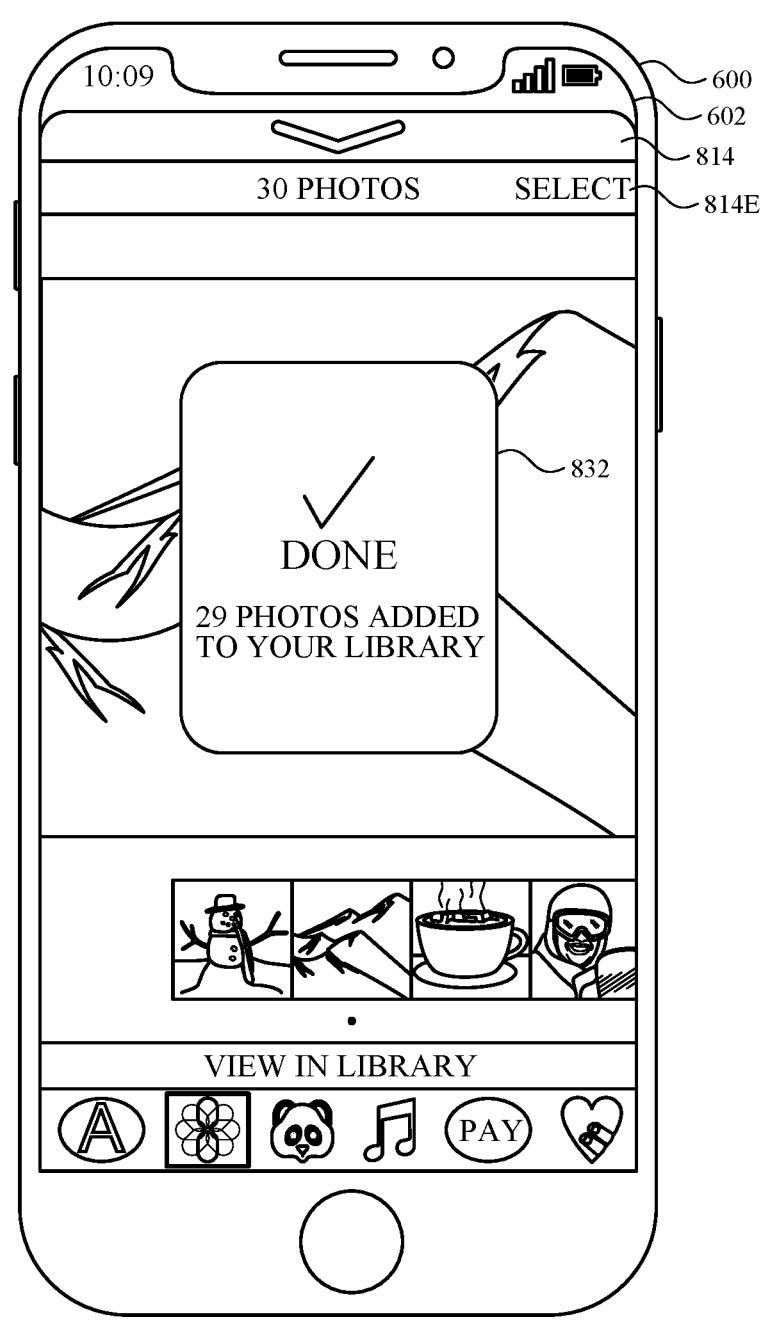
Figure 8V:
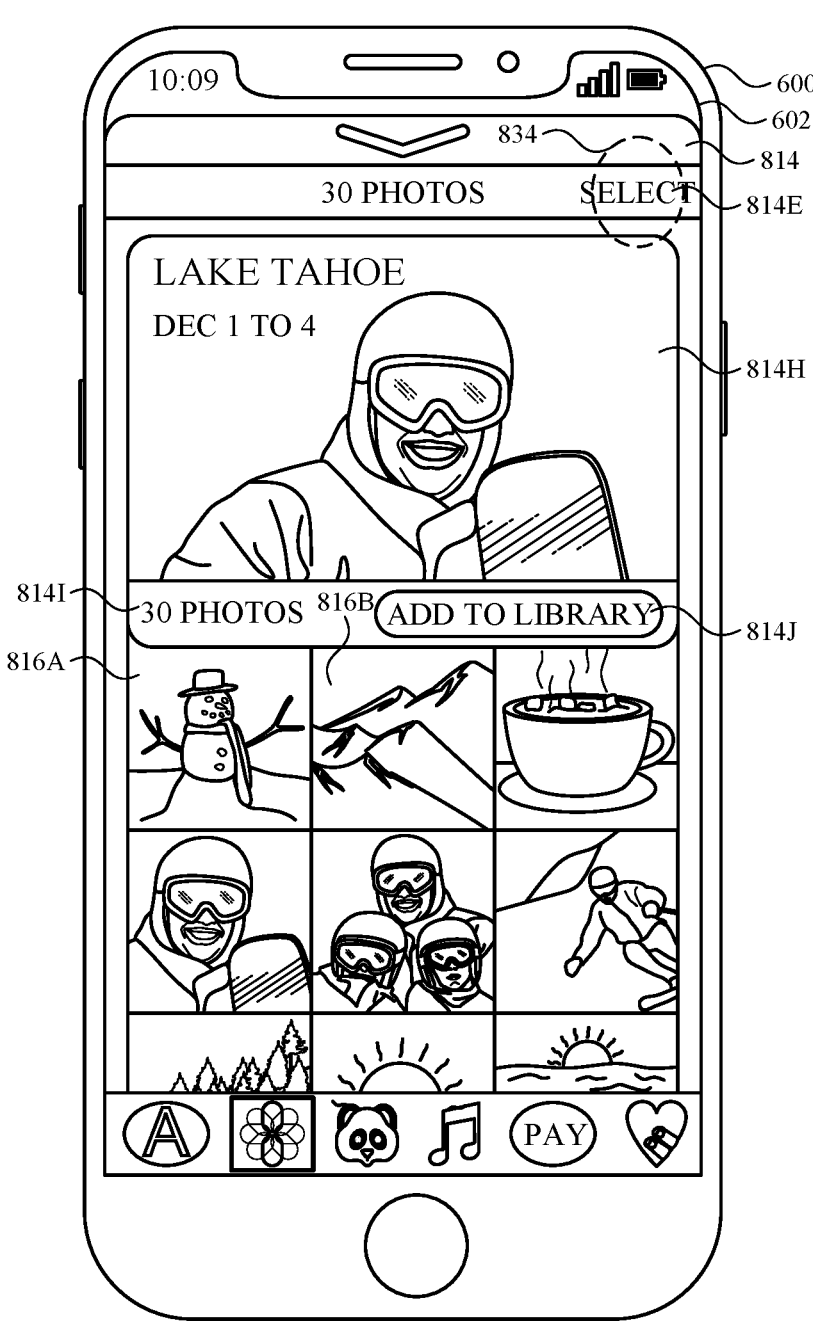

FIG. 8U illustrates an exemplary save confirmation indicator 832. In some embodiments, the device (e.g., 600) displays a save confirmation indicator (e.g., 832) in response to user input (e.g., 830) representing a request to add one or more media items from a collection a media library. Save confirmation indicator 832 indicates that the operation of adding the one or more media items was successful. In some embodiments, a save confirmation indicator (e.g., 832) includes an indication of an amount of media items that were added to the media library. For example, save confirmation indicator 832 indicates that 29 media items (e.g., photos) were saved to the user's (e.g., of device 600) media library, stating: "29 photos added to your library". In some embodiments, the device (e.g., 600) displays an indication if one or more media items were not successfully added to the media library.

FIG. 8U also illustrates an exemplary shared collection interface (e.g., 814) after saving one or more media items. For example, shared collection interface 814 as shown in FIG. 8U is displayed in response to user input 830. In some embodiments, subsequent to adding one or more media items to a library, the device (e.g., 600) exits a selection mode. For example, as shown in FIG. 8U, shared collection interface 814 is no longer in selection mode. For instance, select affordance 814E is displayed again, and no selection indicators (e.g., 824A) or unselected indicators (e.g., 824B) are displayed anymore (e.g., as they are in FIG. 8T).

FIGS. 8V-8AI illustrate various interfaces for viewing a collection of media items in a grid view, for moving between a grid view and a one-up view, or for selecting media items while in either view.

FIG. 8V illustrates shared collection interface 814 arranged in a grid view (e.g., as described above with respect to FIG. 6X above). In some embodiments, the device (e.g., 600) displays a shared collection interface (e.g., 814) in a grid view (e.g., FIG. 8V) in response to user input. For example, shared collection interface 814 can be displayed in response to user input selection of a notification that download has completed (e.g., 810) or user input selection of a representation of the collection in a message transcript (e.g., 812). Restated, device 600 can initially display the shared collection in either a grid view or in a one-up view. In some embodiments, whether a collection is displayed in a grid or one-up view in response to user input corresponding to selection of a representation of the collection is user-configurable.

In some embodiments, a shared collection interface (e.g., 814) in grid view includes one or more features of suggested collection interface 612 as described with respect to FIG. 6N above. For example, a shared collection interface (e.g., 814) includes an indication of the amount of media items. For example, still referring to FIG. 8V, indicator 8141 of interface 814 indicates that the suggested collection includes 30 photos. In some embodiments, a shared collection interface (e.g., 814) includes a save affordance for causing one or more media items from the corresponding collection of media items to be saved (e.g., added to a media library). For example, save affordance 814J of interface 814 can be selected in order to add one or more media items to a media library, as discussed above. In some embodiments, a shared collection interface (e.g., 814) includes representations of one or more media items in the corresponding collection of media items. For example, shared collection interface 814 includes representations of media items 816A and 816B, each representing a media item in the received shared collection represented by shared collection interface 814 (Lake Tahoe collection from William, FIG. 8A). In some embodiments, a displayed collection of media items (e.g., as shown in interface 814) is scrollable (e.g., to reveal additional content or elements as described herein with respect to interface 814). For example, user input representing a request to scroll (e.g., upward or downward swipe on 814) causes additional media items in the collection to be displayed.

In some embodiments, the device (e.g., 600) transitions a displayed shared collection interface (e.g., 814) from a grid view to a one-up view. In some embodiments, the device (e.g., 600) transitions a displayed shared collection interface (e.g., 814) from a one-up view to a grid view. In some embodiments, the transition is performed in response to user input. For example, device 600 can receive user input (e.g., a tap, a gesture, a key press) at FIG. 8J or 8U while in one up view, and transition to the grid view shown in FIG. 8V. For example, the user input that causes transition to the grid view can be a "pinch" gesture (e.g., movement of two contacts toward each other by more than a threshold distance) (e.g., in region 814A of the one-up view). In some embodiments, the device (e.g., 600) transitions a displayed shared collection interface (e.g., 814) from a grid view to a one-up view. For example, device 600 can receive user input (e.g., a tap, a gesture, a key press) while in a grid view, and transition to the one-up view, as shown in FIGS. 8Z-8AA and 8AD-8AE. In some embodiments, the user input that causes transition to the one-up view can be a de-pinch gesture (e.g., as shown in FIGS. 8Z-8AA and 8AD-8AE). In some embodiments, the user input that causes transition to the one-up view can be a long press gesture (e.g., a contact exceeding a predetermined length of time). In some embodiments, the user input that causes transition to the one-up view can be a hard press gesture (e.g., a contact with a characteristic intensity that exceeds a threshold intensity such as a threshold intensity that is greater than a nominal contact detection intensity threshold at which a tap input can be detected). In some embodiments, the user input that causes transition to the one-up view can be is a tap gesture (e.g., a contact not exceeding a predetermined length of time) (e.g., if not in a selection mode).

While displaying media items in a grid view, the device optionally provides the user with the option to select and add one or more of the media items in the received collection into a media library. In some embodiments, while in a grid view, the device (e.g., 600) receives user input (e.g., 834) representing a request to enter into a selection mode and, in response, enters into a selection mode. For example, at FIG. 8V, device 600 receives user input 834 corresponding to selection of select affordance 814E. In response, device 600 displays shared collection interface 814 in a selection mode, as shown in FIG. 8W.

Figure 8W:
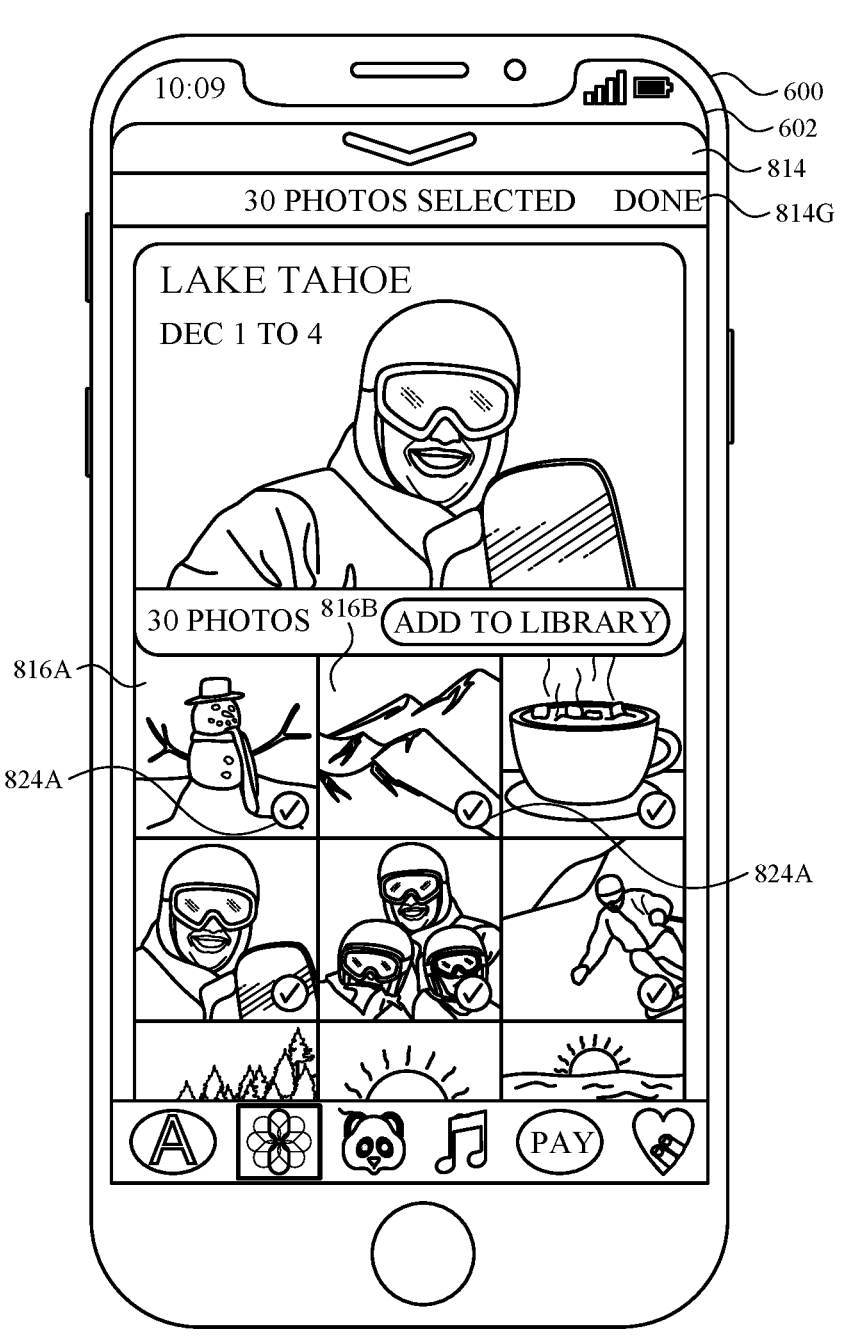

FIG. 8W illustrates exemplary shared collection interface 814 in a grid view while in a selection mode. For example, device 600 displays sharing user interface 814, as shown in FIG. 8W, in response to receiving user input 834. In some embodiments, entering a sharing mode comprises displaying (e.g., on display 602 of device 600) one or more selection indicators associated with one or more media items of a collection of media items. In some embodiments, a shared collection interface (e.g., 814) while in a selection mode includes one or more selection indicators that indicate whether one or more media items are currently selected. In some embodiments, a selection indicator is visually associated with a media item that is currently selected, and is optionally not displayed when the same media item is not selected. In some embodiments, a shared collection interface (e.g., 814) while in a selection mode includes one or more unselected indicators that indicate whether one or more media items are not currently selected. In some embodiments, an unselected indicator is visually associated with a media item that is not currently selected, and is optionally not displayed when the same media item is selected.

For example, in FIG. 8W, sharing user interface 814 includes a selection indicator 824A associated with media item 816A, and a selection indicator 824A associated with media item 816B. Thus, both media items 816A and 816B are currently selected.

In some embodiments, in response to entering into a selection mode, the device (e.g., 600) displays an affordance for saving a selection of media items. For example, in FIG. 8W, device 600 displays done affordance 814G (e.g., replacing affordance 814E) that, when selected, causes the currently selected media items to be added to the media library associated with the device.

In some embodiments, while in a selection mode, the device (e.g., 600) displays an indication of an amount of media items that are currently selected. For example, in FIG. 8W, shared collection interface 814 includes indicator 814D, which has been updated to indicate that the amount (e.g., number) of media items in the shared collection that are currently selected (e.g., "30 photos selected").

In some embodiments, in response to entering a selection mode, an initial set of media items are currently selected. In some embodiments, the initial set of media items includes all media items in the collection of media items. For example, in FIG. 8W, all 30 media items of the collection are selected by default upon entering selection mode (e.g., upon entering the selection mode initially (for the first time)). In some embodiments, the initial set of media items includes fewer than all media items in the collection. For example, upon entering selection mode (as shown in FIG. 8W), one or more media items are not selected (e.g., do not include a selection indicator associated with them) by default. In some embodiments, the initial set of media items is an empty set (e.g., includes no media items). For example, upon entering selection mode, no media items are selected by default, but the user can add to the empty set by selecting one or more media items.

Figure 8X:

As described previously, while in a selection mode, the user can customize selection of media items. In some embodiments, while displaying a shared collection interface (e.g., 814) in a grid view, and while in a selection mode, the device (e.g., 600) receives user input representing a request to toggle selection of a media item. For example, at FIG. 8X, device 600 receives user input 836 while shared collection interface 814 is in a grid view, representing a request to toggle selection of media item 816B, which is currently selected. At FIG. 8Y, in response to receiving the user input 836, device 600 has toggled selection of media item 816B, which is now not currently selected (e.g., selection indicator 824A is no longer displayed associated with media item 814B, and unselected indicator 824B is now displayed associated with media item 814B).

Figure 8Y:
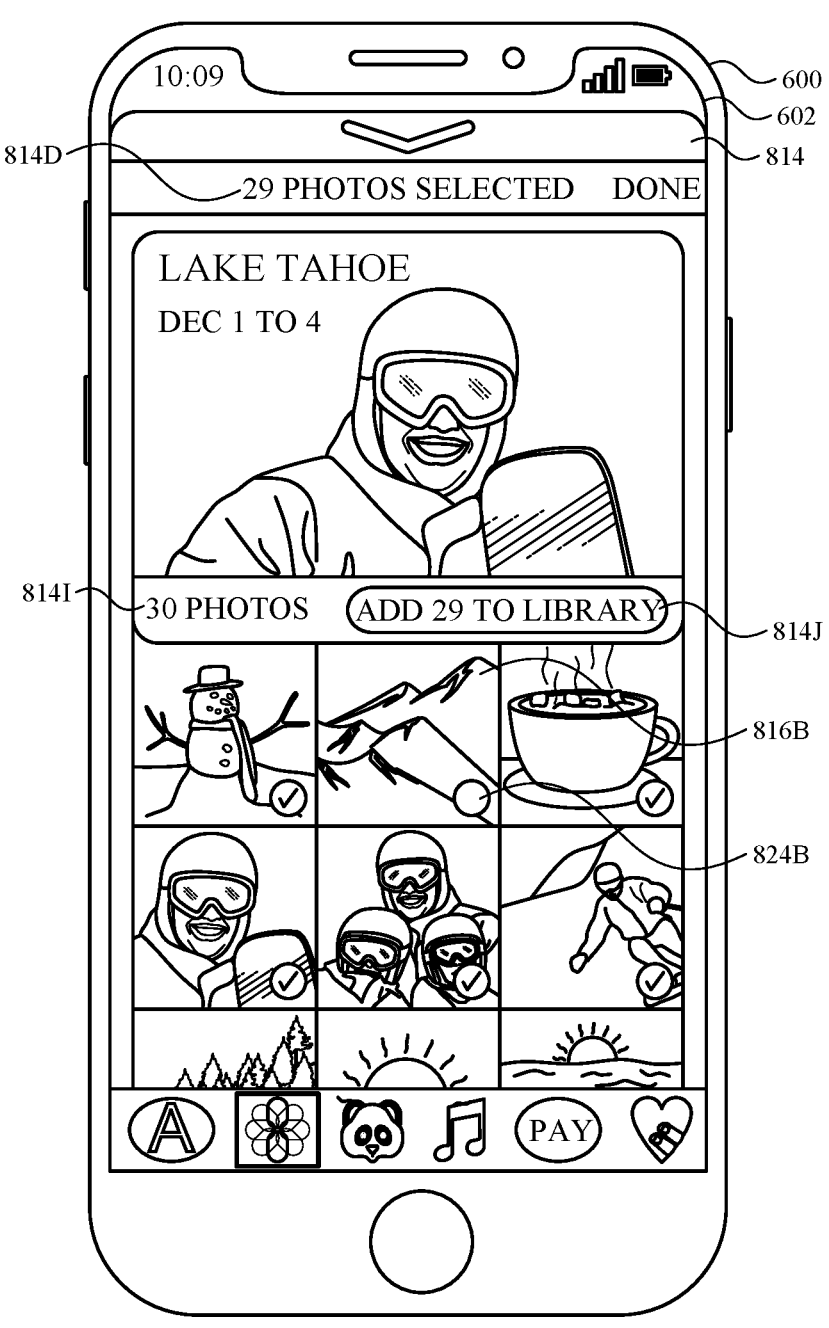
Figure 8Z:
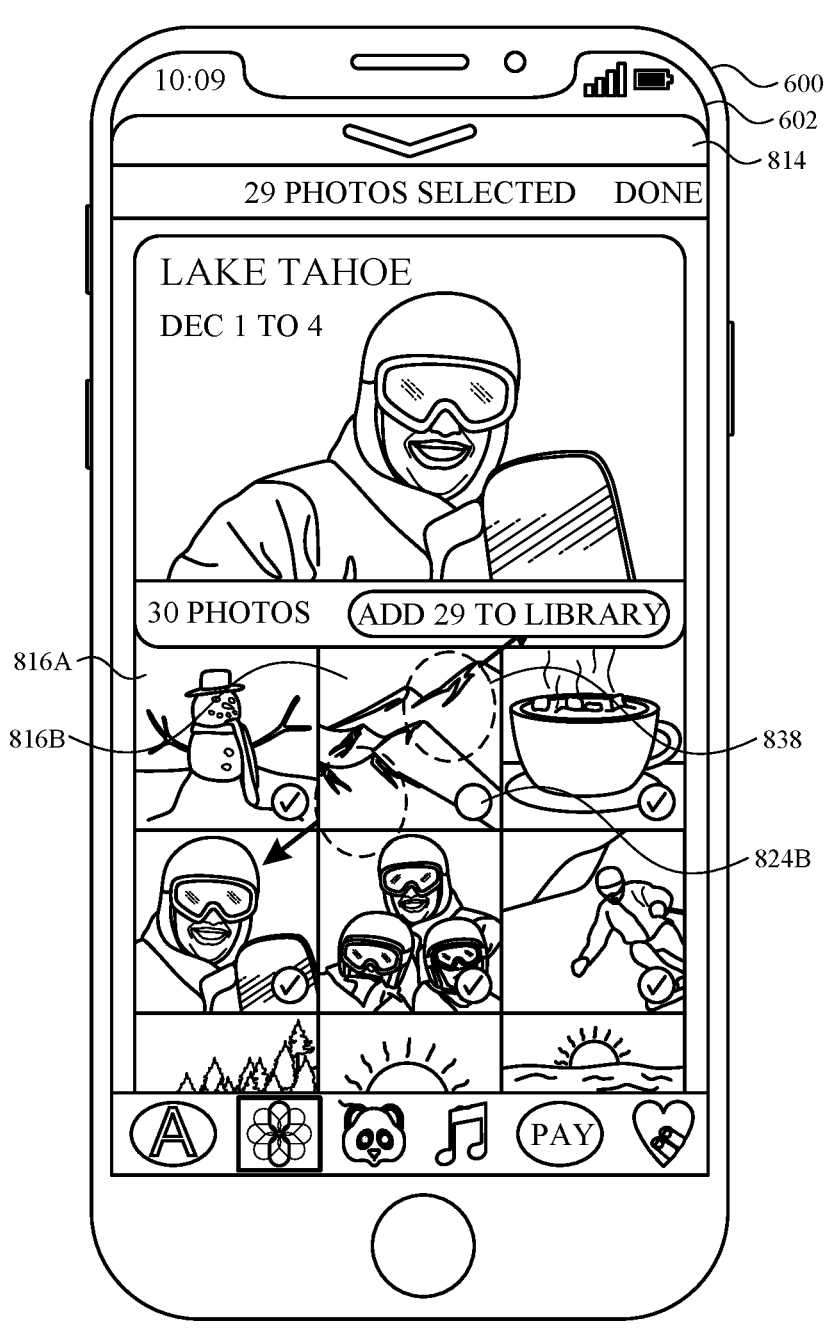
Figure 8A:
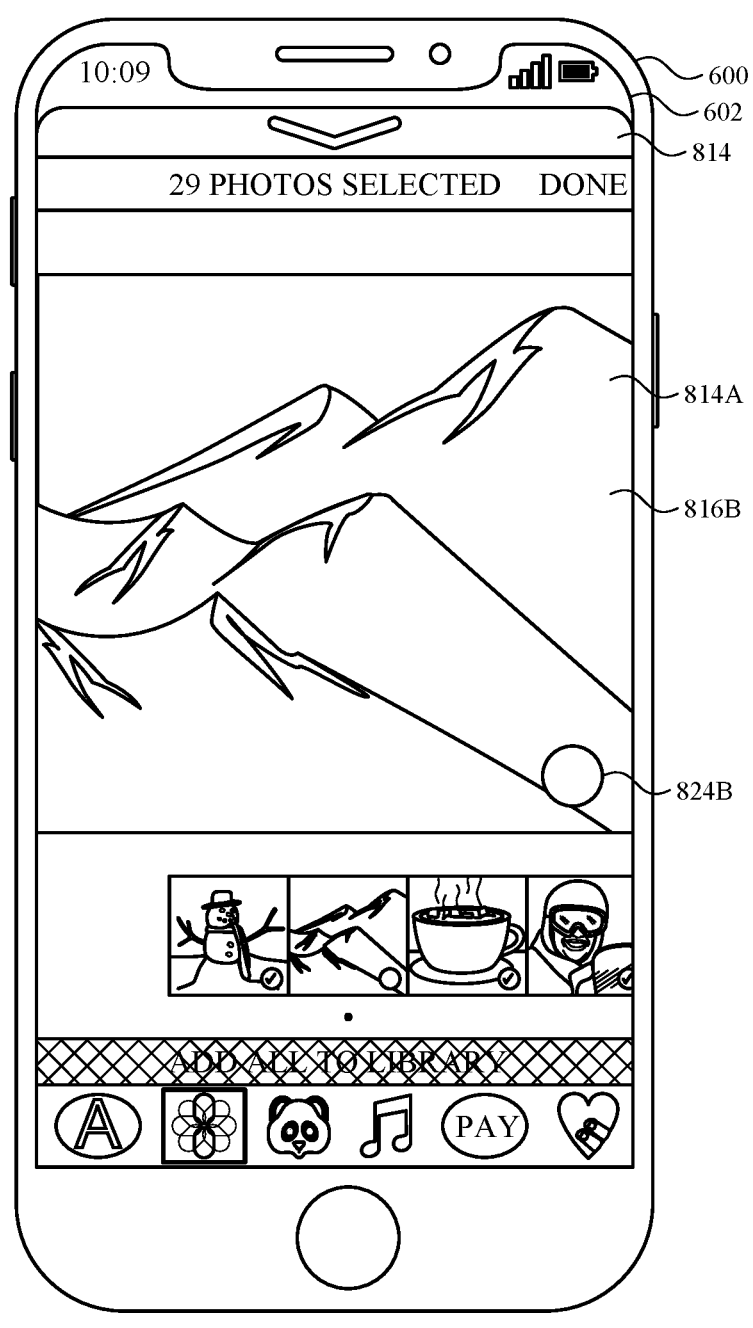
Figure 8A:
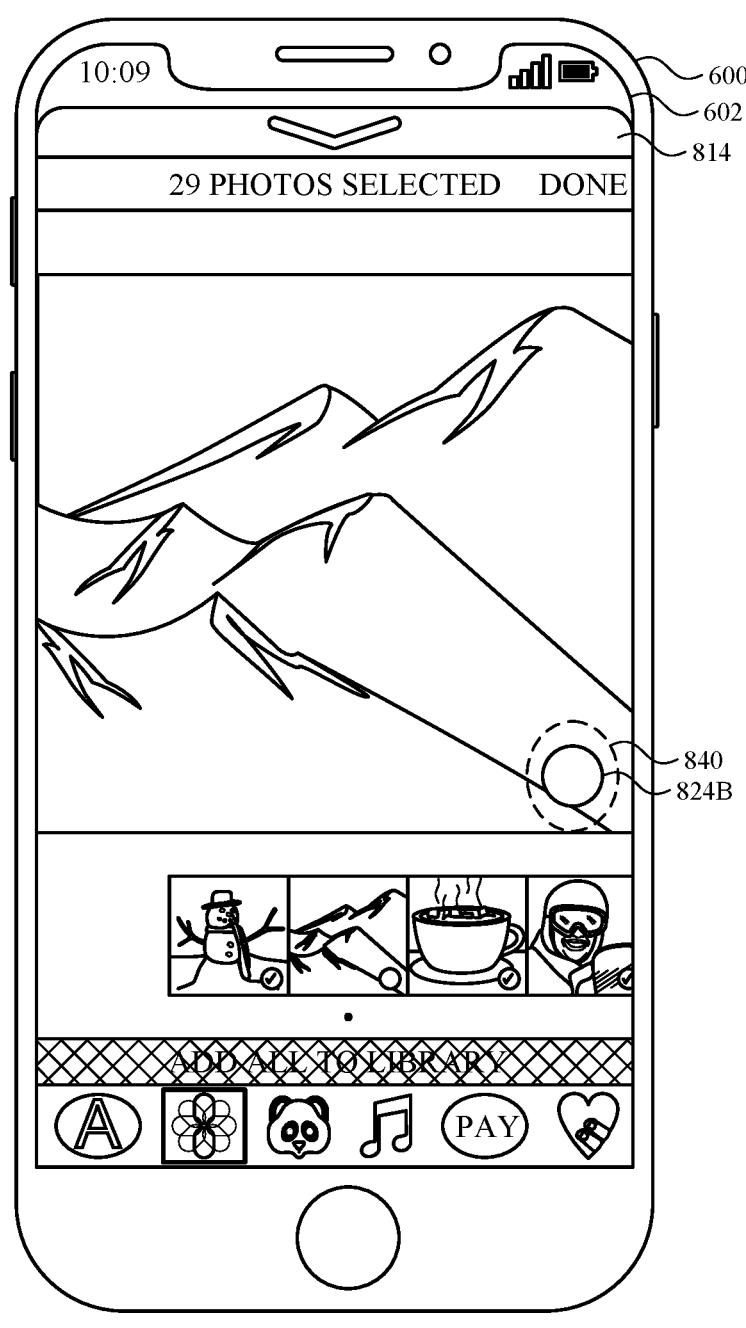
Figure 8A:
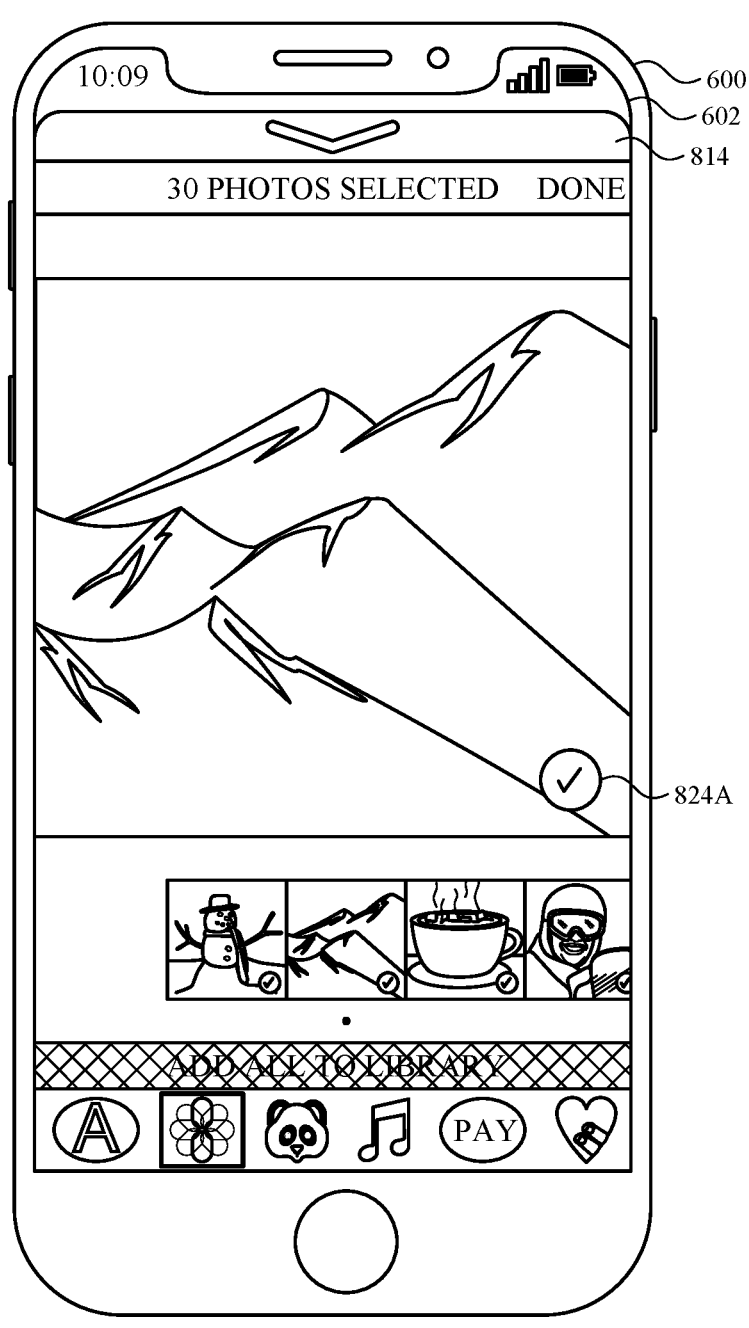
Figure 8A:
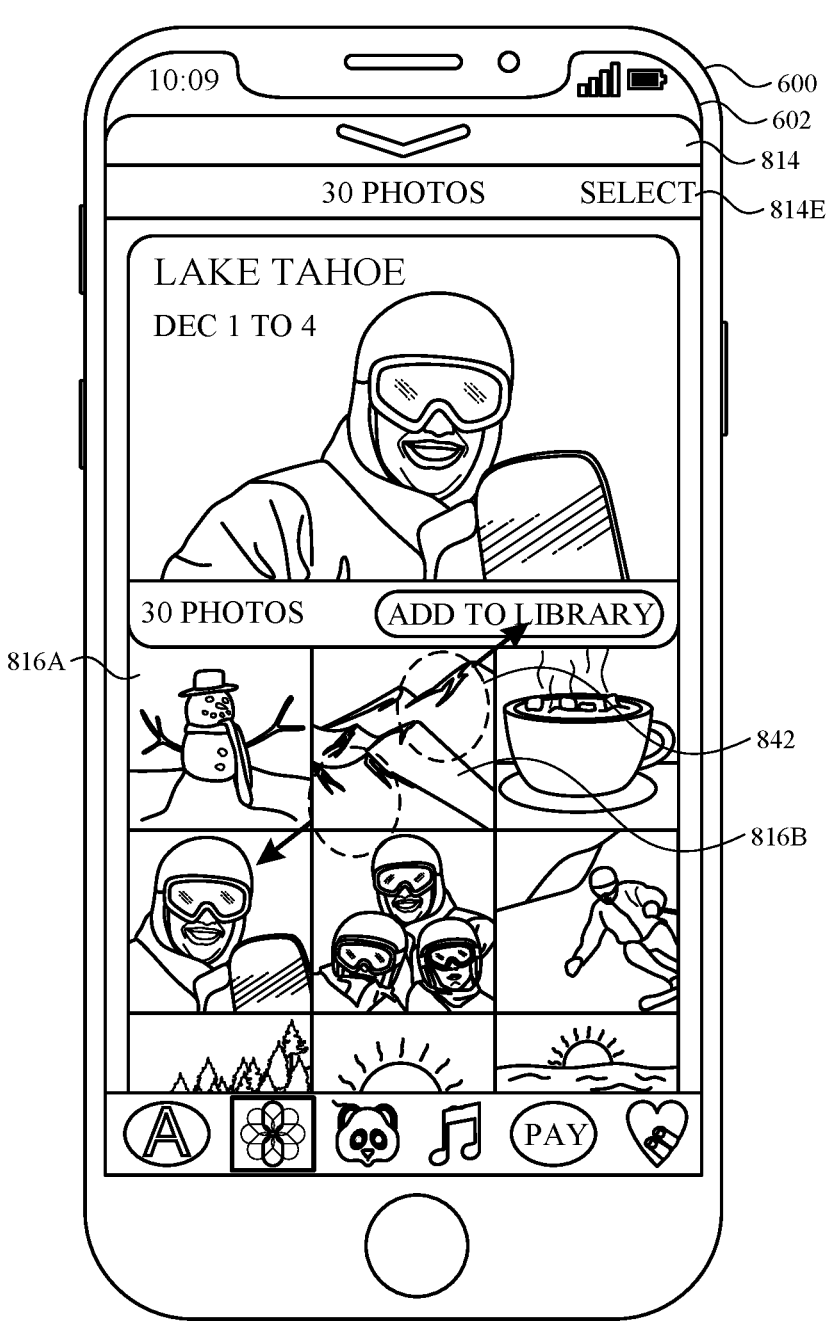
Figure 8A:
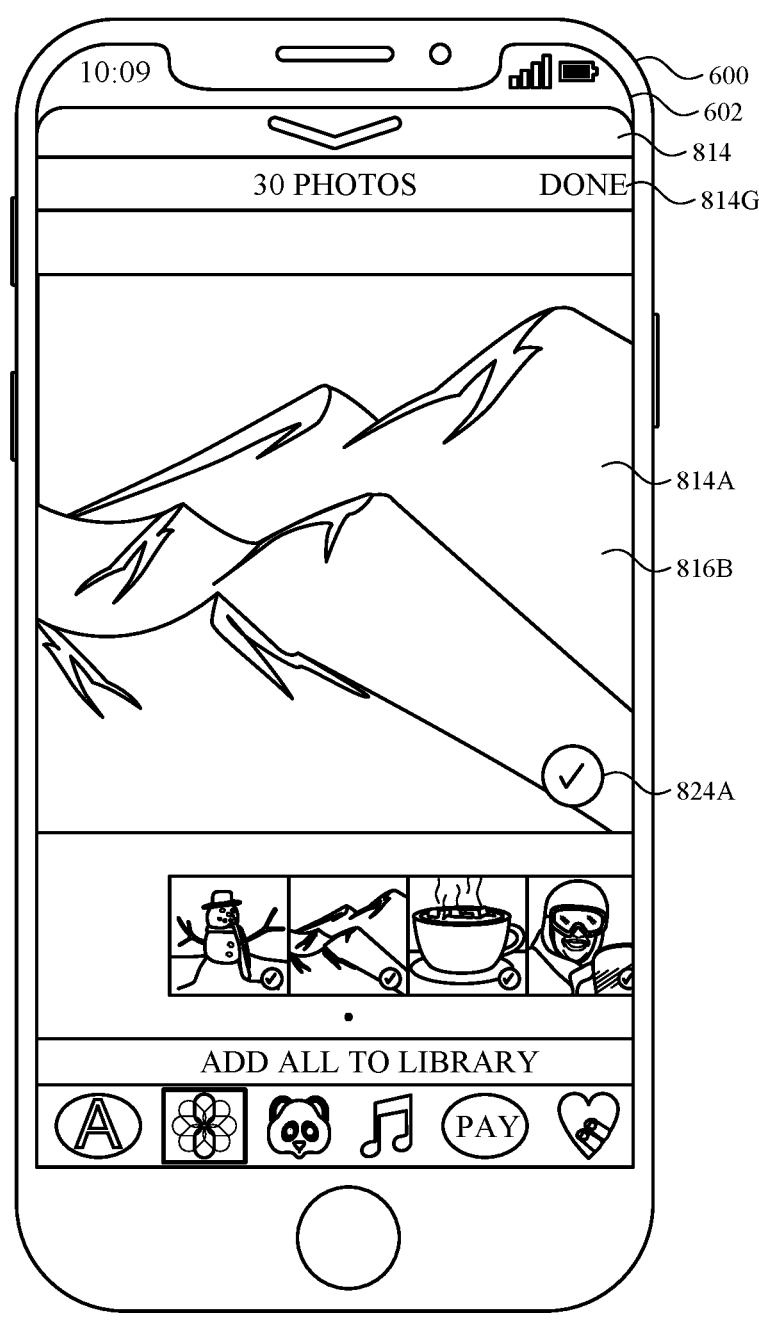
Figure 8A:
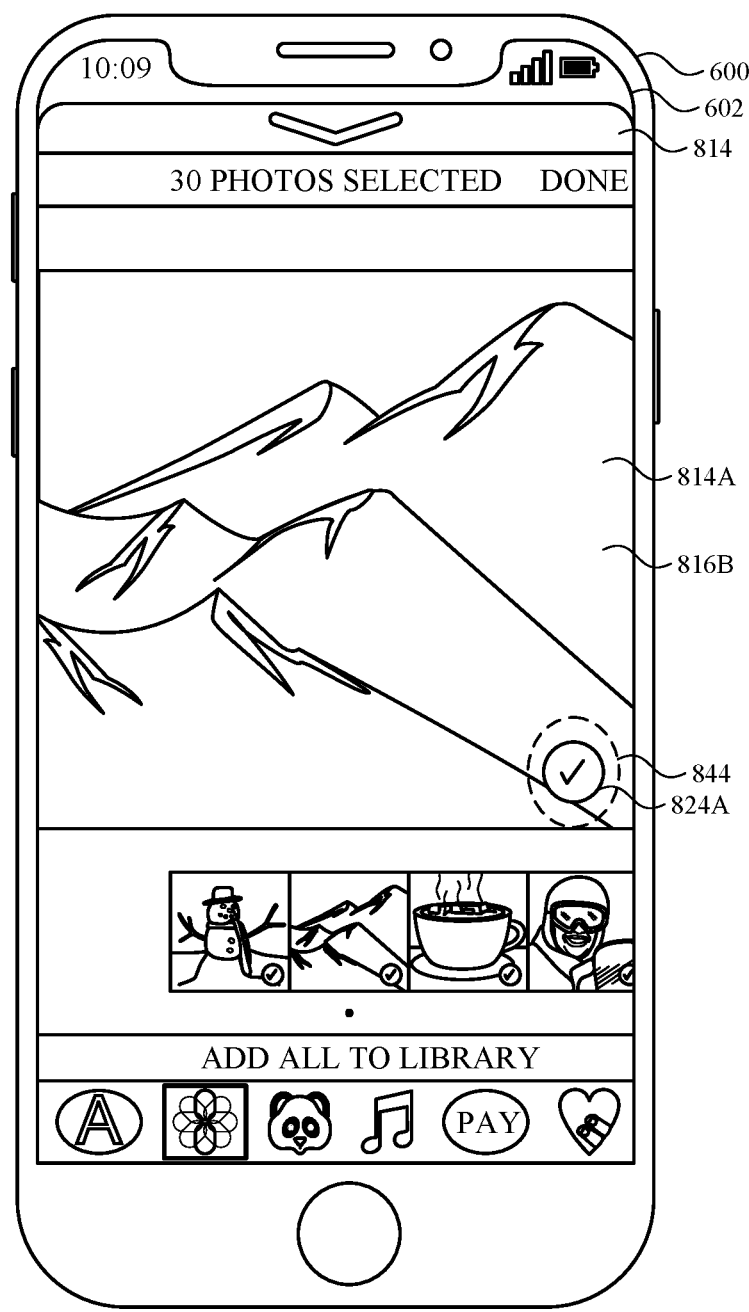
Figure 8A:
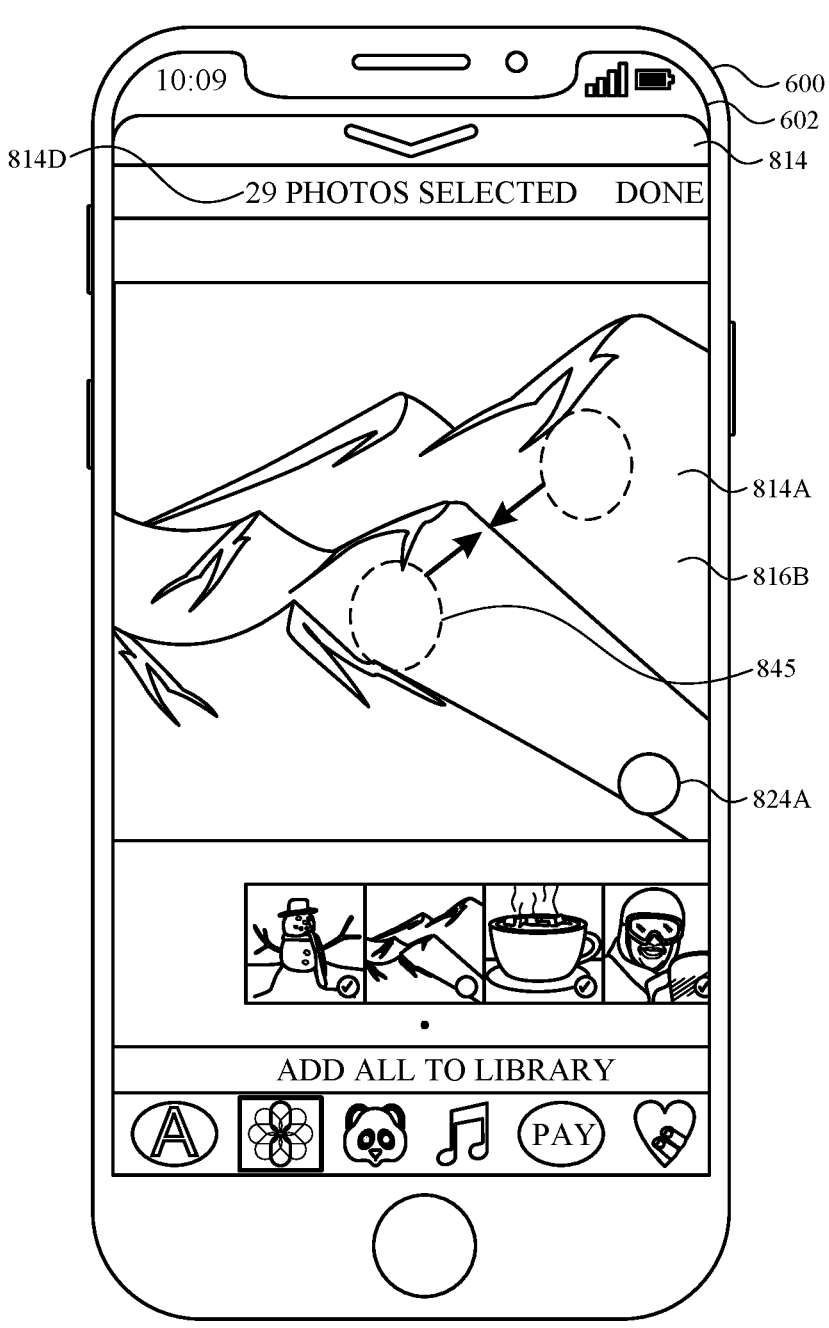
Figure 8A:
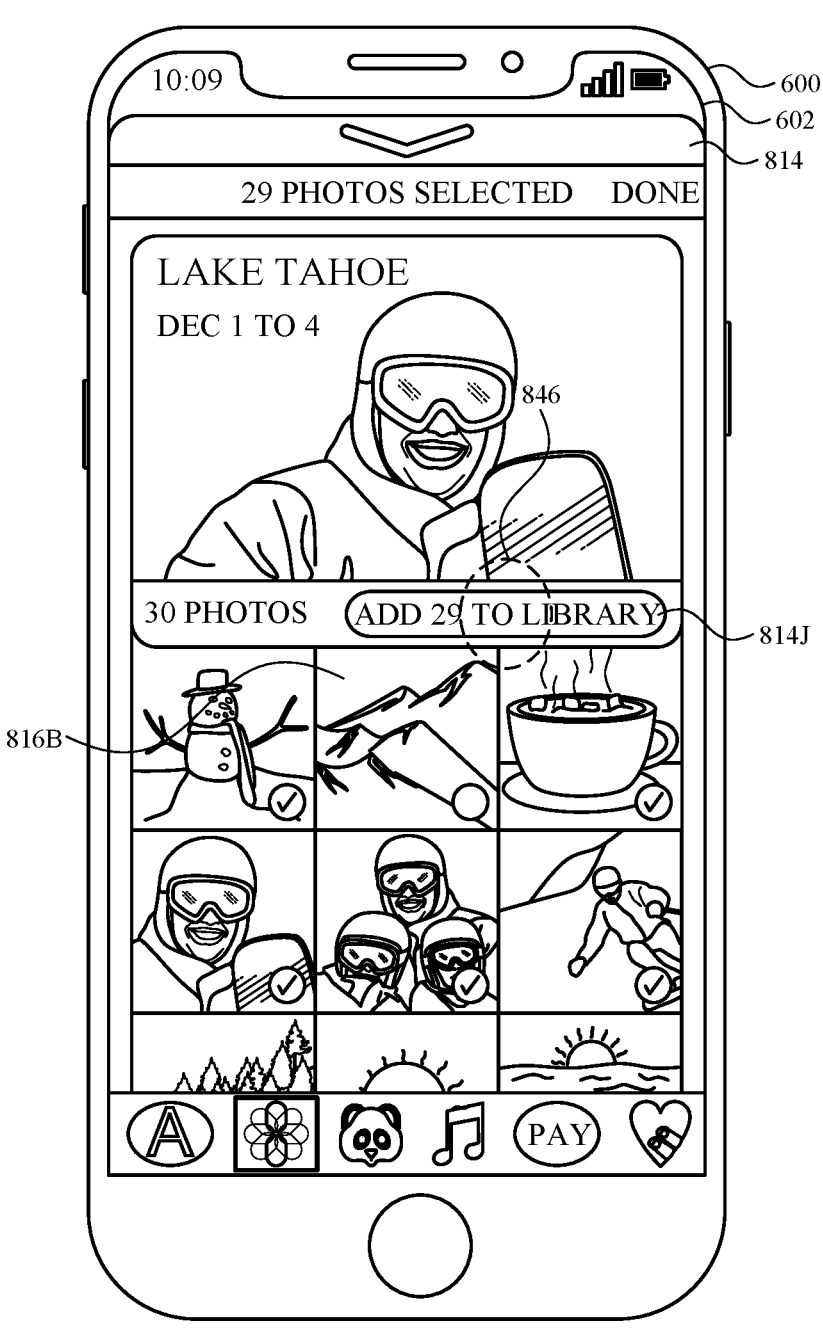
Figure 8A:
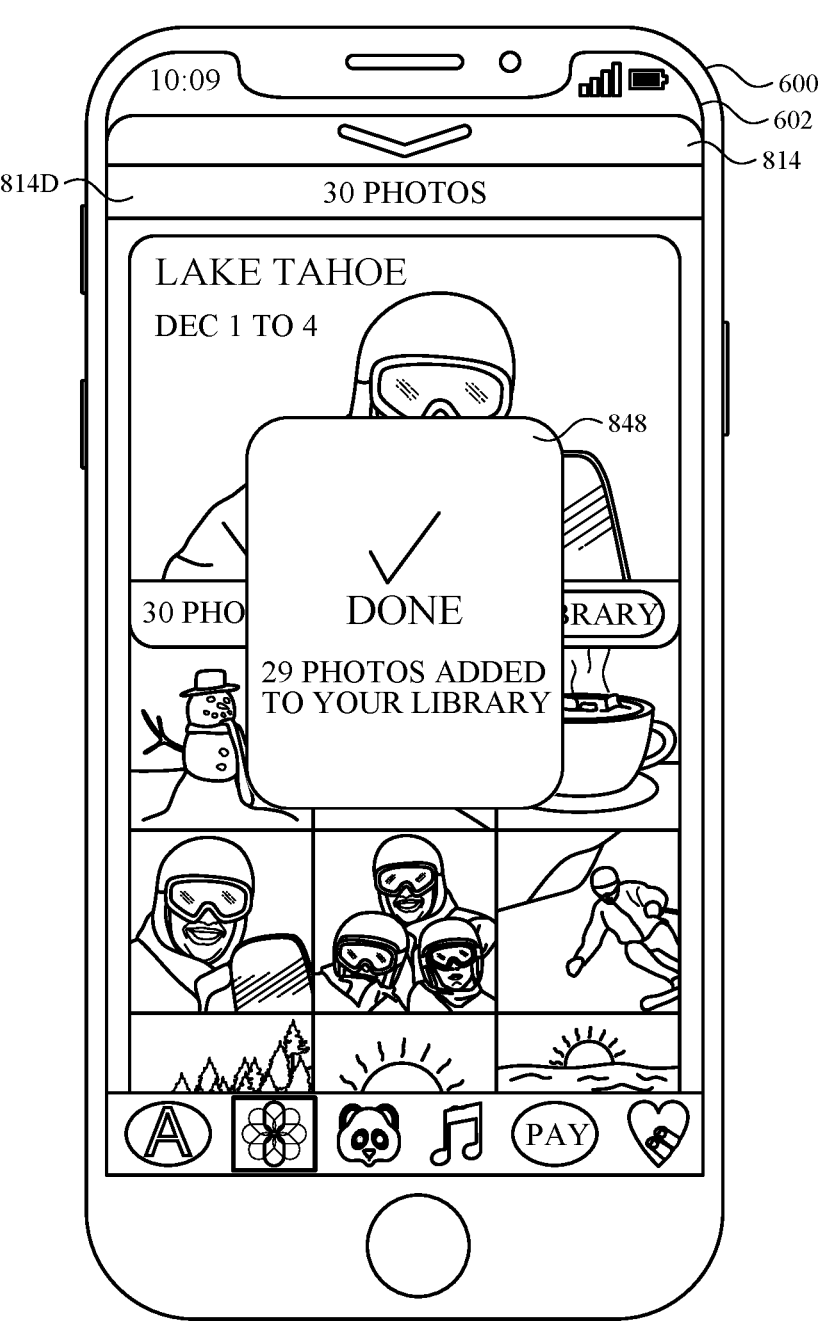
Figure 8A:
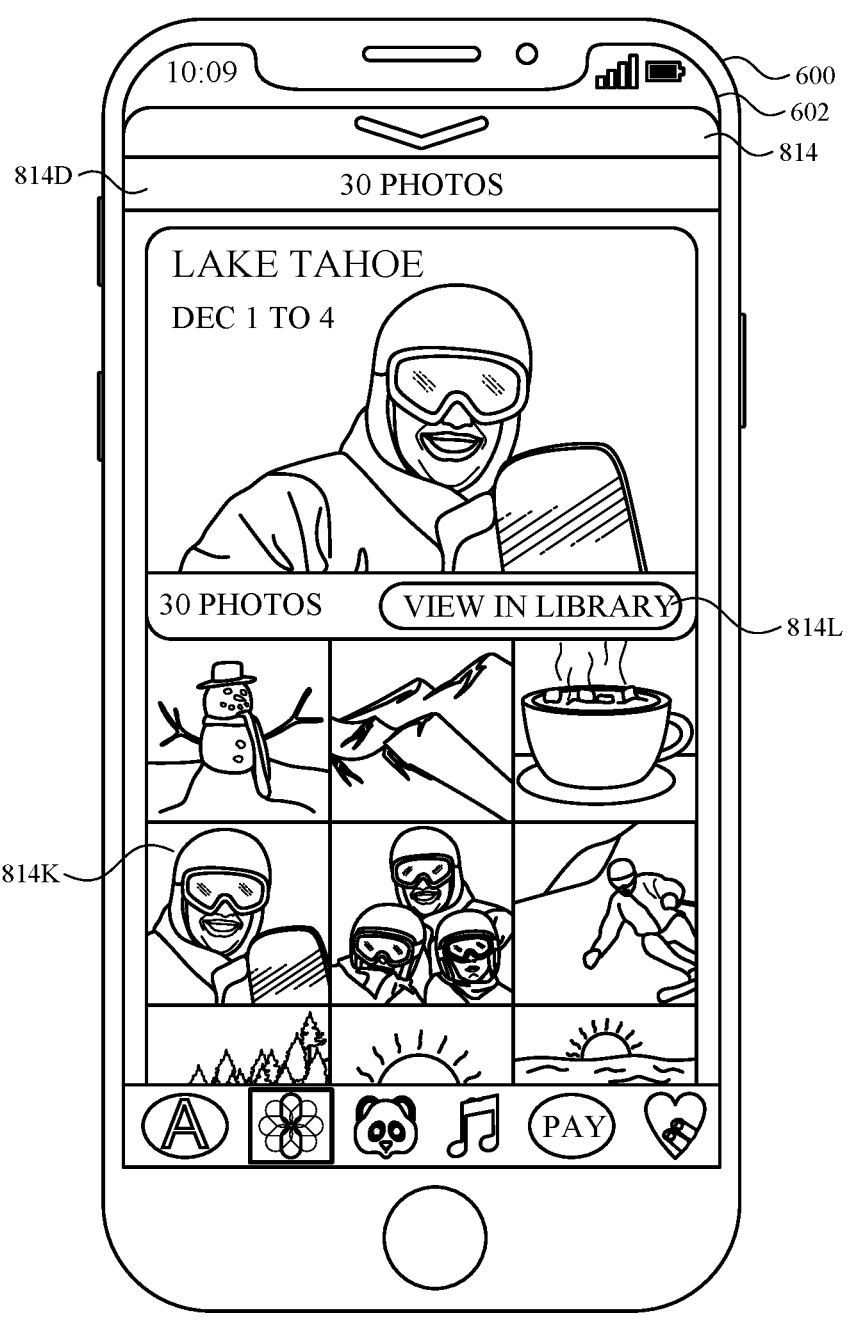
Figure 8A:
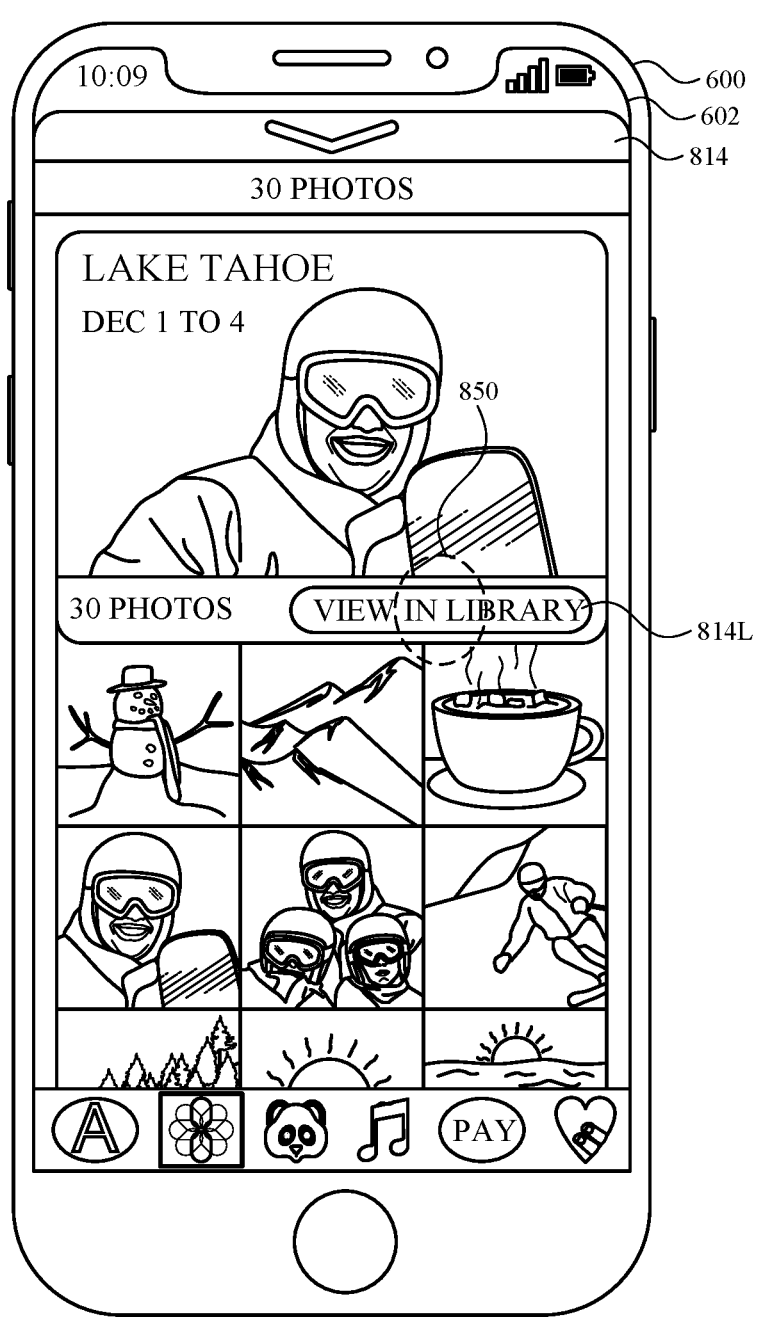
Figure 8A:
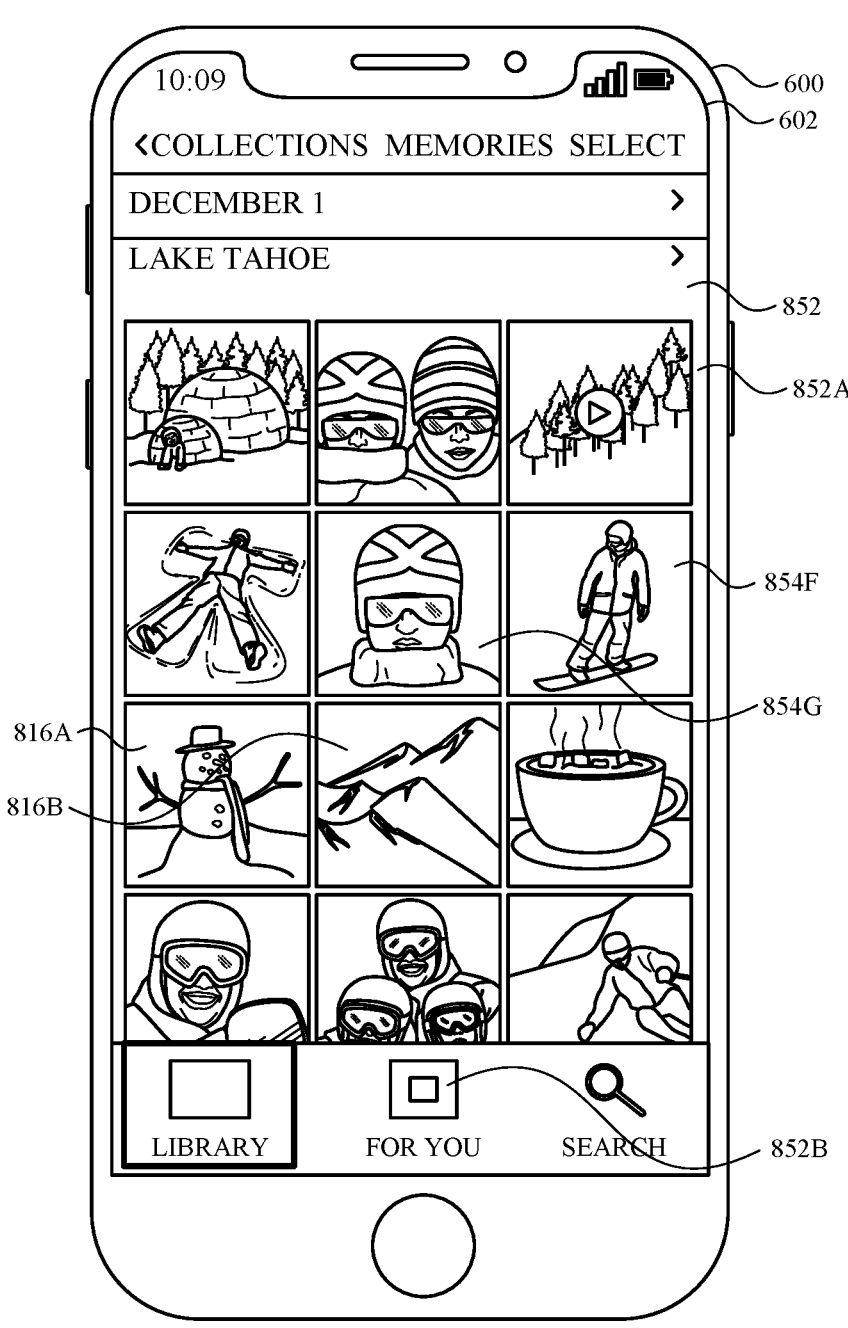
Figure 8A:
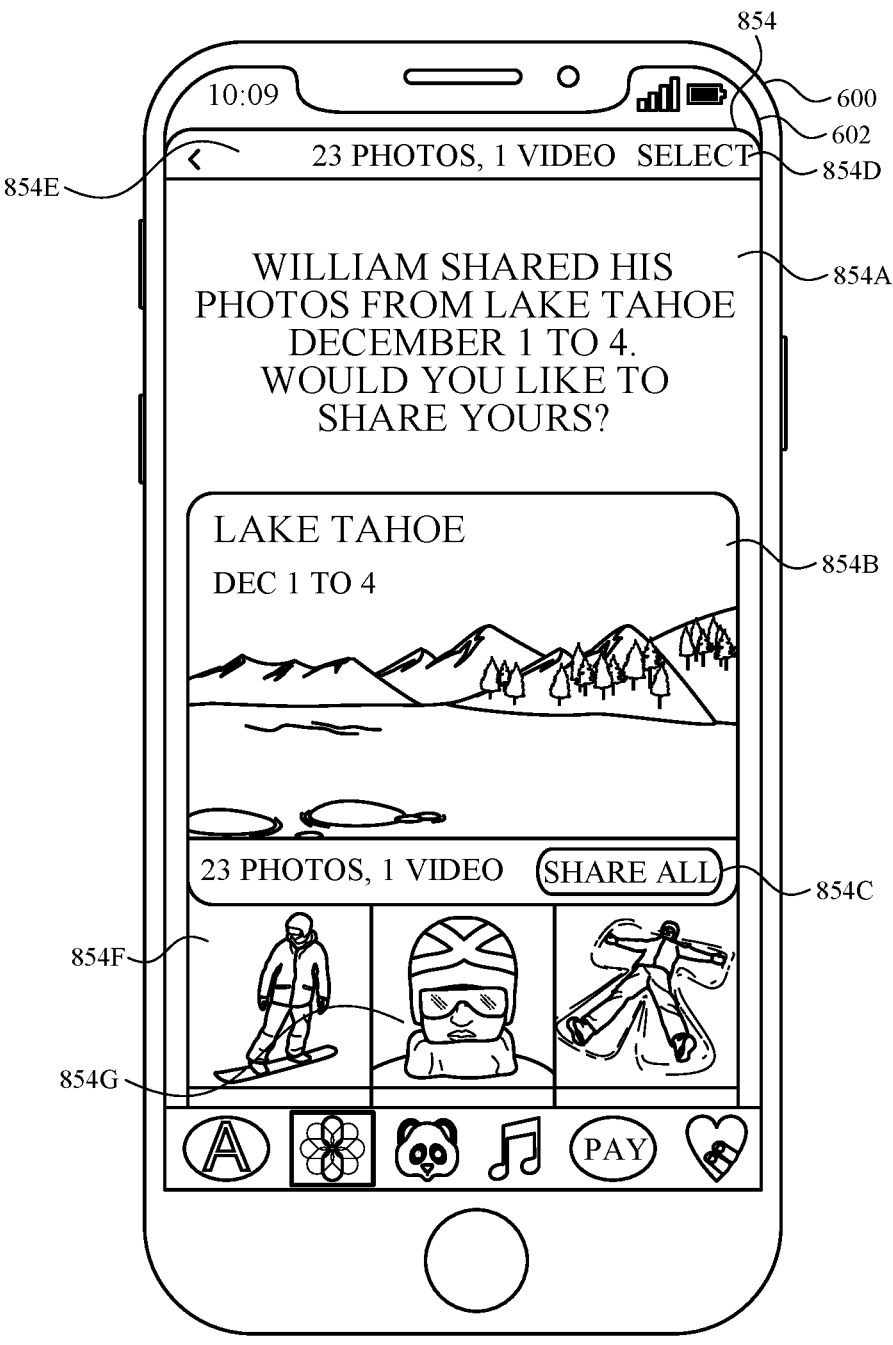
Figure 8A:
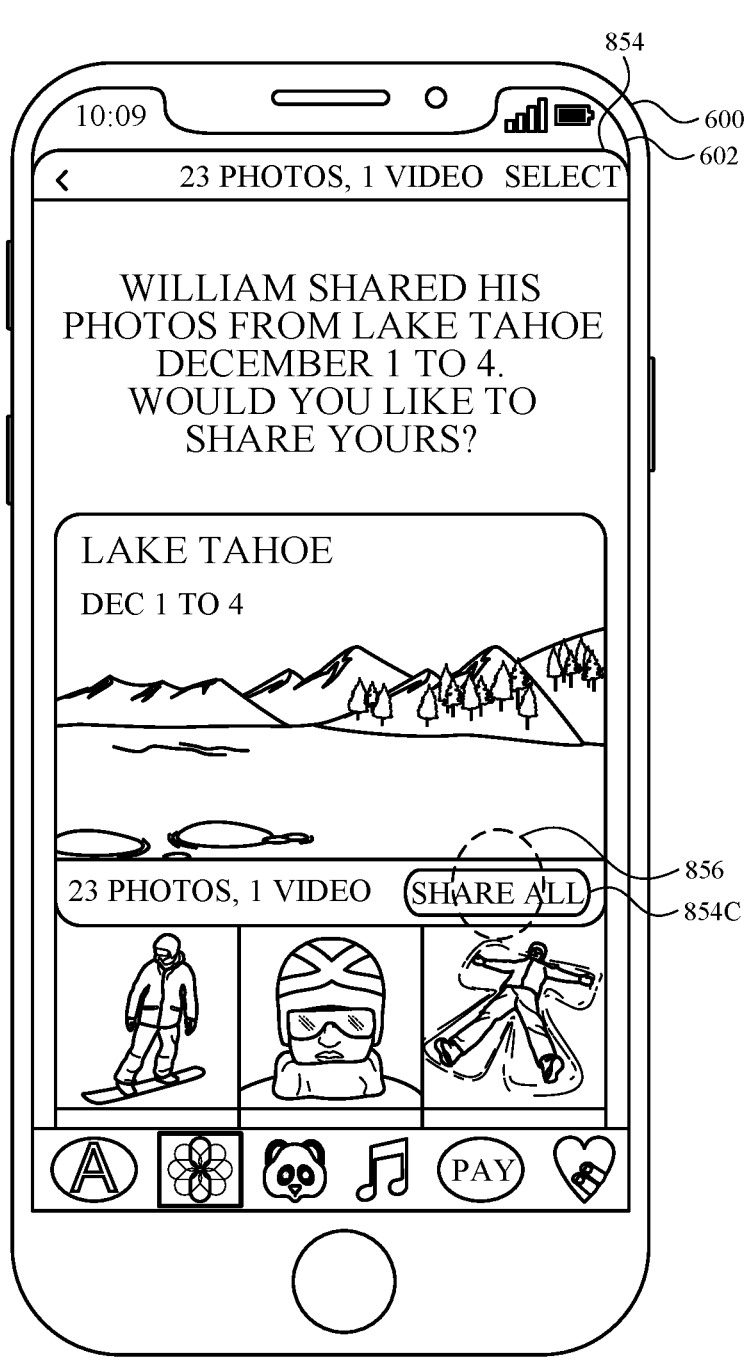
Figure 8A:
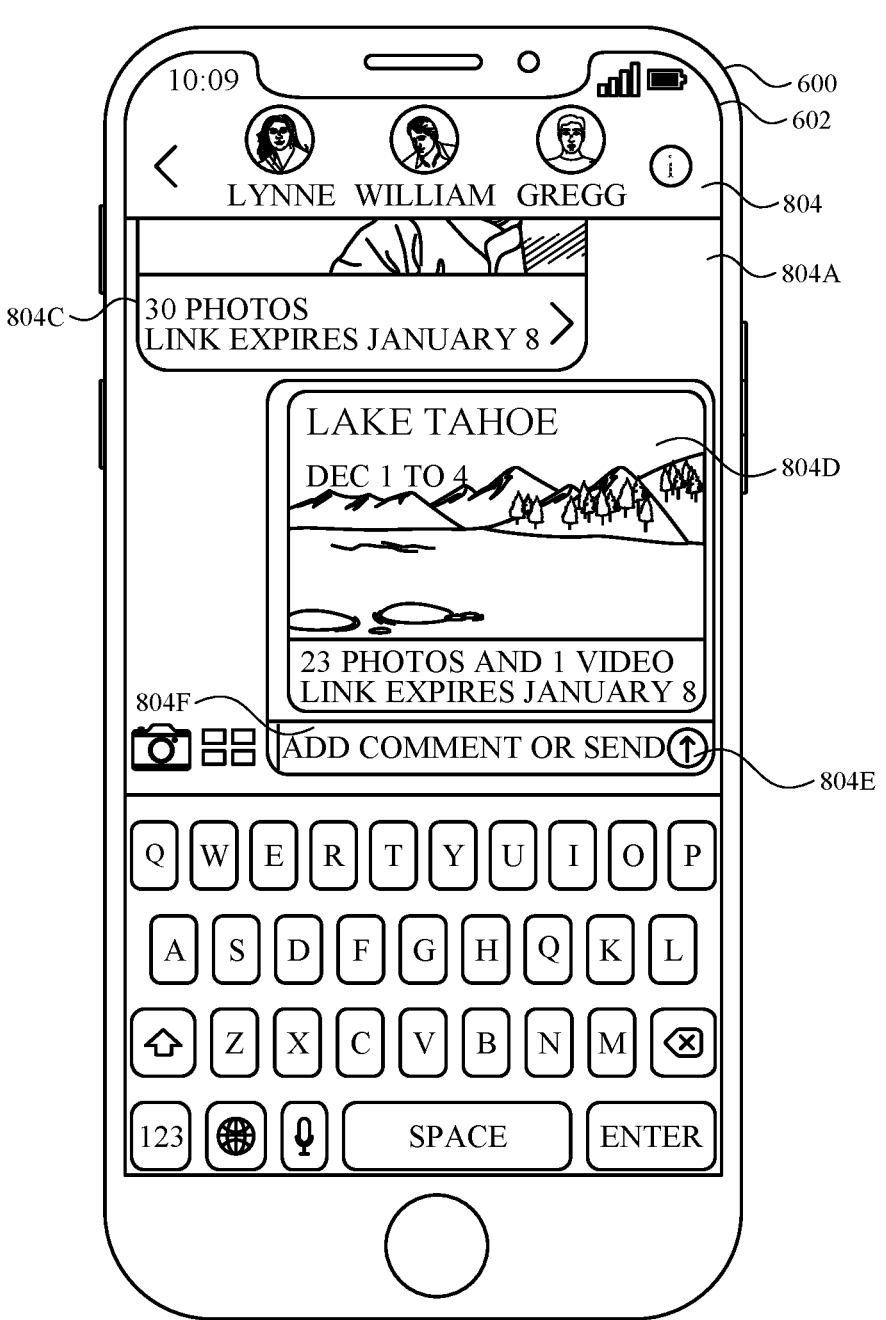
Figure 8A:
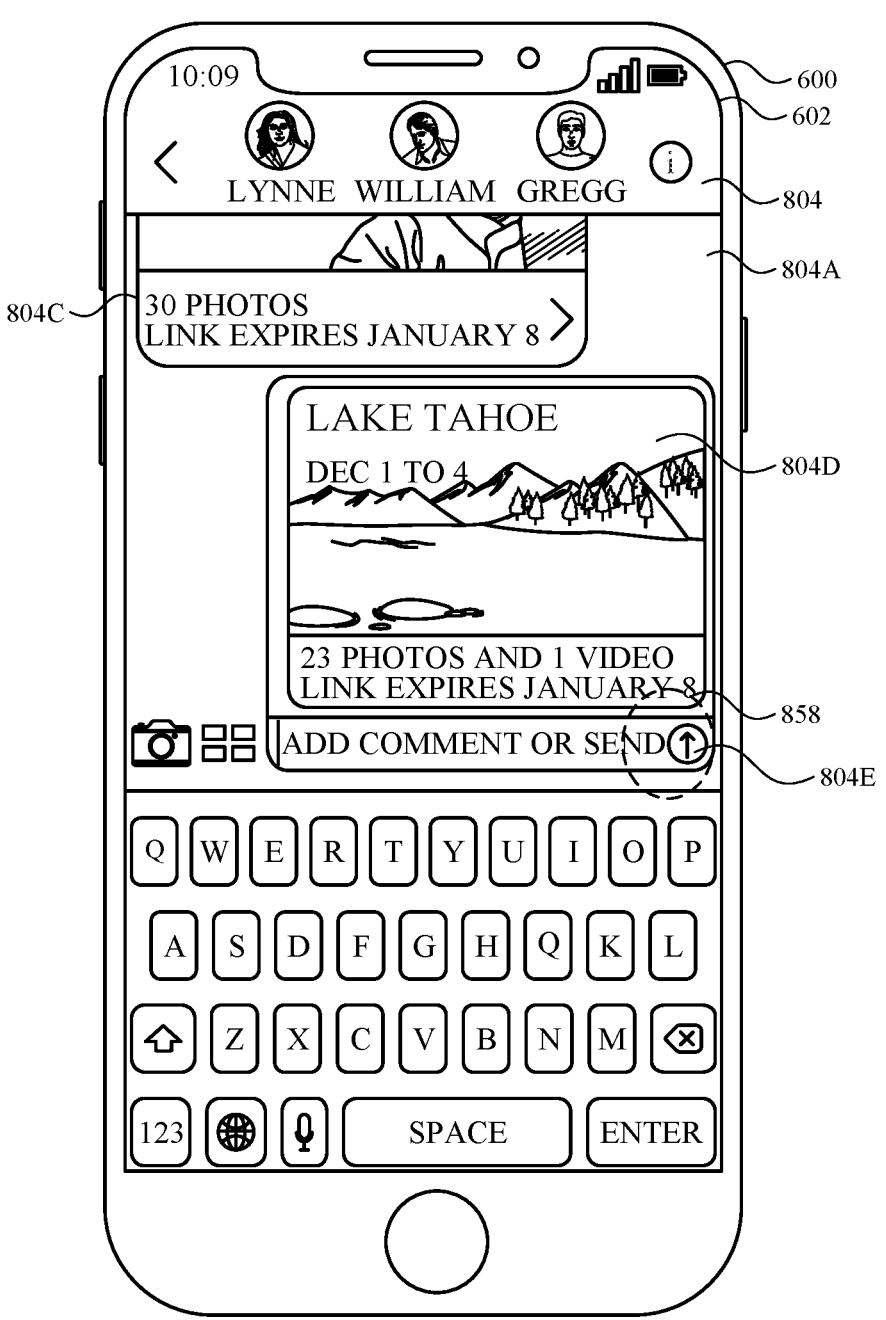
Figure 8A:
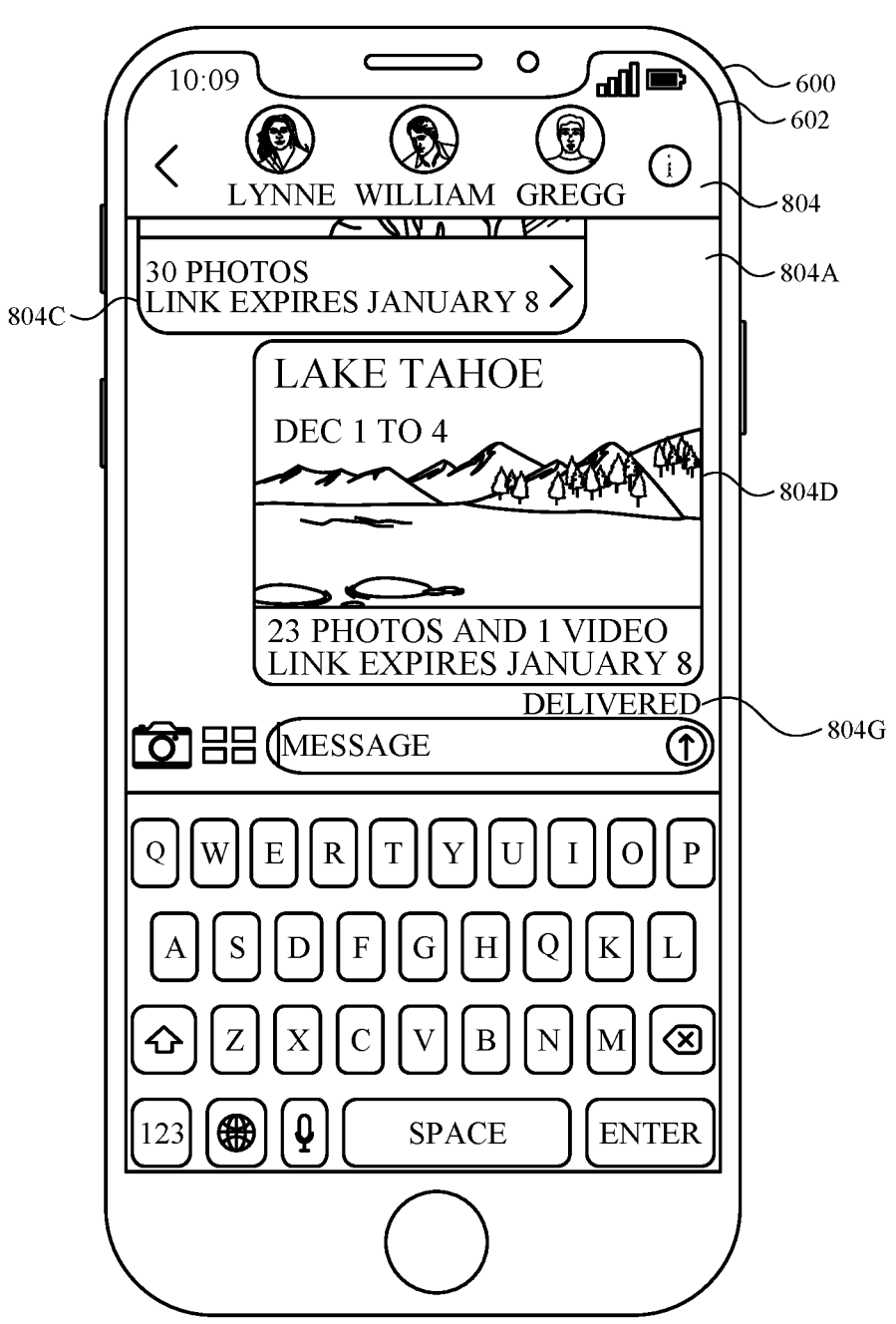
Figure 9G:
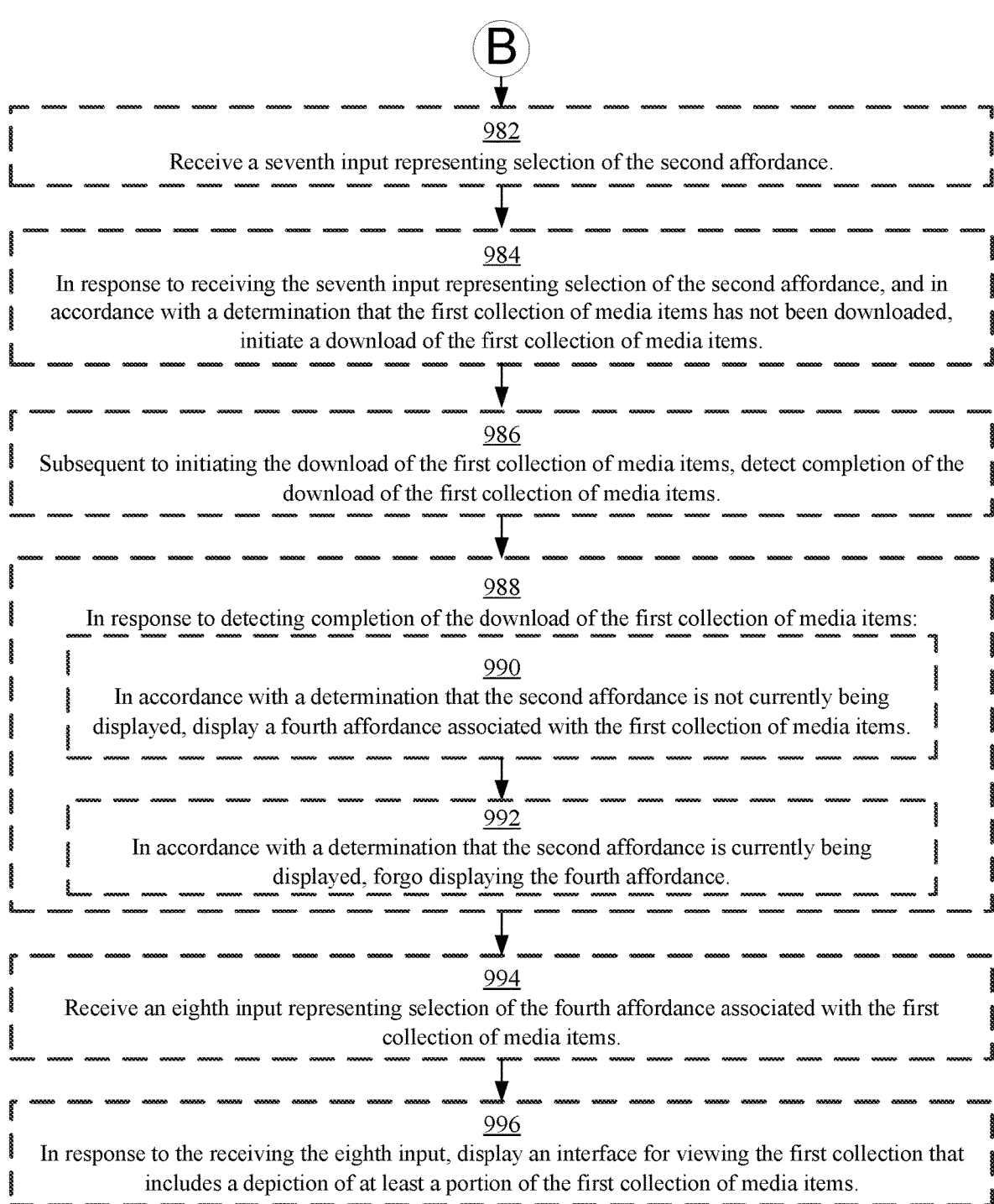

In some embodiments, the device (e.g., 600) updates an indication of an amount of currently selected media items in response to toggling selection of a media item. For example, FIG. 8Y illustrates that indicator 814D has been updated to indicate that the amount of media items selected has changed to 29 items (from 30 items in FIG. 8X). In some embodiments, the indication of an amount of currently selected media items is an affordance (e.g., for saving the media items). For example, FIG. 8Y illustrates that save affordance 8141 has been updated to indicate that the amount of media items selected is 29 items (e.g., out of the 30 total items in the collection indicated by indicator 8141), and now states: "Add 29 to Library".

FIGS. 8Z-8AC illustrate exemplary techniques for transitioning between grid view and one-up view, while staying in a selection mode. As described above, a shared collection interface (e.g., 814) can transition between grid view and one-up view in response to user input. For example, while in selection mode in a grid view, the device optionally provides the user with the option to transition to a one-up view while staying in selection mode. In some embodiments, the device (e.g., 600) receives user input representing a request to transition to a one-up view. In some embodiments, the user input is associated with a location of a media item. For example, at FIG. 8Z, device 600 receives user input 838 at a location associated with media item 816B. In this example, user input 838 is a de-pinch gesture centered on media item 816B.

In some embodiments, in response to receiving user input representing the request to transition to a one-up view that is associated with a location of a media item, the device (e.g., 600) displays the media item in a one-up view. For example, at FIG. 8AA, device 600 displays media item 816B in a one-up view in response to receiving user input 838. Further, because user input 838 was a de-pinch gesture associated with (e.g., centered on) the location of media item 816B, the one-up view is a one-up view of media item 816B.

In some embodiments, if a request to transition between a grid view and a one-up view is received while the device (e.g., 600) is currently in a selection mode, the device stays in the selection mode after transitioning between the grid view and the one-up view. For example, in FIG. 8AA, shared collection interface 814 stayed in selection mode (e.g., selection indicators and an unselected indicator are displayed, a done affordance is displayed) after transitioning to the one-up view.

While in selection mode, a user might wish to view a particular media item in a one-up view, without toggling selection of that media item. In some embodiments, in response to receiving a user input associated with a media item that causes a transition between a one-up view and a grid view while in a selection mode, the device (e.g., 600) enters a one-up view without toggling selection of the media item. For example, in response to receiving user input 838 at FIG. 8Z on media item 816B (which is unselected), the device transitions to one-up view as shown in FIG. 8AA but media item 816B remains unselected.

In some embodiments, the device (e.g., 600) toggle selections if a user input associated with a location of a media item is a first gesture (e.g., 836), and transitions to a one-up view without toggling selection if the user input (e.g., 838) is a second gesture different than the first gesture. For example, in response to a tap gesture represented by user input 836 (FIG. 8X), device 600 toggles selection of media item 816B. However, in response to a de-pinch gesture represented by user input 838 (FIG. 8Z) at the location of media item 816B, device 600 transitions to a one-up view of media item 816B without toggling selection. In this way, the user can inspect a media item of interest in a one-up view without causing it to be selected. While in the one-up view, the user can then toggle selection of that media item (e.g., or other media items), as illustrated in FIGS. 8AB-8AC described below.

In some embodiments, the set of media items that are currently selected remain unchanged in response to transitioning between a grid view and a one-up view (e.g., transitioning either from grid view, or to grid view). For example, as shown in FIG. 8Z, the total number of media items currently selected is 29 items, and the only media item unselected is media item 816B. As shown in FIG. 8AA, after transitioning to the one-up view, the set of currently selected media items is still 29 items and the unselected media item is still 816B. Accordingly, the device can move between different views of the media items in a collection without unintentionally changing the currently selected set of media items.

FIGS. 8AB-8AC illustrate an exemplary technique for toggling selection of a media item while in a one-up view. After entering one-up view, as shown in FIG. 8AA, the device optionally provides the user with the option to make a change to the set of currently selected media items. At FIG. 8AB, device 600 receives user input 840, representing a request to toggle selection of media item 816B (currently unselected) in the one-up view. At FIG. 8AC, in response to receiving user input 840, device 600 toggles selection of media item 816B (to be selected).

FIGS. 8AD-8AG illustrate an exemplary technique for simultaneously transitioning between views of a shared collection interface and entering a selection mode. In some embodiments, the device (e.g., 600) receives user input (e.g., 842) representing a request to transition between a grid view and a one-up view while not in a selection mode, and in response, transitions between the grid view and one-up view and enters into a selection mode. For example, FIG. 8AD illustrates shared collection interface 814 while not in a selection mode (e.g., also as shown in FIG. 8V). At FIG. 8AD, device 600 receives user input 842 representing a de-pinch gesture (e.g., as described above), and in response, displays shared collection interface 814 in a one-up view as shown in FIG. 8AE.

FIG. 8AE illustrates shared collection interface 814 in a one-up view while in a selection mode. For example, in response to receiving de-pinch gesture user input 842, device 600 displays shared collection interface 814 in a one-up view and enters a selection mode. In some embodiments, the user input, representing a request to transition between a grid view and a one-up view while not in a selection mode, is associated with a location associated with a media item. For example, user input 842 is a de-pinch gesture centered on the location of media item 816B and thus enters one-up view of that media item. In some embodiments, in response to the user input representing a request to transition between a grid view and a one-up view while not in a selection mode, the device enters a one-up view without entering into a selection mode if the user input is a first gesture, and the device enters into a one-up view and enters into a selection mode if the user input is a second gesture different than the first gesture. In some embodiments, a gesture is one of: a tap gesture, a pinch gesture, a de-pinch gesture, a deep press, or a press and hold. For instance, a first gesture can be a tap gesture and a second gesture can be a de-pinch gesture. For example, as shown in FIG. 8AD, because user input 842 is a de-pinch gesture (e.g., an exemplary second gesture), device 600 transitions to the display of a one-up view and enters a selection mode (as shown in FIG. 8AE). If user input 842 was a tap gesture (e.g., an exemplary first gesture) received while not in a selection mode, then device 600 would transition to the display of a one-up view without entering into selection mode. For example, in response to the tap gesture, device 600 would display shared collection interface 814 as shown in FIG. 8J, but with media item 816B displayed in region 814A.

After entering into one-up view and selection mode in response to the same user input (e.g., as shown in FIG. 8AE), the user can toggle selection of media items as described previously. For example, at FIG. 8AF, device 600 receives user input 844 associated with a location of media item 816B (e.g., selection of selection indicator 824A for media item 816B). As shown in FIG. 8AG, in response to receiving user input 844, the device 600 toggles selection of media item 816B to be unselected (e.g., unselected indicator 824B is now displayed, and selection indicator 824A is no longer displayed; indicator 814D is updated from "30" to "29" to indicate that one item has be unselected).

FIGS. 8AG-8AH illustrates an exemplary technique for transitioning between a one-up view and a grid view. For example, while in a one-up view, the device optionally provides the user with the option to change to a grid view. In some embodiments, in response to receiving user input (e.g., 845) while displaying a one-up view of a collection of media items, the device (e.g., 600) transitions the one-up view to a grid view. For example, at FIG. 8AG, the device receives user input 845, representing a pinch gesture (e.g., two contacts brought closer together), and in response, displays interface 814 in a grid view as shown in FIG. 8AH.

FIG. 8AH illustrates an exemplary grid view. At FIG. 8H, the device 600 receives user input 846 corresponding to selection (e.g., a tap) of save affordance 814J. In response to receiving user input 846, device 600 causes the selected media items to be added to a media library associated with the device, as discussed previously. In some embodiments, the device (e.g., 600) displays a confirmation that the media items were successfully added. For example, at FIG. 8AI, subsequent to receiving user input 846 (e.g., in response to or subsequent to the media items having been successfully added to the library), device 600 displays a confirmation indicator 848.

FIGS. 8AJ-8AL illustrate exemplary interfaces for viewing media items that have been added to a media library. FIG. 8AJ illustrates an exemplary shared collection interface after one or more media items have been added to a media library. In some embodiments, after adding one or more media items to a media library, the device (e.g., 600) displays an affordance for viewing the media items in the library (e.g., a browsing interface of a photos application). For example, as shown in FIG. 8AJ, save affordance 814J has been replaced by affordance 814L, which reads "View in Library". At FIG. 8AK, the device (e.g., 600) receives user input 850 corresponding to selection of affordance 814L. In response to receiving user input 850, device 600 displays library interface 852 of FIG. 8AL.

In some embodiments, after adding the media items to the library, the device (e.g., 600) exits selection mode. For example, turning briefly back to FIG. 8AJ, interface 814 is no longer in selection mode (e.g., no selection indicators or unselected indicators are displayed). For example, because the device already caused addition of the requested selection of media items to a media library, the selection mode is no longer needed.

FIG. 8AL illustrates an exemplary library interface 852. In some embodiments, the device (e.g., 600) displays a library interface (e.g., 852) in response to user input (e.g., 850). In this example, library interface 852 depicts media items that are included in the media library associated with device 600. Notably, library interface 852 includes a region 852A that includes representations of one or more media items in the media library associated with device 600. As can be seen, region 852A includes media items from the received shared collection of media items received from William, and saved at FIG. 8AH (e.g., in response to user input 846). For example, representations of media item 816A and 816B are included. In some embodiments, a library interface includes representations of media items that were added from the received shared collection and representations of media items that were already in the library before adding from the received shared collection. In this example, representations of media items from the user's library that were not added from the collection shared by William are also included (e.g., media items 854F and 854G, described below with respect to FIG. 8AM).

In some embodiments, the library interface is associated with a photos application. For example, displaying library interface 852 can include opening or launching a photos application.

After receiving a shared collection, the device optionally provides the user with the option to view a personalized media interface (e.g., as described above with respect to interface 658 of FIGS. 6AO-6AAB). In some embodiments, the device receives user input representing a request to view a personalized media interface, and in response, displays a personalize media interface. For example, in response to user selection of affordance 852B of FIG. 8AL, device 600 displays personalized media interface (e.g., similar to 658).

FIGS. 8AM-8AQ illustrate exemplary interfaces for sharing back one or more media items. The device optionally provides the user with the option to share back one or more media items (e.g., a collection) after receiving a shared collection from another user (e.g., a user account, or a device associated with a user). In some embodiments, the device (e.g., 600) outputs (e.g., displays) a sharing prompt (e.g., 854) to share media items with another user (e.g., a user other than the user of device 600). FIG. 8AM illustrates an exemplary prompt 854 for sharing back a collection of one or more media items with a sender who shared a collection. In this example, William (recipient user 803B) shared the media collection represented by 804C in the transcript 804A with the user of device 600 (user 803A). Based on receiving an indication of the collection shared by William, device 600 displays a sharing prompt 854 that suggests one or more media items (e.g., suggested media items) to share back with William. Thus, a sharing prompt provides quick and easy access to a sharing suggestion (e.g., a suggested collection) in order to reciprocate the sharing of media.

In some embodiments, a prompt to share media items includes one or more of the features of sharing prompt 854. In some embodiments, a prompt (e.g., 854) includes an indication of a context. In some embodiments, the context is a context that is related to both the received shared collection and the suggested collection. For example, prompt 854 includes region 854A, which includes text that indicates that the sharer (William) has shared media items related to the location Lake Tahoe and the time period December 1 to 4, and that there are suggested media items (e.g., 854F and 854G) related to that context that are available to share: "William shared his photos from Lake Tahoe December 1 to 4. Would you like to share yours?" In some embodiments, a prompt (e.g., 854) includes representations of one or more suggested media items. For example, prompt 854 includes representations of media items 854F and 854G from the suggested collection. In some embodiments, a prompt (e.g., 854) includes one or more of the features of interfaces 612 and/or 814, as described herein throughout. For example, prompt 854 includes a title card 854B (e.g., that includes an indication of a geographic location associated with the suggested collection (Lake Tahoe), an indication of a time period associated with the suggested collection ("Dec. 1 to 4" (e.g., December 1 to 4)), and a representative image (e.g., from the suggested collection)).

In some embodiments, the prompt includes an affordance for sharing the suggested collection with a recipient (e.g., the user who shared the received collection that causes the prompt to be displayed). For example, prompt 854 includes sharing affordance 854C. In some embodiments, the affordance for sharing (e.g., 854C) includes one or more of the features as described above with respect to any of affordances 604I, 612E, 664A, 666G, or 666H. For example, if the user changes selection of the media items for sharing, affordance 854C can be updated to reflect the number of selected media items (e.g., "Share 22" if 22 media items are selected).

In some embodiments, a prompt (e.g., 854) includes an affordance (e.g., 854D) for entering a selection mode. For example, prompt 854 includes select affordance 854D for entering a selection mode. Select affordance 854D includes one or more of the features as described above with respect to affordance 814E. For example, in response to user selection of select affordance 854D, device 600 enters selection mode (e.g., allowing user-customization of the media items that are selected for sharing). In some embodiments, a prompt (e.g., 854) is displayed (e.g., initially) in selection mode. For example, device 600 can display prompt 854 in selection mode without first requiring user input (e.g., of select affordance 854D). In some embodiments, fewer than all media items of the suggested collection are selected for sharing. For example, the suggested collection of FIG. 8AM includes 23 photos and 1 video (e.g., as indicated by indicator 854E), and fewer than 24 media items can be initially (e.g., automatically) selected for sharing (e.g., only 20 media items). In some embodiments, media items are selected (e.g., automatically) based on selection criteria (e.g., as described above).

The discussion above (e.g., with respect to FIG. 6) regarding a suggested collection being suggested based on it being determined to be relevant to content in a transcript (e.g., a received shared collection) is equally applicable to a prompt (e.g., 811A, 813, or 854) to share media items after receiving a shared collection, and is incorporated herein. In some embodiments, the suggested media items are related to the received collection of media items based on a context. For example, the suggested media items are related by a context (e.g., a time or time range, a geographic location or set of geographic locations, identified faces depicted in the media items, or other metadata). In some embodiments, the context is determined based on the received collection of media items. For example, the context is a time range and/or at a geographic location, or corresponds to an identified event associated with the received shared collection. In the example of FIG. 8AM, the suggested collection relates to the context of an event defined by geographic location and time—the location Lake Tahoe and the time range December 1 to December 4. Notably, the received shared collection from William represented by 804C also corresponds to the geographic location Lake Tahoe and the time range December 1 to December 4 (e.g., as shown by 804C in FIG. 8A). Thus, for example, device 600 displays a sharing prompt 854 that suggests sharing the Lake Tahoe collection because it relates to a context (e.g., geographic location) that is also related to the received shared collection from William.

In some embodiments, the suggested media items are not included in the received shared collection. For example, device 600 suggests media items (e.g., the collection represented by interface 854) to share back with William that were not received in the collection shared by William (e.g., in the shared collection represented by 804C). In this way, device 600 prevents sharing or display of duplicate media items (e.g., already shared between, and thus already possessed by, two users). In some embodiments, the device (e.g., 600) identifies the one or more media items that share the context is performed by the device. In some embodiments, the identifying is performed by a remote device (e.g., a server).

In some embodiments, the prompt (e.g., 854) is displayed in response to further user action after receiving an indication of a shared collection from another user (e.g., 804C of FIG. 8A). For example, prompt 854 can be displayed after the user of device 600 accesses a personalized media interface (e.g., selects affordance 852B in FIG. 8AL, the tab labeled "For You"). For further example, the prompt can be displayed after the user views an interface associated with the received shared collection and adds media to a media library (e.g., displayed subsequent, or in response, to user input: 808 of FIG. 8K, 830 of FIG. 8T, or 846 of FIG. 8AH). For instance, at FIG. 8AK, after adding media items from the collection received from William to the media library, the device 600 receives user input representing a request to close (e.g., cease displaying) interface 814, and in response displays prompt 854. Thus, after the user is finished viewing and/or saving media items from the received shared collection, the device displays a prompt (e.g., 854).

In some embodiments, the prompt is displayed in response to receiving the indication that a first user (e.g., 803B) has shared a first collection with a second user (e.g., of device 600). For example, as described above, in response to receiving an indication that William (e.g., user 803B) has shared the Lake Tahoe collection associated with representation 804C in FIG. 8I, device 600 displays one or more of the following exemplary prompts: sharing affordance 811A (e.g., includes the text "Share Back") or sharing affordance 813. In some embodiments, the prompt (e.g., 811A and/or 813) is displayed concurrently with a transcript (e.g., 804A) of a message conversation with the recipient (e.g., user 803B). In some embodiments, a prompt is an affordance (e.g., 811A or 813 of FIG. 8I).

At FIG. 8AN, device 600 receives user input 856 corresponding to selection of affordance 854C, representing a request to share a suggested collection of media items. In some embodiments, in response to receiving a request to share a suggested collection of media items (e.g., 856), the device (e.g., 600) prepares to share one or more media items (e.g., selected media items) from the suggested collection.

FIG. 8AO depicts exemplary message interface 804. FIG. 8AO illustrates an exemplary representation 804D of a suggested media collection that is being shared back. In some embodiments, preparing to share the suggested collection includes inserting a representation of the media items into a text entry field (e.g., text entry field 804F of FIG. 8AO). For example, device 600 inserts representation 804D into a text entry filed 804F in FIG. 8AO, allowing the user to optionally add accompanying text (or other content) before sharing (e.g., via selection of an affordance, such as 804E). At FIG. 8AP, device receives user input 858 corresponding to selection of affordance 804E, and in response, shares the suggested collection (e.g., the selected media items) with the other user (e.g., 803B, William).

FIG. 8AQ illustrates an exemplary representation of a suggested collection that has been shared back. In some embodiments, sharing includes transmitting a message that provides access to media items of the media collection. In some embodiments, sharing includes one or more of inserting the media items, or a representation of the media items, into a transcript of a message conversation. For example, as shown in FIG. 8AQ, device 600 has caused representation 804D to be inserted into the transcript in response to user input 858.

In some embodiments, in response to receiving a request to share a suggested collection of media items (e.g., 856), the device (e.g., 600) immediately transmits a message that provides access to media items of the suggested collection (e.g., the selected media items). For example, device 600 can display message interface 804 as shown in FIG. 8AQ in response to user input 856 at prompt 854, and optionally not require user input 858, or provide an opportunity to add accompanying content.

In some embodiments, a representation of a collection of media items is associated with a displayed indication of receipt. For example in FIG. 8AQ, representation 804D is associated with receipt indicator 804G, which indicates that the shared suggested collection (e.g., the message that includes the representation) as been delivered to one or more recipients (e.g., users 803B and 803C). In some embodiments, a receipt indicator includes information regarding a recipient's activity accessing and/or viewing the shared collection. For example, instead of (or in addition to) stating "Delivered", indicator 804G can include text such as: "Read", "Read at [a particular time]", "Viewed", "Viewed [n] times", "Opened", "Not Viewed", or the like.

FIGS. 9A-9G is a flow diagram illustrating a method for 900 using an electronic device in accordance with some embodiments. Method 700 is performed at a device (e.g., 100, 300, 500, 600) with a display and one or more input devices. Some operations in method 900 are, optionally, combined, the orders of some operations are, optionally, changed, and some operations are, optionally, omitted.

As described below, method 900 provides an intuitive way for sharing a suggested collection of media items that is related to a received collection of media items. The method reduces the cognitive burden on a user for sharing a suggested collection of media items that is related to a received collection of media items, thereby creating a more efficient human-machine interface. For battery-operated computing devices, enabling a user to share a suggested collection of media items that is related to a received collection of media items faster and more efficiently conserves power and increases the time between battery charges.

The electronic device (e.g., 600) receives (902) an indication, from an external device (e.g., 100, 300, 500), that a first user (e.g., a device or account associated with a first user) has shared (e.g., provided access to (e.g., via a link and/or corresponding permission), or has sent the actual media items) a first collection of media items with a second user (e.g., a device (e.g., 600) or account associated with the second user). For example, in FIG. 8A, device 600 receives an indication that user 805B ("William") has shared the collection of media items represented by representation 804C as shown in FIG. 8A.

Subsequent to (e.g., in response to) receiving the indication that the first user has shared the first collection of media items with the second user, the electronic device (e.g., 600) outputs (904) (e.g., displays, on the display) a prompt (e.g., 811A of FIG. 8I, 813 of FIG. 8I, or 854 of FIG. 8M) to share, with the first user (e.g., 805B) (e.g., share with a device or an account associated with the first user), one or more suggested media items (e.g., 854F, 854G of FIG. 8AM) associated with (e.g., included a local and/or remotely stored media library of, or stored locally on a device of) the second user (e.g., 805A) (e.g., or a device or account associated with the second user) that are related to the first collection of media items based on a context, wherein: the context is determined (906) based on the first collection of media items (e.g., context is a time range and/or at a geographic location, or corresponds to an identified event), and the one or more suggested media items are not included (908) in the first collection (e.g., the one or more media items were included in the second user's media library before receiving the indication of the shared first collection).

Displaying a prompt to share, with the first user, one or more suggested media items associated with the second user that are related to a first collection of media items (shared by the first user) based on a context allows the second user to quickly identify media items that are the user is likely to want to share with the first user. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the prompt (e.g., 854) is output in response to user input (e.g., selection of 811A or 813 of FIG. 8I, or user input 846 of FIG. 8AH, or selection of 852B of FIG. 8AL). In some embodiments, the prompt is output in response to one or more media items in the first collection being added to a media library associated with the electronic device (e.g., subsequent to displaying interface 814 as shown in FIG. 8AI).

In some embodiments, identifying the one or more media items that share the context is performed by the electronic device (e.g., 600). In some embodiments, identifying the one or more media items that share the context is performed by one or more remote devices (e.g., a server).

In some embodiments, while displaying a representation (e.g., 854F or 854G of FIG. 8AM, or 804D of FIG. 8AO) of the one or more suggested media items associated with the second user, the electronic device (e.g., 600) displays (910), on the display, a first affordance (e.g., 854C of FIG. 8AM, or 804E of FIG. 8AO).

The electronic device (e.g., 600) receives (912), via the one or more input devices, a first input (e.g., 856 of FIG. 8AN, or 858 of FIG. 8AP) representing selection of the first affordance (e.g., 854C of FIG. 8AM, or 804E of FIG. 8AO).

In response to receiving the first input (e.g., 856 of FIG. 8AN, or 858 of FIG. 8AP), the electronic device (e.g., 600) transmits (914) a message (e.g., the message including representation 804D of FIG. 8AQ) to the first user (e.g., 805B) (e.g., as part of a message conversation with the second user) and provides access to the at least a portion of the one or more suggested media items (e.g., transmits the media items themselves, or provides a link or other data and/or permissions for accessing the media items).

In some embodiments, subsequent to receiving the indication (e.g., 804C of FIG. 8A) that the first user (e.g., 805B) has shared the first collection of media items with the second user (e.g., 805A), and prior to outputting the prompt to share, the electronic device (e.g., 600) receives (916), via the one or more input devices, a second input (e.g., 818 of FIG. 8K, 830 of FIG. 8T, or 846 of FIG. 8AH) representing a request to add one or more media items in the first collection of media items to a media library associated with the second user (e.g., a media library stored locally on a device (e.g., 600) associated with the second user, and/or a media library stored remotely (e.g., cloud-based media storage) associated with the second user). In response to receiving the second input, the electronic device (e.g., 600) causes (918) the one or more media items in the first collection of media items to be added to the media library associated with the second user (e.g., as indicated by 820 of FIG. 8L, 832 of FIG. 8U, or 848 of FIG. 8AI). Subsequent to causing the one or more media items in the first collection to be added to the media library associated with the second user, the electronic device (e.g., 600) displays (920) the prompt (e.g., 854 of FIG. 8AM) to share the one or more suggested media items associated with the second user, wherein: the one or more suggested media items associated with the second user are selected (922) from the media library associated with the second user, and the one or more suggested media items associated with the second user exclude (924) the one or more media items from the first collection that have been added to the media library associated with the second user. For example, after adding the media items from the collection received from William, which are depicted at interface 814 of FIG. 8AJ, to a media library associated with the electronic device, the electronic device displays a prompt 854 of FIG. 8AM that suggests sharing media items from the media library—however the suggested media items do not include the media items from William (e.g., the media items (e.g., 854F and 854G) represented in prompt FIG. 8AM do not include the media items from William's collection, represented in FIG. 8AJ).

In this way, the electronic device avoids suggesting media items to share with a recipient that were received from the recipient.

Selecting suggested media items from a media library of the user that includes media added from the first collection, and excluding from the suggestion the media items from the first collection allows the user to quickly identify and send media items that have not already been received from the first user without requiring an excessive number of inputs or placing a high cognitive burden on the user. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the context is determined (926) based on an identified face being identified in: one or more media items in the first collection of media items, and one or more media items in the one or more suggested media items. In some embodiments, the one or more media items in the first collection of media items, and the one or more media items in the one or more suggested media items are different media items. For example, the exemplary first collection received from William (e.g., 805B), represented in interface 814J of FIG. 8AJ, includes a media item 814K that includes a depiction of an identified face (e.g., of William) of a snowboarder, and the exemplary one or more suggested media items represented in interface 854 of FIG. 8AM include a depiction of the same identified face in media item 854F that depicts the same person snowboarding. Thus, the one or more suggested media items and the first collection are determined to be related based on a context determined based on the face in both media items 814K and 854F.

Using a determined context based on an identified face being depicted in the first collection and in the one or more suggested media items allows the user to quickly identify media that the second user is likely to want to share with the first user, in particular that depicts a face common to both sets of media. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the context is determined (928) based on an event associated with the first collection of media items and the one or more suggested media items. For example, the exemplary first collection received from William (e.g., 805B), represented in interface 814 of FIG. 8AJ, includes media items associated with an event "Lake Tahoe" that occurred December 1 to December 4, and the exemplary one or more suggested media items represented in interface 854 of FIG. 8AM also include one or more media items associated with an event named "Lake Tahoe" that occurred December 1 to December 4.

Using a determined context based on an event associated with the first collection and the one or more suggested media items allows the user to quickly identify media that the second user is likely to want to share with the first user. Performing an optimized operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the event corresponds to a range of time, and wherein the first collection and the one or more suggested media items respectively include (930) one or more media items captured during the range of time. In some embodiments, a range of time is a range that begins at a first particular time of day and/or on a first particular date, and ends at a second particular time of day and/or on a second particular date. In some embodiments, media item includes or is associated with metadata indicating that the media item was captured at a particular time within the range of time. For example, the exemplary first collection received from William (e.g., 805B), represented in interface 814 of FIG. 8AJ, includes media items associated with an event "Lake Tahoe" that occurred during the range of time December 1 to December 4, and the exemplary one or more suggested media items represented in interface 854 of FIG. 8AM also include one or more media items associated with an event named "Lake Tahoe" that occurred during the range of time December 1 to December 4.

In some embodiments, the event corresponds to a geographic location, and the first collection and the one or more suggested media items respectively include (932) one or more media items captured at the geographic location. In some embodiments, media item includes or is associated with metadata indicating that the media item was captured at or near (e.g., in another geographic location) the geographic location. In some embodiments, the event corresponds to a plurality of geographic locations (e.g., media items taken during a road trip at multiple locations). For example, the exemplary first collection received from William (805B), represented in interface 814 of FIG. 8AJ, includes media items associated with an event "Lake Tahoe" that occurred at the geographic location Lake Tahoe, and the exemplary one or more suggested media items represented in interface 854 of FIG. 8AM also include one or more media items associated with an event named "Lake Tahoe" that occurred at the geographic location Lake Tahoe.

In some embodiments, subsequent to receiving the indication that the first user has shared the first collection of media items with the second user, the electronic device (e.g., 600) displays (934), on the display, a second affordance (e.g., 804C of FIG. 8A, 8D or 8I; 814J of FIG. 8AJ) associated with the first collection of media items. In some embodiments, the affordance associated with the first collection is displayed concurrently with a transfer (e.g., download/upload) progress indicator (e.g., "Downloading", "Uploading", "Lori is uploading 23 photos"; "Downloading 23 photos", or the like). For example, as shown in FIG. 8A, affordance 804C includes an indication that the corresponding media items are being uploaded (e.g., by the sender device, associated with William), and the state of the upload (e.g., 2 of 30). For example, as shown in FIG. 8D, affordance 804C includes an indication that the corresponding media items are being downloaded (e.g., by the recipient device, associated with Lynne), and the state of the download (e.g., 2 of 30). In some embodiments, in response to user input (e.g., 806 of FIG. 8B) selection of the affordance while transferring is in progress (e.g., downloading and/or uploading) displays a preview of one or more media items of the first collection. In some embodiments, the preview includes representations of one or more media item that are: reduced in size and/or quality, displayed greyed out, and/or not selectable. For example, in response to user input 806, the electronic device displays interface 808 as shown in FIG. 8C.

In some embodiments, the electronic device (e.g., 600) receives (936), via the one or more input devices, a third input (e.g., 810 of FIG. 8H, or 812 of FIG. 8I) representing selection of the second affordance (e.g., 804C) associated with the first collection of media items. In response to receiving the third input representing selection of the second affordance, the electronic device displays (938), on the display, an interface (e.g., 814 as shown in FIG. 8J, 8O, 8V, or 8W) for viewing the first collection that includes a depiction (e.g., 816A, 816B) of at least a portion of the first collection of media items. For example, the interface includes is a one-up view of a media item or a grid view of a plurality of photos from the first collection.

In some embodiments, while displaying the interface for viewing the first collection, the electronic device (e.g., 600) displays (940) a third affordance (e.g., 814C of FIG. 8J, 814G of FIG. 8T, 814J of FIG. 8V or 8AH). In some embodiments, the electronic device (e.g., 600) receives (942), via the one or more input devices, a fourth input (e.g., 818 of FIG. 8K, 830 of FIG. 8T, 846 of FIG. 8AH) representing selection of the third affordance. In response to receiving the fourth input representing selection of the third affordance, the electronic device (e.g., 600) causes (944) one or more media items in the first collection to be added to a media library associated with the second user. For example, the electronic device adds (e.g., selected) media items to a media library on local storage, or transmits command to a cloud-based service to add media items to a remote media library (e.g., on a cloud-based service).

In some embodiments, prior to receiving the fourth input representing selection of the third affordance, and while displaying the interface for viewing the first collection, the electronic device (e.g., 600) receives (946), via the one or more input devices, a fifth input (e.g., 822 of FIG. 8N, 834 of FIG. 8V, or 842 of FIG. 8AD). In response to receiving the fifth input, the electronic device (e.g., 600) enters (948) into a media item selection mode (e.g., as shown in FIG. 8O, 8W, or 8AE). While in the media item selection mode (950): while displaying a representation of a first media item (e.g., 816B of FIG. 8R, 816B of FIG. 8X) of the first collection of media items, the electronic device (e.g., 600) receives (952), via the one or more input devices, a sixth input (e.g., 828 of FIG. 8R, 836 of FIG. 8X) associated with a location of the displayed representation of the first media item. In response to receiving the sixth input (954), the electronic device (e.g., 600): toggles whether the first media item is selected (e.g., as shown in FIG. 8S or 8Y); in accordance with the toggling causing the first media item to be selected, the electronic device (e.g., 600) displays, on the display, a selection indicator (e.g., 824A of FIG. 8R or 8W) associated with the displayed representation of the first media item; and in accordance with the toggling causing the first media item to be unselected, the electronic device (e.g., 600) ceases to display, on the display, the selection indicator associated with the representation of the first media item (e.g., as shown in FIG. 8S or 8Y).

In some embodiments, in accordance with a determination (956) that the sixth input is a first gesture (e.g., a tap on a media item) (e.g., user input 828 of FIG. 8R, or user input 836 of FIG. 8X), the electronic device (e.g., 600): toggles whether the first media item is selected (e.g., as shown in FIG. 8S or 8Y); in accordance with the toggling causing the first media item to be selected, displays, on the display, the selection indicator (e.g., 824A of FIG. 8R or 8W) associated with the displayed representation of the first media item; and in accordance with the toggling causing the first media item to be unselected, ceases to display, on the display, the selection indicator associated with the representation of the first media item. In some embodiments, in accordance with the toggling causing the first media item to be unselected, the electronic device displays an unselected indicator (e.g., 824B of FIG. 8S or 8Y). In accordance with a determination that the sixth input is a second gesture (e.g., user input 838 of FIG. 8Z) (e.g., a deep press gesture, a press and hold gesture, or a de-pinch gesture centered on the media item), different than the first gesture, the electronic device: displays (958), on the display, a one-up view (e.g., 814 as shown in FIG. 8AA) of the first media item (e.g., 816B) without toggling whether the first media item is selected. For example, at FIGS. 8X-8Y, in response to user input 836 (e.g., a tap on media item 816B), the device toggles selection of media item 816B without entering a one-up view. At FIGS. 8Z-8AA, in response to user input 838 (e.g., a de-pinch centered on media item 816B), the device enters a one-up view without toggling selection of media item 816B. In some embodiments, a subsequent user input (e.g., that is the first gesture, such as a tap) (e.g., user input 840 of FIG. 8AB) received on the media item displayed while in a one-up view toggles selection of the media item (e.g., as shown in FIGS. 8AB-8AC).

Toggling, or forgoing toggling and entering a one-up view of media item, depending on whether an input is a first gesture or a second gesture, respectively, provides with user with more control of the device by allowing gesture-dependent, different outcomes from a input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the representation (e.g., 816B of FIG. 8AA) of the first media item (e.g., 816B) of the first collection of media items comprises displaying (960), on the display, a one-up view of the first media item (e.g., as shown in FIG. 8Q, 8AA, or 8AG), wherein the sixth input (e.g., 828 of FIG. 8R, 840 of FIG. 8AB, or 844 of FIG. 8AF) is received while displaying the one-up view of the first media item.

In some embodiments, while in the media item selection mode, the electronic device (e.g., 600) receives (962), via the one or more input devices, input (e.g., 828 of FIG. 8R, 836 of FIG. 8X, 840 of FIG. 8AB, or 844 of FIG. 8AF) that defines a user-selected set of media items in the first collection of media items (e.g., selection and/or de-selection of one or more media items), wherein the user-selected set of media items in the first collection includes fewer than all media items in the first collection (e.g., 29 out of 30 as indicated in FIG. 8AH). Subsequent to receiving the input that defines the user-selected set of media items in the first collection, the electronic device receives (964), via the one or more input devices, the fourth input (e.g., 830 of FIG. 8T, or 846 of FIG. 8AH) representing selection of the third affordance (e.g., 814G, or 814J). In response to receiving the fourth input representing selection of the third affordance, the electronic device causes (966) the user-selected set of media items in the first collection to be added to a media library associated with the second user (e.g., saves the photos to a locally stored media library and/or causes a cloud-based service to save photos to a remotely stored media library) without causing media items in the first collection that are not included in the user-selected set of media items to be added to the media library associated with the second user. For example, in response to receiving user input 846 of FIG. 8AH, the electronic device causes the addition of the 29 selected media items to a media library, without causing the addition of the 1 unselected media item (media item 816B) to the media library.

In some embodiments, the interface (e.g., 814 as shown in FIG. 8AD) for viewing the first collection includes (968) a plurality of representations of media items (e.g., 816A and 816B, as shown in FIG. 8AD) arranged in a grid (e.g., arranged aligned along one or more of a vertical axis or horizontal axis), the plurality of representations includes the representation of the first media item (e.g., 816B), and in response to receiving the fifth input (970): in accordance with a determination that the fifth input is a third gesture (e.g., a tap on a media item), the electronic device (e.g., 600): displays (972), on the display, a one-up view of the first media item without entering into the media item selection mode (e.g., such as a one-up view shown in FIG. 8J, but with media item 816B displayed in region 814A). In accordance with a determination (974) that the fifth input is a fourth gesture (e.g., user input 842 of FIG. 8AD) (e.g., a deep press gesture, a press and hold gesture, or a de-pinch gesture centered on a media item), different than the third gesture (e.g., a tap gesture), the electronic device: displays (976), on the display, a one-up view of the first media item (e.g., as shown in FIG. 8AE); and enters (978) into the media item selection mode (e.g., a shown in FIG. 8AE). In some embodiments, the fifth input is received while displaying the first media item in the one-up view and while in the media item selection mode. For example, while displaying a one-up view as shown in FIG. 8N, the electronic can enter a selection mode in response to selection of affordance 814F (e.g., user input 822).

Entering or forgoing entering into a media item selection mode, depending on whether an input that causes a one-up view to be displayed is a fourth gesture or a third gesture, respectively, provides with user with more control of the device by allowing gesture-dependent, different outcomes from an input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first collection of media items includes a first set of media items that are included in a media library associated with the second user, the first collection of media items includes a second set of media items that are not included in the media library associated with the second user, and displaying the interface for viewing the first collection that includes a depiction of at least a portion of the first collection of media items (e.g., a single media item in a one-up view, or a title card and a plurality of photos from the first collection) comprises: displaying (980) representations of the first set of media items that are not included in the media library associated with the second user without displaying representations of the second set of media items that are included in the media library associated with the second user. For example, the electronic device (e.g., 600) does not display (e.g., at interface 814) representations of media items in the first collection that were already included in the second user's (e.g., 805A) media library before the first user (e.g., 805B) shared the first collection. For example, this can avoid adding duplicate media items to a library and makes more efficient use of display space, by not displaying media items that are not new to the user.

Forgoing displaying representations of the second set of media items that are included in the media library associated with the second user allows the user to view only media items that are not already included in their media library, avoiding display and review of duplicate media items. Performing an operation when a set of conditions has been met without requiring further input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) receives (982), via the one or more input devices, a seventh input (e.g., 806 of FIG. 8B) representing selection of the second affordance (e.g., 804C). In response to receiving the seventh input representing selection of the second affordance, and in accordance with a determination that the first collection of media items has not been downloaded (e.g., downloaded data representing at least a portion of the collection of media items) (e.g., user has not previously selected 804C, or otherwise viewed the shared collection), the electronic device initiates (984) a download of the first collection of media items (e.g., the media items represented by affordance 804C, and shown in interface 814). Subsequent to initiating the download of the first collection of media items, the electronic device detects (986) completion of the download of the first collection of media items. In response to detecting (988) completion of the download of the first collection of media items: in accordance with a determination that the second affordance is not currently being displayed (e.g., affordance 804C is no longer displayed in the transcript as shown in FIG. 8F, such as if the transcript as grown or if the device is no longer displaying the transcript and/or a message application as shown in FIG. 6AL), the electronic device displays (990), on the display, a fourth affordance (e.g., 809 of FIG. 8G) associated with the first collection of media items; in accordance with a determination that the second affordance is currently being displayed, the electronic device forgoes (992) displaying the fourth affordance. The electronic device receives (994), via the one or more input devices, an eighth input (e.g., 810 of FIG. 8H) representing selection of the fourth affordance associated with the first collection of media items. In response to the receiving the eighth input, the electronic device displays (996), on the display, an interface (e.g., 814 as shown in FIG. 8J, 8O, 8V, or 8W) for viewing the first collection that includes a depiction of at least a portion of the first collection of media items.

Displaying a third affordance, which causes an interface for viewing the first collection, to be displayed upon completion of a download while content that does not include a first affordance for doing the same is no longer displayed allows the user to quickly access a first collection without requiring excessive input to seek out the first affordance for selection. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the indication that the first user has shared the first collection of media items with the second user includes a link for accessing the first collection of media items, and wherein displaying the second affordance (e.g., 804C of FIG. 8A) associated with the first collection of media items comprises concurrently displaying, on the display: the second affordance associated with the first collection of media items; and an expiration time that indicates when the link for accessing the first collection of media items expires. For example, representation 804C in FIG. 8A indicates an expiration time of January 8 in the included text "Link expires January 8".

In some embodiments, subsequent to the expiration of the link for accessing the first collection of media items, receiving, via the one or more input devices, a ninth input (e.g., such as 812 of FIG. 8I) representing selection of the second affordance (e.g., 804C of FIG. 8I) associated with the first collection of media items. In response to receiving the ninth input representing selection of the second affordance: in accordance with a determination that the at least a portion of the first collection of media items have previously been downloaded, the electronic device (e.g., 600) displays, on the display, an interface for viewing the first collection that includes a depiction of the at least a portion of the first collection of media items (e.g., 814 as shown in FIG. 8AJ). For example, in response to selection of a representation such as 804C of FIG. 8I after access has expired, if one or more media items from the first collection had been downloaded (e.g., before expiration), the electronic device displays shared collection interface such as 814 as shown in FIG. 8AJ, or 854 as shown in FIG. 8AL. The shared interface can be displayed in a one-up view or a grid view. In accordance with a determination that the at least a portion of the first collection of media items have not previously been downloaded, the electronic device forgoes displaying, on the display, the interface for viewing the first collection that includes the depiction of the at least a portion of the first collection of media items. For example, selection of 804C after access has expired might cause display of an error message or have no effect (e.g., not cause display of an interface in response). In some embodiments, the electronic device displays (e.g., associated with the second affordance) an indication that the link has expired (e.g., as shown in representation 604H of FIG. 6AAC).

Displaying the user interface for viewing the first collection in response despite selection of an expired link, in accordance with at least a portion of the first collection having been downloaded, provides the user with quick access to the downloaded media without requiring excessive input to seek out the downloaded media items in a library interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIGS. 9A-9G) are also applicable in an analogous manner to the methods described below/above. For example, method 900 optionally includes one or more of the characteristics of the various methods described above with reference to method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of sharing suggestions or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted and relevant sharing suggestions that are of greater interest to the user. Accordingly, use of such personal information data enables users to review a sharing suggestion yet control whether to share the content with others. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing sharing suggestions, the present technology can be configured to allow users to select to "opt in" or "opt out" of participation in the collection of personal information data during registration for services or anytime thereafter. In another example, users can select not to provide, or limit, data for determining sharing suggestions relevant to the user's activity or device. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and suggested to users by inferring preferences or relevance based on non-personal information data or a bare minimum amount of personal information, such as the content being requested by the device associated with a user, other non-personal information available to the sharing suggestion services, or publicly available information.

What is claimed is:

1. An electronic device, comprising:
a display;
one or more input devices;
one or more processors; and
memory storing one or more programs configured to be executed by the one or more processors, the one or more programs including instructions for:
  receiving, via the one or more input devices, a request to share a collection of media items;
  in response to receiving the request to share the collection of media items, displaying, on the display, a recipient confirmation user interface including a set of one or more suggested recipients, wherein the set of one or more suggested recipients is identified based on one or more faces detected in the collection of media items, and wherein the set of one or more suggested recipients includes:
    a first suggested recipient that corresponds to a first detected face that is associated with contact information of one or more contact lists of a user of the electronic device; and
    a second suggested recipient that corresponds to a second detected face that is not associated with contact information of the one or more contact lists of the user of the electronic device, wherein the second suggested recipient is concurrently displayed with the first suggested recipient;
  detecting a set of one or more inputs that includes selection of the second suggested recipient;
  in response to detecting the set of one or more inputs that includes selection of the second suggested recipient, associating the second suggested recipient with contact information;
  after displaying the recipient confirmation user interface, receiving a request to share the collection of media items; and
  in response to receiving the request to share the collection of media items, initiating a process for sharing the collection of media items with a set of one or more selected recipients that includes at least one of the one or more suggested recipients.

2. The electronic device of claim 1, wherein the recipient confirmation user interface includes an affordance for adding a first recipient to the set of one or more selected recipients, wherein the first recipient is not included in the set of one or more suggested recipients.

3. The electronic device of claim 1, the one or more programs further including instructions for:
detecting, via the one or more input devices, a first set of one or more inputs to remove a second recipient from the set of one or more selected recipients.

4. The electronic device of claim 1, the one or more programs further including instructions for:
subsequent to sharing the collection of media items with the set of one or more selected recipients, displaying, on the display, a preview of the collection of media items in a messaging application.

5. The electronic device of claim 1, the one or more programs further including instructions for:
subsequent to sharing the collection of media items with the set of one or more selected recipients, displaying, on the display, a status of the collection of media items in a messaging application.

6. The electronic device of claim 1, the one or more programs further including instructions for:

prior to sharing the collection of media items with the set of one or more selected recipients, displaying, on the display, a preview of the collection of media items.

7. The electronic device of claim 6, the one or more programs further including instructions for:

while displaying the preview of the collection of media items, detecting a third set of one or more inputs to modify the collection of media items.

8. The electronic device of claim 1, wherein selection of the set of one or more suggested recipients is further based on a date criterion.

9. The electronic device of claim 1, wherein selection of the set of one or more suggested recipients is further based on a location criterion.

10. The electronic device of claim 1, wherein selection of the set of one or more suggested recipients is further based on a requirement that each media item includes at least one of the one or more faces.

11. The electronic device of claim 1, wherein selection of the set of one or more suggested recipients is further based on a requirement that each media item corresponds to an event at which a respective person was present.

12. The electronic device of claim 1, wherein:

displaying the recipient confirmation user interface includes concurrently displaying:

the set of one or more suggested recipients; and an add recipient affordance for adding a third recipient to the set of one or more suggested recipients.

13. The electronic device of claim 1, the one or more programs further including instructions for:

detecting, via the one or more input devices, a second set of one or more inputs to add a third recipient to the set of one or more suggested recipients, wherein the third recipient is not included in the set of one or more suggested recipients; and in response to detecting the second set of one or more inputs, adding the third recipient to the set of one or more suggested recipients.

14. The electronic device of claim 1, wherein displaying the recipient confirmation user interface includes concurrently displaying the second suggested recipient with an indication that the second suggested recipient corresponds to a detected face that is not associated with contact information.

15. The electronic device of claim 1, wherein displaying the recipient confirmation user interface includes concurrently displaying the second suggested recipient with a representation of the second detected face that is from a portion of a media item of the collection of media items.

16. The electronic device of claim 1, wherein displaying the recipient confirmation user interface includes:

concurrently displaying the first suggested recipient with contact information from the one or more contact lists associated with the user; and concurrently displaying the second suggested recipient without contact information from the one or more contact lists associated with the user.

17. A non-transitory computer-readable storage medium storing one or more programs configured to be executed by one or more processors of an electronic device with a display and one or more input devices, the one or more programs including instructions for:

receiving, via the one or more input devices, a request to share a collection of media items;

in response to receiving the request to share the collection of media items, displaying, on the display, a recipient confirmation user interface including a set of one or more suggested recipients, wherein the set of one or more suggested recipients is identified based on one or more faces detected in the collection of media items, and wherein the set of one or more suggested recipients includes:

a first suggested recipient that corresponds to a first detected face that is associated with contact information of one or more contact lists of a user of the electronic device; and a second suggested recipient that corresponds to a second detected face that is not associated with contact information of the one or more contact lists of the user of the electronic device, wherein the second suggested recipient is concurrently displayed with the first suggested recipient;

detecting a set of one or more inputs that includes selection of the second suggested recipient;

in response to detecting the set of one or more inputs that includes selection of the second suggested recipient, associating the second suggested recipient with contact information;

after displaying the recipient confirmation user interface, receiving a request to share the collection of media items; and in response to receiving the request to share the collection of media items, initiating a process for sharing the collection of media items with a set of one or more selected recipients that includes at least one of the one or more suggested recipients.

18. The non-transitory computer-readable storage medium of claim 17, wherein the recipient confirmation user interface includes an affordance for adding a first recipient to the set of one or more selected recipients, wherein the first recipient is not included in the set of one or more suggested recipients.

19. The non-transitory computer-readable storage medium of claim 17, the one or more programs further including instructions for:

detecting, via the one or more input devices, a first set of one or more inputs to remove a second recipient from the set of one or more selected recipients.

20. The non-transitory computer-readable storage medium of claim 17, the one or more programs further including instructions for:

subsequent to sharing the collection of media items with the set of one or more selected recipients, displaying, on the display, a preview of the collection of media items in a messaging application.

21. The non-transitory computer-readable storage medium of claim 17, the one or more programs further including instructions for:

subsequent to sharing the collection of media items with the set of one or more selected recipients, displaying, on the display, a status of the collection of media items in a messaging application.

22. The non-transitory computer-readable storage medium of claim 17, the one or more programs further including instructions for:

prior to sharing the collection of media items with the set of one or more selected recipients, displaying, on the display, a preview of the collection of media items.

23. The non-transitory computer-readable storage medium of claim 22, the one or more programs further including instructions for:

while displaying the preview of the collection of media items, detecting a third set of one or more inputs to modify the collection of media items.

24. The non-transitory computer-readable storage medium of claim 17, wherein selection of the set of one or more suggested recipients is further based on a date criterion.

25. The non-transitory computer-readable storage medium of claim 17, wherein selection of the set of one or more suggested recipients is further based on a location criterion.

26. The non-transitory computer-readable storage medium of claim 17, wherein selection of the set of one or more suggested recipients is further based on a requirement that each media item includes at least one of the one or more faces.

27. The non-transitory computer-readable storage medium of claim 17, wherein selection of the set of one or more suggested recipients is further based on a requirement that each media item corresponds to an event at which a respective person was present.

28. The non-transitory computer-readable storage medium of claim 17, wherein:

displaying the recipient confirmation user interface includes concurrently displaying:

the set of one or more suggested recipients; and an add recipient affordance for adding a third recipient to the set of one or more suggested recipients.

29. The non-transitory computer-readable storage medium of claim 17, the one or more programs further including instructions for:

detecting, via the one or more input devices, a second set of one or more inputs to add a third recipient to the set of one or more suggested recipients, wherein the third recipient is not included in the set of one or more suggested recipients; and in response to detecting the second set of one or more inputs, adding the third recipient to the set of one or more suggested recipients.

30. The non-transitory computer-readable storage medium of claim 17, wherein displaying the recipient confirmation user interface includes concurrently displaying the second suggested recipient with an indication that the second suggested recipient corresponds to a detected face that is not associated with contact information.

31. The non-transitory computer-readable storage medium of claim 17, wherein displaying the recipient confirmation user interface includes concurrently displaying the second suggested recipient with a representation of the second detected face that is from a portion of a media item of the collection of media items.

32. The non-transitory computer-readable storage medium of claim 17, wherein displaying the recipient confirmation user interface includes:

concurrently displaying the first suggested recipient with contact information from the one or more contact lists associated with the user; and concurrently displaying the second suggested recipient without contact information from the one or more contact lists associated with the user.

33. A method, comprising:

at an electronic device with a display and one or more input devices:

receiving, via the one or more input devices, a request to share a collection of media items;

in response to receiving the request to share the collection of media items, displaying, on the display, a recipient confirmation user interface including a set of one or more suggested recipients, wherein the set of one or more suggested recipients is identified based on one or more faces detected in the collection of media items, and wherein the set of one or more suggested recipients includes:

a first suggested recipient that corresponds to a first detected face that is associated with contact information of one or more contact lists of a user of the electronic device; and a second suggested recipient that corresponds to a second detected face that is not associated with contact information of the one or more contact lists of the user of the electronic device, wherein the second suggested recipient is concurrently displayed with the first suggested recipient;

detecting a set of one or more inputs that includes selection of the second suggested recipient;

in response to detecting the set of one or more inputs that includes selection of the second suggested recipient, associating the second suggested recipient with contact information;

after displaying the recipient confirmation user interface, receiving a request to share the collection of media items; and in response to receiving the request to share the collection of media items, initiating a process for sharing the collection of media items with a set of one or more selected recipients that includes at least one of the one or more suggested recipients.

34. The method of claim 33, wherein the recipient confirmation user interface includes an affordance for adding a first recipient to the set of one or more selected recipients, wherein the first recipient is not included in the set of one or more suggested recipients.

35. The method of claim 33, further comprising:

detecting, via the one or more input devices, a first set of one or more inputs to remove a second recipient from the set of one or more selected recipients.

36. The method of claim 33, further comprising:

subsequent to sharing the collection of media items with the set of one or more selected recipients, displaying, on the display, a preview of the collection of media items in a messaging application.

37. The method of claim 33, further comprising:

subsequent to sharing the collection of media items with the set of one or more selected recipients, displaying, on the display, a status of the collection of media items in a messaging application.

38. The method of claim 33, further comprising:

prior to sharing the collection of media items with the set of one or more selected recipients, displaying, on the display, a preview of the collection of media items.

39. The method of claim 38, further comprising:

while displaying the preview of the collection of media items, detecting a third set of one or more inputs to modify the collection of media items.

40. The method of claim 33, wherein selection of the set of one or more suggested recipients is further based on a date criterion.

41. The method of claim 33, wherein selection of the set of one or more suggested recipients is further based on a location criterion.

42. The method of claim 33, wherein selection of the set of one or more suggested recipients is further based on a requirement that each media item includes at least one of the one or more faces.

43. The method of claim 33, wherein selection of the set of one or more suggested recipients is further based on a requirement that each media item corresponds to an event at which a respective person was present.

44. The method of claim 33, wherein:

displaying the recipient confirmation user interface includes concurrently displaying:

the set of one or more suggested recipients; and an add recipient affordance for adding a third recipient to the set of one or more suggested recipients.

45. The method of claim 33, further comprising:

detecting, via the one or more input devices, a second set of one or more inputs to add a third recipient to the set of one or more suggested recipients, wherein the third recipient is not included in the set of one or more suggested recipients; and in response to detecting the second set of one or more inputs, adding the third recipient to the set of one or more suggested recipients.

46. The method of claim 33, wherein displaying the recipient confirmation user interface includes concurrently displaying the second suggested recipient with an indication that the second suggested recipient corresponds to a detected face that is not associated with contact information.

47. The method of claim 33, wherein displaying the recipient confirmation user interface includes concurrently displaying the second suggested recipient with a representation of the second detected face that is from a portion of a media item of the collection of media items.

48. The method of claim 33, wherein displaying the recipient confirmation user interface includes:

concurrently displaying the first suggested recipient with contact information from the one or more contact lists associated with the user; and concurrently displaying the second suggested recipient without contact information from the one or more contact lists associated with the user.

* * * * *